United States Patent [19]

Paker et al.

[11] Patent Number: 5,345,441
[45] Date of Patent: Sep. 6, 1994

[54] HIERARCHICAL PATH HUNT FOR MULTIRATE CONNECTIONS

[75] Inventors: Marianne F. Paker, West Chicago; Robert L. Pawelski, Lisle; William A. Payne, III, Glen Ellyn; Gaylord W. Richards, Lisle, all of Ill.

[73] Assignee: AT&T Bell Laboratories, Murray Hill, N.J.

[21] Appl. No.: 964,224

[22] Filed: Oct. 20, 1992

[51] Int. Cl.$^5$ .................. H04J 14/08; H04Q 11/04; H04L 12/52

[52] U.S. Cl. .................. 370/54; 370/58.1; 370/84; 370/95.1

[58] Field of Search .............. 370/84, 60, 60.1, 58.1, 370/58.2, 58.3, 110.1, 68, 66, 112, 95.1, 54, 59, 13, 85.7

[56] References Cited

U.S. PATENT DOCUMENTS

| | | | |
|---|---|---|---|
| 4,485,468 | 11/1984 | Slana | 370/58 |
| 4,855,996 | 8/1989 | Douskalis | 370/84 |
| 4,876,682 | 10/1989 | Graves et al. | 370/66 |
| 4,967,405 | 10/1990 | Upp et al. | 370/58.1 |
| 4,991,168 | 2/1991 | Richards | 370/54 |
| 4,993,016 | 2/1991 | Richards | 370/54 |
| 4,998,242 | 3/1991 | Upp | 370/60 |
| 5,005,170 | 4/1991 | Nelson | 370/84 |
| 5,005,171 | 4/1991 | Modisette et al. | 370/110.1 |
| 5,040,173 | 8/1991 | Richards | 370/54 |
| 5,043,979 | 8/1991 | Sakurai et al. | 370/60 |
| 5,115,425 | 5/1992 | Ardon | 370/58.1 |
| 5,146,455 | 9/1992 | Goke et al. | 370/68 |
| 5,161,152 | 11/1992 | Czarwiec et al. | 370/84 |
| 5,197,063 | 3/1993 | Nakano et al. | 370/58.1 |
| 5,265,090 | 11/1993 | Guinand et al. | 370/58.1 |

OTHER PUBLICATIONS

*Enhanced Network*, Product/Service Information, document No. 50041.16/04-91 (Apr. 12, 1991), Northern Telecom, pp. 1-22,A-1-A-9,B-1-B-3.

*Synchronous Optical Networks (SONET)*, Technical Advisory TA-TSY-000253, Issue 2(May 1987), Bell Communications Research, Inc., pp. 1-77.

*Synchronous Optical Network (SONET) Transport Systems: Common Generic Criteria*, Technical Reference TR-NWT-000253, Issue 2(Dec. 1991), Bell Communications Research, Inc., pp. 3-1-3-76.

Primary Examiner—Wellington Chin
Assistant Examiner—Chau T. Nguyen
Attorney, Agent, or Firm—David Volejnicek

[57] ABSTRACT

In a time-space-time switching network that provides connections at a hierarchy of data rates, a path-hunt arrangement effects establishment of a switched connection of a given bandwidth as a collection of a plurality of connections of smaller bandwidths of different sizes. Connections are first found at the highest rate of the hierarchy to satisfy as much of the given bandwidth as possible. Then, connections are found at the lower rates to satisfy any remaining unsatisfied bandwidth. The path-hunt uses a hierarchy of status tables, corresponding to the hierarchy of rates, for each time-switching element of the network. The tables have entries that define availability of time slots—representing bandwidth of the tables' corresponding rates—between that time-switching element and a space-switching stage of the network. Connections are provided at the highest rate by finding matching idle time-slot entries in the high rate status tables for the two time-switching elements involved in the connection. Connections are provided at a lower rate by finding matching partially-full time-slot entries in the highest rate status tables for the two time-switching elements and then finding matching idle time-slot entries in the corresponding lower-rate status tables. To maximize path-hunt efficiency while maintaining non-blocking performance, the path-hunt follows a search hierarchy for lower-rate connections that first searches for matching partially-full time-slot entries in higher-rate status tables, and uses idle time-slot entries in higher-rate status tables only as a last resort.

63 Claims, 92 Drawing Sheets

| FRAME TYPE | TIME SLOT # | BINARY TIME-SLOT ADDRESS | DECIMAL EQUIVALENT |
|---|---|---|---|
| DS-0 | 0 | 00 0000 0000 0000 | 0 |
|  | 9719 | 10 0101 1111 0111 | 9719 |
| VT | 0 | 11 1000 0000 0000 | 14336 |
|  | 1007 | 11 1011 1110 1111 | 15343 |
| STS | 0 | 11 1111 1111 0000 | 16368 |
|  | 11 | 11 1111 1111 1011 | 16379 |

VT2 PER-COLUMN INPUT TIME-SLOT ADDRESS COMPENSATION

| INPUT VT2 SET # \ OUTPUT VT2 SET # | FIRST | SECOND | THIRD |
|---|---|---|---|
| FIRST | (0,0,0,0) | (0,-12,0,0) | (0,-12,-12,0) |
| SECOND | (0,+12,0,0) | (0,0,0,0) | (0,0,-12,0) |
| THIRD | (0,+12,+12,0) | (0,0,+12,0) | (0,0,0,0) |

FIG. 28

INPUT TSI STS-1 TIMESLOT BLOCK STATUS MATRIX 2800

| INPUT LINK/PORT \ TIME SLOT BLOCK | #0 | ... | #11 | ... | #23 |
|---|---|---|---|---|---|
| #0 | 2711 | | 2711 | | 2701 |
| ⋮ | | | | | |
| #63 | | | 2701 | | 2711 |

OUTPUT TSI STS-1 TIMESLOT BLOCK STATUS MATRIX 2801

| OUTPUT LINK/PORT \ TIME SLOT BLOCK | #0 | ... | #11 | ... | #23 |
|---|---|---|---|---|---|
| #0 | 2711 | | 2711 | | 2711 |
| ⋮ | | 2701 | | | |
| | | | | | 2701 |
| #64 | 2711 | | 2711 | | 2711 |

FIG. 29

| VT GROUP \ VT | #0 | #1 | #2 | #3 |
|---|---|---|---|---|
| #0 | 2712 | 2712 | 2712 | 2712 |
|  |  |  |  |  |
| . | VT1 | VT1 | VT1 | VT1 |
| . | VT2 | VT2 | VT2 | NOT USED |
| . | VT3 | VT3 | NOT USED | NOT USED |
|  | VT6 | NOT USED | NOT USED | NOT USED |
|  |  |  |  |  |
| #6 | 2712 | 2712 | 2712 | 2712 |

VT TIMESLOT BLOCK STATUS MATRIX 2900 — 2702

VT GROUP STATUS MATRIX 3000

| STS-1 \ VT GROUP | #0 | . . . | #6 | | 3000 |
|---|---|---|---|---|---|
| #0 | 3001 | | 3001 | | |
| ... | | | | . . . | |
| #11 | 3001 | | 3001 | | |
| ... | | | | | |
| #23 | 3001 | | 3001 | | |

*FIG. 31*

DS-0 TIMESLOT BLOCK STATUS MATRIX 3100

| DS-0 / VT GROUP | #0 | ... | #107 | | |
|---|---|---|---|---|---|
| #0 | 2713 | | 2713 | | 3100 |
| #1 | 2703 | | | ... | |
| #2 | 2713 | | 2713 | | |
| #3 | 2713 | | 2713 | | |
| ⋮ | | | | | |
| #6 | 2703 | | | | |

SET UP ALGORITHM
FOR ONE STS-1 CONNECTION

SET-UP ALGORITHM FOR C VT6 CONNECTIONS

SET-UP ALGORITHM
FOR G DSO CONNECTIONS

SET UP ALGORITHM
FOR ONE DS0 CONNECTION

HIERARCHICAL PATH HUNT FOR MULTIRATE CONNECTIONS

CROSS-REFERENCE TO RELATED APPLICATIONS

This application is related to the following concurrently-filed and jointly-owned applications:

R. L. Pawelski, "Multirate, Sonet-Ready, Switching Arrangement", Case 3, Ser. No. 07/964,537;

R. L. Pawelski, "Multirate, Sonet-Ready, Switching Arrangement", Case 7, Ser. No. 07/963,976; and M. F. Paker, R. L. Pawelski, and W. A. Payne, III, "A TDM Circuit-Switching Arrangement that Handles Frames of Different Sizes", Ser. No. 07/963,975.

TECHNICAL FIELD

This invention relates to telecommunications switching.

BACKGROUND AND PROBLEM

In recent years, standards have been developed for the transport of broadband communications. Among these are the Synchronous Optical Network (SONET) and the similar Synchronous Digital Hierarchy (SDH). The expected growth in synchronous transport facilities based on SONET and SDH supports a need for more efficient synchronous switch fabric architectures. The modular byte-interleaved structure of SONET is based on Synchronous Transport Signal level 1, or STS-1, format, in which overhead plus payload results in a rate of 51.840 Mb/s. The STS-1 frame consists of 90 columns by 9 rows of bytes, or 810 bytes, with a frame rate of 125 $\mu$s. The first three columns in the frame are devoted to transport overhead (TOH), while the remaining 87 columns carry the payload, including one column devoted to path overhead (POH). 87 columns of payload constitute a Synchronous Payload Envelope (SPE). However, an SPE can cross frame boundaries, and is allowed to float anywhere within the payload-carrying portion of one or more contiguous frames to accommodate the semi-synchronous nature of the transport facilities. For switching of rates below the STS-1 rate, a switch assumes that the path overhead has been aligned with the first column following transport overhead.

Super STS-1 signals (STS-N) are formed by byte-multiplexing the N constituent STS-1 signals, with the resultant bandwidth being N times that of the STS-1 rate. Conversely, sub STS-1 signals are transported in Virtual Tributaries (VTs), of which four sizes are defined at present, namely VT1.5 (1.728 Mb/s), VT2 (2.304 Mb/s), VT3 (3.456 Mb/s) and VT6 (6.912 M/b/s). To accommodate mixes of VTs, the VT-structured STS-1 SPE is divided into 7 VT groups, with each group occupying 12 columns of the 9-row frame structure; 2 columns remain unused and are referred to as STUFF columns. A VT group may contain 4 VT1.5s, 3 VT2s, 2 VT3s, or 1 VT 6. Both the super STS and sub STS signals retain the frame rate of 125 $\mu$s.

FIG. 2 shows a 3-dimensional representation of an STS-12 frame as an illustrative example. There are 12 vertical planes which represent the 12 STS-1s, each composed of 90 columns and 9 rows, for a total of 9720 bytes. Vertical columns may be grouped to form Virtual Tributaries (VTs), as shown by the four regularly-spaced columns representing a VT2 in position #3. While a VT2 requires 4 regularly-spaced columns, as shown, a VT1.5 requires 3 regularly-spaced columns, a VT3 requires 6 regularly-spaced columns, and a VT6 requires 12 regularly-spaced columns. Finally, a DS-0, corresponding to a 64 kilobits-per-second rate, appears as a single byte within one row and column. There are a maximum of 774 DS-0s per STS-1, some of which may be used for additional overhead functions; 756 DS-0s are available for traffic transport.

The three component sub-rates of an STS-N frame—STS-1, VT, and DS-0—may be switched independently by three separate switching fabrics, each dedicated to switching one of the sub-rates. But this is inefficient in the amount of equipment used: it requires demultiplexers at the inputs to the switching fabrics to separate the sub-rates, a separate switching fabric for each sub-rate, and multiplexers at the outputs from the switching fabrics to combine the switched sub-rates back into STS-N frames. The use of a single switching fabric for all sub-rates is therefore preferable.

Given a switching fabric capable of switching multiple rates within an STS-N format, one is faced with the problem of efficiently setting up multirate calls through such a fabric. One approach is to treat a call of any given bandwidth as multiple DS-0 calls. Although this is a flexible approach, the disadvantage is that a path-hunt and a path-setup must be performed individually for each DS-0 call. For example, a single STS-1 call would require as many as 810 individual path hunts and control-memory-setups. This is inefficient both in terms of the amount of time required for the path hunting and the number of control communications required to set up the individual paths.

Solution

The above problem is solved and a technical advance is achieved in accordance with the principles of the invention in a method of providing a switched connection of a given bandwidth through such a multiple-rate network where connections are provided at a high rate of a hierarchy of data rates to satisfy some of the given bandwidth—preferably as much of the given bandwidth as possible—thereby minimizing the number of path hunts and control communications required. Connections are then also provided at lower rates of the hierarchy to satisfy other, e.g., any remaining unsatisfied, of the given bandwidth. Hence, the connection of the given bandwidth is provided as a collection of a plurality of connections of smaller bandwidths of different sizes. Illustratively, the given bandwidth is divided into connections at the high rate, and any remainder of that bandwidth is divided into connections at the lower rate. An attempt is then made to provide the connections at the high rate. The bandwidth of any of the high-rate connections that fail to be made, e.g., because of unavailability of idle connections of this rate, is divided into additional connections at the lower rates. An attempt is then made to provide the lower-rate connections.

In an illustrative embodiment disclosed herein, the switching network is a three-stage network, such as a time-space-time network, and a hierarchy of status tables are stored for each input and each output switching element of the network. The tables have entries defining availability of time slots—representing bandwidth of the tables' corresponding rates—between the corresponding input or output switching element and an intermediate stage of the network. The hierarchy of status tables correspond to the hierarchy of data rates, and define availability as full (non-available), partial, or idle (fully available). Connections are provided at the high rate by finding matching idle entries in the high rate status tables across the intermediate stage, i.e., for the interface between the intermediate stage and the input and the output switching elements involved in the connection—referred to herein as status tables for the input and the output switching elements, for short. Connections are provided at a lower rate by finding matching entries that define at least partial availability in the high rate status tables for the input and the output switching elements and then finding matching idle entries in the corresponding lower-rate status tables. To maximize non-blocking performance, the path-hunt follows a search hierarchy for the lower-rate connections by first finding any matching partial entries in the high rate status tables for the input and the output switching elements. If sufficient partial entries cannot be found in the high rate status tables, or if sufficient idle entries cannot be found in the corresponding lower-rate status tables, further lower-rate connections are provided by finding corresponding partial/idle and idle/partial entries in the high data-rate status tables for the input and the output switching elements, and again finding matching idle entries in the corresponding lower-rate status tables. Finally, any remaining lower-rate connections are provided by finding corresponding idle entries in the high data-rate status tables for the input and the output switching elements, and finding matching idle entries in the corresponding lower-rate status tables. Thus, idle entries at the high data-rate are made unavailable for other connections at that rate only as a last resort, to prevent blocking. If the hierarchy of data rates comprises intermediate data rates, this search hierarchy is followed at every level of the hierarchy of status tables so as to preserve idle blocks of bandwidth at every level for use by connections of the highest possible data rate, whenever possible. Fragmenting of the idle bandwidth, into small fragments that would necessitate the making of connections of a given bandwidth as a collection of a larger-than-optimum number of smaller-than-optimum-size connections, is thereby minimized.

In a specific illustrative embodiment, the three-stage switching network provides connections at three types of rates: STS-1, VT, and DS-0. In addition, the intermediate rate type can be one or more of the VT1.5, VT2, VT3, or VT6 rates. The tables of the hierarchy of status tables correspond to the STS-1, VT and DS-0 data rates, and define availability as full, partial, or idle for the STS-1 and VT rates and define availability as busy or idle for the DS-0 data rate.

When an STS-1 connection is requested, matching idle entries are found in the STS-1 status tables for the input and the output switching elements to be used for the STS-1 connection. The time slots represented by the matching idle entries are assigned to the STS-1 connection. When matching idle entries are not found, an attempt is made to complete the STS-1 connection as a plurality of VT connections.

When a VT connection of an individual rate is requested, matching idle entries for the individual rate are found in the VT status tables for the input and the output switching elements. The time slots represented by the matching idle VT entries are assigned to the VT connection but only when the result of the assignment does not result in a previously-idle STS-1 entry no longer being available for STS-1 connections, unless such assignment is necessary to prevent blocking of the VT connection. When no time slots are assigned to the VT connection, an attempt is made to complete the VT connection as a plurality of DS-0 connections.

When a DS-0 connection is requested, matching idle entries are found in the DS-0 status tables for the input and the output switching elements. The time slots represented by the matching idle DS-0 entries are assigned to the DS-0 connection, but only when the result of the assignment does not result in a previously-idle VT entry no longer being available for VT connections, unless such assignment is necessary to prevent blocking of the DS-0 connection.

The invention minimizes the number of path-hunts that must be performed and the number of connections that must be set up to create a desired connection of a given bandwidth, yet does so without wasting bandwidth available for carrying other connections. It allows desired connections of substantially any bandwidth to be made, without sacrificing efficiency of path-hunting and connection-establishment and without sacrificing conservation of bandwidth. Furthermore, the invention utilizes available bandwidth in a most efficient manner, avoiding idle bandwidth fragmentation so as to minimize instances when a desired connection must be made as a collection of a greater-than-optimum number of smaller-than-optimum-size connections. Yet, at the same time, it provides flexibility in the composition of a desired connection so that the desired connection may be established as long as the given bandwidth is available, irrespective of the size and number of blocks into which that available bandwidth is fragmented.

These and other advantages and features of the invention will become apparent from the following description of an illustrative embodiment of the invention taken together with the drawing.

BRIEF DESCRIPTION OF THE DRAWING

FIG. 28 is a block diagram of TSI STS-1 timeslot block status matrices for the TSIs of the switching system of FIG. 1;

FIG. 29 is a block diagram of VT timeslot block status matrices for the TSIs of the switching system of FIG. 1;

FIG. 30 is a block diagram of VT group status matrices for the TSIs of the switching system of FIG. 1;

FIG. 31 is a block diagram of DS-0 timeslot block status matrices for the TSIs of the switching system of FIG. 1;

DETAILED DESCRIPTION

Figure 1:
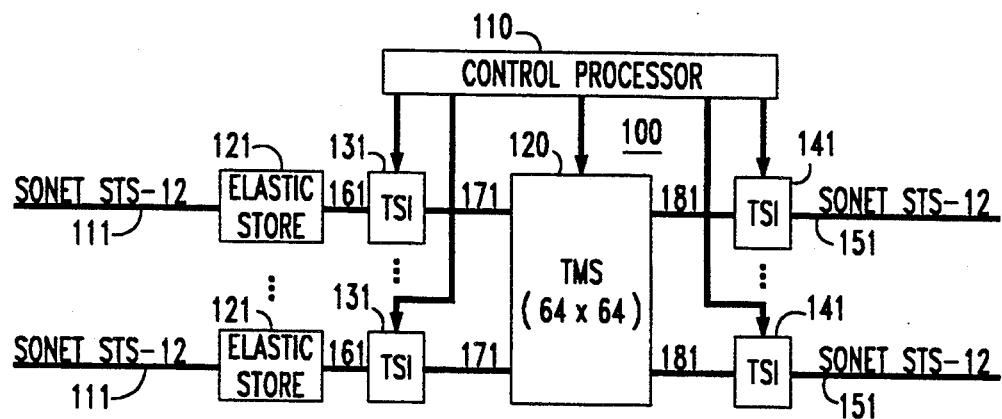
FIG. 1 is a block diagram of a time-division multiplex circuit-switching system that incorporates an illustrative embodiment of the invention.

FIG. 1 is a block diagram of an exemplary SONET switching system 100 in accordance with the invention. System 100 is of the time-space-time (T-S-T) type with 64 input time-slot interchangers (TSIs) 131 connected to system input links 111 through elastic stores 121 and their output links 161, a central 64×64 time-multiplexed switch (TMS) 120 connected to output links 171 of TSIs 131, and 64 output time-slot interchangers 141 connected to TMS output links 181 and to system output links 151. Input TSIs 131 each receive the 9720 bytes of SONET STS-12 frames (FIG. 2) incoming on their respective input links 161 after they are aligned by elastic stores 121. A central control processor 110 controls system 100 and, in particular, performs path hunts through the system and controls the various switching elements (TSIs, TMS) in accordance with the path-hunt results.

It is well-known in the art that, in an NxN switching fabric, 2N paths are needed through the switch in order to obtain strictly-non-blocking performance. It is also well-known to obtain the 2N paths through a T-S-T switch by duplicating the T-S-T stages and operating the two duplicate fabrics in parallel. This duplication is assumed but not shown in FIG. 1 in order to avoid undue complexity of the illustration.

Figure 2:
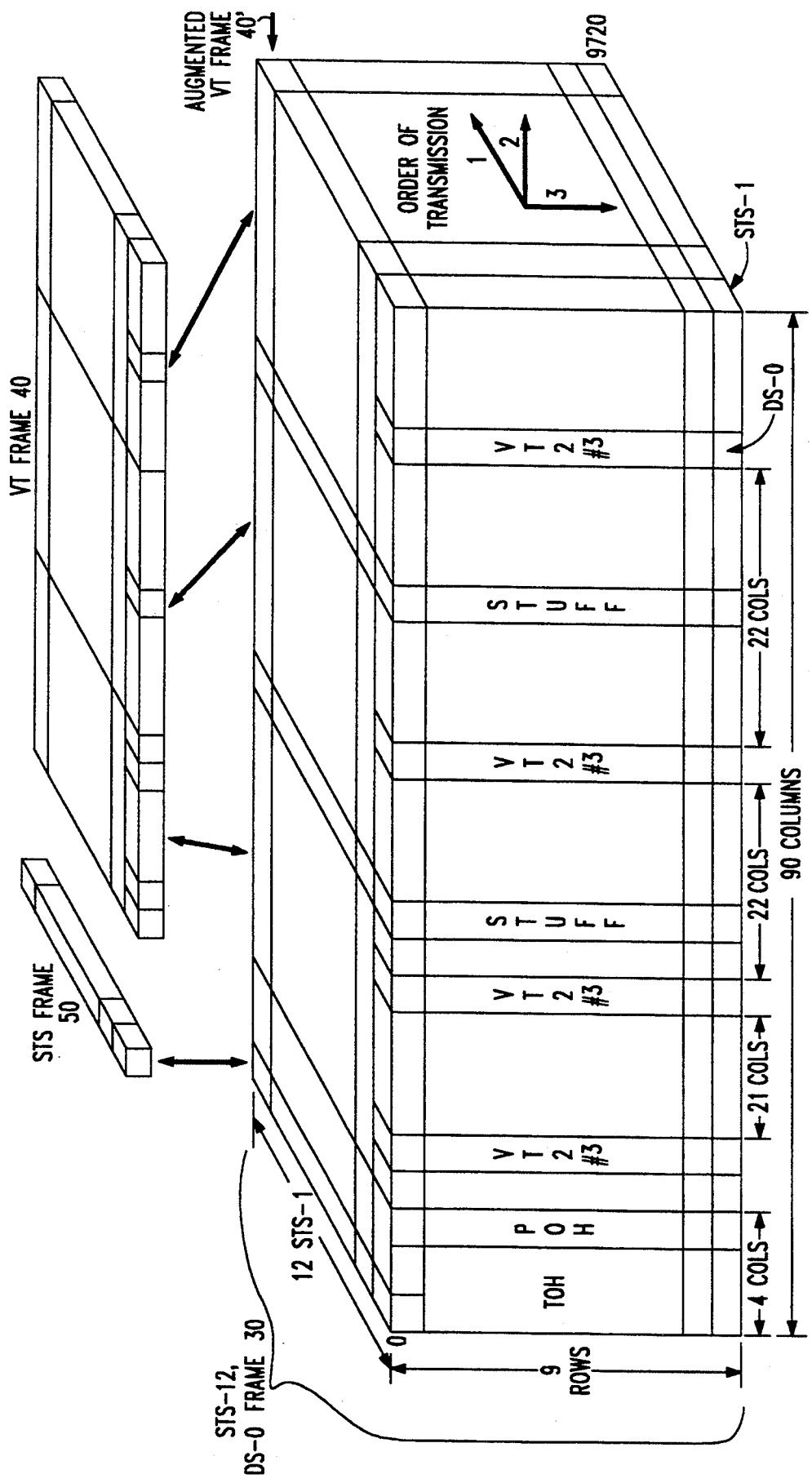
FIG. 2 is a block diagram of the internal configuration of a SONET STS-12 frame.

As was mentioned previously, FIG. 2 is a SONET STS-12 frame map. Note that the 90 columns of each of the twelve included STS-1 frames include four overhead columns (columns 0–3) as well as two stuff columns (columns 32 and 61). FIG. 2 illustrates the four columns used for a single VT2 virtual tributary. The four columns are evenly spaced apart by 21 columns (excluding stuff columns). Other virtual tributary rates VT1.5, VT3, VT6 may also be accommodated within the format. A single DS-0 (64 kilobits-per-second) channel represents a single byte of the STS-12 frame.

Note that the layout of the 9720 bytes of a single 125-microsecond frame is depicted in three dimensions, with the order of transmission (1-2-3) as shown on the right-hand side of FIG. 2. The twelve STS-1 frames are thus transmitted in a byte-interleaved manner. One byte of the same row and column of each STS-1 frame is transmitted in succession, followed by one byte of the same row and next column of each STS-1. When one byte of each column of a row of each STS-1 frame has been transmitted, transmission proceeds to the first column of the next row of each STS-1 frame, and the process repeats.

Returning to FIG. 1, each input TSI 131 is capable of switching any of the 9720 bytes, or time slots, of an STS-12 frame received from an elastic store 121 to any other byte position, or time slot, on a time-multiplexed link 171 to TMS 120; all time-slot interchanging occurs within the boundaries of individual STS-12 frames; each output TSI 141 has a like capability. The SONET STS-12 format is maintained internally within system 100, with the exception that a parity bit is added to each eight-bit byte for internal transmission.

Figure 3:
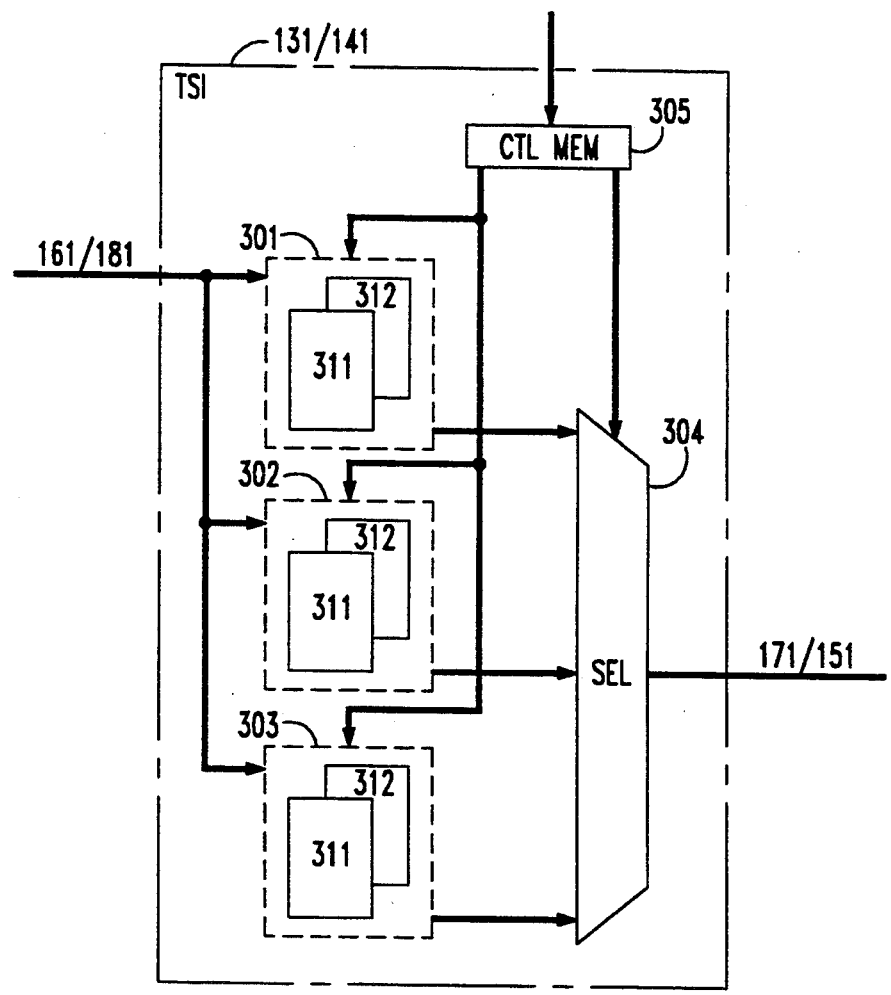
FIG. 3 is a block diagram of a first illustrative embodiment of a time-slot interchanger (TSI) of the system of FIG. 1.

A first illustrative embodiment of a TSI 131 or 141 is shown in FIG. 3. As indicated, TSI 131 or 141 comprises three data buffer memories 301–303. Each memory 301–303 is double-buffered: it comprises two buffers 311 and 312, one of which is written while the other is read and the two of which alternate in time between being read and written. Each memory 301–303 has its data input connected to its TSI's input link 161 or 181 and receives all bytes of each incoming STS-12 frame. The data outputs of the three memories 301–303 of an individual TSI are connected to inputs of a selector 304 whose output is connected to the TSI's output link 171 or 151. At any one time, the data output of only one of the memories 301–303 of a TSI is selected by selector 304 as the output of that TSI. Memories 301–303 and selector 304 of each TSI 131 or 141 operate under control of a control memory 305.

Each memory 301–303 of a TSI 131 or 141 serves a different type of transmission rate. Memory 301 serves the DS-0 rate, memory 302 serves the VT rate, and memory 303 serves the STS-1 rate. The different rates require different amounts of buffering, resulting in memories 301–303 being of different depths. A particular DS-0 channel appears in the data stream of an STS-12 frame only once, every 9720 bytes. Hence, memory 301 must buffer a full STS-12 frame, and so each buffer 311 and 312 of memory 301 is 9720 bytes deep. A particular VT channel appears in the data stream of an STS-12 frame at least once in every row of one of the twelve STS-1s, i.e., at least once in each horizontal plane of rows that make up the STS-12 frame. Hence, memory 302 must buffer one such horizontal plane. Every such horizontal plane comprises 12 (one for each STS-1)-by-86 (one for each column excluding overhead and stuff columns), or 1008, bytes. Therefore, each buffer 311 and 312 of memory 302 is 1008 bytes deep. Finally, a particular STS-1 channel appears in the data stream of an STS-12 frame every 12th byte. Hence, memory 303 must buffer 12 bytes of an STS-12, and so each buffer 311 and 312 of memory 303 is 12 bytes deep.

For ease of understanding, memory 301, operating under control of control memory 305, may be thought of as implementing a TSI 131 or 141 for 9720-byte frames (shown as STS-12 or DS-0 frame 30 in FIG. 2); memory 302 may be thought of as implementing a TSI for 1008-byte frames (shown as VT frame 40 in FIG. 2), and memory 303 may be thought of as implementing a TSI for 12-byte frames (shown as STS frame 50 in FIG. 2). Since the rate of a full STS-12 superframe is 125 $\mu$s, memory 301 causes a buffering delay of 125 $\mu$s for DS-0 rate traffic, memory 302 causes a buffering delay of only 1/9·125 $\mu$s for VT rate traffic, and memory 303 causes a buffering delay of only 1/810·125 $\mu$s for STS-1 rate traffic. This is a significant improvement over the conventional buffering delay of at least the full-frame rate of 125 $\mu$s for all traffic rates.

While the 9720 time-slot STS-12 has been referred to above as a superframe that comprises STS-1, VT, and DS-0 frames, an alternative and equivalent terminology is to refer to the STS-12 as a frame and to refer to the STS-1s, VTs, and DS-0s as sub-frames. For ease of discussion, the STS-12s, STS-1s, VTs, and DS-0s will all be referred to below merely as frames.

Figure 4:
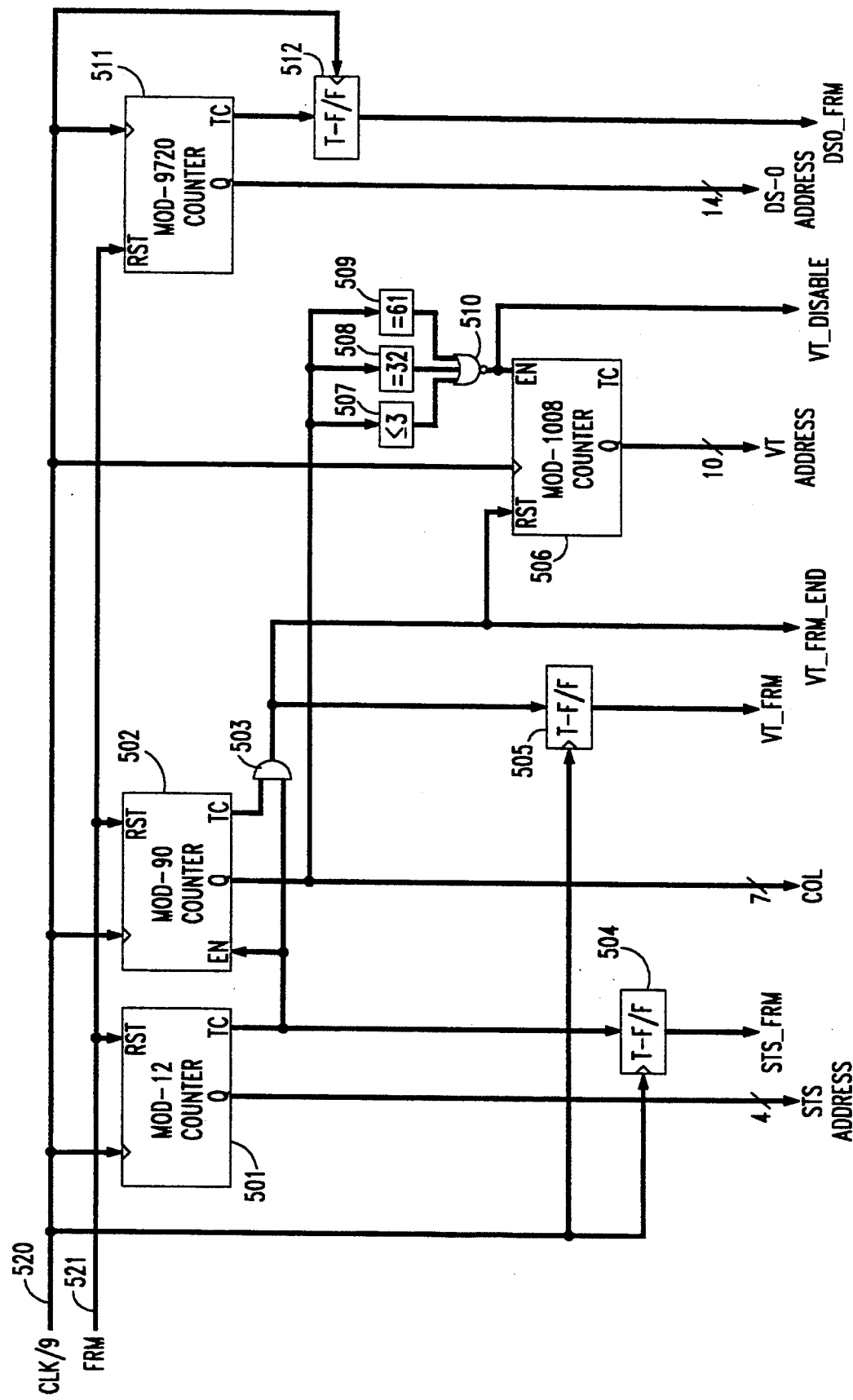
FIGS. 4–6 are a circuit diagram of a first illustrative implementation of the TSI of FIG. 3.
Figure 5:
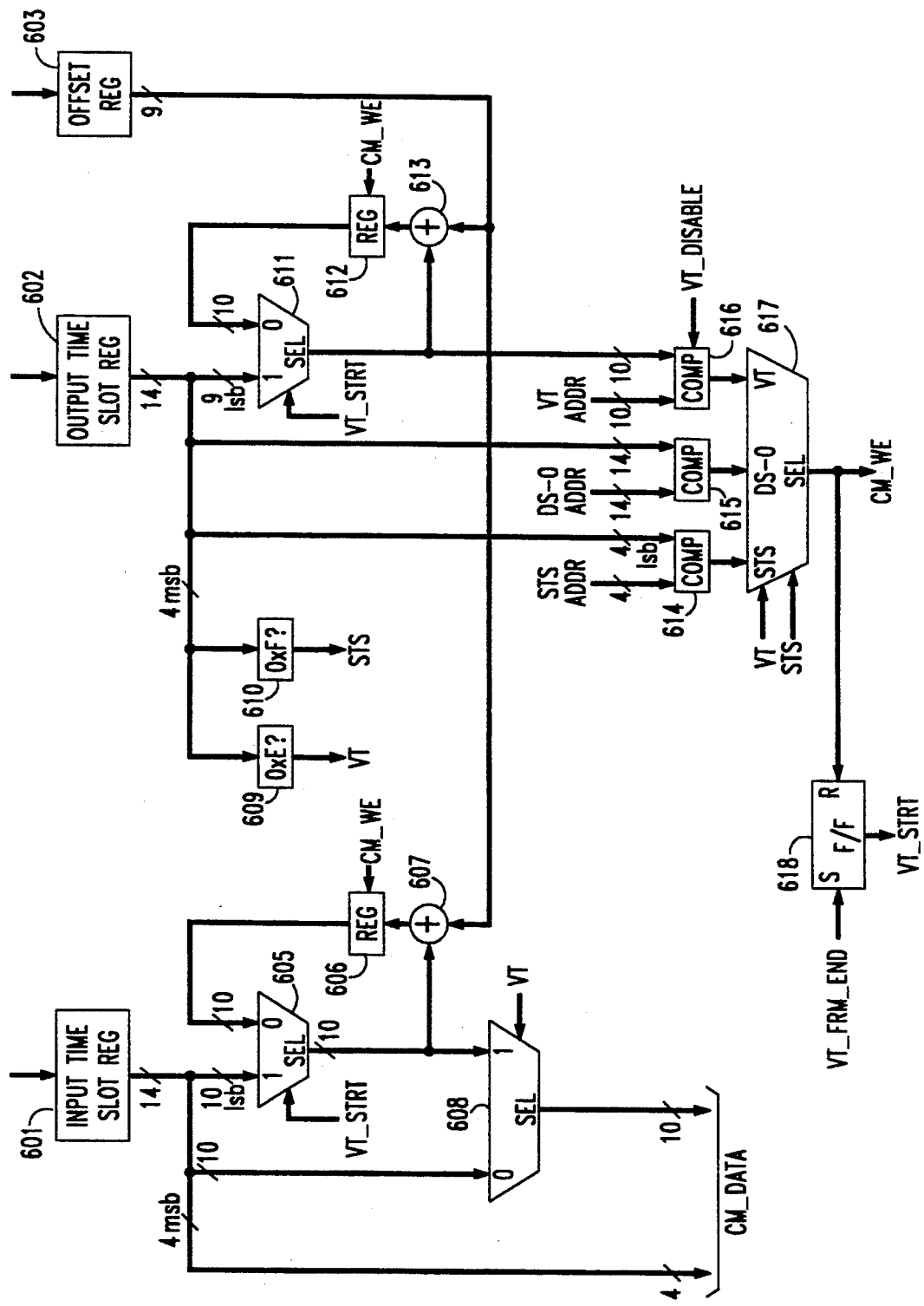
Figure 6:
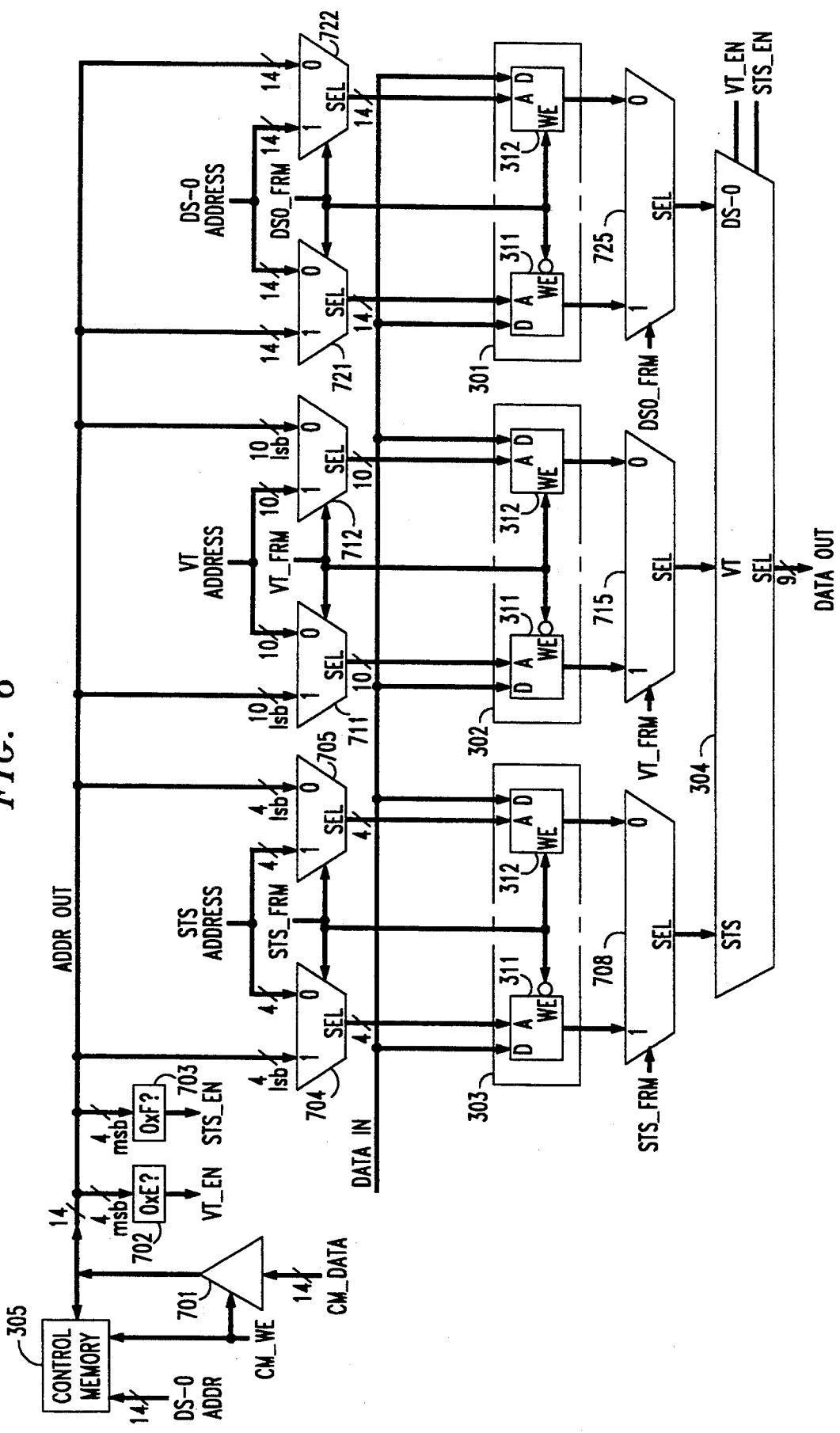

FIGS. 4–6 collectively make up a first illustrative implementation of TSI 131 or 141 of FIG. 3. FIG. 4 depicts various frame-byte, or time-slot, counters that serve as control memory 305 address generators. Although the bytes received by input TSI 131 comprise eight bits, the internal time slots comprise an additional ninth parity bit; accordingly, a 9-bit byte clock CLK/9 signal line 520 is used to drive each of four time-slot counters: a modulo-12 counter 501, a modulo-90 counter 502, a modulo-1008 counter 506, and a modulo-9720 counter 511. The counters are reset by a FRM signal line 521 at the end of each STS-12 or DS-0 frame 30. Modulo-12 counter 501 generates a four-bit STS ADDRESS, and when it reaches its terminal count, at the end of an STS frame 50, it generates a terminal count (TC) signal to toggle a flip-flop 504 that generates an STS_FRM signal in response, and to enable modulo-90 counter 502. Accordingly, modulo-90 counter 502 counts the 90 columns of the STS-1 frame format (FIG. 2) and generates a corresponding COL signal. When it reaches its terminal count, modulo-90 counter 502 also generates a TC signal. The TC signal outputs of both counters 501 and 502 are connected to inputs of an AND gate 503. Thus, when both modulo-12 counter 501 and modulo-90 counter 502 reach their terminal count, AND gate 503 generates a VT_FRM_END signal to indicate the end of a VT frame 40, and also toggles a flip-flop 505 to generate a VT_FRM signal. The VT_FRM_END signal is used to reset modulo-1008 counter 506. The COL signal is transmitted to inputs of each of three comparators 507, 508, 509, whose outputs effectively disable modulo-1008 counter via NOR gate 510 for columns $<=3$, $=32$, or $=61$, whereby the overhead and stuff columns are not counted as part of VT frame 40. Modulo-1008 counter 506 generates a 10-bit VT_ADDRESS signal. Modulo-9720 counter 511 generates a 14-bit DS-0 address signal, and when it reaches its terminal count, at the end of a DS-0 frame 30, it generates a TC signal to toggle a flip-flop 512 that generates a DS0_FRM signal in response.

FIG. 5 is a diagram of the circuitry that generates control data for storage in control memory 305 of a TSI 131 or 141 from information supplied as a result of a path-hunt performed by control processor 110. This control information specifies which incoming time-slot of an incoming STS-12 frame is to be switched to which outgoing time-slot of the corresponding outgoing STS-12 frame. Since system 100 is adapted to establish connections of three types of rates (that is, STS-1, VT, and DS-0 connections), and treats each type as having its own frame size (that is, respectively, STS frame 50, VT frame 40, and DS-0 frame 30), the control circuitry must be able to distinguish which time slots belong to which of these three types of frames 30, 40, and 50.

At least two possible ways of accomplishing this distinction offer themselves. One is to use the same sequential numbers to designate the same sequential time slots of all three types of frames, but associate with each number an indication (e.g., a separate number) that indicates which type of frame is being referred to. The other is to use numbers from different number ranges to designate time slots of the different frame types, whereby the range used serves as the indication of which frame type is being referred to. The illustrative implementation shown in FIGS. 5–7 adopts the latter approach.

Figures 7, 10:
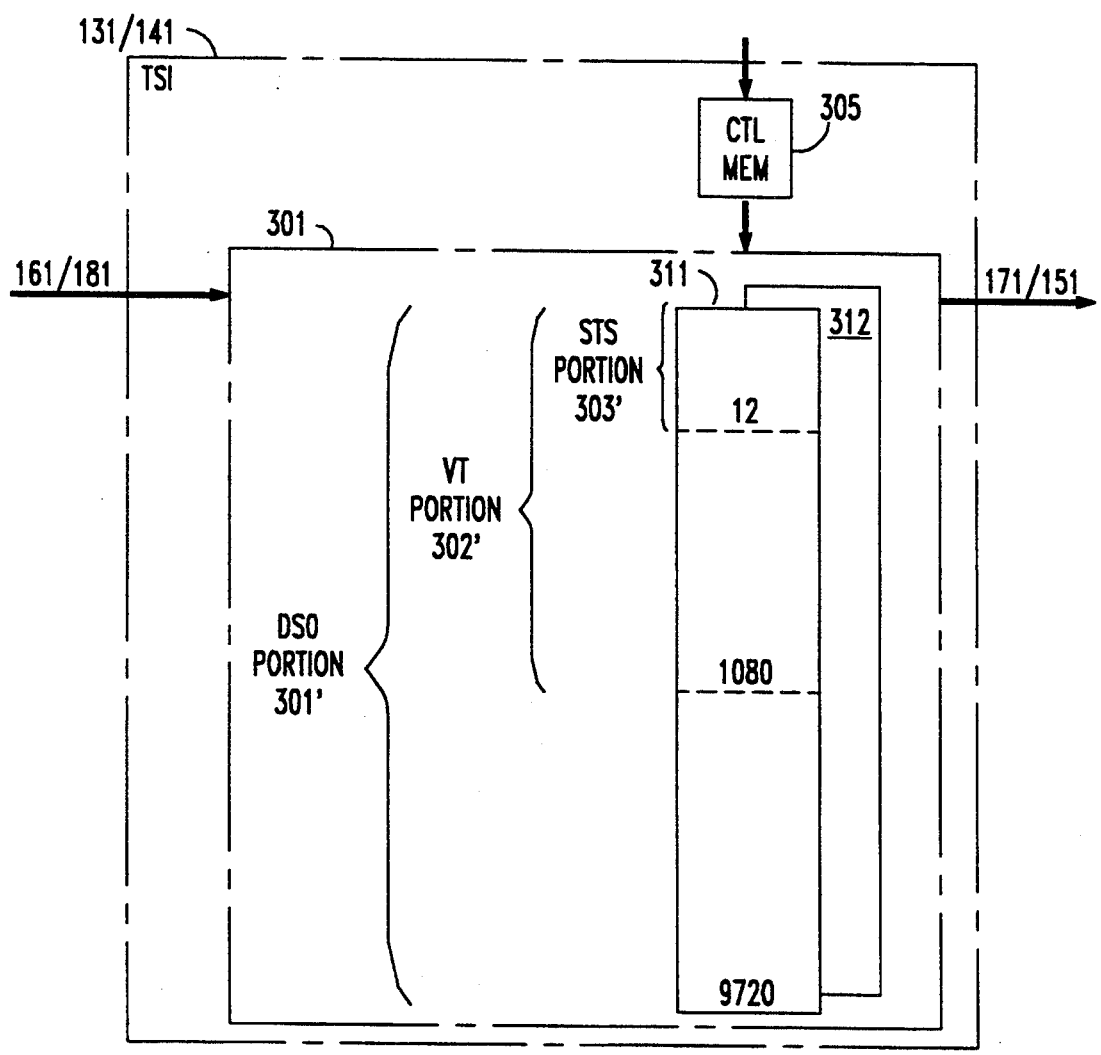
FIG. 7 is a table of the ranges of address values that define frames of different types in the TSI implementation of FIGS. 4–6.
FIG. 10 is a block diagram of a second illustrative embodiment of a TSI of the system of FIG. 1.

The time-slot coding table that is used to identify both the type of connection (type of frame) as well as the initial time slot of that connection is shown in FIG. 7. As shown, a VT frame 40 address is encoded with the four most-significant bits having a binary value of 1110 (or a hexadecimal value of 0×E), and an STS frame 50 address is encoded with the four most significant bits having a binary value of 1111 (or a hexadecimal value of 0×F). The remaining bits for a VT or an STS frame define the first time slot of that connection. DS-0 connections, which represent a single time slot, are encoded by decimal numbers from 0 through 9719.

Returning to FIG. 5, the path-hunt information that defines a particular single connection selected by control processor 110 is received from processor 110 in three registers: an input time-slot register 601, an output time-slot register 602, and an offset register 603. Contents of output time-slot register 602 identify a particular time-slot at the output of a TSI 131 or 141 according to the convention of FIG. 7. Contents of input time-slot register 601 identify, also according to the convention of FIG. 7, the input time-slot that is to be switched to the output time-slot identified by register 602. Circuitry associated with input time-slot register 601 in FIG. 5 generates the control data that are to be stored in control memory 305. Circuitry associated with output time-slot register 602 in FIG. 5 determines at which address of memory 305 the just-mentioned control data are to be stored. The addresses of control memory 305 have a one-to-one correspondence to the 9720 output time slots of an STS-12 frame output by a TSI 131 or 141.

Offset register 603 receives the constant offset, or spacing between data-bearing columns of an STS-12 frame, that is necessary for the type of VT connection being set up. For example, for a VT2 connection, an offset of 21·12=252 (decimal) would be stored in offset register 603. The stored offsets are 336, 168, or 84 for the other VT1.5, VT3, and VT6 connections, respectively. Contents of offset register 603 are null for a non-VT connection. Preferably, an additional register (not shown) further receives information that selects one of the duplicate switching fabrics that were discussed in conjunction with FIG. 1.

Control memory 305 is updated on-the-fly. Normally, control memory 305 is only read, in a cyclical manner. When it is necessary to change a word of control memory 305, the circuitry of FIG. 5 waits until occurrence of the cycle during which that word of control memory 305 is normally read. It then changes the cycle to a write cycle, writes the new data word into control memory 305, and at the same time supplies that data word to the other circuitry of TSI 131 or 141 in place of the now-overwritten data word that would have normally been read from control memory 305.

Comparators 609 and 610 respectively determine whether the four most-significant bits in register 602 define a VT or an STS connection. The respective VT and STS outputs of comparators 609 and 610 control a selector 617. If the contents of register 602 define an STS connection, a control memory 305 write-enable (CM_WE) signal is generated by selector 617 each time the four least-significant bits of register 602 are equal to the STS ADDR generated by modulo-12 counter 501, as indicated by the output of a comparator 614. If the contents of register 602 define a DS-0 connection (signified by no match being detected at comparators 609 and 610), a CM_WE signal is generated by selector 617 during the time slot when the 14 bits of register 602 are equal to the DS-0 ADDR generated by modulo-9720 counter 511, as indicated by the output of a comparator 615.

Whereas each STS connection occurs once during each STS frame 50 and each DS-0 connection occurs once during each DS-0 frame 30, each VT connection occurs one or more times during each VT frame 40. Hence, the matter is more complicated when the contents of register 602 define a VT connection. For the case of a VT connection, there is provided an S-R flip-flop 618 that is set by the VT_FRM_END output of gate 503 of FIG. 4 and that is reset by the CM_WE output of selector 617. When it becomes set at the end of an STS-1, flip-flop 618 generates a VT_STRT signal that controls a selector 611 and causes selector 611 to select a first one of its two inputs for connection to its output. The first input of selector 611 is connected to the nine least-significant bits of output time-slot register 14, whereas the second input of selector 611 is connected to the output of a register 612.

When the contents of register 602 define a VT connection, either the contents of register 612 or the nine least-significant bits of output time-slot register 602 are transmitted by a selector 611 to comparator 616, depending upon whether the first or a subsequent occurrence of the VT connection in a VT frame 40 is being searched for. When those bits are the same as the VT ADDR generated by modulo-1008 counter 506, as indicated by comparator 616, selector 617 generates a CM_WE signal. The output of selector 611 is also added by an adder 613 to the contents of offset register 603, and the sum is stored in register 612. The contents of register 612 are transmitted via selector 611 to comparator 616, and a CM_WE is generated by selector 617 during the next occurrence of the VT connection in this VT frame 40. This process repeats throughout each VT frame 40.

Preferably, comparator 616 is disabled, by VT_DISABLE signal generated by gate 510 of FIG. 5, during the occurrence of output time slots that correspond to the overhead and stuff columns of an STS-1. This disabling of comparator 616 lessens the possibility of a spurious, erroneous, output from comparator 616 while modulo-1008 counter 506 is disabled.

As was mentioned previously, the information that is written in control memory 305 (FIG. 6) comes from input time-slot register 601. The four most-significant bits are always written directly to control memory 305. In the case of an STS or DS-0 connection, the 10 least-significant bits are also written directly to control memory 305. However, for VT connections, an arrangement comprising a selector 605, an adder 607, and a register 606 generates the input time-slot identifiers for the VT connection, and transmits those via a selector 608 to control memory 305. The arrangement comprising elements 605–607 duplicates the arrangement comprising elements 611–613, with the exception that the first input of selector 605 is connected to the 10 least-significant bits of input time-slot register 601. Selector 608 is controlled by the VT output of comparator 609, analogously to selector 617.

FIG. 6 is a diagram of the circuitry that implements control by memory 305 over a TSI 131 or 141. The contents of memory 305 represent the input-time-slot to output-time-slot assignment that is to be effected by a TSI 131 or 141 for each STS-12 frame. Because an STS-12 or DS-0 frame 30 has 9720 time slots, memory 305 is 9720 words deep. Addresses of memory 305 words are sequenced-through by the DS-0 ADDR generated by modulo-9720 counter 511 of FIG. 4. Normally, CM_WE signal line is not asserted and the words of memory 305 are cyclically read out, one word per time-slot interval, to provide on an ADDR bus 701 the address of a word of the appropriate one of data memories 301–303 that is to be written out as the output of the TSI during that instant time-slot. A word of control data is written into memory 305 in response to the CM_WE signal line being asserted. In response to this assertion, the fourteen-bit address CM_DATA that is generated in FIG. 5 is output by a gate 701 onto ADDR bus 701, from where it is both written into memory 305 and made available to the other circuitry of FIG. 6 in place of the address that would otherwise normally have been read out of memory 305.

As was mentioned previously, each memory 301-303 serves a different one of the STS, VT, and DS-0 connection types. Memories 301-303 are double-buffered: each of the two buffers 311 and 312 is alternatively written during one corresponding frame period and is read during the next corresponding frame period. The data input DATA IN, which corresponds to link 161 or 181, is connected to all three of data memories 301-303, and each incoming STS-12 frame is written into each one of these memories 301-303. At each memory 301-303, DATA IN is connected through a respective one of selectors 731-733 to the data inputs of both buffers 311 and 312. Which buffer 311 or 312 is written at any given time is controlled at each memory 301-303 respectively by the STS_FRM, VT_FRM, and DS0_FRM signals, which control the outputs of selectors 731-733, respectively.

Addresses are conveyed to data memories 301-303 in the following manner. At each memory 301-303, ADDR bus 701 is connected to a first input of one, and the second input of another, of a pair of selectors 704-705, 711-712, and 721-722, respectively. The second input of the one, and the first input of the other, of the pair of selectors 704-705 is connected to the STS ADDRESS signal line from modulo-12 counter 501 of FIG. 4 and both selectors are controlled by the STS_FRM signal line from flip-flop 504 of FIG. 4. The second input of the one, and the first input of the other, of the pair of selectors 711-712 is connected to the VT ADDRESS signal line from modulo-1008 counter 506 of FIG. 4 and both selectors are controlled by the VT_FRM signal line from flip-flop 505 of FIG. 4. And the second input of the one, and the first input of the other, of the pair of selectors 721-722 is connected to the DS-0 ADDRESS signal line from modulo-9720 counter 511 of FIG. 4 and both selectors are controlled by the DS0_FRM signal line from flip-flop 512 of FIG. 4. The output of each selector of the three pairs of selectors 704-705, 711-712, and 721-722 is connected to the address input of a different one of the buffers 311 and 312 of the corresponding one of the data memories 301-303.

ADDR bus 701 supplies the address of a data buffer word that is to be read while the STS ADDRESS, VT ADDRESS, and DS-0 ADDRESS lines supply the addresses of words of data buffers which are to be written with data incoming on DATA IN. And the STS_FRM, VT_FRM, and DS0_FRM signal lines select which address is supplied to which buffer 311 and 312 of a memory 301-303. The addresses are alternately supplied to the two buffers 311-312 of each memory 301-303 so that—as was mentioned above—one of the buffers 311-312 is read while the other is written during one corresponding frame period, and vice versa during the next corresponding frame period.

The data outputs of both buffers 311 and 312 of each memory 301-303 are connected to the data inputs of a corresponding one of selectors 708, 715, and 725, respectively, whose outputs are in turn connected to the inputs of a selector 726. Selectors 708, 715, and 725 are respectively controlled by the STS_FRM, VT_FRM, and DS0_FRM signal lines, so as to always select for output the one of the buffers 311 and 312 of the corresponding memory to which addresses are being supplied from control memory 305 via ADDR bus 701. Selector 304 in turn selects among the STS, VT, and DS-0 data memories under the control of VT_EN and STS_EN signals which are generated by comparators 702 and 703, respectively. Comparators 702 and 703 respectively determine whether the most-significant bits of the address generated by control memory 305 on ADDR bus 701 define a VT or an STS connection. Detection of neither a VT or an STS connection signifies a DS-0 connection. Selector 304 selects for output from TSI 131 or 141 on link 171 or 151 the output of the one of the memories 301-303 that corresponds to the detected connection type.

Figure 8:
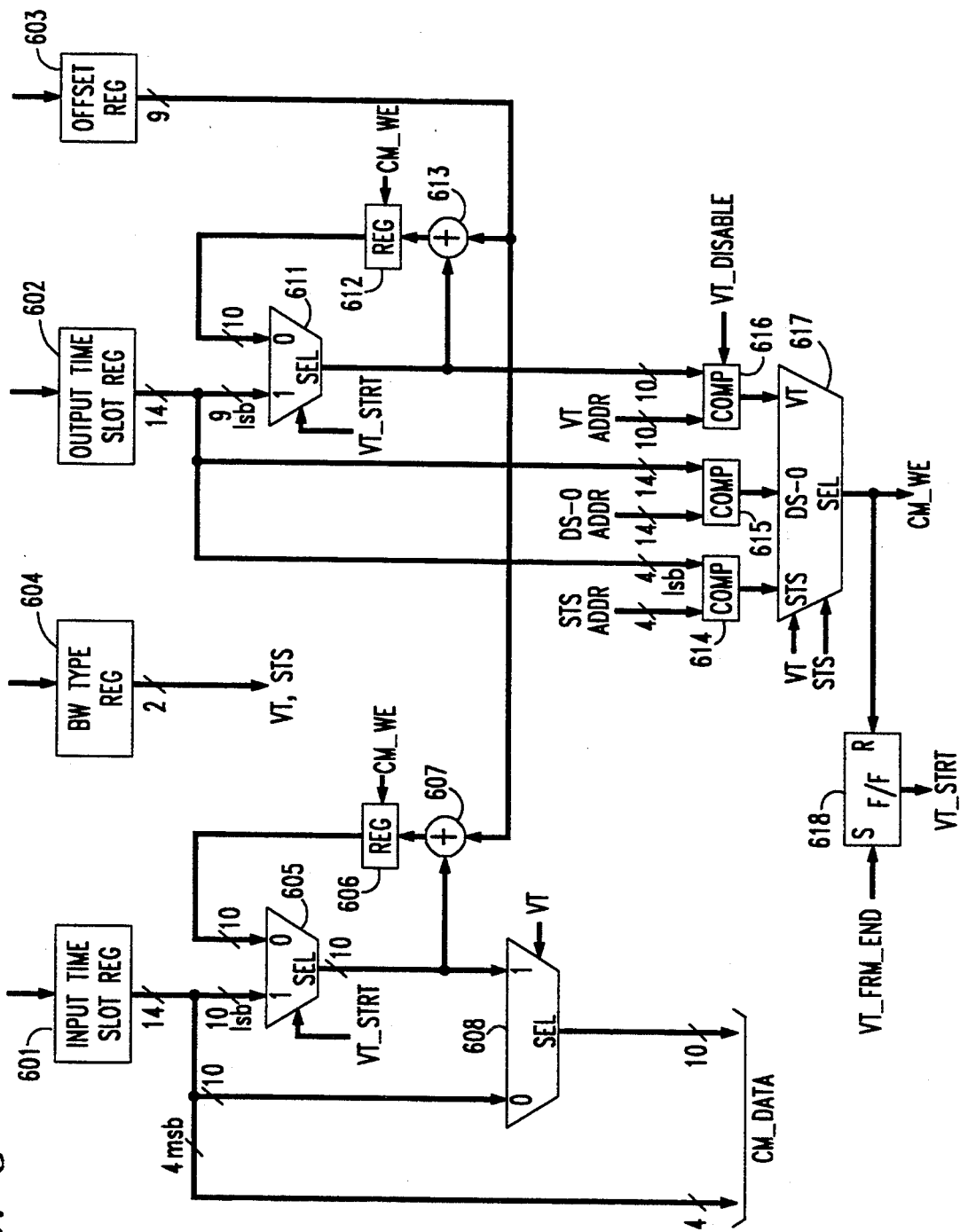
FIGS. 8–9, along with FIG. 4, are a circuit diagram of a second illustrative implementation of the TSI of FIG. 3.
Figure 9:
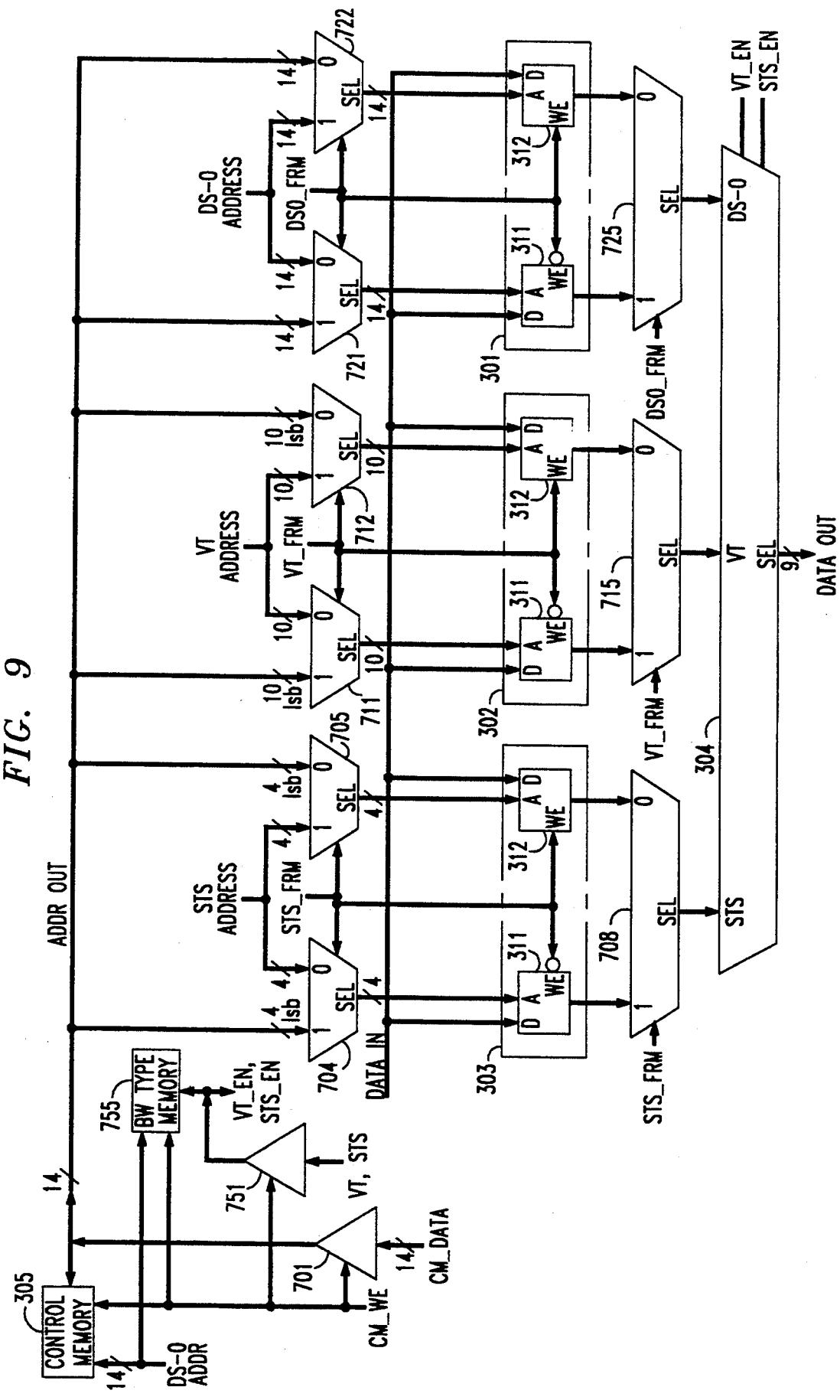

FIGS. 4 and 8-9 collectively make up a second illustrative implementation of TSI 131 or 141 of FIG. 3. As was mentioned previously, since system 100 is adapted to establish connections, or channels, of three types of rates, the TSI control circuitry must be able to distinguish between time slots of the three types of frames 30, 40, and 50 of FIG. 2. One way of accomplishing this distinction is illustrated in FIGS. 5-6. Another way, which uses the same sequential numbers to designate the same sequential time slots of all three types of frames but associates with each number an indication (e.g., a separate number) that indicates which type of frame is being referred to, is illustrated in FIGS. 8-9. A comparison of FIG. 5 with FIG. 8 and of FIG. 6 with FIG. 9 readily shows that they are identical in many respects. The same numerical designations are used for elements which they have in common. Only the differences are discussed below.

In FIG. 8, a bandwidth-type register 604 is substituted for comparators 609 and 610 of FIG. 5. Like registers 601-603, register 604 is loaded by control processor 110 with information defining a particular connection selected as a result of a path hunt. The contents of register 604 are two bits whose value identifies the bandwidth of the desired connection. The rest of FIG. 8 duplicates FIG. 5.

In FIG. 9, a bandwidth-type memory 755 is substituted for comparators 702 and 703 of FIG. 6, and produces the same two-bit output, with one bit representing the VT_EN signal and the other bit representing the STS_EN signal. Bandwidth-type memory 755 is of the same depth as control memory 305, and is addressed and cycled-through in tandem with control memory 305 by DS-0 ADDR signals. Also like control memory 305, bandwidth-type memory 755 is enabled to be written with a new word of data in response to the CM_WE signal. Associated with bandwidth-type memory 755 is a gate 751 which performs a function equivalent to that performed for control memory 305 by gate 701, and which allows bandwidth-type memory 755 to be updated on-the-fly and at the same time as control memory 305. Normally, CM_WE signal line is not asserted and words of both memories 305 and 755 are cyclically read out. A word of control data is written into each memory 305 and 755 in response to the CM_WE signal line being asserted. In response to this assertion, the two-bit VT or STS signal that is generated by bandwidth-type register 604 of FIG. 8 is output by gate 751 onto the VT_EN, STS_EN signal line, from where it is both written into memory 755 and made available to the other circuitry of FIG. 9 in place of the word of memory 755 that would otherwise normally have been read out of memory 755.

While FIG. 3 shows an embodiment of a TSI having physically separate data memories for each connection type, FIG. 10 shows an alternative embodiment of TSI 131 having logically separate data memories for each connection type implemented in a single physical memory. The memory is sized to accommodate the largest possible frame, i.e., a DS0 frame 30, and hence is the same physical memory as memory 301 of FIG. 3. It is therefore designated by the same numeral 301. The first 12 bytes of memory 301 serve as the equivalent of STS memory 303 of FIG. 3, and are designated as STS portion 303' in FIG. 10. The first 1080 bytes of memory 301 serve as the functional equivalent of VT memory 302 of FIG. 3, and are designated as VT portion 302' in FIG. 10. And the full memory 301 serves as the equivalent of DS0 memory 301 of FIG. 3, and is designated as DS0 portion 301' in FIG. 10. Just like the memories 301–303 of FIG. 3, memory 301 of FIG. 10 is double-buffered and comprises two buffers 311 and 312.

It will be noted that VT portion 302' consists of 1080 bytes of memory, as compared with 1008 bytes for VT 302 of FIG. 2. These extra 72 bytes are used to store the STUFF and OVERHEAD bytes that accompany each VT frame 40. These 72 bytes are discarded and ignored by memory 302 of FIG. 3, and could be handled in the same way in FIG. 10. However, for VT type calls, the appearance rate varies between 336, 252, 168, or 84 bytes, depending on the VT type. In order to allow TSI 131 or 141 to ignore these variances and make the hardware simpler, a common appearance rate of 1080 bytes is used in FIG. 10. This rate guarantees that at least one byte from every VT channel is stored in a buffer 311 or 312 before switching over to the other buffer 312 or 311 takes place.

In operation, memory 301 of FIG. 10 is used in the identical manner as memories 301–303 of FIG. 3. The use of buffers 311 and 312 alternates for each connection type at the rate commensurate with that connection's frame size, i.e., every 12 bytes for an STS connection, every 1080 bytes for a VT connection, and every 9720 bytes for a DS-0 connection. Due to the different frame rates of the different connections, it is possible that bytes may arrive, as part of one connection type, for storage in one of the buffers 311 or 312 while bytes are being read out of that buffer as part of another connection type. Hence, buffers 311 and 312 either are dual-ported devices, so as to accommodate simultaneous reads and writes, or are high-speed devices that support two successive cycles—both a read and a write—during successive halves of a single time—slot interval.

Figure 11:
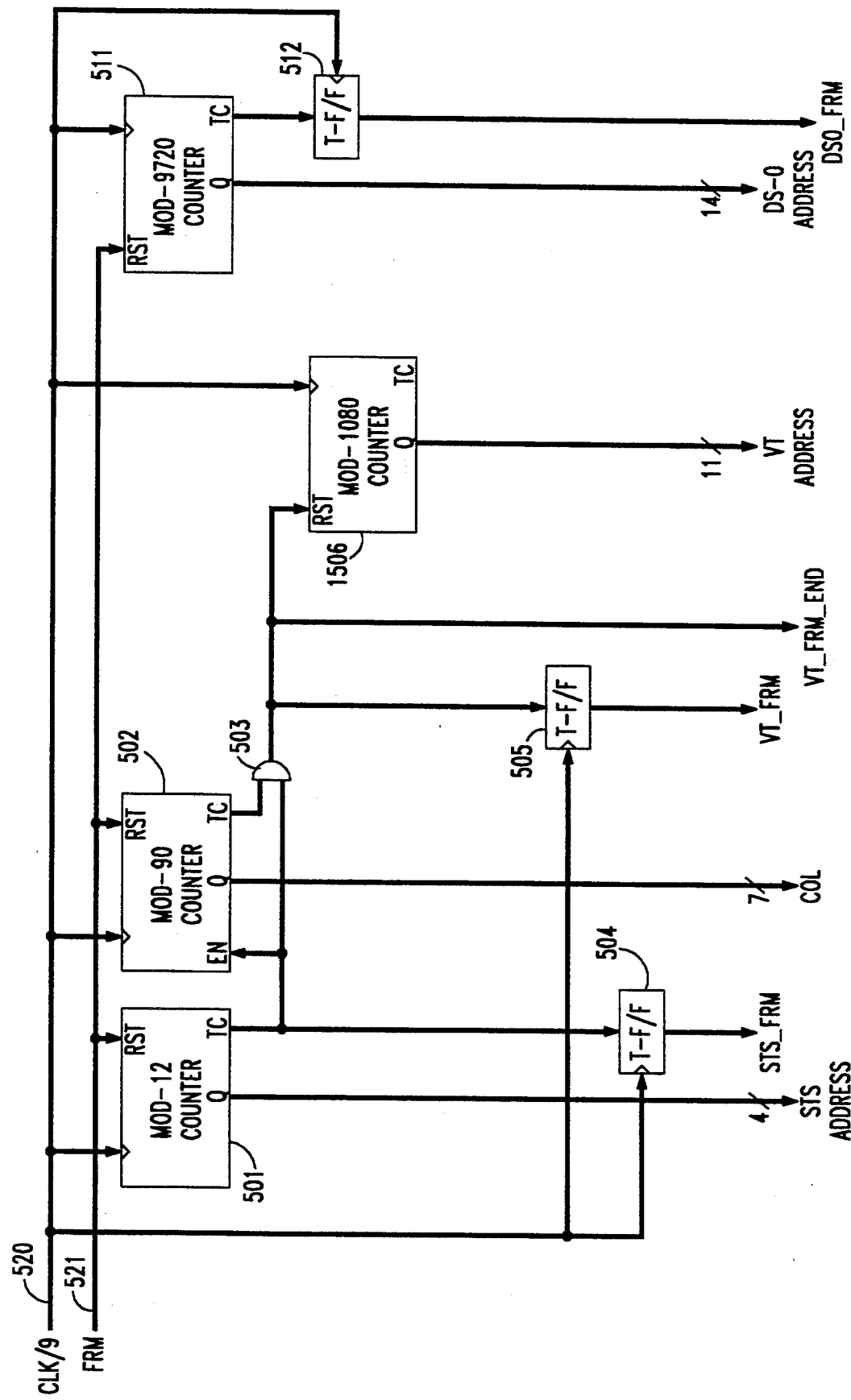
FIG. 11–13 are a circuit diagram of an illustrative implementation of the TSI of FIG. 10.
Figure 12:
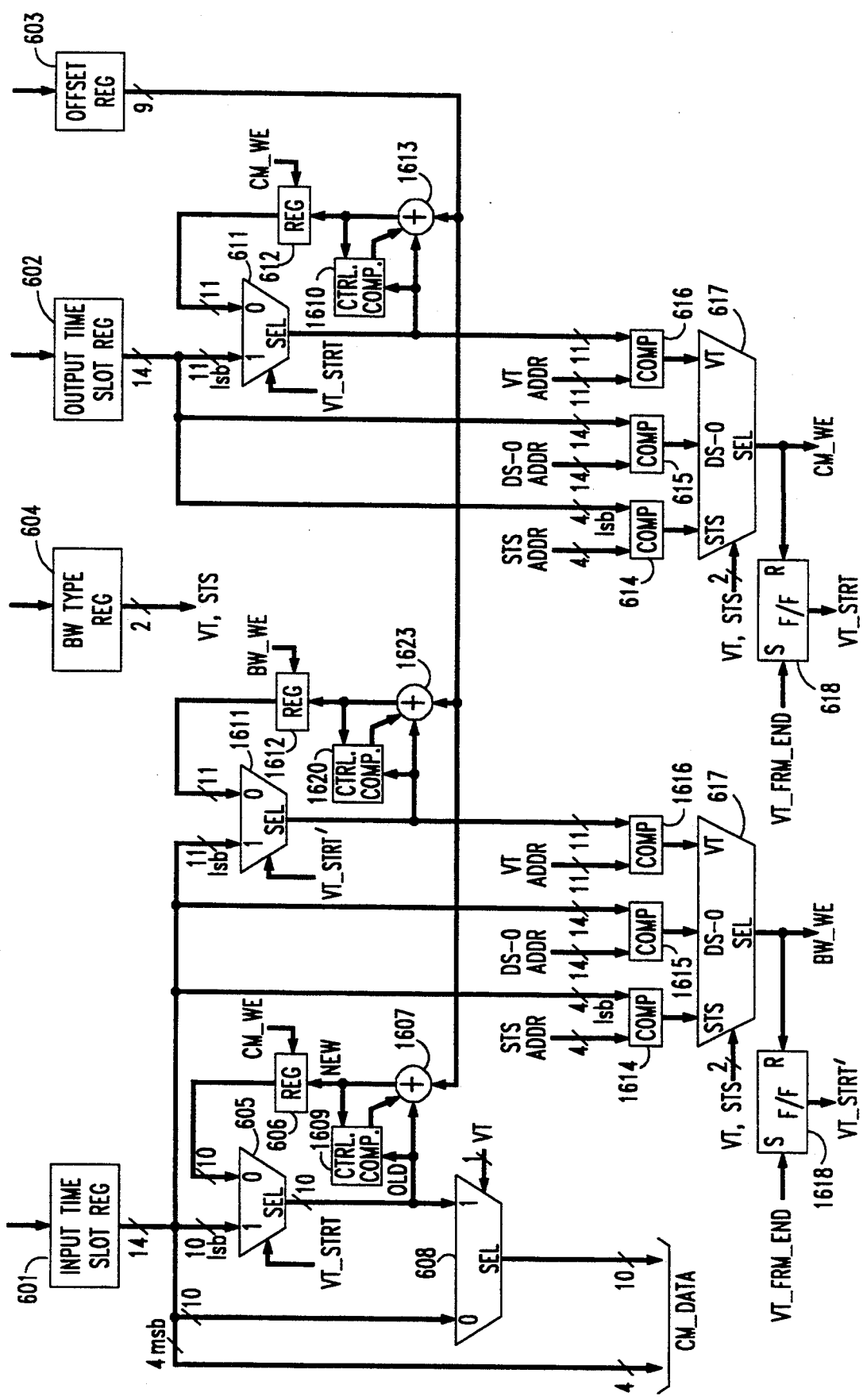
Figure 13:
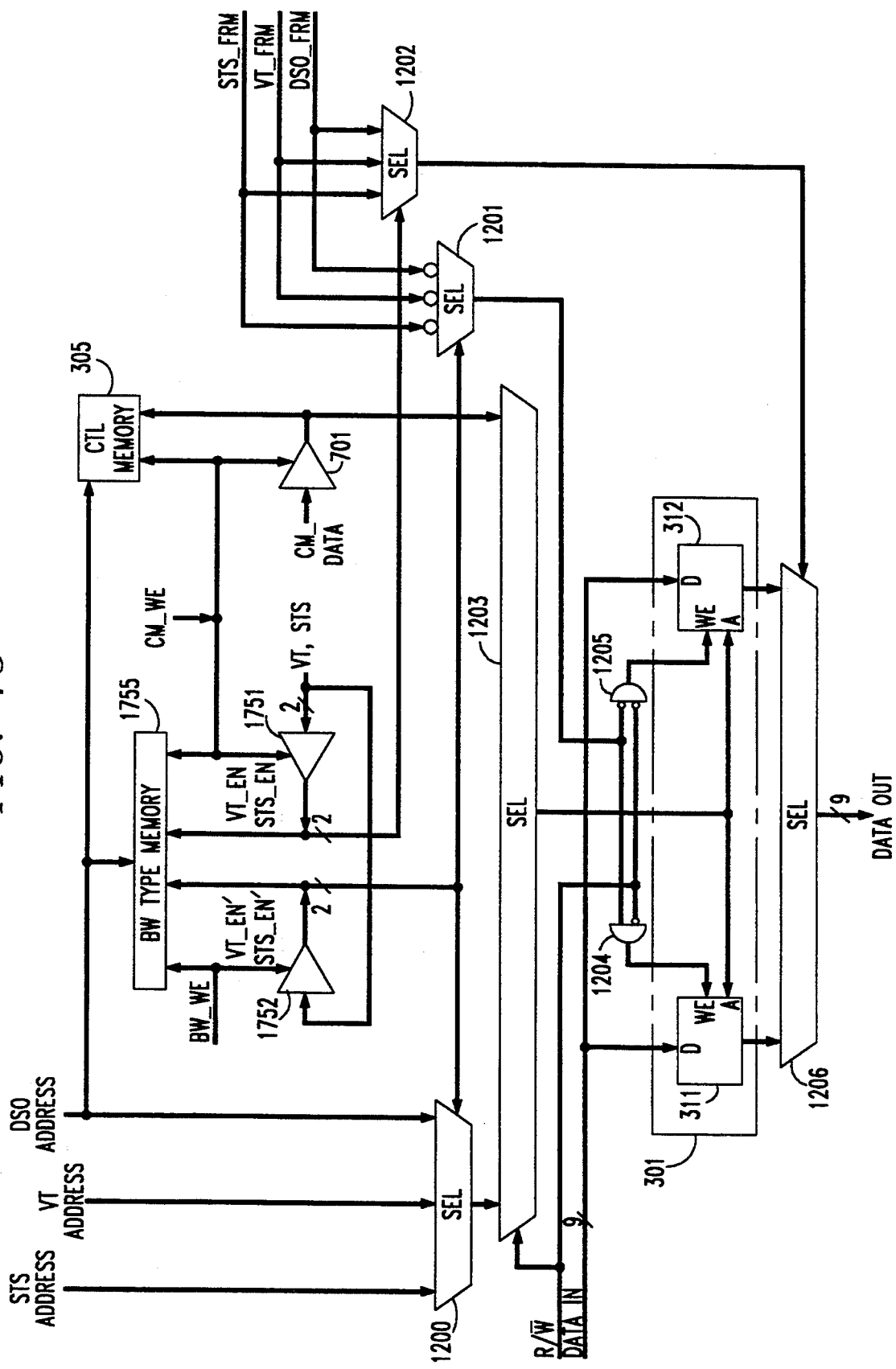

FIGS. 11–13 collectively make up a first illustrative implementation of TSI 131 of FIG. 10. A comparison of FIG. 4 with FIG. 11 shows that they are identical in many respects. The same numerical designations are used for elements which they have in common. Only the differences are discussed below.

In FIG. 11, a modulo-1080 counter 1506 replaces modulo-1008 counter 506 of FIG. 4, and the VT_DISABLE circuit 507–510 is eliminated. Modulo-1080 counter 1506 counts the bytes that make up each horizontal plane of the STS-12 frame of FIG. 2. This plane may be referred to as an augmented VT frame 40', as it is composed of VT frame 40 plus the 72 bytes of the STUFF and OVERHEAD columns that lie in the same plane as the VT frame 40. And since the STUFF bytes are no longer being ignored but are being counted, the circuit 507–510 is no longer needed.

A comparison of FIG. 8 with FIG. 12 likewise shows that these figures are identical in many respects. The same numerical designations are used for elements which they have in common, and only their differences are discussed hereinbelow.

Since modulo-1080 counter 1506 of FIG. 11 includes the overhead and stuff columns (see FIG. 2) in its count, the spacing of addresses generated by counter 1506 of columns of a particular VT-rate channel is not regular in the augmented VT frame 40'—contrary to the VT frame 40—related output of modulo-1008 counter 506 of FIG. 4. This irregularity of spacing must be compensated for in FIG. 12 whenever the contents of offset register 603 are used to address a VT channel's columns. Accordingly, adders 607 and 613 of FIG. 8 are replaced in FIG. 12 by adders 1607 and 1613, respectively, and associated control comparators 1609 and 1610. Each control comparator 1609 and 1610 monitors the selector input to its corresponding adder, referred to as "old" address, and the adder output, referred to as "new" address. During any operational cycle when control comparator 1609 or 1610 determines that (a) "old" address is less than decimal 384 and "new" address is greater than decimal 383, or (b) "old" address is less than 732 and "new" address is greater than decimal 731, the control comparator causes its corresponding adder to increment new address by decimal 12.

Turning briefly to FIG. 13, the implementation shown in FIG. 13 also uses a bandwidth-type memory like the implementation shown in FIG. 9. In FIG. 9, each incoming byte is written into each data memory 301–303, and so bandwidth type memory 755 need only indicate the bandwidth-type of each byte selected for output. But in FIG. 13, there is only one data memory 301 to write incoming data into, and therefore bandwidth-type memory 1755 of FIG. 13 must additionally indicate the bandwidth-type of each incoming byte. Bandwidth-type memory 1755 must therefore be provided with address control analogous to that which is provided to control memory 305. But because bandwidth-type memory 1755 relates to—indicates —the bandwidth of incoming bytes, unlike control memory 305 it must have its address control derived from the contents of input time-slot register 601. Returning to consideration of FIG. 12, there is accordingly provided circuitry 1620, 1611, 1612, 1623, and 1614–1618 which duplicates the circuitry 611, 612, 613, 610, and 614–618 of FIG. 9, but with the following exceptions: a first input of selector 1611 is connected to the output of input time slot register 601, selector 1611 is controlled by a signal VT-STRT' which is the output of flip-flop 1618, and the output of selector 1617 is designated as BW_WE (bandwidth-type memory write enable).

Turning again to FIG. 13, bandwidth-type memory 1755 must indicate the bandwidth-type of each incoming byte. Accordingly, bandwidth-type memory 1755 is twice as wide as memory 775 of FIG. 9, and has two two-bit outputs. The VT_EN, STS_EN output corresponds to the output of memory 755 and indicates the bandwidth-type of the byte selected to be read out of data memory 301. A VT_EN', STS_EN' output indicates the bandwidth-type of the byte being written into data memory 301.

As in the case of FIG. 9, control memory 305 and bandwidth-type memory 1755 are addressed and read out in a cyclical manner by DS-0 ADDRESS. The VT_EN, STS_EN output of memory 1755 controls a selector 1202, while the VT_EN', STS_EN' output controls a selector 1201. Selector 1202 has the STS_FRM, VT_FRM, and DS0_FRM signals connected to its inputs, while selector 1201 has the inverted values of these same signals connected to its inputs. It had been explained previously that each of these signals changes its value during successive occurrence of the corresponding frame type. Consequently, for any one of the three frame types 30, 40, 50, selectors 1201 and 1202 each output a different value during any one frame, and each changes the value of its output during successive frames.

The VT_EN', STS_EN' output of memory 1755 further controls the output of a selector 1200, which has STS_ADDRESS, VT_ADDRESS, and DS0_ADDRESS signal lines connected to its inputs. Consequently, selector 1200 outputs the address that corresponds to the frame type of the bit that is presently to be written into memory 301. The output of selector 1200 and the output of control memory 305 are connected to inputs of a selector 1203. The output of selector 1203 is connected to address inputs of buffers 311 and 312. Selector 1203 operates under control of a clock-generated read-write R/$\overline{W}$ signal. R/$\overline{W}$ signal changes value twice during each time-slot interval. During the first half of the time-slot interval, the R/$\overline{W}$ signal indicates a data memory-write cycle and causes selector 1203 to supply to memory 301 the address selected by selector 1200.

The output of selector 1201 is connected to an input of an AND gate 1204, and to an inverted input of an AND gate 1205. Second inverted inputs of gates 1204 and 1205 are connected to R/$\overline{W}$ signal line. Output of gate 1204 is connected to a write-enable (WE) input of buffer 311, while output of gate 1205 is connected to a WE input of buffer 312. Gates 1204 and 1205 enable the one of the two buffers 311 and 312 that is presently selected by the output of selector 1201 to be written with a byte of data incoming to buffers 311 and 312 on DATA IN line during the write cycle of each time-slot interval.

During the second half of each time-slot interval, the R/$\overline{W}$ signal indicates a data-memory-read cycle and causes selector 1203 to supply to memory 301 the address that is output by control memory 305. Both buffers' WE inputs are disabled during this cycle, and so both buffers are read. Outputs of buffers 311 and 312 are connected to inputs of a selector 1206, which operates under control of the output of selector 1202. Selector 1206 selects the output of the one of the buffers 311 and 312 that is picked by the output of selector 1202 as the output of TSI 131 and transmits it on DATA OUT line.

New control information from CM_DATA line (from FIG. 12) is written into control memory 305 under control of gate 701 and the CM_WE signal, as was the case in FIG. 9. Bandwidth-type memory 1755 is written in a corresponding manner. The VT_EN, STS_EN and VT_EN', STS_EN' inputs/outputs of memory 1755 each have a respective gate 1751 and 1752 connected thereto. Gate 1751 operates under control of the CM_WE signal, while gate 1752 operates under control of the BW_WE signal (from FIG. 12). These signals also control the writing of the respective parts of the bandwidth-type memory 1755. The inputs of gates 1751 and 1752 are connected to the VT, STS output of bandwidth-type register 604 (from FIG. 12). When the CM_WE line is asserted, a normal read cycle of the data-memory-output-indicating portion (i.e., VT_EN, STS_EN) of bandwidth-type memory 1755 is converted into a write cycle. At the same time, gate 1751 supplies the VT, STS output of bandwidth-type register 604 to VT_EN, STS_EN signal line, from where the VT, STS output is written into bandwidth-type memory 1755. Similarly, when the BW_WE line is asserted, a normal read cycle of the data-memory-input-indicating portion (i.e., VT_EN', STS_EN') of bandwidth-type memory 1755 is converted into a write cycle and, at the same time, gate 1752 supplies the VT, STS output of register 604 to VT_EN', STS_EN' signal line from where this output is written into memory 1755.

Figure 14:
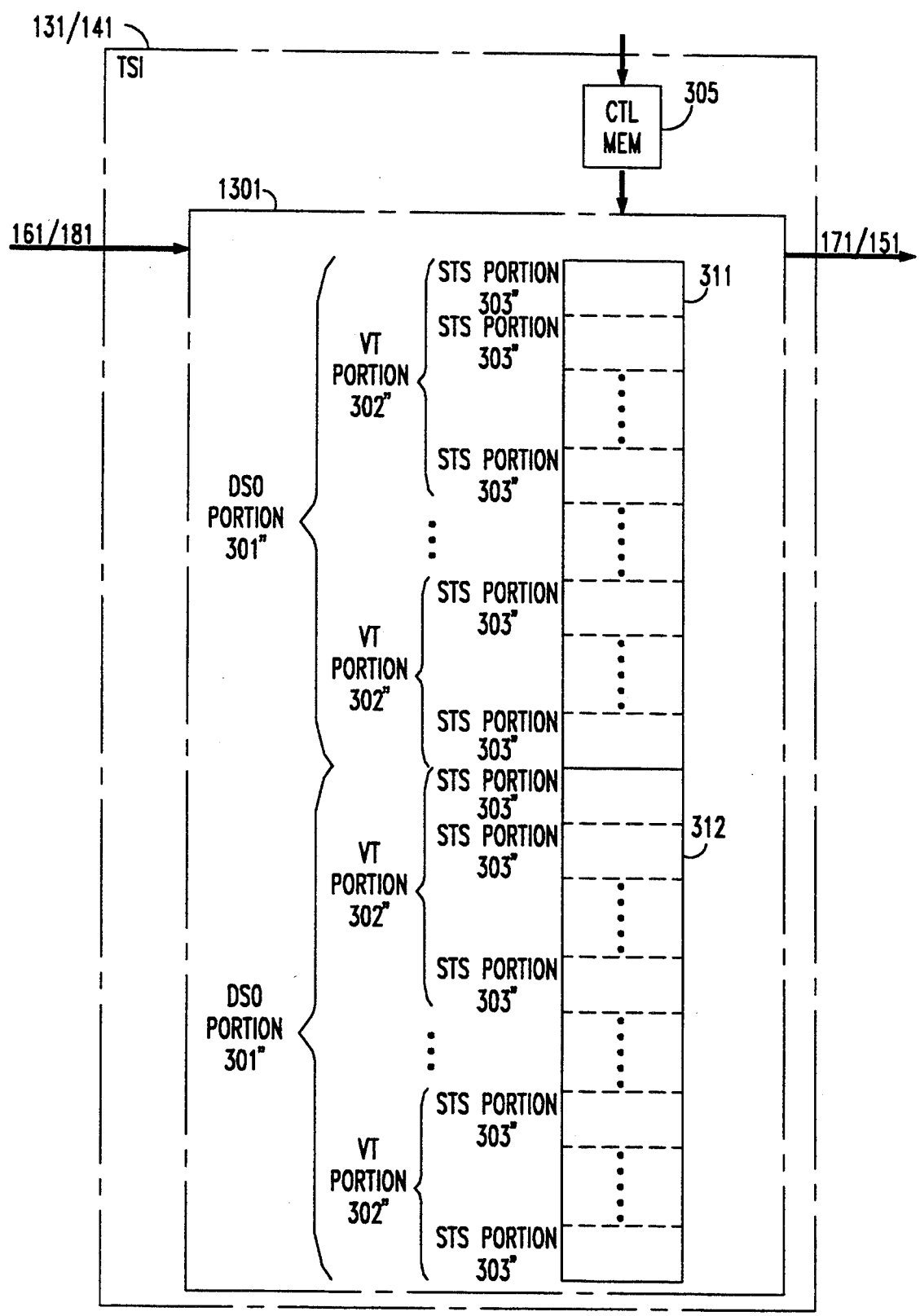
FIG. 14 is a block diagram of a third illustrative embodiment of a TSI of the system of FIG. 1.

FIG. 14 shows an alternative embodiment of the single-shared-memory TSI implementation. Unlike the implementation of FIG. 10, this implementation writes each incoming full STS-12 frame into data memory sequentially, and thereby dispenses with the requirement of knowing to which one of the frame types 30, 40, and 50 an incoming byte belongs. Like the implementation of FIG. 10, this implementation makes use of a single double-buffered data memory, designated as 1301. Unlike in FIG. 10, however, the two buffers 311 and 312 of FIG. 14 are implemented in sequence in a single physical memory device. To allow memory 1301 to be simultaneously read and written, memory 1301 is implemented as a dual-ported device. Each buffer 311 and 312 is sized to accommodate a full STS-12 frame, which is also the DS-0 frame 30. Hence, each buffer 311 and 312 of FIG. 14 is of the same size as the corresponding buffers of FIG. 10, and memory 1301 is 2·9720=19440 words deep.

Like the implementation of FIG. 10, the implementation of FIG. 14 has logically separate data memories for each connection type which share the same physical memory locations. However, because an STS-12 frame is written into data memory 1301 sequentially, as if it were composed only of DS-0 type channels, each sequential 12 bytes of memory 1301 serve as the equivalent of STS memory 303 of FIG. 3 and STS portion 303' of FIG. 10. Hence, there are a plurality of logical STS memories, with each sequential 12 bytes being designated as a separate STS portion 303''. Similarly, each 1080 bytes of memory 1301 serve as the functional equivalent of VT memory 302 of FIG. 3 and VT portion 302' of FIG. 10, and so each sequential 1080 bytes of memory 1301 are designated as a separate VT portion 303''. And each full buffer 311 or 312 serves as the equivalent of DS-0 memory 301 of FIG. 10, and is designated as DS0 portion 301''.

The addresses that are stored in control memory 305 for sub-rate calls are controlled so as to read from the preceding sub-frame (i.e., the preceding STS portion 303'' for an STS sub-rate, or the preceding VT portion 302'' for a VT sub-rate) to the sub-frame that is being written, irrespective of whether the read and written sub-frames are in the same or in different buffers 311 or 312. The addresses are calculated algorithmically, as required when the frame that is being read is in one buffer 311 while the frame that is being written has overlapped into the other buffer 312, and vice versa. The calculation views memory 1301 as a single continuous buffer of 19,440 bytes.

Figure 15:
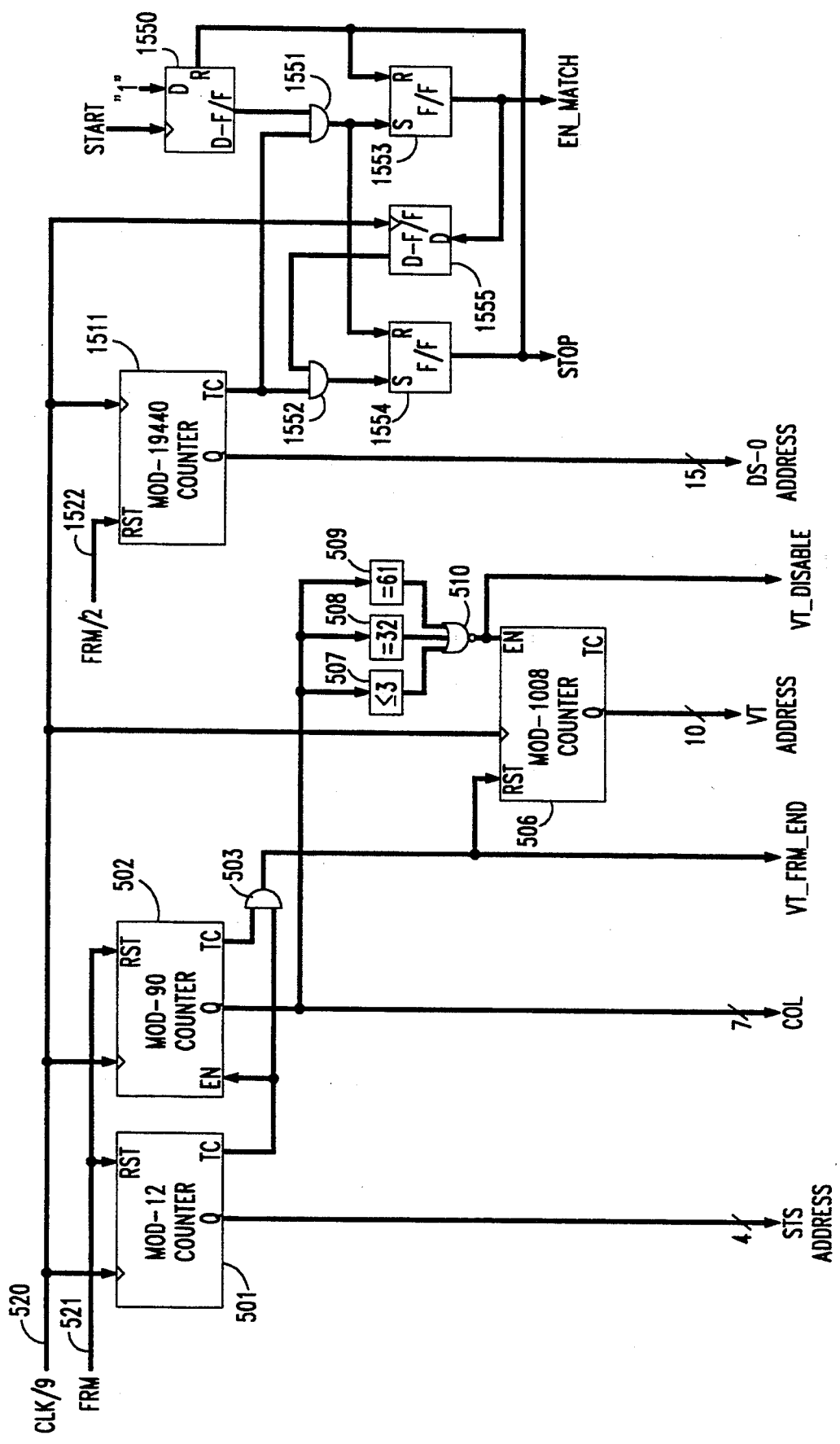
FIGS. 15–17 are a circuit diagram of a first illustrative implementation of the TSI of FIG. 14.
Figure 16:
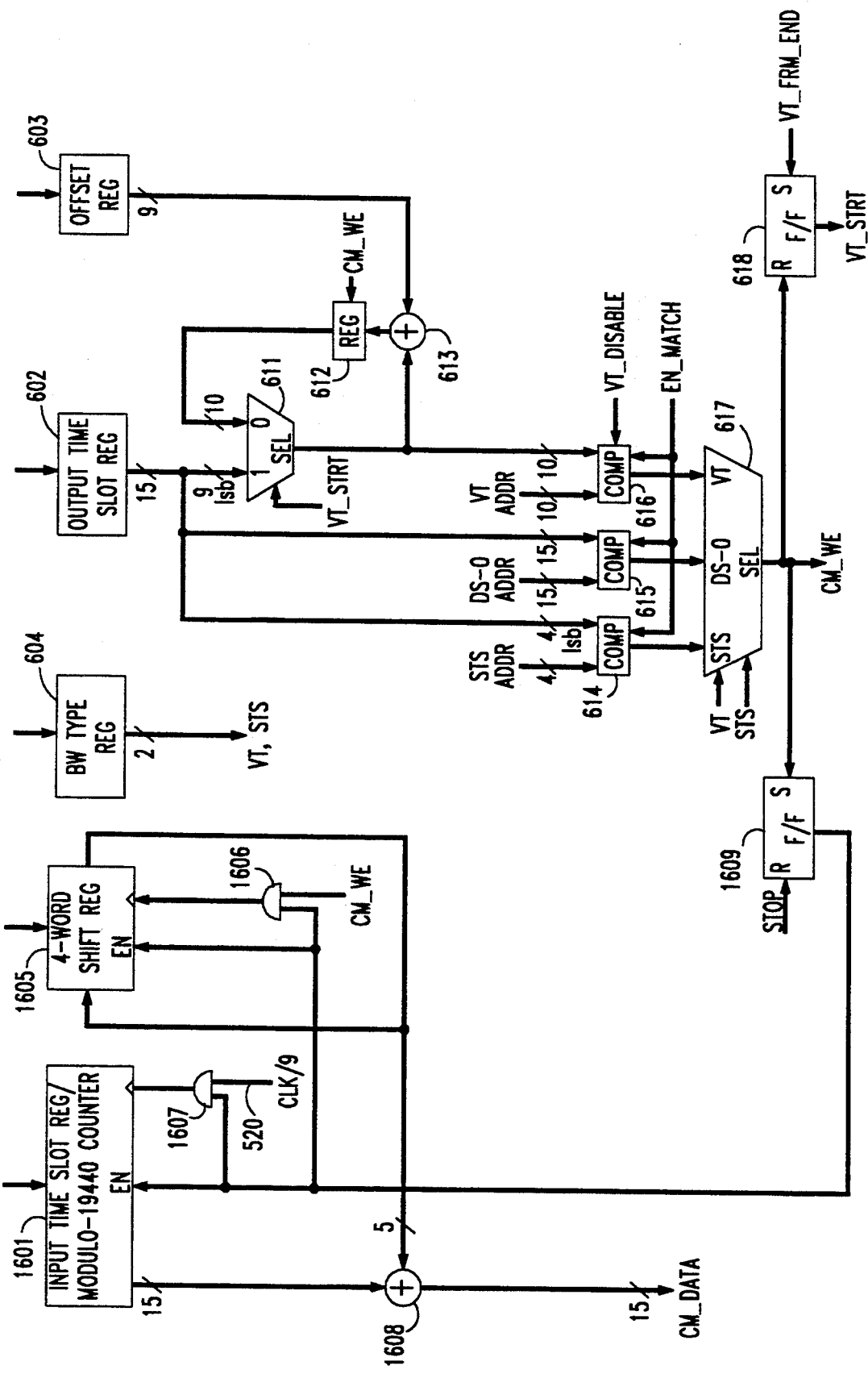
Figures 17, 18:
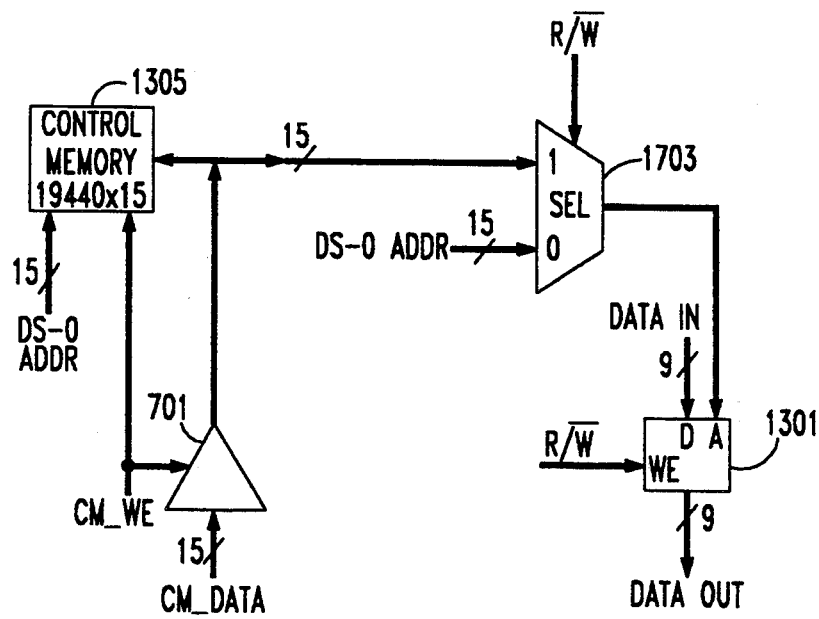
FIG. 18 is a table of the address-compensation values of the 4-word shift register of the TSI implementation of FIGS. 15–17.

FIGS. 15–17 collectively make up an implementation of TSI 131 or 141 of FIG. 14. A comparison of FIG. 15 with FIG. 4 readily shows that they are identical in many respects. The same numerical designations are used for elements which they have in common. Only the differences are discussed below.

Since reading and writing of sub-frames in FIG. 14 occurs in adjacent portions 301''–301'' irrespective of whether or not they lie in the same or in different buffers 311 and 312, the toggle flip-flops 504, 505, and 512 of FIG. 4 are no longer needed to indicate a changeover between buffers 311 and 312. Hence, these flip-flops are eliminated from FIG. 15. Also, since data memory 1301 of FIG. 14 is twice as deep as data memory 301 of FIG. 3, modulo-9720 counter 511 of FIG. 4 is replaced in FIG. 15 with a modulo-19440 counter 1511. Counter 1511 is reset only once every two STS-12 frame periods, i.e., at half the STS-12 frame rate, and hence counter 1511 is provided with a FRM/2 lead 1522 which is connected to its reset (RST) input and which resets counter 1511 once every 19440 time slots.

Additionally, FIG. 15 includes circuitry 1550–1555 for generating an EN_MATCH signal that directs the circuitry of FIG. 16 to commence searching for the address of a control memory 305 location that is to be written, only at the beginning of an even STS-12 frame (the beginning of buffer 311 of FIG. 14), and for generating a STOP signal that directs the circuitry of FIG. 16 to end the search at the end of an odd STS-12 frame (the end of buffer 312 of FIG. 14). Circuitry 1550–1555 includes a D-type flip-flop 1550 whose D input is latched to a logical "1" level and whose CLK input is connected to a START signal line. Control processor 110 asserts START signal line after loading the registers of FIG. 16, to indicate that it has made available the information necessary for the search to commence. The output of flip-flop 1550 is connected to one input of an AND gate 1551, whose other input is connected to the TC output of modulo-19440 counter 1511. The output of gate 1551 is connected to the S input of an S-R flip-flop 1553 and to the R input of an S-R flip-flop 1554. The output of flip-flop 1553 is connected to the EN_MATCH signal line and to the D input of a D-type flip-flop 1555 whose output is connected to one input of an AND gate 1552. The CLK input of flip-flop 1555 is connected to CLK/9 line 520, to delay the propagation of the EN_MATCH signal to AND gate 1552 by one time-slot period. The other input of gate 1552 is connected to the TC output of counter 1511, and the output of gate 1552 is connected to the S input of flip-flop 1554. The output of flip-flop 1554 forms the STOP signal, and is further connected to the R inputs of flip-flops 1553 and 1550. Assertion of START signal by control processor 110 enables the next assertion of the TC output by counter 1511 to cause flip-flop 1553 to generate the EN_MATCH signal. The next assertion of the TC output by counter 1511 causes flip-flop 1554 to generate the STOP signal, which in turn causes flip-flop 1553 to cancel the EN_MATCH signal.

Turning to FIG. 16, a comparison thereof with FIG. 8 shows their CM_WE and VT_START signal-generation portions to be identical. The same numerical designations are used in both figures for elements which they have in common, and only the differences are discussed below.

In the data memory implementation shown in FIG. 14, the input time slot that corresponds to (that is to be output during) a particular output time slot is not always stored in the same data memory location. Rather, that input time slot moves from portion 301″–303″ to successive portion 301″–303″ in memory 1301. It is therefore no longer sufficient for an input time slot register, such as register 601 of FIG. 8, to specify the address of only a single data memory location. Rather, the register must now specify the addresses of a whole sequence of data memory locations. Consequently, the simple input time-slot register 601 of FIG. 8 is replaced in FIG. 16 with an input time-slot register/modulo-19440 counter 1601. For each change in switched connections being effected, control processor 110 loads register/counter 1601 with an initial value. From that initial value, register/counter 1601 increments its count during each time-slot period, thereby producing the correct input time slot address during every occurrence of the corresponding output time slot (e.g., during every assertion of CM_WE signal line).

The initial value loaded by control processor 110 into register/counter 1601 is equal to 19440 minus the frame size of the channel being switched (9720 for a DS-0 channel; 1080 for a VT channel; 12 for an STS-1 channel) plus the sequence number, within the sequence of 19440 time slots of two STS-12 frames, of the first input time slot of the subject channel that is being switched. In other words, it specifies the data memory 1301 address in the very last portion 301″–303″ that corresponds to the frame size of the channel that is to be switched, at which address is stored the input time slot that should be switched out during the first occurrence of the output time slot that corresponds to the switched channel. Conceptually, one can view this as the drawing of FIG. 14 being overlayed onto a cylinder such that the bottom wraps around to join with the top to form a seamless circular buffer.

The reason for this initial value is the following. An output time slot and the writing of memory 1301 occur during the same time slot. Hence, the output time slot is properly thought of as occurring in the partition 301″–303″ that is then being written. By action of the EN_MATCH signal generated in FIG. 15, comparators 614–616 start looking for, and find, an output time slot match in (i.e., during the writing of) the first partition 301″–303″ of data memory 1301. It will be recalled that reading from data memory 1301 is done in a partition 301″–303″ that immediately precedes the partition 301″–303″ that is being written. For the first partition 301″–303″ of memory 1301, the immediately-preceding partition is the last partition 301″–303″ (on account of memory 1301 being a circular buffer). Hence, upon the detection by comparators 614–616 of the first matching output time slot, in the first partition 301″–303″ of memory 1301, register/counter 1601 must indicate the reading of an input time slot from the immediately-preceding partition, which is the last partition 301″–303″ of memory 1301. And that is precisely what the initial value of register/counter 1601 does.

The stuff and path overhead columns neatly divide the payload envelope of an STS-N frame into three partitions of equal size, as shown in FIG. 2. In turn, the 12 columns of a VT group neatly divide between the partitions, with four columns lying in each partition. Hence, an equal number of columns of any one of the rates VT1.5, VT3, and VT6 lie in each of the partitions. Consequently, the distance (in time slots) between the input time slots and output time slots is constant, regardless of the partition.

Unfortunately, the same is not true for the VT2 rate. A VT2 rate occupies 4 columns of the 12 columns of a VT group, and these 4 columns cannot be evenly divided between the three payload partitions created by the POH and stuff columns. Hence, the distance from the input time slots to the output time slots will change if they happen to fall into different partitions, and this lack of regularity must be compensated for. This is the purpose of the circuits 1605–1609. The compensation is necessary when a column of input time slots of a VT2 rate lies to one side of a stuff or POH column while the column of corresponding output time slots lies to the other side of that stuff or POH column. In that case, the address generated by register/counter 1601 is high or low by 12 (the number of time slots in one row of the stuff or POH column). Control processor 110 knows when this will happen, based on the following consideration.

There are N·21 VT2 channels in an STS-N frame. For all N·21 VT2 channels, their first column lies in the first partition and their last—fourth—column lies in the last—third—partition. For the first set of N·7 of the N·21 VT2 channels, their second column lies in the first partition and their third column lies in the second partition. For the next set of N·7 VT2 channels, both their second and third columns lie in the second partition. And for the last set of N·7 VT2 channels, their second column lies in the second partition while their third column lies in the third partition. Consequently, no compensation is ever required for the first and fourth columns of a VT2 channel irrespective of which other VT2 channel it is being switched to, but compensation may be required for the second and third columns of a VT2 channel and depends upon the relative positioning of the input VT2 and output VT2 within the three N·7 sets of VT2 channels in an STS-N frame. The requisite compensation, for each of the four columns of a VT2, is shown in the table of FIG. 18.

Consequently, when loading registers 602–604 and 1601 of FIG. 16 with information defining a switched connection for a VT2 channel, control processor 110 loads the corresponding one of the entries of the table of FIG. 18 into a four-word shift register 1605. For switched connections of channels other than VT2 channels, processor 110 loads register 1605 with all zeros. Furthermore, in the international SDH standard, stuff columns are positioned directly next to the overhead columns. Hence, above-described problem does not arise, i.e., there is no need for any compensation. Consequently, when the system of FIG. 1 is switching SDH frames, processor 110 loads register 1605 with all zeros for all switched connections including VT2 connections.

The generation of input data to control memory 1301 of FIG. 17 by the circuitry of FIG. 16 occurs as follows. Following loading by control processor 110 of registers 602–604, 1601, and 1605 with the results of a path hunt and issuance of the START signal, circuits 611–617 generate the CM_WE signal upon occurrence of the desired output time slot. The CM_WE signal sets R-S slip-flop 1609, whose output enables AND gate 1606 to start supplying CM_WE signals to the clock input of register 1605 and also enables AND gate 1607 to start supplying time-slot interval signals from CLK/9 signal line 520 to the clock input of register/counter 1601. The output of flip-flop 1609 also enables register/counter 1601 and register 1605 to start responding to their clock inputs.

Acting as a clock input to register 1605, the CM_WE signals causes register 1605 to output the first of its four words. The output of register 1605 is connected to its input to form a recirculating register, and also to one end of a summing circuit 1608 whose other input is connected to the output of register/counter 1608. Circuit 1608 compensates the input time-slot address generated by register/counter 1601 by the value supplied by register 1605 and outputs the compensated address as CM_DATA to control memory 1305 of FIG. 17. The output of register 1605 remains constant until the next occurrence of the CM_WE signal, which causes register 1605 to output the next one of its four words. Generation of the STOP signal in FIG. 15 at the end of a read cycle through data memory 1301 of FIG. 14 resets flip-flop 1609, thereby disabling both AND gates 1606 and 1607 and the outputs of register/counter 1601 and register 1605.

Since all input time slots are stored sequentially in data memory 1301 of FIG. 14, no bandwidth-type indication is required to supplement the output of control memory 1305 in the implementation of FIGS. 15–17. Hence, turning to FIG. 17, a bandwidth-type memory is not used. Control memory 1305 has the same depth as data memory 1301—19440 words. Memory 1305 is controlled in the same manner as explained for the illustrations discussed previously, e.g., FIG. 13. The output of control memory 1305 is connected to a first input of a selector 1703 whose second input is connected to DS-0 ADDR. Selector 1703 operates under control of R/$\overline{W}$ signal line to supply both split-cycle read and write addresses to the address (A) input of data memory 1301, similarly to selector 1203 of FIG. 13.

The contents of memory 1305 are programmed such that during every data memory 1301 read/write cycle, the most-significant-bit output of memory 1305 has the opposite value of the most-significant bit of DS-0 ADDR. Thus, buffer 311 of memory 1301 is read while buffer 312 is written, and vice versa. The R/$\overline{W}$ signal line is also connected to the write enable (WE) control input of memory 1301. The data (D) input of memory 1301 is connected to the DATA IN line and the output of memory 1301 is connected directly to the DATA OUT line which represents link 171 or 151.

Figure 19:
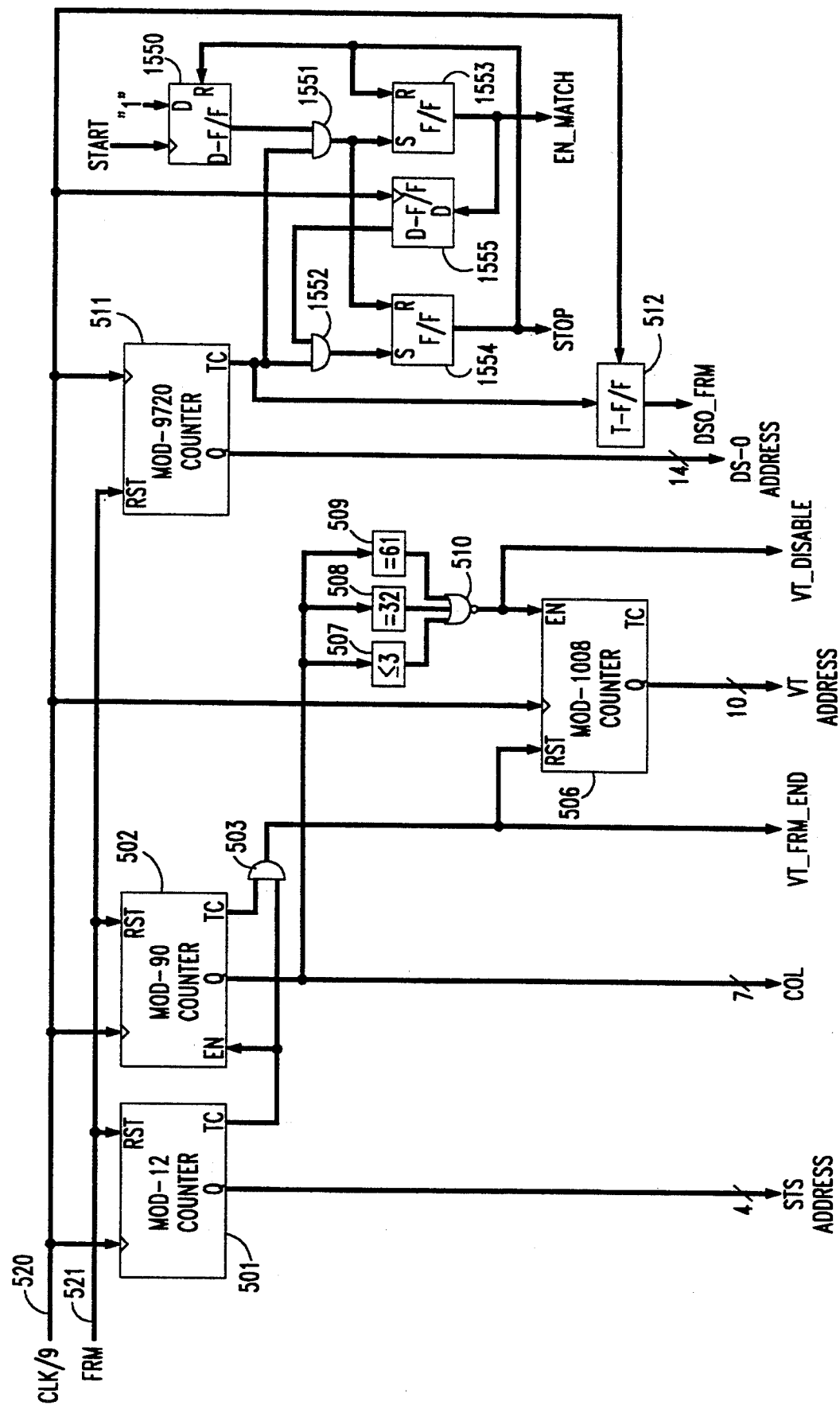
FIGS. 19–21 are a circuit diagram of a second illustrative implementation of the TSI of FIG. 14.
Figure 20:
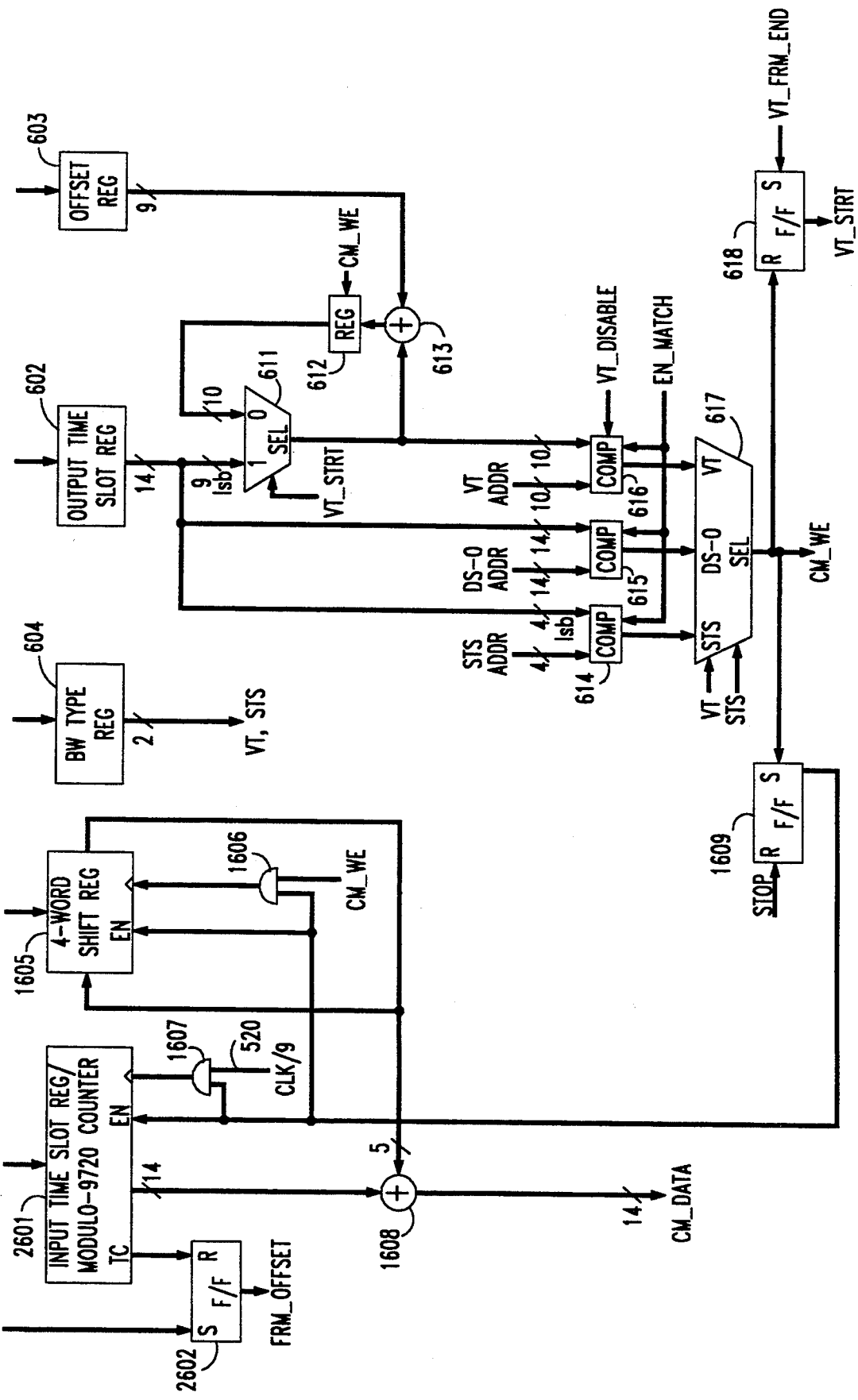
Figure 21:
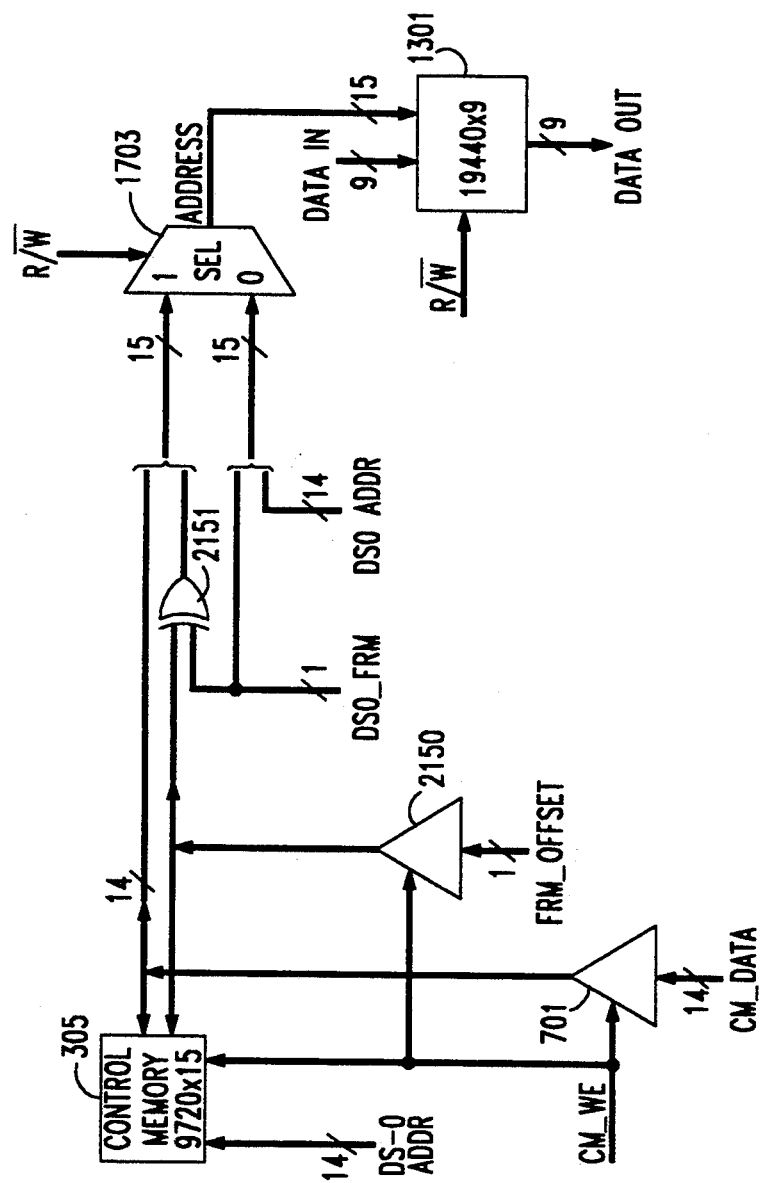

Yet another implementation of TSI 131 or 141 of FIG. 4 is shown in FIGS. 19–21. The departure of this implementation from that of FIGS. 15–17 is that it uses a control memory 305 that is only half as deep. Because of this, only half of the count that was previously required is needed to cycle through the addresses of this reduced-size control memory 305. Modulo-19440 counter of FIG. 15 is therefore replaced in FIG. 19 with a modulo-9720 counter 511 which is reset by the FRM signal line 521. But because the reduced-size control memory 305 has a capacity to address only one of the buffers 311 and 312 of data memory 1301, it must be used twice and its output must be modified during the second use in order for it to address all of data memory 1301. For this purpose, there is included in FIG. 19 a toggle flip-flop 512 which duplicates the flip-flop 512 of FIG. 4. In other respects FIGS. 15 and 19 are identical.

Again, because control memory 305 can hold only half of the addresses of control memory 1305 of FIG. 17, input time-slot register/modulo-19440 counter 1601 of FIG. 16 is replaced in FIG. 20 with an input time-slot register/modulo-9720 counter 2601 and an S-R flip-flop 2602. Flip-flop 2602 is set by control processor 110 at the same time as it loads the registers of FIG. 20. It is reset by the terminal count of register/counter 2601. The output of flip-flop 2602 forms a FRM_OFFSET signal which indicates whether the present count of register/counter 2601 is generating an address of buffer 311 or of buffer 312 of data memory 1301. In other respects, FIGS. 16 and 20 are identical.

FIG. 21 parallels FIG. 17 in many respects, and the same numerals are used to designate elements common to both figures. Only the differences are discussed.

The FRM_OFFSET signal is written into control memory 305 along with the CM_DATA signal. The writing thereof into memory 305 is controlled by a gate 2150 in the identical manner as gate 701 controls the writing of the CM_DATA signal into memory 305.

The FRM_OFFSET signal output of gate 2150 and of control memory 305 forms an input to an exclusive-OR gate 2151, whose output is connected to the first input of selector 1703 in parallel with the CM_WE signal output of gate 701 and of control memory 305. The DS0_FRM signal is connected to the second input of selector 1703 in parallel with the DS0_ADDRESS signal, and also forms the second input to exclusive-OR gate 2151. Therefore, the FRM-OFFSET signal acts as an indicator of which one of buffers 311 and 312 is being read, and the DS0_FRM signal acts as an indicator of which one of buffers 311 and 312 is being written.

It will be remembered, from the discussion of FIG. 16, that the initial value of register/counter 1601 points into the last partition 301"-303" of memory 1301. To have the same be true of register/counter 2601, flip-flop 2602 is initialized by control processor 110 with a value of "1". Thereafter, when register/counter 2601 begins to count and reaches its terminal count for the first time, its count value in conjunction with the FRM_OFFSET value output by flip-flop 2602 points to the last location of memory 1301. Flip-flop 2602 is therefore reset at this time, so that the next count of register/counter 2601 in conjunction with the FRM_OFFSET value will point to the first location of memory 1301. Significantly, the value of FRM_OFFSET will not change again until flip-flop 2602 is set by control processor 110 at the beginning of a new call setup. That means that only those locations in control memory 305 that are read during the occurrence—the writing—of the first partition 301"-303" of memory 1301 have stored an FRM_OFFSET value of "1". But the contents of control memory 305 are used twice: for the first time during the occurrence—the writing—of buffer 311 and a second time during the occurrence—the writing—of buffer 312. Consequently, those same locations in control memory 305 that have stored an FRM_OFFSET value of "1" will be read during the occurrence—the writing—of the first partition 301"-303" of the second buffer 312 of memory 1301. But during this occurrence of the first partition 301"-303" of the second buffer 312, the last partition 301"-303" of the first buffer 311 should be read. Hence, the stored FRM_OFFSET value of 1 is incorrect and must be changed to a 0. This is the function of exclusive-OR gate 2151.

During the occurrence of the second and all subsequent portions 301"-303" of the second buffer 312, reading should be of the first and subsequent portions 301"-303" of the second buffer and not of the first buffer 311. But, as was explained above, the FRM_OFFSET value stored by control memory 305 locations used at this time is 0. Hence, the stored FRM OFFSET value of 0 is incorrect and must be changed to a 1. This is another function of exclusive-OR gate 2151.

Figure 22:
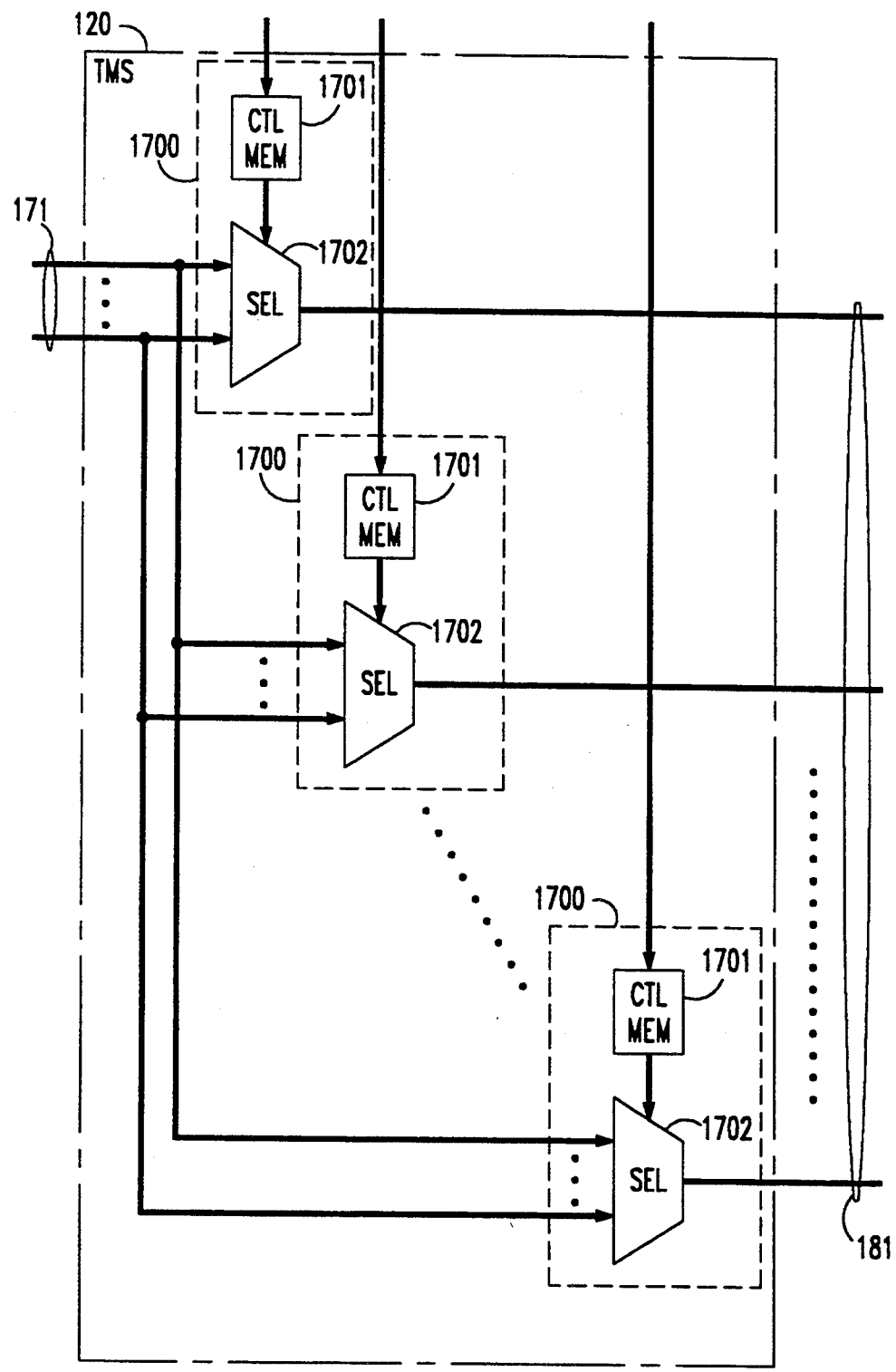
FIG. 22 is a block diagram of the time-multiplexed switch (TMS) of the system of FIG. 1.

Returning to FIG. 1, exercise of control over TMS 120 is implemented in much the same way as over a TSI 131 or 141. FIG. 22 shows an illustrative implementation of TMS 120. It comprises a plurality of output controls 1700, one for each TMS output link 181. Each output control 1700 comprises a selector 1702 and associated control memory 1701. Connected to the inputs of each selector 1702 are all of the TMS input links 171. Each selector 1702 operates under control of its own control memory 1701. During each time-slot interval, control memory 1701 of each selector 1702 selects one of the input links 171 of the corresponding selector 1702 for connection to its output link 181.

Figure 23:
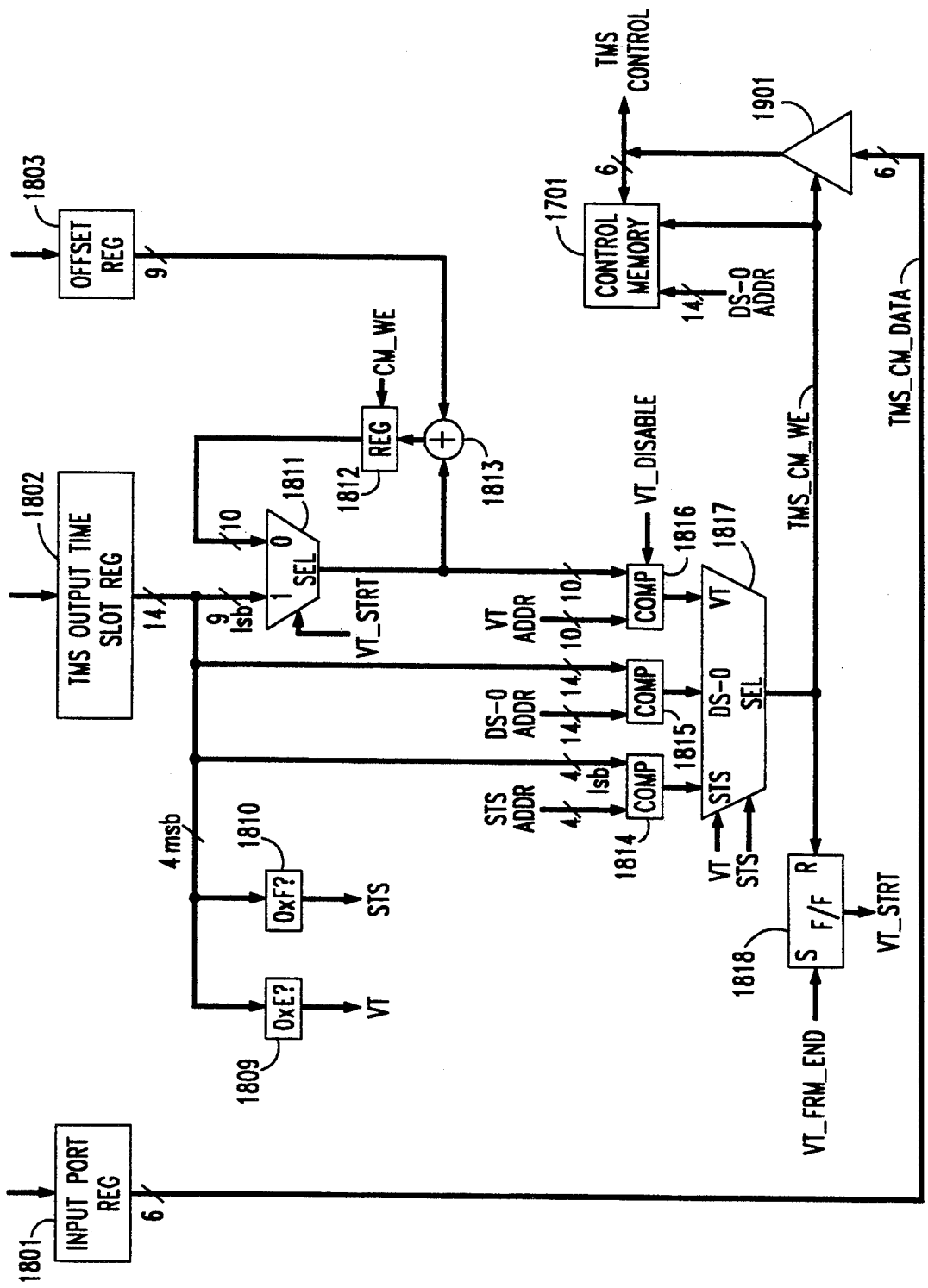
FIG. 23 is a circuit diagram of a first illustrative implementation of an output control of the TMS of FIG. 22.

Just as there are numerous possible implementations of a TSI 131 or 141, there are correspondingly numerous implementations of output controls 1700. The implementation of an output control 1700 that corresponds to the TSI 131 or 141 implementation of FIGS. 4-6 is shown in FIG. 23. The implementation shares the circuitry of FIG. 4 with TSI 141 of its corresponding TMS output link 181. For the programming of control memory 1701, this implementation uses circuitry that duplicates that of FIG. 5 in many respects. TMS output time slot register 1802 duplicates the function of output time-slot register 602. Input port register 1801 serves a similar function to input time-slot register 601, but specifies which of the TMS input ports, or links 171, is to be connected by selector 1702 to the TMS output port, or link 181, during the time slot specified by register 1802. Offset register 1803 duplicates offset register 603. Similarly, elements 1809-1818 duplicate elements 609-618.

The output of input port register 1801 is connected to the input of a gate 1901, which serves the same function for control memory 1701 as gate 701 serves for control memory 305 of FIG. 6. Gate 1901 is controlled by the TMS-CM-WE output of selector 1817, as is the write enable input of control memory 1701. Like memory 305, control memory 1701 is cycled through by DS-0 ADDR. Control memory 1701 is 9720 words deep, one for each byte/time slot of an STS-12 frame.

Figure 24:
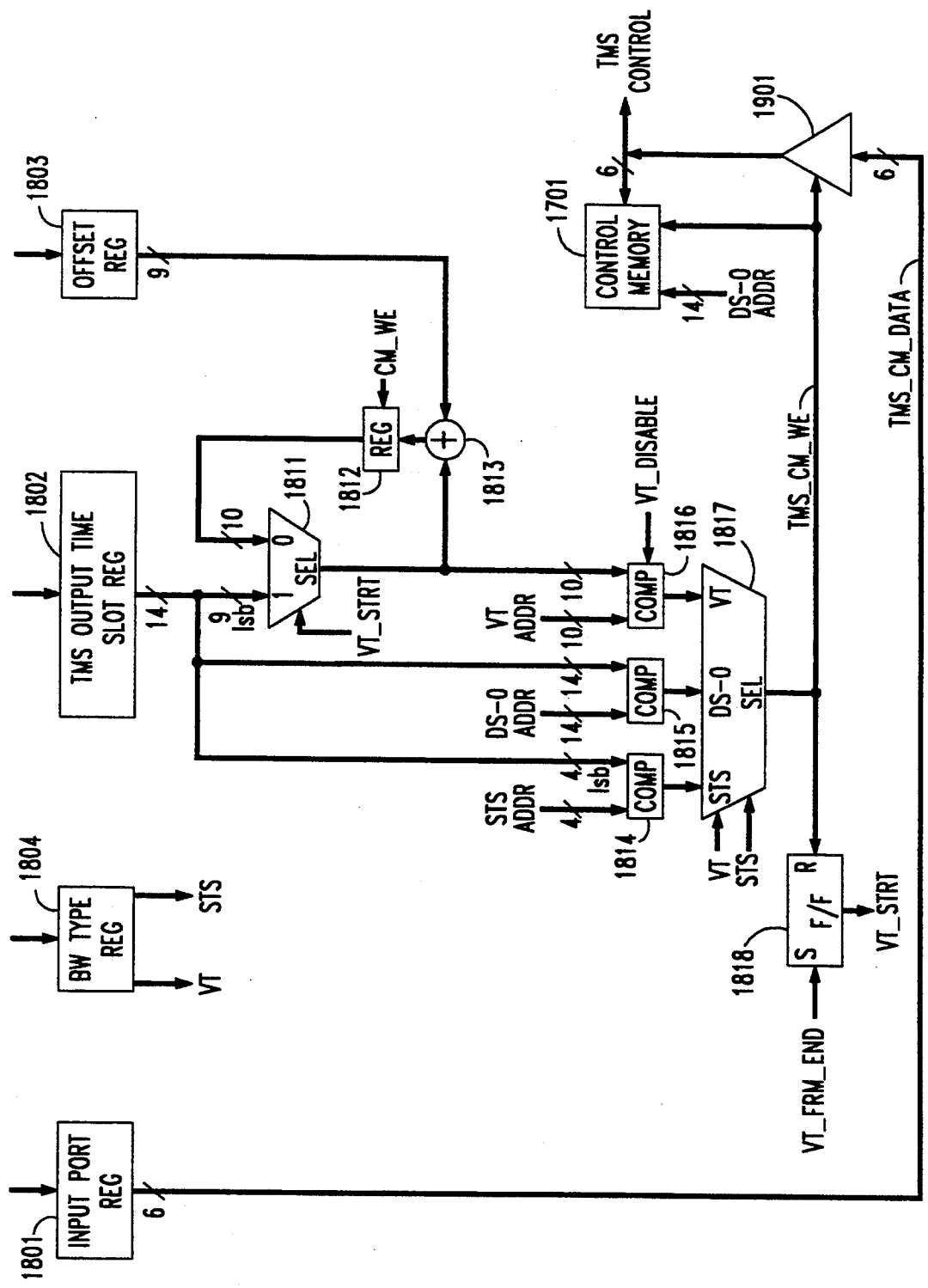
FIG. 24 is a circuit diagram of a second illustrative implementation of an output control of the TMS of FIG. 23.

The implementation of an output control 1700 that corresponds to the TSI 131 or 141 implementation of FIGS. 4 and 8-9 is shown in FIG. 24. The implementation shares the circuitry of FIG. 4 with TSI 141 of its corresponding TMS output link 181. For the programming of control memory 1701, this implementation uses circuitry that duplicates that of FIG. 8 in many respects. Just as FIG. 8 is substantially identical to FIG. 5 but replaces comparators 609 and 610 with bandwidth-type register 604, the implementation of FIG. 20 is substantially identical to that of FIG. 23 but replaces comparators 1809 and 1810 with bandwidth-type register 1804, which duplicates the function of register 604 of FIG. 8. The same numerals are used in FIGS. 23 and 24 to designate elements that are common to both.

Figure 25:
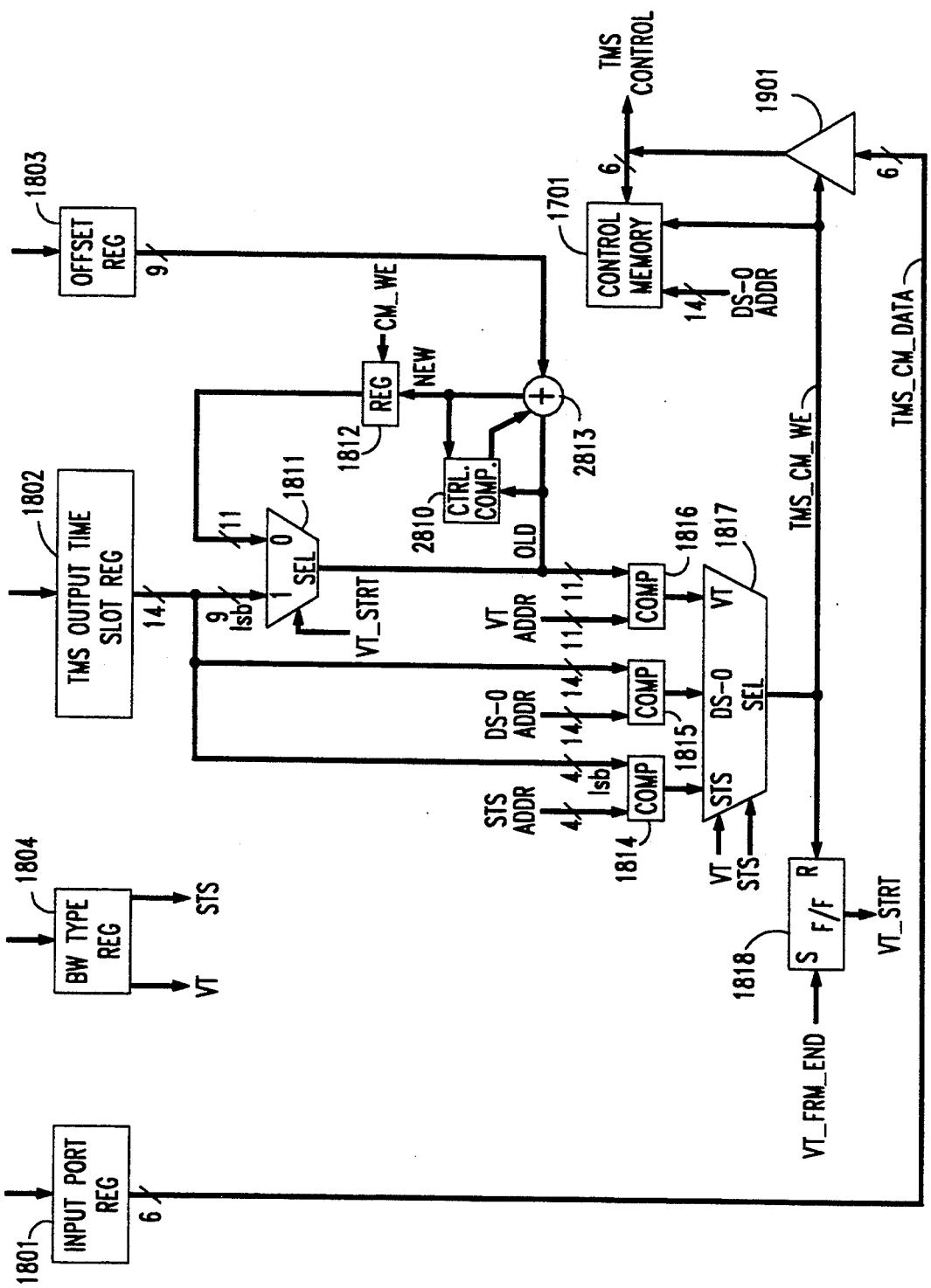
FIG. 25 is a circuit diagram of a third illustrative implementation of an output control of the TMS of FIG. 22.

The implementation of an output control 1700 that corresponds to the TSI 131 or 141 implementation of FIGS. 11-13 is shown in FIG. 25. This implementation shares the circuitry of FIG. 11 with TSI 141 of its corresponding TMS output link 181. For the programming of control memory 1701, this implementation uses circuitry that duplicates portions of FIG. 12. The implementation of FIG. 25 is substantially identical to that of FIG. 24 but replaces adder 1813 with an adder 2813 and control comparator 2810, which respectively duplicate adder 1613 and control comparator 1610 of FIG. 12. Control memory 1701 of FIG. 25 is again 9720 words deep, one for each byte/time slot of an STS-12 frame.

Figure 26:
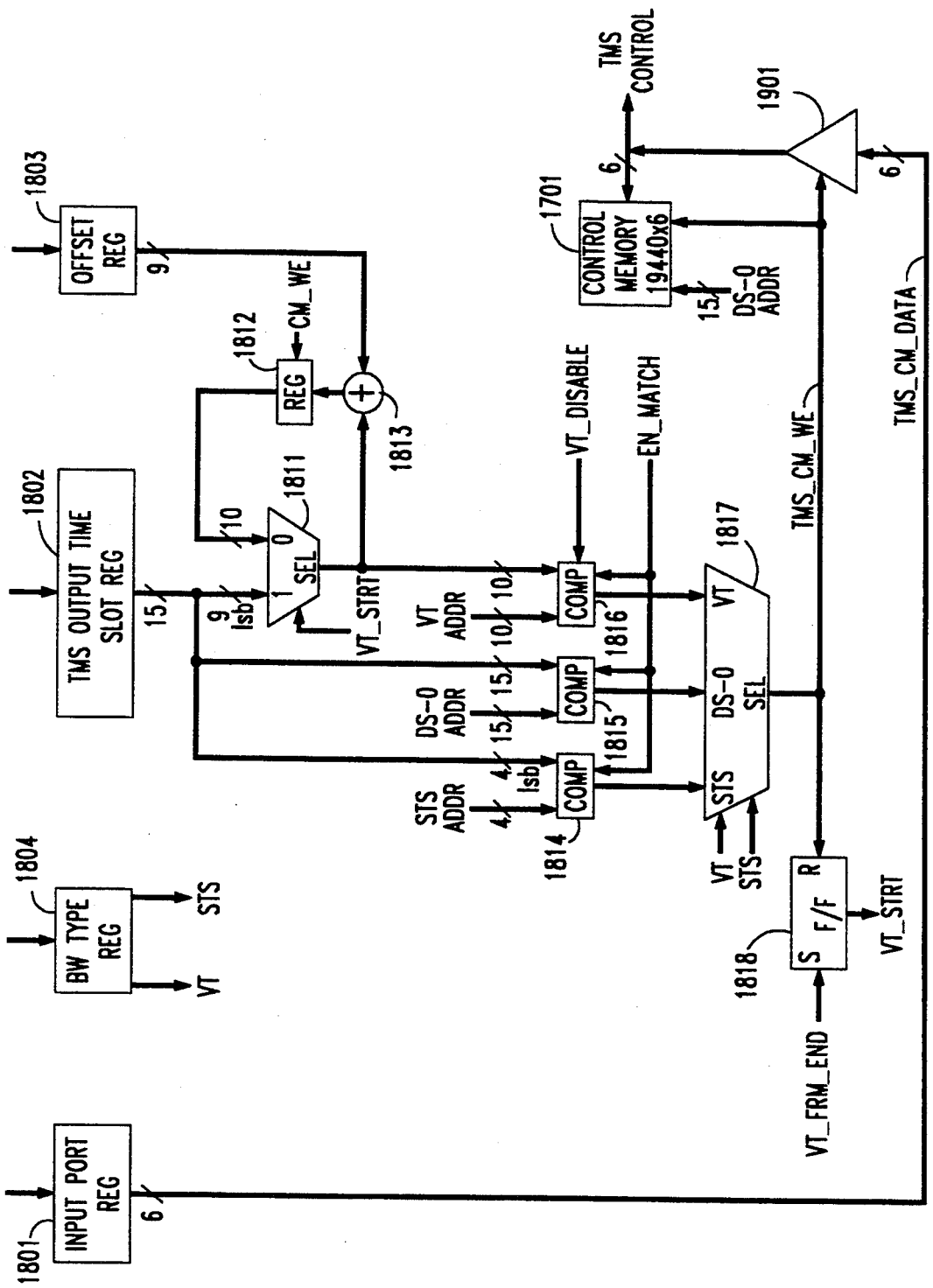
FIG. 26 is a circuit diagram of a fourth illustrative implementation of an output control of the TMS of FIG. 22.

The implementation of an output control 1700 that corresponds to the TSI 131 or 141 implementation of FIGS. 15-17 is shown in FIG. 26. This implementation shares the circuitry of FIG. 15 with TSI 141 of its corresponding TMS output link 181. For the programming of control memory 1701, this implementation uses circuitry that duplicates portions of FIG. 16. The implementation of FIG. 26 is substantially identical to that of FIG. 24. However, in this embodiment, control memory 1701 is 19440 words deep, spanning the two STS-12 frames of storage of data memory 1301 of FIG. 14, and hence DS-0 ADDR is 15 bits wide. The information stored in control memory 1701 is identical for both STS-12 frames, i.e., the contents of the two halves of memory 1701 are duplicates of each other.

An alternative equivalent implementation is to make memory 1701 of FIG. 26 only half as deep, i.e., 9720 words deep, and addressed by only the 14 least-significant bits of DS-0 ADDR, i.e., addressed by DS-0 ADDR modulo 9720. This alternative implementation corresponds to the TSI 131 or 141 implementation of FIGS. 19–21.

As was mentioned previously, the switching fabric of FIG. 1—TSIs and TMS—would normally be duplicated and the two duplicate fabrics would be operated in parallel in order to obtain strictly-non-blocking performance. The implementations of output controls 1700 shown in FIGS. 22–26 assume that each output control 1700 of both duplicate TMSs 120 has its own, duplicate, circuitry for loading control memory 1701. An alternative implementation reduces the amount of required circuitry by sharing non-duplicated memory-loading circuitry among the pair of control memories 1701 of the corresponding output controls 1700 of the duplicate TMSs 120. In such a shared implementation, each FIG. 22–26 further includes a register (not shown) that is written by control processor 110 at the time of writing of the other registers to indicate which one of the pair of control memories 1701 is to be loaded.

As described above, the hardware of system 100 is configured to switch connections (also referred to herein as channels) at three different types of rates: STS-1, VT, and DS-0. However, system 100 is not limited to switching connections having these specific rates. Rather, a connection may have any rate up to and including the STS-12 rate, and system 100 allocates as much available bandwidth to each connection as that connection requires. Bandwidth is allocated in different-size blocks whose sizes correspond to the specific rates which the hardware is configured to switch. A connection's full allocated bandwidth will therefore comprise one or more individually-allocated blocks of bandwidth preferably corresponding to one or more of the STS-1, VT, and DS-0 rates. Bandwidth allocation is accomplished hierarchically, such that as much of the required bandwidth is allocated in the largest available bandwidth blocks without wasting bandwidth, the remaining required bandwidth is allocated in the next-smaller available bandwidth blocks, and so on, until the connection's full bandwidth requirement has been met.

A characteristic of this approach is that each rate will suffer a different time delay through the switching system equal to the switch delay of that rate's corresponding frame. Therefore, for each call, the traffic switched at a higher rate will have to be delayed at the switch output to re-synchronize it with the call's traffic switched at the lowest rate used for that call. However, this is not expected to result in significant performance degradation, because calls spanning a wide range of rates are expected to be rare.

In view of this need to delay a call's traffic being switched at higher rates, it is necessary to retain this traffic at the switch output for some time without immediately overwriting it with subsequent switched frames of traffic corresponding to those rates. One way of achieving this is to retain the call's traffic in the output switching element's data memory. The implementation of data memory 1301 shown in FIG. 14 is particularly suited for this purpose, because it retains each rate's corresponding frames until the slowest rate's frame, i.e., the entire DS-0 frame, has been received at the output.

It should be noted that a similar situation exists with calls that are unrelated and of different rates arriving at the switch output with different delay characteristics. Because they are unrelated, these calls need not be delayed further but instead, the SONET/SDH pointer mechanism can be used to reconcile the different delays.

One of the requirements of the SONET/SDH standards is that section and line overhead (i.e., the first 3 columns) of each constituent STS-1 of an STS-N signal must be aligned such that the N framing bytes are contiguous in their transmission. The Synchronous Payload Envelope (SPE) is allowed to float relative to the STS-1 overhead bytes. The SPE starting location is identified by a pointer located in the respective STS-1 overhead and will be referred to as the STS-1 level pointer. Virtual tributaries (VTs) are carded within the STS-1 SPE. VTs have their own SPE which may float in a similar fashion to the STS-1 SPE or may be locked, meaning that the VT SPE does not move relative to the STS-1 SPE. Floating VTs therefore have a VT level pointer analogous to the STS-1 level pointer. The VT pointers always appear as the first seven to twenty-eight bytes (depending on the VT size) of the STS-1 SPE. Floating VTs are preferred for carrying asynchronous payloads, such as a DS-1, that is not locked to the same clock as the switch. This allows these asynchronous signals to pass through the switch without added delay. Therefore, it is preferable to transport signals in the floating format. When the VT payload is to be switched, as in the case of DS-0s carried in a VT, a slip buffer is used to convert the floating VT to a locked VT. Locked VTs carry payloads that are synchronized to the switch clock and therefore are ideal for locating individual bytes (time slots) such as DS-0s for switching. The SONET/SDH standards however do not allow mixing locked VTs with floating VTs within a STS-1. For a multirate switch, all traffic being switched below the STS-1 level is done using the floating format. All traffic that is being switched below the VT level (i.e., DS-0s) is converted to a pseudo-floating format. That is, the VT SPE passes through a slip buffer so that the SPE appears locked, and the VT level pointer is set to 0. For VT level switching, the VT pointer is incremented by an amount corresponding to the value of the STS-1 level pointer. The STS-1 level pointer is set to 0, meaning that the STS-1 SPE, and consequently the VT pointers, start in the first position of the payload envelope. For switching at the STS-1 and above levels, the STS-1 pointer is passed to the switch without change.

After switching in a TSI, the VTs will exit the TSI shifted down one row relative to the overhead due to the VT frame length of one row of the 125 microsecond frame. The STS-1 level pointer is therefore incremented by an equivalent amount showing the SPE as a whole being shifted. For DS-0 level switching, the delay is the full 125 microsecond frame time, which places the VT pointer associated with the DS-0s one row above the VT pointers associated with the VTs being switched at that level. However, all VT pointers must be contiguous. The path hunting mechanism must therefore offset the output time-slot assignments for DS-0 level calls by one row, thereby allowing the VT pointers to be contiguous once again. Finally, if STS-1 or above calls are switched as an entity, their respective STS-1 level pointers and VT level pointers pass through the switch unchanged. If, however, these higher-rate call types must be split partially into lower-rate portions to avoid blocking, and the lower-rate portion is of type VT, then the STS-1 level pointers must be incremented by an amount representing the added delay of one row required to be inserted in the high-rate portion of the call to resynchronize that portion with the lower rate portion, as described above.

Figure 27:
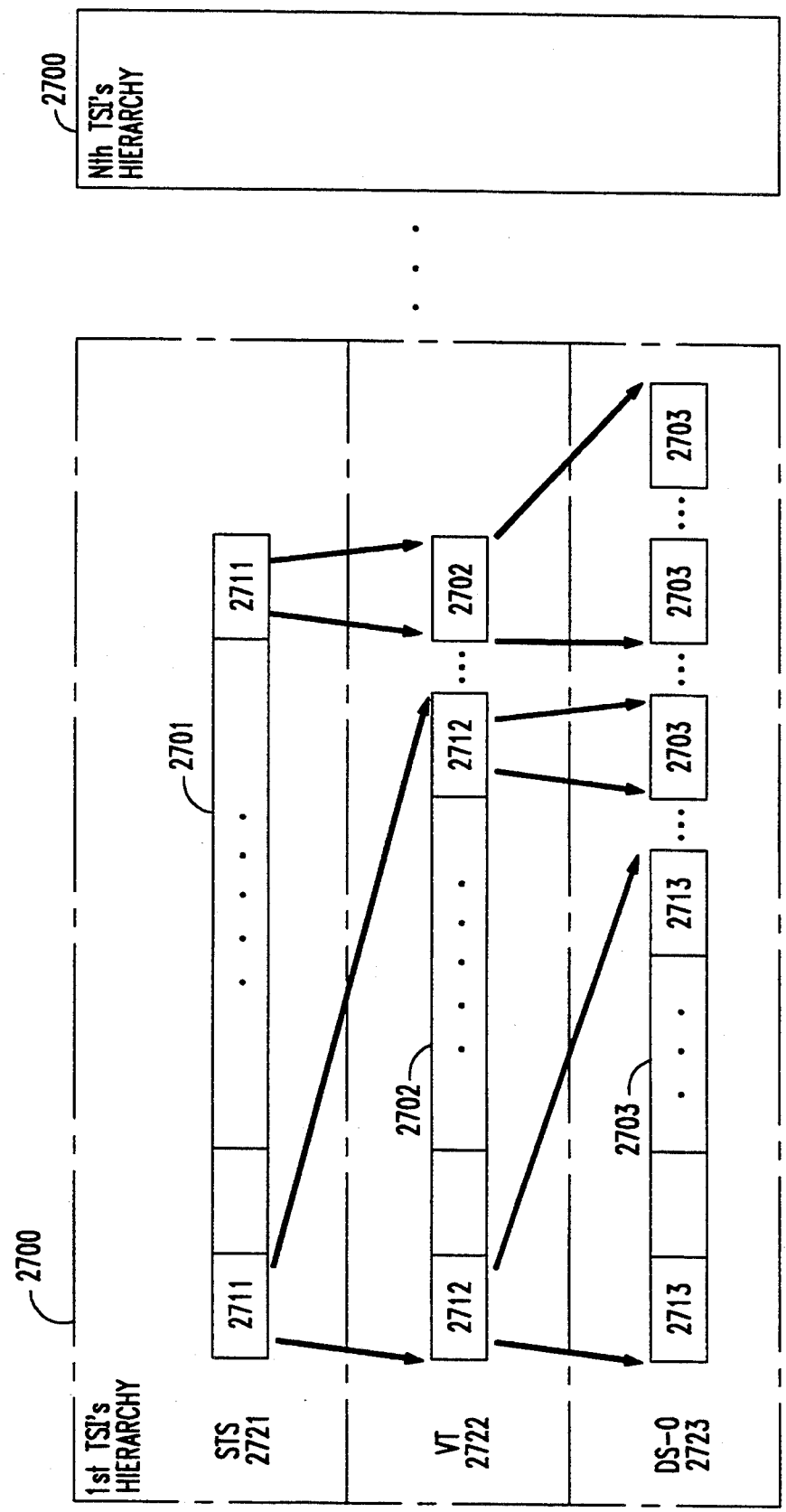
FIG. 27 is a block diagram of timeslot-status table-hierarchies for the TSIs of the switching system of FIG. 1, which hierarchies are implemented by matrices shown in FIGS. 28–31.

This hierarchical allocation and corresponding path hunts are accomplished as follows. Turning to FIG. 27, conceptually, each TSI 131 and 141 has an associated hierarchy 2700 of status tables 2701–2703 stored conventionally in the memory of control processor 110 to be used to perform path hunts through system 100. Each one of the plurality of layers 2721–2723 of each hierarchy 2700 corresponds to a different one of the STS-1, VT, and DS-0 data rates, respectively. Each one of the layers 2721–2723 comprises one or more corresponding status tables 2701–2703, respectively. The STS-1 rate layer 2721 contains one STS-1 timeslot block status table 2701 which has twelve entries 2711. Each entry 2711 corresponds to one time slot equivalent to an STS-1 frame 30 (see FIG. 2). Hence, each entry 2711 represents the bandwidth of one STS-1 within an STS-12. Each entry 2711 is encoded to indicate whether the corresponding bandwidth is fully idle, partially idle, or busy.

For every entry 2711, the VT rate layer 2722 contains a different corresponding VT timeslot block status table 2702. Hence, there are 12 status tables 2702 for each table 2701. Each status table 2702 has up to 28 entries 2712, each corresponding to a different VT of an STS-1. How many entries 2712 a table 2702 has at any one time depends upon the mix of VT types that the corresponding STS-1 carries at that time. Each entry 2712 of layer 2722 corresponds to a timeslot equivalent to of one VT within an STS-1. Hence, each entry 2712 represents the bandwidth of one VT. Each entry 2712 is also encoded to indicate whether the corresponding bandwidth is fully idle, partially idle, or busy.

For every entry 2712, the DS-0 rate layer 2723 contains a corresponding DS0 timeslot block status table 2703. Hence, the number of tables 2703 in layer 2723 varies with the number of VT entries in tables 2702 in layer 2722. Each status table 2703 has a plurality of entries 2713, each corresponding to a different DS-0 of the corresponding VT. How many entries 2713 a table 2703 has depends upon the corresponding VT type. Each entry 2713 represents the bandwidth of one DS-0, i.e., of one time slot of an STS-12 frame. Hence, there is a total of 9720 entries 2713 in one layer 2723. Each entry 2713 is encoded to indicate whether the corresponding bandwidth is idle or busy.

The hierarchy 2700 of tables may be expanded to contain additional levels—for example, to include an STS-3 upper level and an H0 (i.e., 384 kbps) next-to-lowest level. However, there is a tradeoff between the number of levels and the width of each level. The three-level hierarchy 2700 shown in FIG. 27 represents a reasonable tradeoff.

To establish a given connection between a given input TSI 131 and a given output TSI 141, matching idle input-TSI output time-slots and output-TSI input time-slots must be found. To perform a path hunt between a TSI 131 and a TSI 141, control processor 110 searches their corresponding hierarchies 2700 of status tables in a predefined way. For an STS-1 rate or a higher-rate connection, the preferred choice is to find matching idle entries at the STS-1 level 2721. For a sub-STS-1 rate, e.g., a VT rate, connection, the preferred choice entries at the VT level 2722 which are not a part of fully-idle STS-1s. This preserves the fully-idle STS-1s—to the extent possible—for other STS-1 rate or higher-rate connections. Similarly, for a sub-VT rate, e.g., a DS-0 rate, connection, it is preferable to find matching idle DS-0 entries which are not part of fully-idle STS-1s or fully-idle VTs. This preserves the fully-idle STS-1s and VTs—to the extent possible—for other higher-rate, e.g., STS-1 rate and VT rate, connections. Hence, the allocation procedure is described in the following hierarchy of searching for bandwidth of a particular size:

1) partial/partial matching at the STS-1 level and the VT level, 2) partial/partial matching at the STS-1 level and partial/idle matching at the VT level, 3) partial/partial matching at the STS-1 level and idle/partial matching at the VT level, 4) partial/partial matching at the STS-1 level and idle/idle matching at the VT level, 5) partial/idle matching at the STS-1 level and partial/idle matching at the VT level, 6) partial/idle matching at the STS-1 level and idle/idle matching at the VT level, 7) idle/partial matching at the STS-1 level and idle/partial matching at the VT level, 8) idle/partial matching at the STS-1 level and idle/idle matching at the VT level, and 9) idle/idle matching at the STS-1 level and idle/idle matching at the VT level.

Of course, how deep into this hierarchy a search proceeds depends upon the size of bandwidth sought. Thus, a search for an STS-1 bandwidth does not reach the level of this hierarchy; a search for a VT bandwidth follows only steps 4, 6, 8, and 9 of this hierarchy, and only a search for a DS-0 bandwidth follows all steps 1–9 of this hierarchy. Non-blocking performance is maintained by always retaining the option to form a higher-rate connection from a collection of a greater-than-ideal number of smaller-than-ideal bandwidth components.

The actual physical structure of the hierarchies 2700 of status tables of FIG. 27 is depicted in FIGS. 28–31. Layers 2721 of hierarchies 2700 are implemented in two matrices 2800 and 2801 of FIG. 28. Input TSI STS-1 timeslot block status matrix 2800 implements layers 2721 of input TSIs 131, and output TSI STS-1 timeslot block status matrix 2801 implements layers 2721 of output TSIs 141. Matrix 2800 has 64 rows, each corresponding to a different one input link 171 of TMS 120 of system 100 of FIG. 1. Similarly, matrix 2801 has 64 rows, each corresponding to a different one output link 181 of TMS 120 of system 100. Matrix 2800 has 24 columns: two sets of twelve columns each corresponding to a table 2701 of a different one of the pair of input TSIs 131 that serve each input link 111 in the duplicated architecture of system 100 that was described above. Similarly, matrix 2801 also has 24 columns: two sets of twelve columns each corresponding to a table 2701 of a different one of the pair of output TSIs 141 that serve each output link 151 in the duplicated architecture of system 100. Hence, the entries of matrices 2800 and 2801 are the entries 2711 of all tables 2701 of all hierarchies 2700 of FIG. 27.

Layers 2722 of hierarchies 2700 are implemented in VT timeslot block status matrices 2900 of FIG. 29. Each matrix 2900 forms one table 2702 and corresponds to a different entry 2701 of matrices 2800 and 2801 of FIG. 28. Each VT timeslot block status matrix 2900 has seven rows, one for each VT group of an STS-1. Each VT type matrix 2900 also has four columns, one for each VT1.5 of a VT group. If a VT group does not carry four VT1.5s but instead carries three VT2s, only the first three columns of its corresponding row of VT type matrix 2900 are used; if it carries two VT3s, only the first two columns of its corresponding row are used; and if it carries one VT6, only the first column of its corresponding row is used, as illustratively shown in FIG. 29. Hence, each entry of a matrix 2900 is an entry 2712 of a table 2702.

To indicate which type of VT rate any VT group is carrying, there are associated with VT timeslot block status matrices 2900 of FIG. 29 a plurality of VT group status matrices 3000 of FIG. 30. There is one VT group status matrix 3000 for each input link 111 and output link 151 of system 100. Each VT group status matrix 3000 has 24 rows: two sets of twelve rows, each set corresponding to a different one of the pair of input TSIs 131 or output TSIs 141 that serve the corresponding input link 111 or output link 151 in the duplicated architecture of system 100. Each row of a set of twelve rows corresponds to a different one of the twelve STS-1s carried by the STS-12 of its corresponding link. Each VT group status matrix 3000 also has seven columns, one for each of the seven VT groups carried by each STS-1. The intersecting rows and columns form a plurality of entries 3001. The contents of each entry 3001 indicate the type of VT rate which the corresponding VT group is presently carrying. Hence, each entry 3001 corresponds to a different row of VT timeslot block status matrices 2900 of FIG. 29 and indicates how many columns, or entries 2712, of that corresponding row are to be used, i.e., which entries 2712 carry valid information.

Layers 2723 of hierarchies 2700 are implemented in DS-0 timeslot block status matrices 3100 of FIG. 31. There is a different matrix 3100 for every entry 2711 of each matrix 2800 and 2801 of FIG. 28. Hence, each matrix 3100 corresponds to a different STS-1. Each matrix 3100 has seven rows, each corresponding to a different one of the VT groups of the corresponding STS-1. Each matrix 3100 also has 108 columns, each corresponding to a different DS-0, i.e., a different one of the 108 time slots, of the corresponding VT group.

Figure 32:
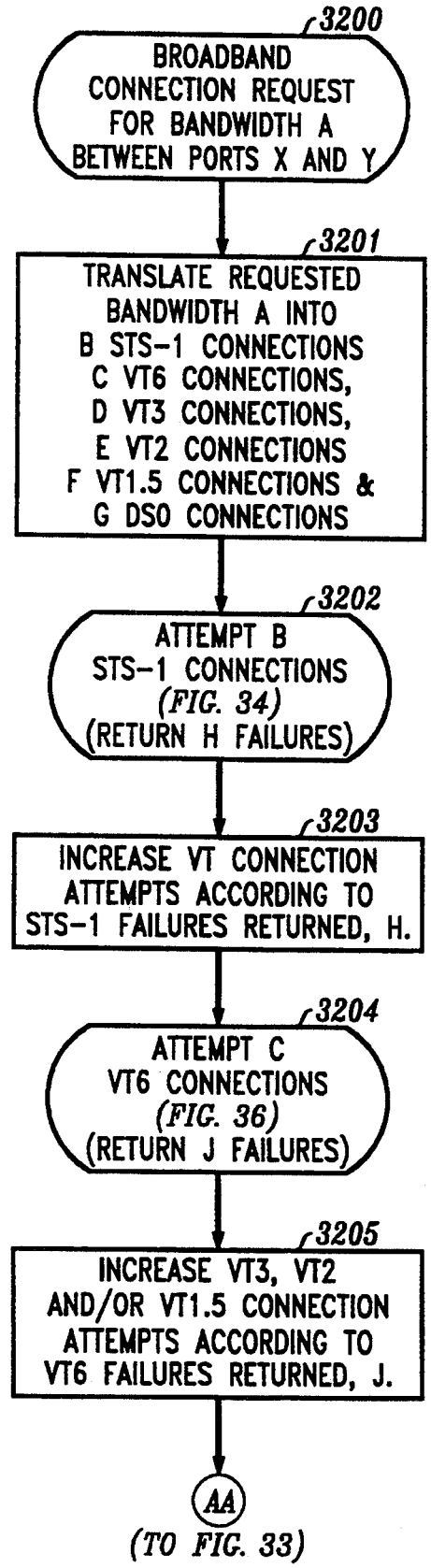
FIGS. 32–33 are a flow diagram of a broadband path-hunt procedure performed by the control processor of the switching system of FIG. 1.
Figure 33:
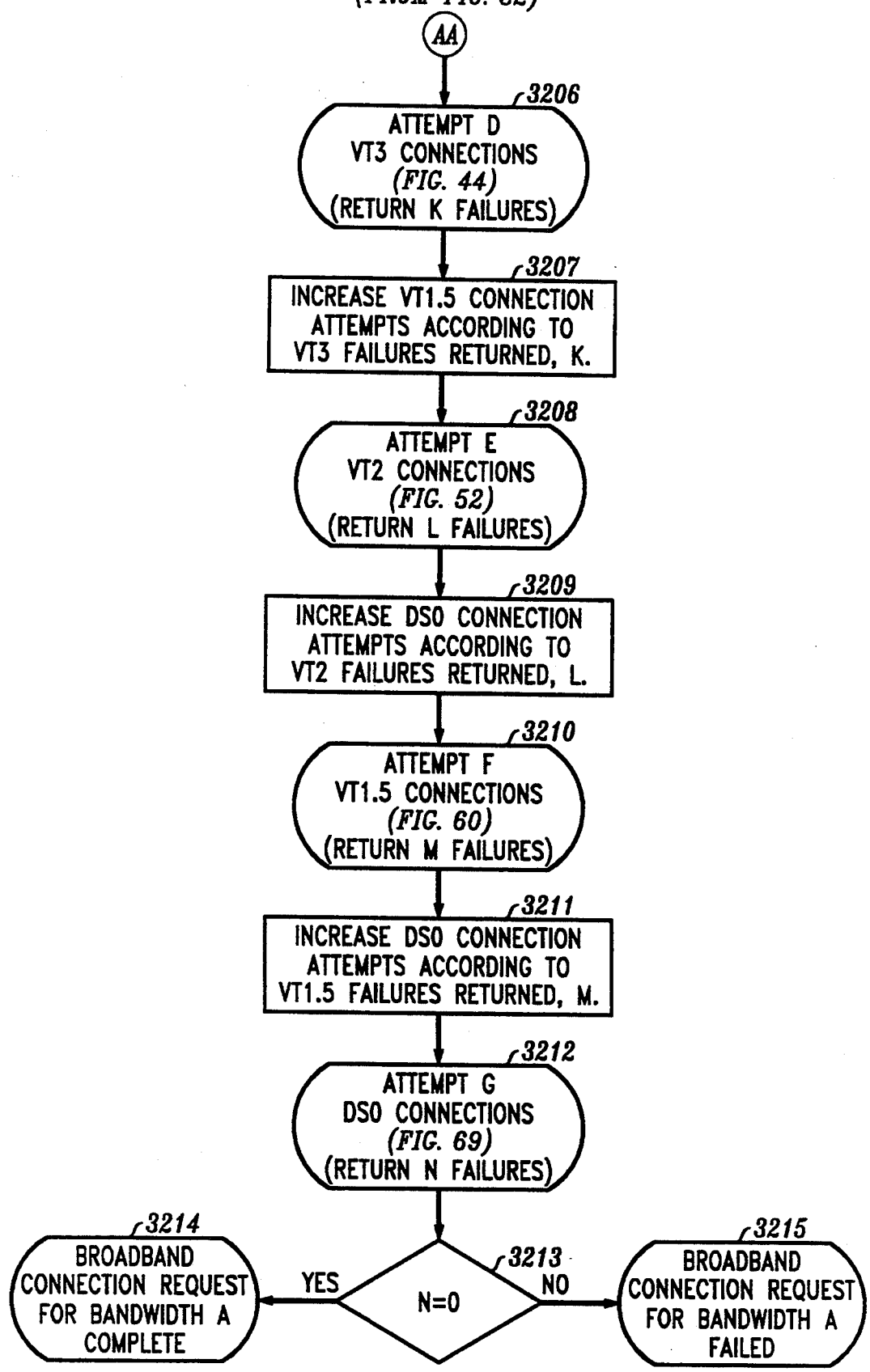
Figure 95:
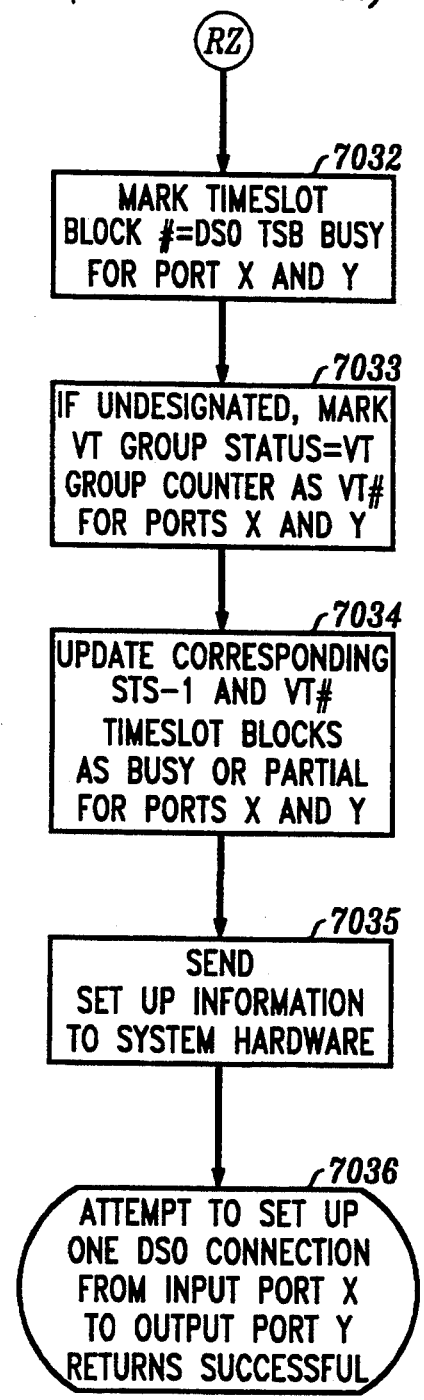

The path-hunt method used by control processor 110 is depicted in detail in FIGS. 32–95. Programs that implement this method are stored in the memory of processor 110 and are executed from the memory by processor 110, as is conventional. FIGS. 32–33 show a general procedure used for processing a request, received at step 3200, for a broadband connection of bandwidth A between input port X and output port Y of TMS 120. The bandwidth A is first translated into STS-1, VT6, VT3, VT2, VT1.5, and DS-0 connections, at step 3201. The translation is done as follows: bandwidth A is divided into as many (B) full STS-1 connections as possible; any remaining bandwidth is divided into as many (C) full VT6 connections as possible; any remaining bandwidth is divided into as many (D) full VT3 connections as possible; any remaining bandwidth is divided into as many (E) full VT2 connections as possible; any remaining bandwidth is divided into as many (F) full VT1.5 connections as possible; and finally any remaining bandwidth is divided into a number (G) of DS-0 connections.

Path-hunts are then performed to find the requisite number B of STS-1 connections, at step 3202. This step is diagramed in FIG. 34. The result of the path-hunts indicates how many (H) of the requisite STS-1 connections could not be found. This number H is used to increment the number of requisite VT connections, at step 3203, i.e., bandwidth represented by the failed STS-1 connections is divided into additional requisite VT connections. Thus, for every one of the H failed STS-1 connections, the number of VT6 connections to attempt is increased by 7, where new C=(H·7)+old C, or the number of VT3 connections to attempt is increased by 14, where new D=(H·14)+old D, or the number of VT2 connections to attempt is increased by 21, where new E=(H·21)+old E, or the number of VT1.5 connections to attempt is increased by 28, where new F=(H·28)+old F, or some other equivalent mix of VT connections is used.

Path-hunts are then performed to find the requisite number C of VT6 connections, at step 3204. This step is diagramed in FIG. 36. The result of the path-hunts indicates how many (J) of the requisite VT6 connections could not be found. This number J is used to increment the number of requisite VT3, VT2, and/or VT1.5 connections, at step 3205. For every one of the J failed VT6 connections, the number of VT3 connections to attempt is increased by 2, where new D=(J·2)+old D, or the number of VT2 connections to attempt is increased by 3, where new E=(J·3)+old E, or the number of VT1.5 connections to attempt is increased by 4, where new F=(J·4)+old F, or some equivalent mix of VT3, VT2, and VT1.5 connections is used.

Path-hunts are then performed to find the requisite number D of VT3 connections, at step 3206. This step is diagramed in FIG. 44. The result of the path-hunts indicates how many (K) of the requisite VT3 connections could not be found. For every one of the K failed VT3 connections, the number of VT1.5 connections to attempt is increased by 2, where new F=(K·2)+old F, at step 3207.

Path-hunts are then performed to find the requisite number E of VT2 connections, at step 3208. This step is diagramed in FIG. 52. The result of the path-hunts indicates how many (L) of the requisite VT2 connections could not be found. For every one of the L failed VT2 connections, the number of DS-0 connections to attempt is increased by 32, where new G=(L·32)+old G, at step 3209.

Path-hunts are then performed to find the requisite number F of VT1.5 connections, at step 3210. This step is diagramed in FIG. 60. The result of the path-hunts indicates how many (M) of the requisite VT1.5 connections could not be found. For every one of the M failed VT1.5 connections, the number of DS-0 connections to attempt is increased by 24, where new G=(M·24)+old G, at step 3211.

Path-hunts are then performed to find the requisite number G of DS-0 connections, at step 3212. This step is diagramed in FIG. 69. The result of the path-hunts indicates how many (N) of the requisite DS-0 connections could not be found. If this number N is zero, as determined at step 3213, the broadband connection request for bandwidth A is now completed, as indicated at step 3214, and the connection has been programmed into control memories of TSIs 131 and 141 and TMS 120. But if the number N is not zero, the broadband connection request for bandwidth A has failed, as indicated at step 3215, and the connection cannot be established. Any portions of the failed connection that have been set up at this point are torn down.

An alternative arrangement may not set up any portion of the connection until the path-hunt returns with an indication, at step 3213, that the hunt for the requested bandwidth has been satisfactorily completed. The entire connection is then set up, at step 3214.

Figure 34:
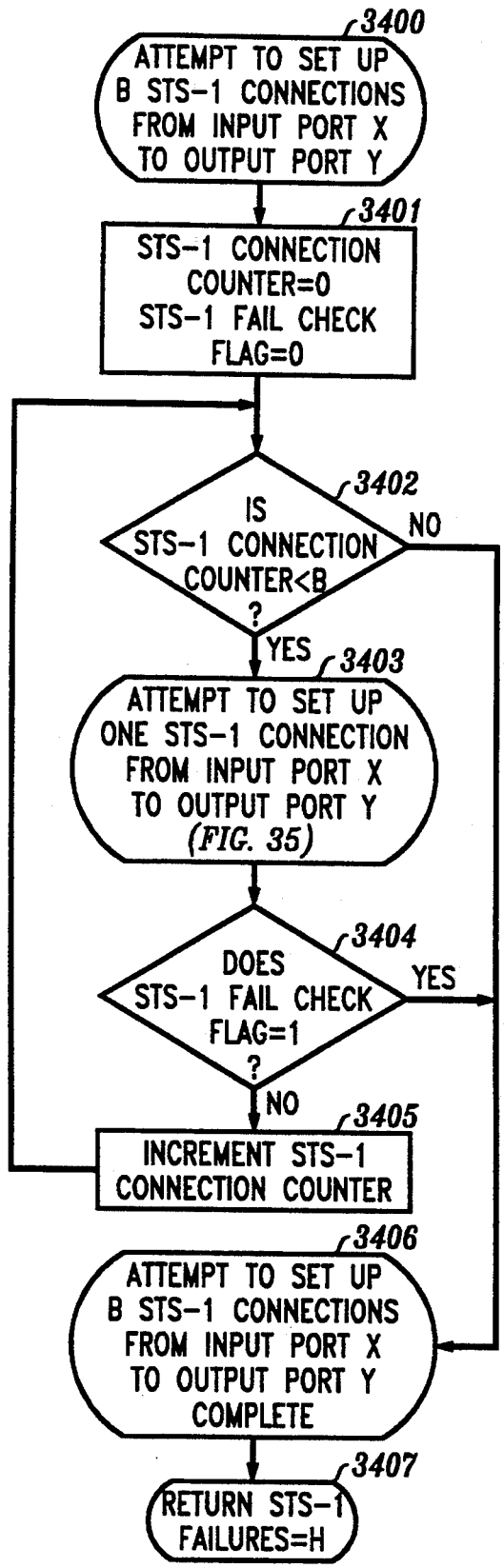
FIG. 34 is a flow diagram of multiple STS-1 path-hunt procedure of the broadband path-hunt procedure of FIGS. 32–33.

FIG. 34 shows the procedure for setting up B STS-1 connections. The procedure is performed in response to a request received from step 3202 of FIG. 32, at step 3400. The request specifies the input port X and the output port Y of TMS 120 that are to be interconnected. These ports correspond directly to the hierarchical status tables of an input TSI 131 and an output TSI 141 required for a given connection. In response to the request, an STS-1 connection counter and an STS-1 fail-check flag (both not shown) are initialized to zero, at step 3401. The value of STS-1 connection counter is then checked against the number B of requested connections, at step 3402. If the counter's value is less than the number B, an attempt is made to set up one STS-1 connection from input port X to output port Y, at step 3403. This step is diagramed in FIG. 35. If this attempt fails, the STS-1 fail-check flag is set to 1. The value of this flag is checked at step 3404. If the value is zero, indicating that the attempt to set up an STS-1 connection succeeded, the value of STS-1 connection counter is incremented by one, at step 3405, and program execution returns to step 3402. If the value of the STS-1 fail-check flag is found at step 3404 to be one, indicating that the attempt to set up an STS-1 connection failed, or if the value of the STS-1 connection counter is found at step 3402 to not be less than the number B, indicating that all requisite STS-1 connections have been set up, the attempt to set up STS-1 connections between input port X and output port Y comes to an end, as indicated at step 3406, and the procedure returns to step 3202 of FIG. 32 with the number H of failed STS-1 connections, at step 3407. The number H is computed as the number B minus the present count of the STS-1 connection counter. If the hunt for all requested STS-1 connections was successful, the value of H is zero.

Figure 35:
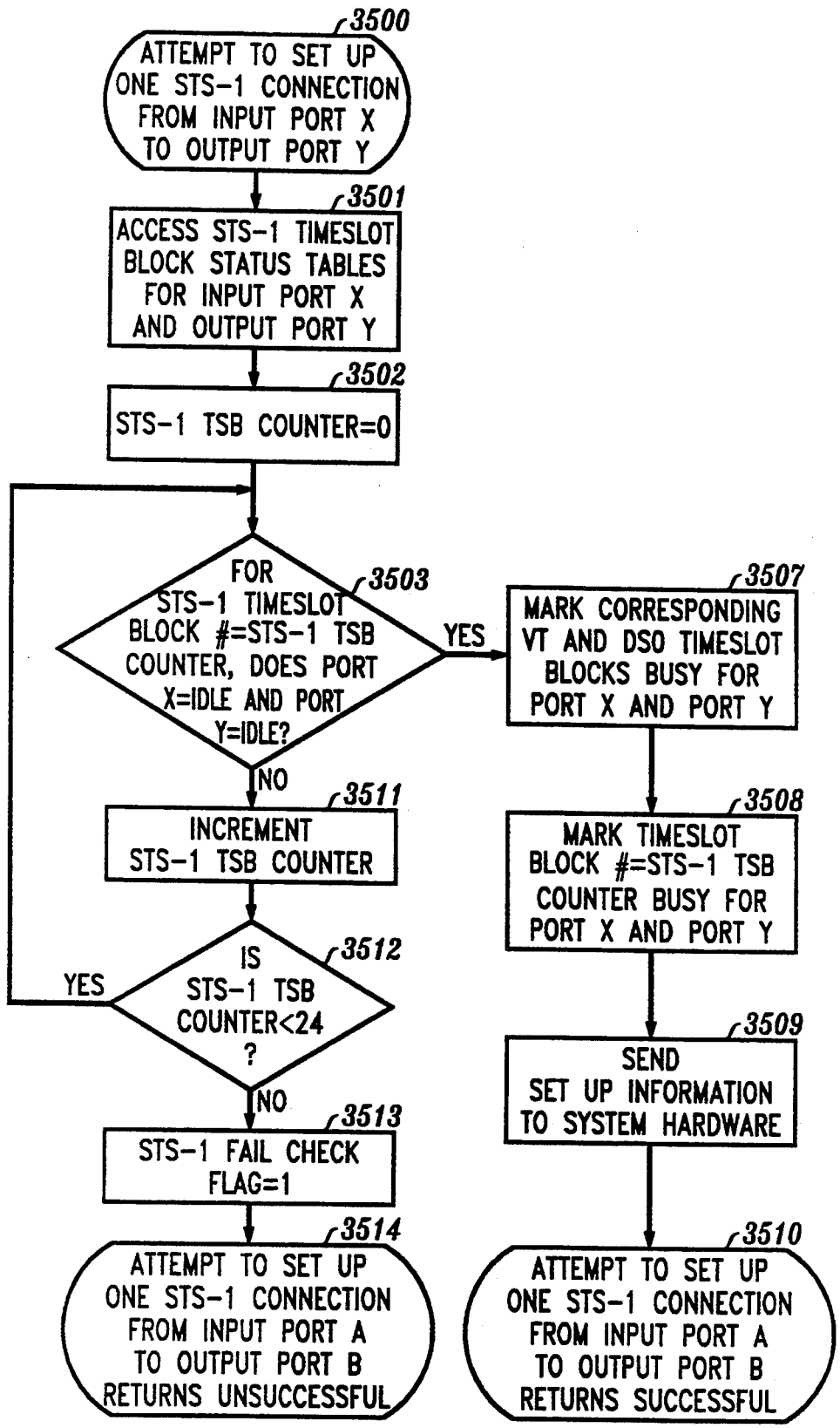
FIG. 35 is a flow diagram of one STS-1 path-hunt procedure of the multiple STS-1 path-hunt procedure of FIG. 34.

FIG. 35 shows the procedure for setting up one STS-1 connection. A check is made to determine whether there are corresponding idle STS-1 bandwidth blocks for both port X and port Y. If there are, the corresponding STS-1, VT, and DS-0 entries are marked busy or full, and the information to set up the STS-1 connection is sent to the system hardware—the TSIs and TMS.

The procedure is performed in response to a request received from step 3403 of FIG. 34, at step 3500. The request specifies the input port X and the output port Y. In response to the request, the procedure identifies and accesses STS-1 timeslot block status table 2701 in matrix 2800 of input TSI 131 serving input port X and table 2701 in matrix 2801 of output TSI 141 serving output port Y (see FIG. 28), at step 3501. Also, an STS-1 timeslot block (TSB) counter (not shown) is initialized to zero, at step 3502. The value of STS-1 TSB counter is then used as an address pointer to access and examine a corresponding entry 2711 of each one of the tables 2701 that were accessed at step 3501 to determine if their contents indicate fully-idle bandwidth, at step 3503. For example, if the count of the STS-1 TSB counter is 5, then the sixth table entry is accessed and examined. If so, all entries of VT tables 2702 and DS-0 tables 2703 (see FIG. 27) that correspond to the entries 2711 that were accessed at step 3503 are marked as busy, at step 3507. Also, those two entries 2711 themselves are marked as busy in tables 2701, at step 3508. This STS-1 connection can now be programmed into control memories of TSIs 131 and 141 and TMS 120, and so the results of the path-hunt are loaded into the TSI and TMS programming registers (see FIGS. 5, 8, 12, 16, 20, and 23–26), at step 3509. The setup having been successfully completed, the procedure returns to step 3403 of FIG. 34, at step 3510.

Returning to consideration of step 3503, if it is there determined that both examined entries 2711 of tables 2701 do not indicate fully-idle bandwidth, the STS-1 TSB counter is incremented by one, at step 3511, and the counter's value is checked to determine whether it is less than 24, at step 3512. If the counter's value is less than 24, there are more STS-1s to be checked for availability, and program execution returns to step 3503. If the counter's value is not less than 24, all STS-1s of the requisite input and output TSIs have been checked without success, and the attempt to set up the STS-1 fails. The STS-1 fail-check flag is therefore set to one to indicate the failure, at step 3513, and the procedure returns with this lack-of-success indication to step 3403 of FIG. 34, at step 3514.

Figure 36:
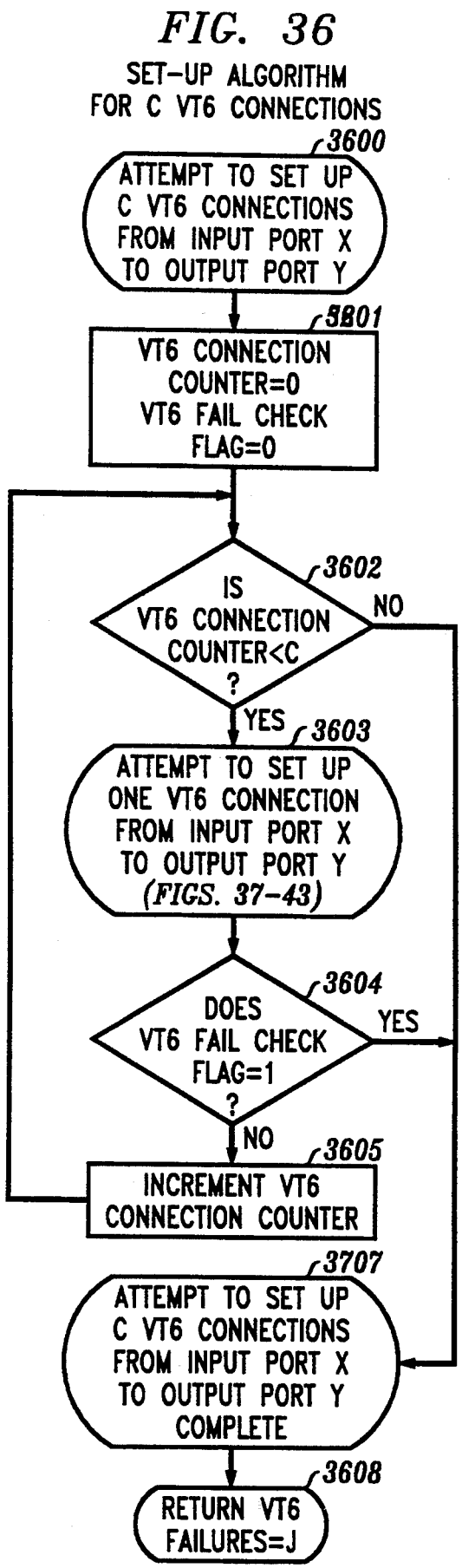
FIG. 36 is a flow diagram of multiple VT6 path-hunt procedure of the broadband path-hunt procedure of FIGS. 32–33.
Figure 37:
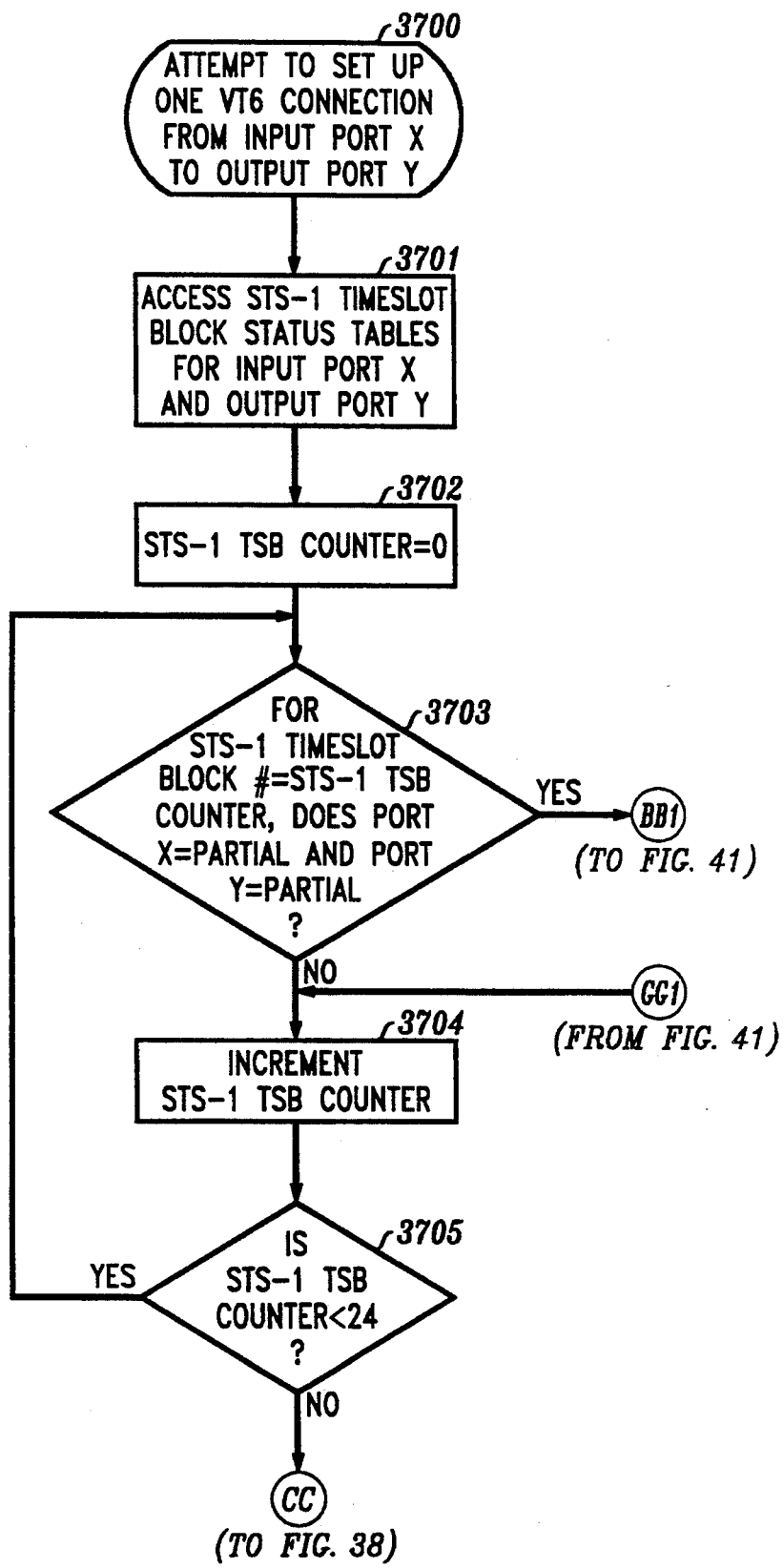
FIGS. 37–43 are a flow diagram of one VT6 path-hunt procedure of the multiple VT6 path-hunt procedure of FIG. 36.

FIG. 36 shows the procedure for setting up C VT6 connections. This procedure parallels exactly the procedure of FIG. 34, but substitutes VT6 for any reference to STS-1, the number C for any reference to the number B, and the number J for any reference to the number H.

FIGS. 37–43 show the procedure for setting up one VT6 connection. A check is made to determine whether there are matching STS-1 bandwidth blocks both marked as partially-idle. If so, they are good candidates from which idle VT bandwidth blocks may be selected without affecting fully-idle STS-1 blocks. When matching partially-idle STS-1 blocks are found, execution proceeds to the VT group level to find a VT group marked undesignated. If such a group is found, the VT group is marked as VT6 and the corresponding DS-0 time slots are marked busy for ports X and Y, the corresponding STS-1 time-slot blocks are marked as busy or partially-idle for ports X and Y, and information to set up the VT6 connection is sent to the system hardware—the TSIs and TMS.

If a VT6 connection is not found following the above steps, a check is made to determine whether an STS-1 block for port X is partially-idle and the STS-1 block for port Y is fully-idle. If so, execution proceeds to the VT group level.

If a VT6 connection is not found following the above steps, a check is made to determine whether an STS-1 block for port X is fully-idle and the STS-1 block for port Y is partially-idle. If so, execution proceeds to the VT group level.

If a VT6 connection is not found following the above steps, a check is made to determine whether an STS-1 block for port X is fully-idle and the STS-1 block for port Y is also fully-idle. If so, execution proceeds to the VT group level.

The procedure is performed in response to a request received from step 3603 of FIG. 36, at step 3700. The request specifies the input port X and the output port Y. In response to the request, the procedure identifies and accesses table 2701 of input TSI 131 serving input port X and table 2701 of output TSI 141 serving output port Y, at step 3700. Also, the STS-1 TSB counter is initialized to zero, at step 3702. The count of STS-1 TSB counter is then used to access and examine a corresponding entry 2711 of each one of the tables 2701 that were accessed at step 3501 to determine if their contents indicate partially-idle bandwidth, at step 3703. If so, program execution proceeds to step 3720 of FIG. 41; if not, the STS-1 TSB counter is incremented by one, at step 3704, and the counter's value is checked to determine whether it is less than 24, at step 3705. If the counter's value is less than 24, there are more STS-1s to be checked for partially-idle bandwidth, and program execution returns to step 3503.

If the counter's value is not less than 24, all STS-1s of the requisite input and output TSIs have been checked for partially-idle bandwidth without success. Therefore, the STS-1 TSB counter is reset to a value of zero, at step 3706 of FIG. 38, and the value of this counter is then used to access and examine a corresponding entry 2711 of each one of the tables 2701 that were accessed at step 3703 to determine if the contents of entry 2711 of input TSI 131 table 2701 indicate partially-idle bandwidth while the contents of entry 2711 of output TSI 141 table 2701 indicate fully-idle bandwidth, at step 3707. If so, program execution again proceeds to step 3720 of FIG. 41; if not, the STS-1 TSB counter is incremented by one, at step 3708, and the counter's value is again checked to determine whether it is less than 24, at step 3709. If so, program execution returns to step 3707.

If the value of STS-1 TSB counter is not less than 24, all STS-1s of the requisite input and output TSIs have been checked for the partially-idle/fully-idle bandwidth combination without success. Therefore, the STS-1 TSB counter is reset to a value of zero, at step 3710 of FIG. 39, and the count of this counter is then used to access and examine a corresponding entry 2711 of each one of the tables 2701 that were accessed at step 3703 to determine if the contents of entry 2711 of input TSI 131 table 2701 indicate fully-idle bandwidth while the contents of entry 2711 of output TSI 141 table 2701 indicate partially-idle bandwidth, at step 3711. If so, program execution again proceeds to step 3720 of FIG. 41; if not, the STS-1 TSB counter is incremented by one, at step 3712, and the counter's value is again checked to determine whether it is less than 24, at step 3713. If so, program execution returns to step 3711.

Figure 40:
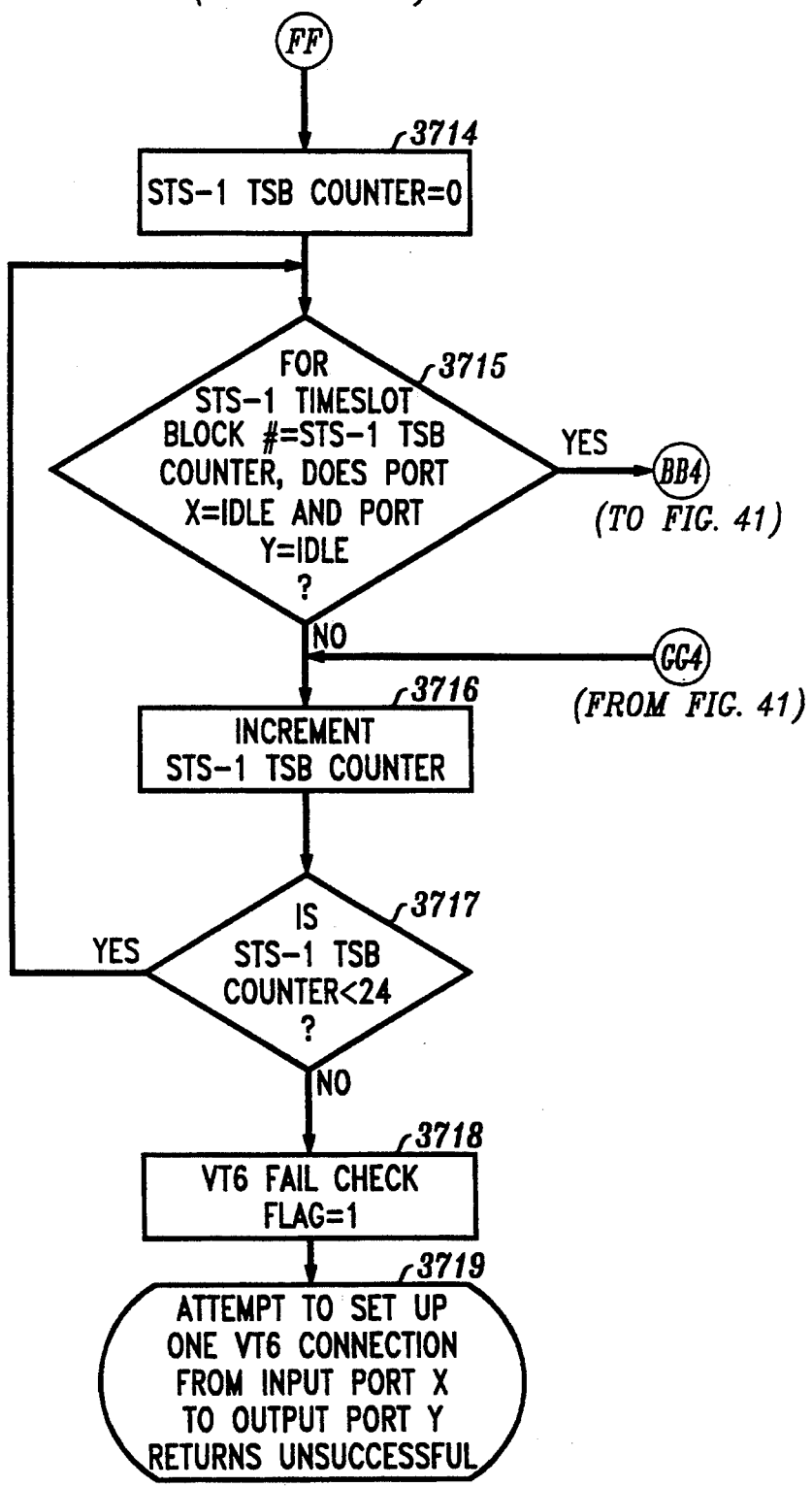

If the value of STS-1 TSB counter is not less than 24, the STS-1 TSB counter is reset to a value of zero, at step 3714 of FIG. 40, and the count of this counter is used to access and examine a corresponding entry 2711 of each one of the tables 2701 that were accessed at step 3703 to determine if their contents indicate fully-idle bandwidth, at step 3715. If so, program execution again proceeds to step 3720 of FIG. 41; if not, the STS-1 TSB counter is incremented by one, at step 3716, and the counter's value is again checked to determine whether it is less than 24, at step 3717. If so, program execution returns to step 3715. If not, all STS-1s of the requisite input and output TSIs have been without success, and the attempt to set up the VT6 fails. The VT6 fail-check flag is therefore set to one to indicate the failure, at step 3718, and the procedure returns with this lack-of-success indication to step 3603 of FIG. 36, at step 3719.

Figure 41:
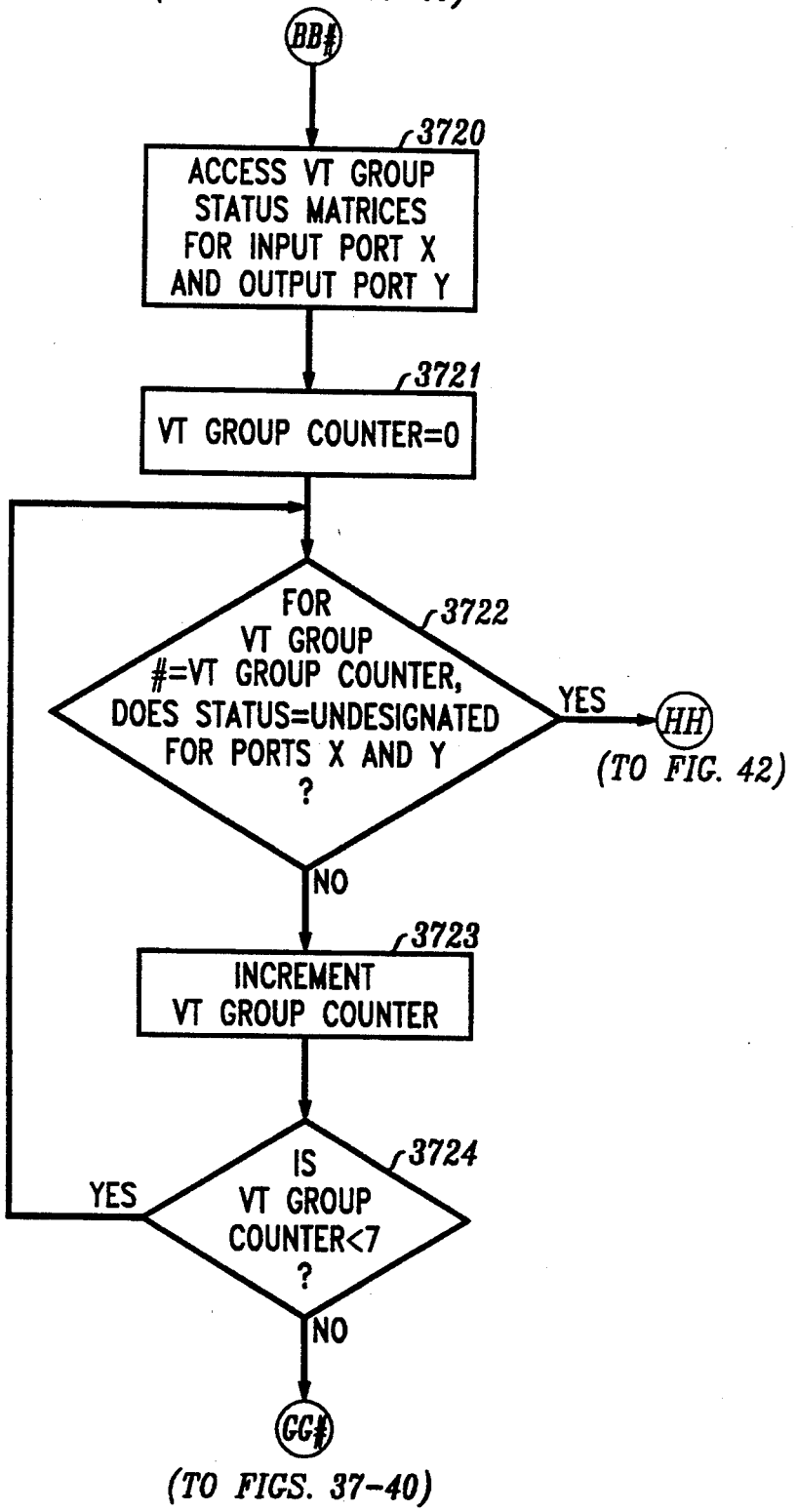

Step 3720 of the routine shown in FIG. 41 is reached from FIGS. 37-40 when idle bandwidth has successfully been found in corresponding STS-1s of both input and output TSIs 131 and 141. At step 3720, the row of the VT group status matrices 3000 (see FIG. 30) that correspond to these STS-1s of these input and output TSIs are accessed. Also, a VT6 group counter (not shown) is initialized to zero, at step 3721. The counter's value is then used to access and examine a corresponding entry 3001 of each one of the two rows that were accessed at step 3720 to determine if their contents indicate that the corresponding VT groups are not carrying any VT type, at step 3722. If no VT type is indicated, program execution proceeds to step 3725 of FIG. 42. If a VT type is indicated, it means that the bandwidth of that VT group is at least partially occupied, and hence that VT group cannot carry a VT6. The VT group counter is therefore incremented by one, at step 3723, and the counter's value is checked to determine whether it is less than 7, at step 3724. If so, there are other VT groups in this STS-1 to be checked, and so program execution returns to step 3722. But if the counter's value is not less than 7, there are no VT groups in this STS-1 available to carry a VT6, and so program execution returns to the point in FIGS. 37-40 from which execution of the routine of FIG. 41 had been invoked.

Figure 42:
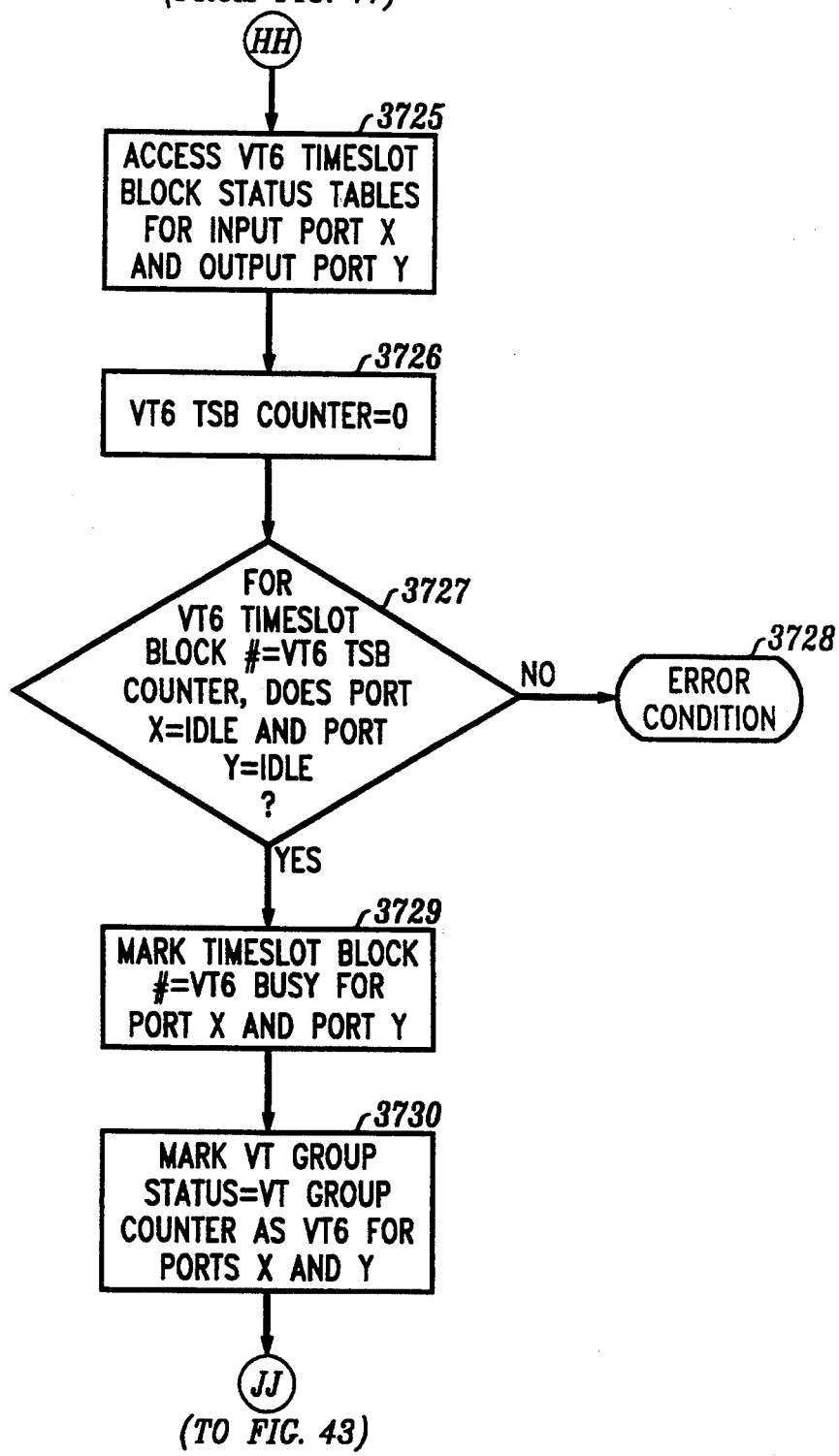
Figure 43:
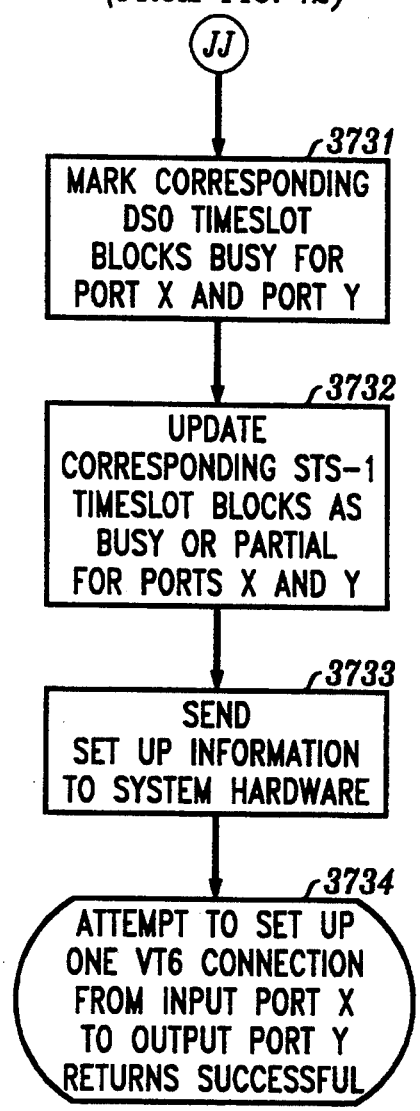

Step 3725 of FIG. 42 is reached when an idle VT group has been found in the STS-1 of interest in both input and output TSIs. At step 3725, the present count of the VT group counter is used to identify and access VT timeslot block status tables 2702 in matrices 2900 of FIG. 29 that correspond to the idle VT groups in the STS-1s of interest. Also, a VT6 TSB counter (not shown) is initialized to zero, at step 3726. The count of this counter is then used to access and examine a corresponding entry 2712 of each one of the tables 2702 that were accessed at step 3725 to determine if their contents indicate fully-idle bandwidth, at step 3727. If not, an error condition exists, as indicated at step 3728, because a VT group having no VT type designation in a VT group status matrix 3000 must be idle.

If the contents of both checked entries 2712 do indicate fully-idle bandwidth at step 3727, both of those entries 2712 are marked as busy, at step 3729, and the corresponding entries 3001 of VT group status matrices 3000 that were accessed at step 3722 are marked to indicate a VT type of VT6, at step 3730. Then, all entries of DS-0 tables 2703 (see FIG. 27) that correspond to the entries 2712 that were marked at step 3729 are also marked as busy, at step 3731 of FIG. 43. Furthermore, the entries 2711 of tables 2701 which correspond to the STS-1 of interest (indicated by the present count of the STS-1 TSB counter) are updated to indicate partially-idle or busy status, at step 3732. Illustratively, the update is accomplished by checking the STS-1's in VT timeslot block status matrix 2900 to determine if any valid entries 2712 are idle or partially idle. If so, the STS-1's corresponding entry 2711 is marked as partially-idle. If all valid entries 2712 of matrix 2900 are marked as busy, then the STS-1's corresponding entry 2711 is marked as busy. The VT6 connection is now ready to be programmed into control memories of TSIs 131 and 141 and TMS 120, and so the results of the path-hunt are loaded into the TSI and TMS programming registers, at step 3733. The setup having been successfully completed, the procedure returns to step 3603 of FIG. 36, at step 3734.

Figure 44:
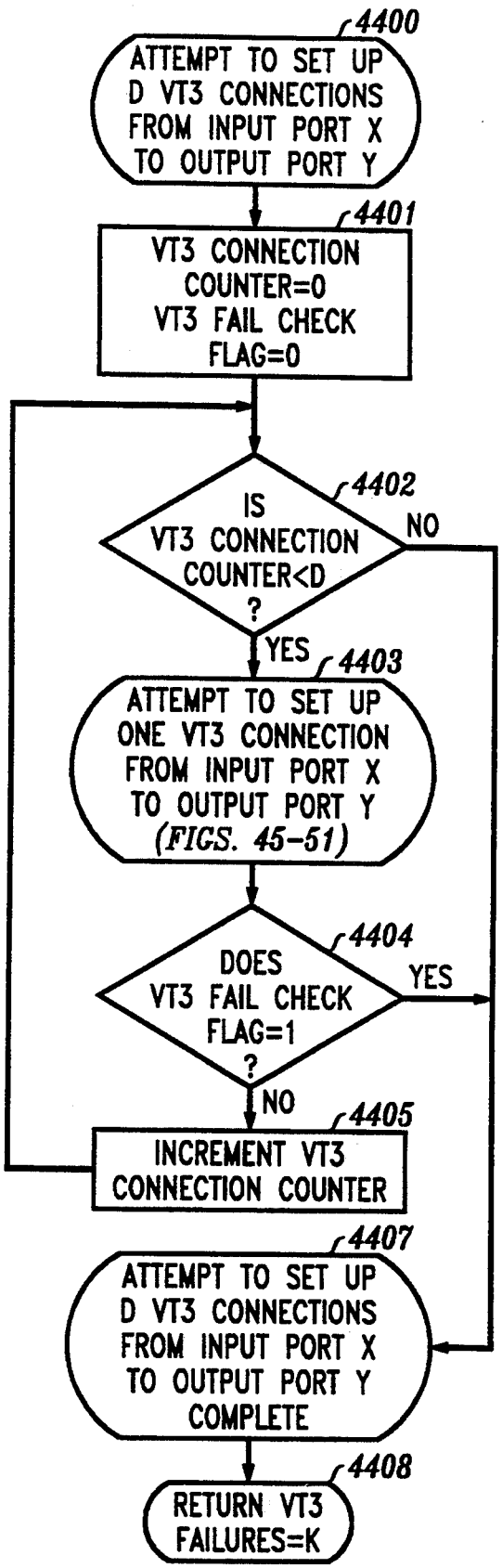
FIG. 44 is a flow diagram of multiple VT3 path-hunt procedure of the broadband path-hunt procedure of FIGS. 32–33.
Figure 45:
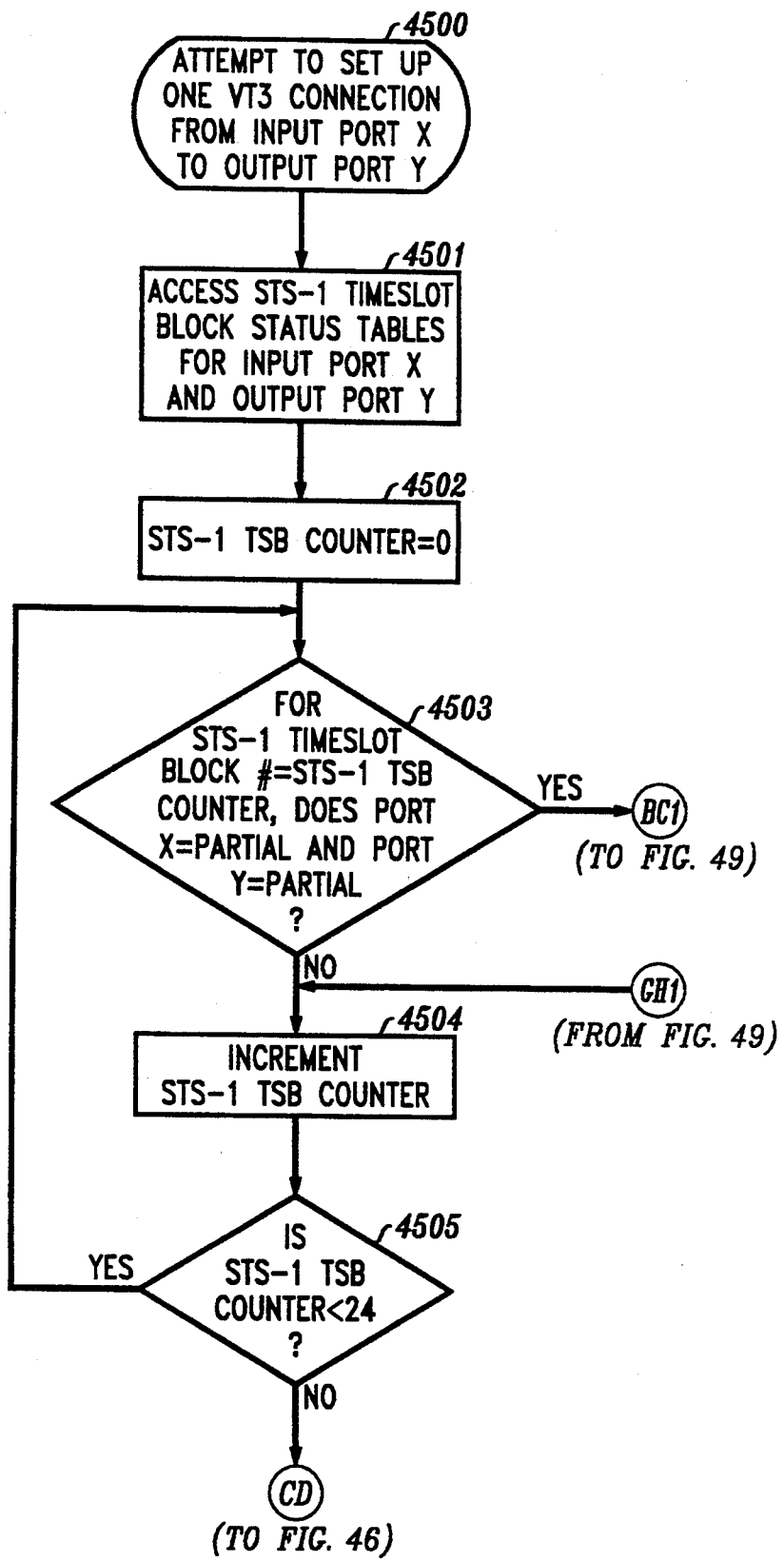
FIGS. 45–51 are a flow diagram of one VT3 path-hunt procedure of the multiple VT3 path-hunt procedure of FIG. 44.
Figure 46:
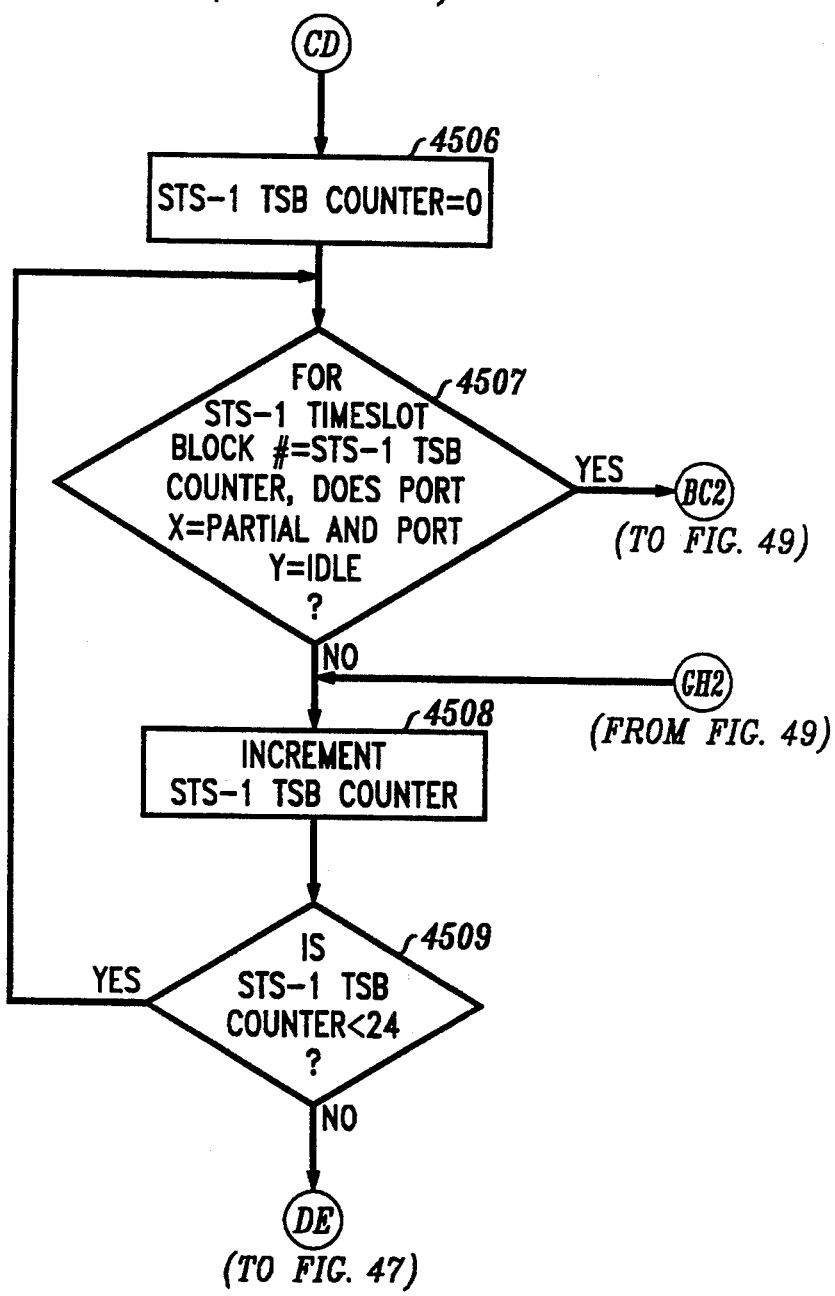
Figure 47:
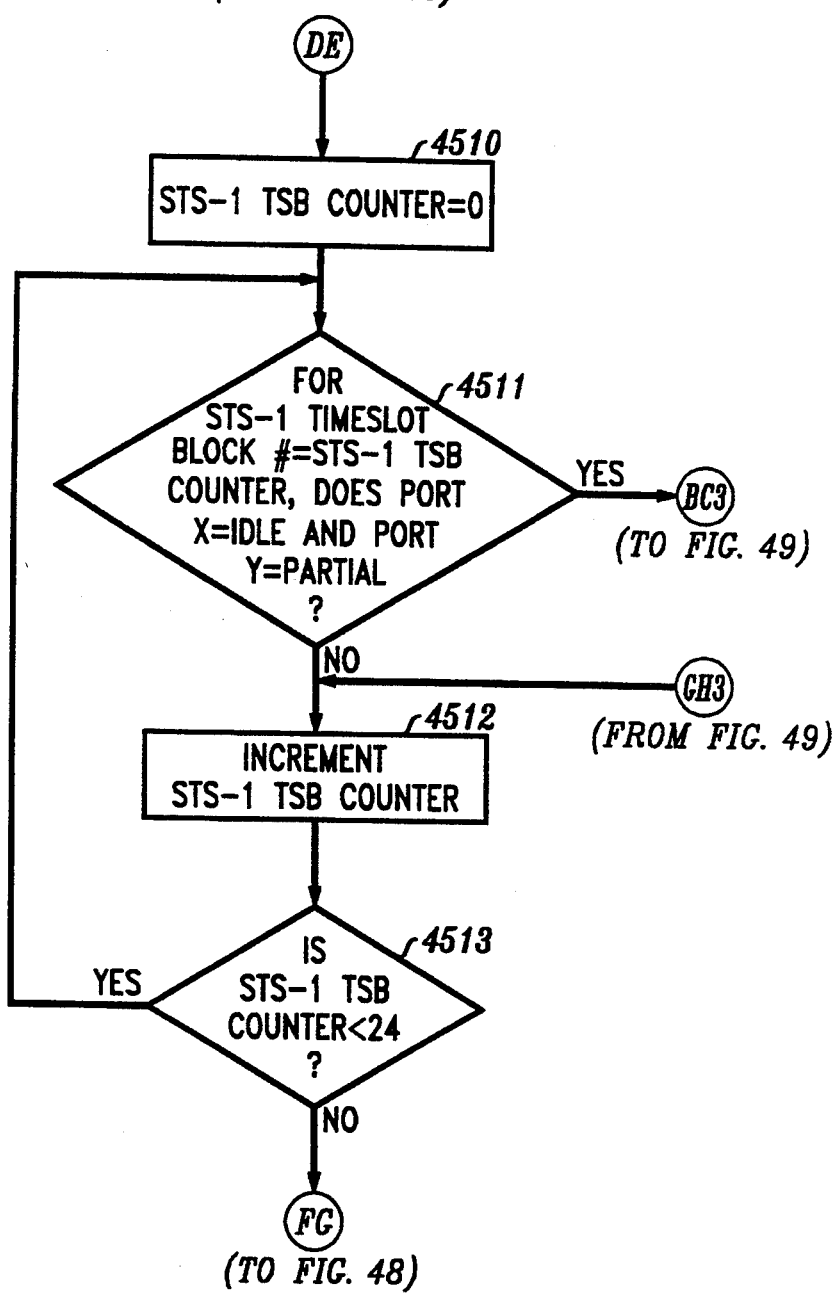
Figure 48:
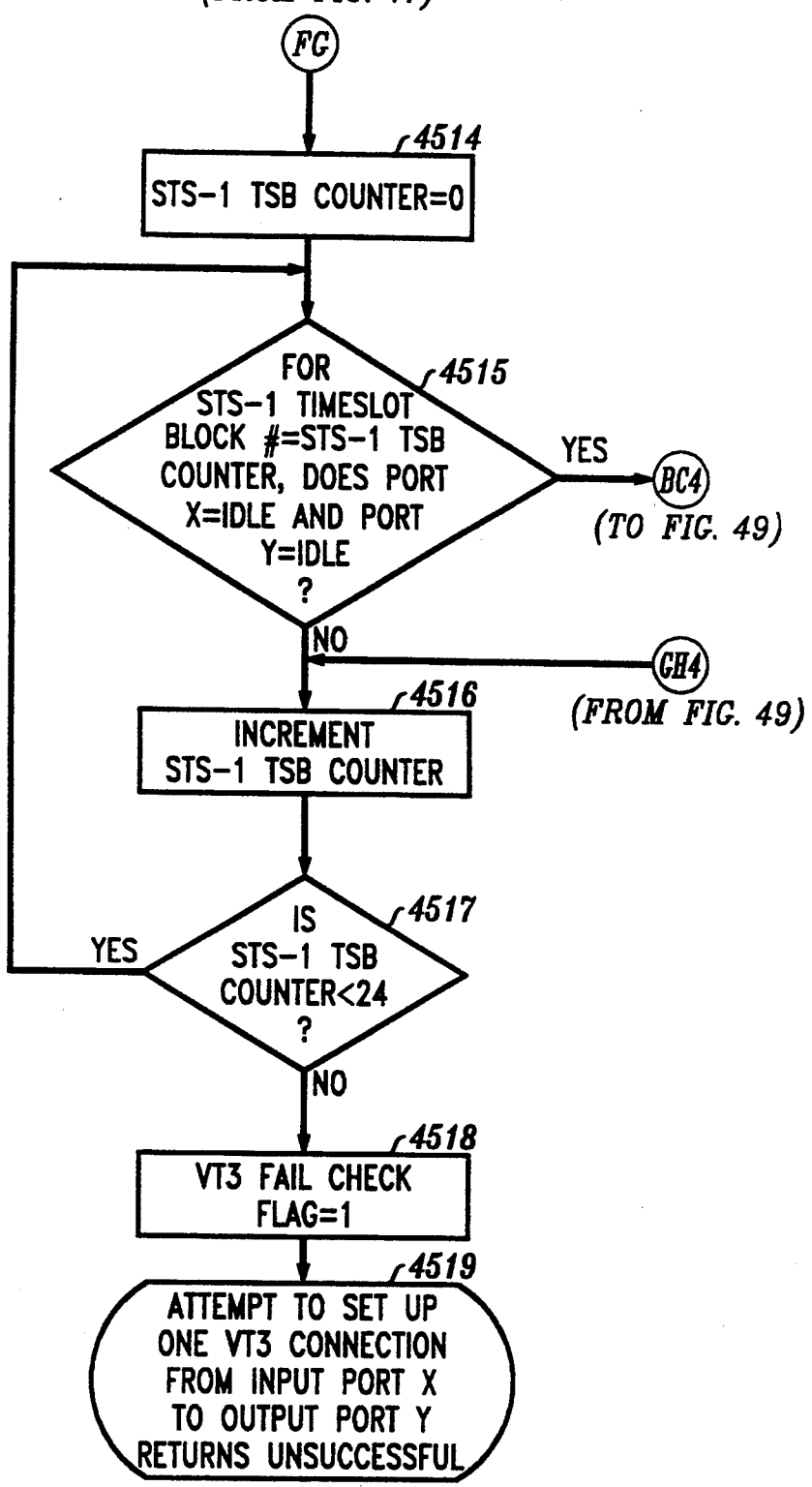

FIG. 44 shows the procedure for setting up D VT3 connections. This procedure also parallels exactly the procedure of FIG. 34, but substitutes VT3 for any reference to STS-1, the number D for any reference to the number B, and the number K for any reference to the number H.

FIGS. 45-51 show the procedure for setting up one VT3 connection. The procedure is the same as for a VT6 connection, except for the VT group level. Initially at the VT group level, a check is made for matching idle VT blocks for ports X and Y. When such idle blocks are found, the VT blocks are marked busy (or full). The VT group level then proceeds as described above for VT6, where VT3 is substituted for any reference to VT6.

The procedure is performed in response to a request received from step 4403 of FIG. 44, at step 4500. FIGS. 45-48 duplicate FIGS. 37-40, except that the transfer of program execution from steps 4503, 4507, 4511, and 4515 is to FIG. 49; at step 4518 of FIG. 48, it is a VT3 fail-check flag that is set to one; and at step 4519, the procedure returns to step 4403 of FIG. 44.

Figure 49:
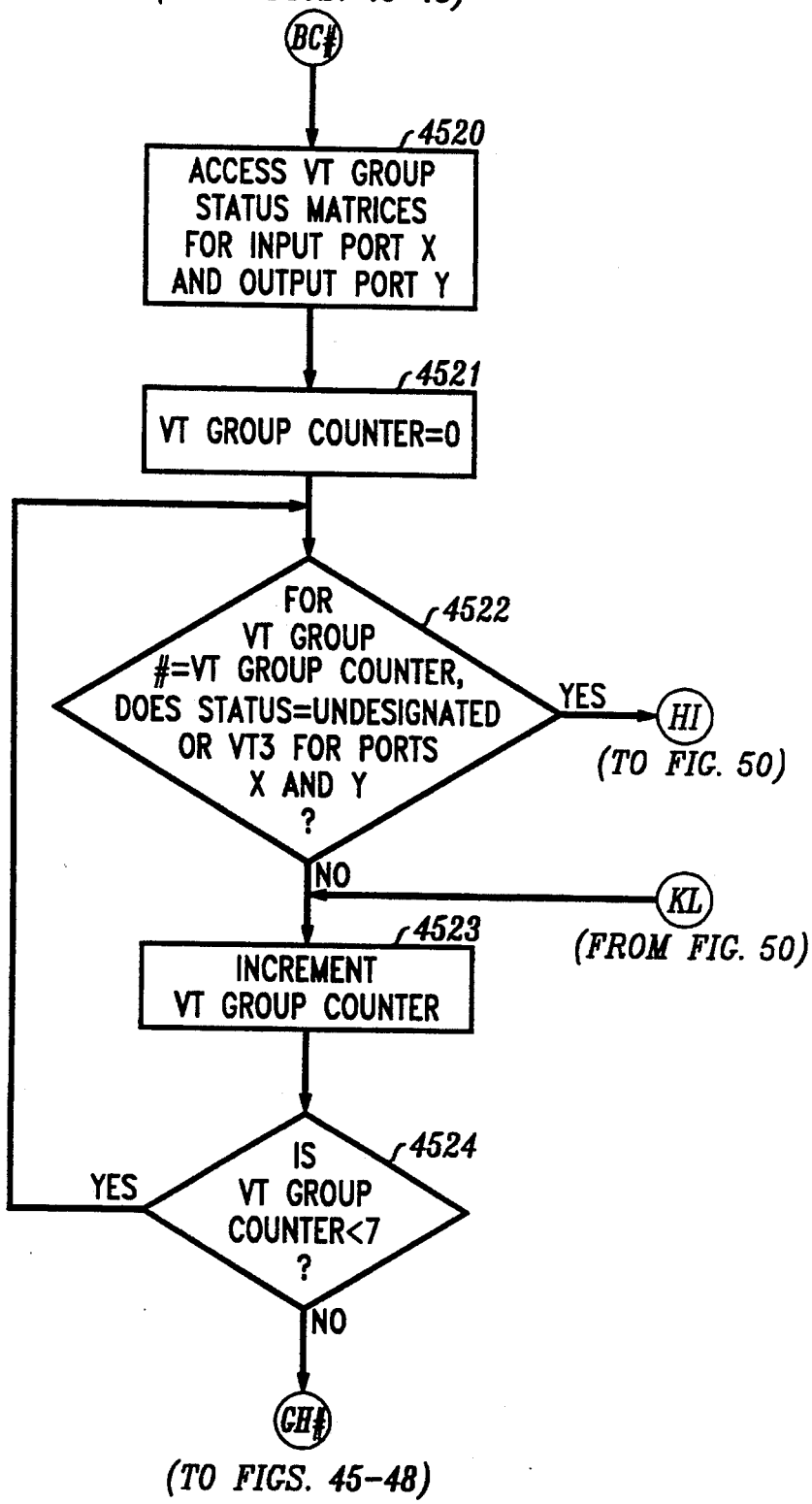

Also, the routine of FIG. 49 duplicates the routine of FIG. 41, with some exceptions. Because only a VT3 bandwidth is being sought and not a full VT6 bandwidth, at step 4522 the two entries 3001, corresponding to the subject input and output STS-1s, of VT group matrices 3000 are examined to determine if their contents indicate that the corresponding VT groups either do not carry any VT type, i.e., are undesignated, or carry a VT3 type. If the determination is affirmative, program execution proceeds to step 4525 of FIG. 50. Because a VT group found at step 4522 to be carrying a VT3 type may be found in FIG. 50 to be busy, in such a case program execution will return from FIG. 50 to step 4523 to continue the search for a suitably-idle VT group.

Figure 50:
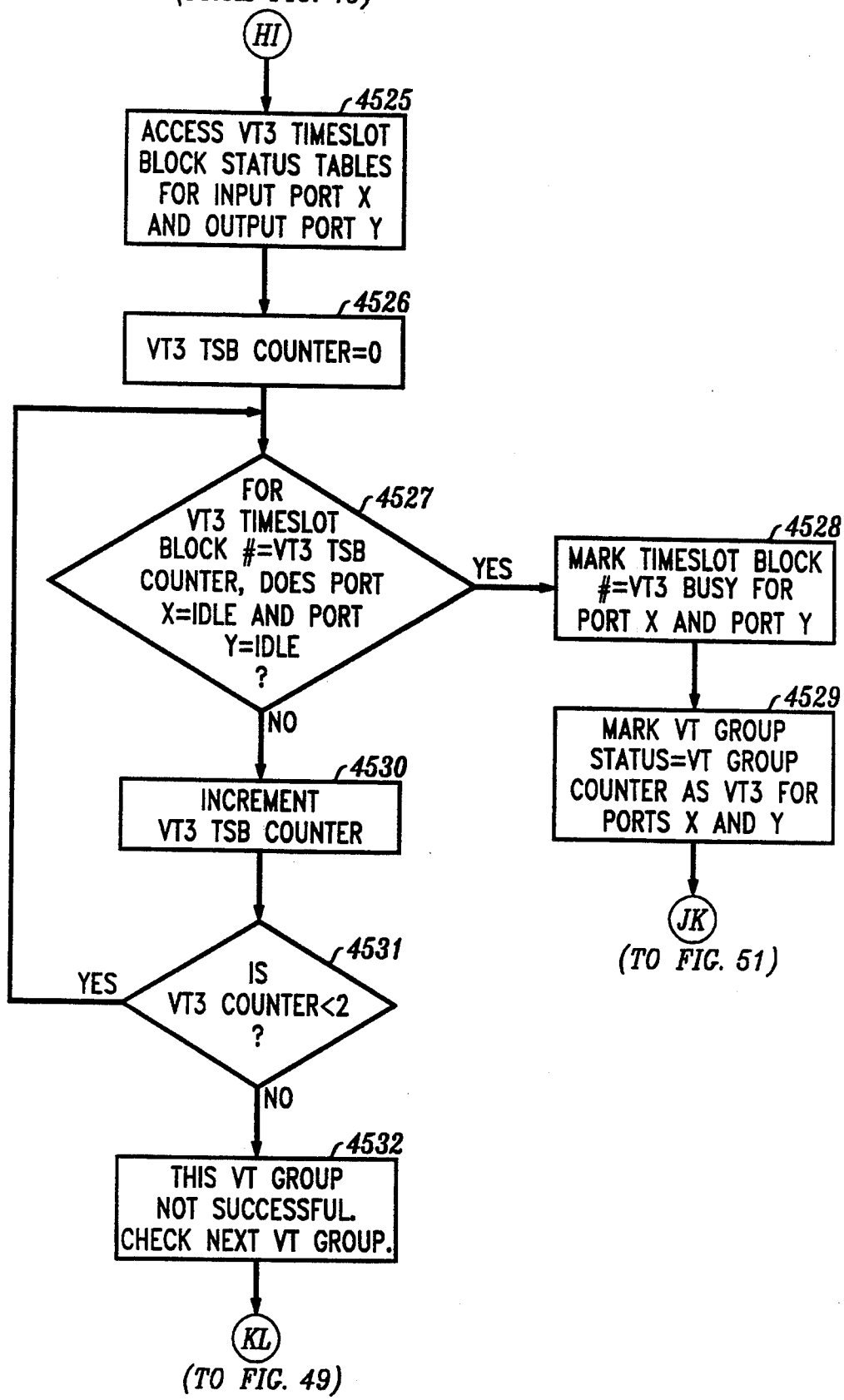

Step 4525 of FIG. 50 is reached when either an undesignated VT group or a VT group carrying the VT3 type has been found in the STS-1 of interest in both input and output TSIs. At step 4525, the present count of the VT group counter is used to identify and access VT timeslot block status tables 2702 of matrices 2900 of FIG. 29 that correspond to these VT groups in the STS-1s of interest. Also, a VT3 TSB counter (not shown) is initialized to zero, at step 4526. The count of this counter is then used to access and examine a corresponding entry 2712 of each one of the two tables 2702 that were accessed at step 4525 to determine if their contents indicate fully-idle bandwidth for the corresponding VT3, at step 4527. If not, sufficient bandwidth is not available in that corresponding VT3. The VT3 TSB counter is then incremented by one, at step 4530, and the counter's value is checked to determine if it is less than two. If the counter's value is less than two, program execution returns to step 4527 to check the status of the next VT3 in the VT groups of interest. But if the counter's value is not less than two, there are no more VT3s in these VT groups to be checked. In other words, the search for an idle VT3 in this input and output VT group has been unsuccessful, as indicated at step 4532, and program execution returns to step 4523 of FIG. 49 to select and check another input and output VT group for an available VT3.

Returning to consideration of step 4527, if examined entries 2712 indicate fully-idle bandwidth for the corresponding VT3 in both the input and output VT groups, both of those entries 2712 are marked as busy, at step 4528, and the corresponding entries 3001 of VT group status matrices 3000 that were accessed at step 4522 are marked to indicate a VT type of VT3, at step 4529. Program execution then continues in FIG. 51, which duplicates FIG. 43 except that, at step 4536, the procedure of FIG. 51 returns to step 4403 of FIG. 44.

Figure 52:
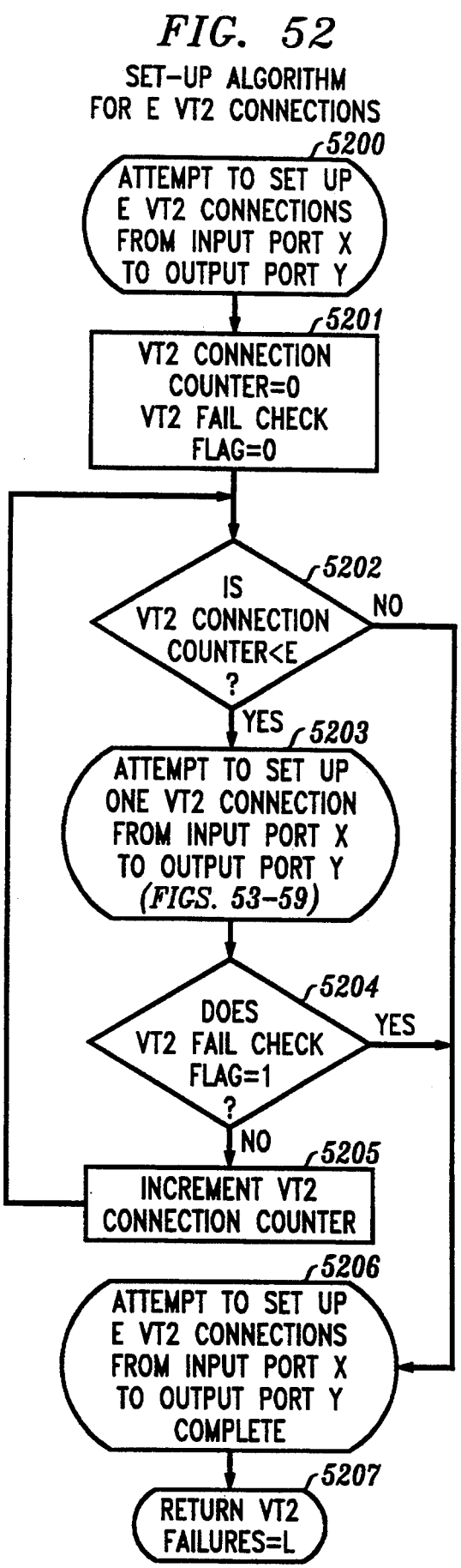
FIG. 52 is a flow diagram of multiple VT2 path-hunt procedure of the broadband path-hunt procedure of FIGS. 32–33.
Figure 53:
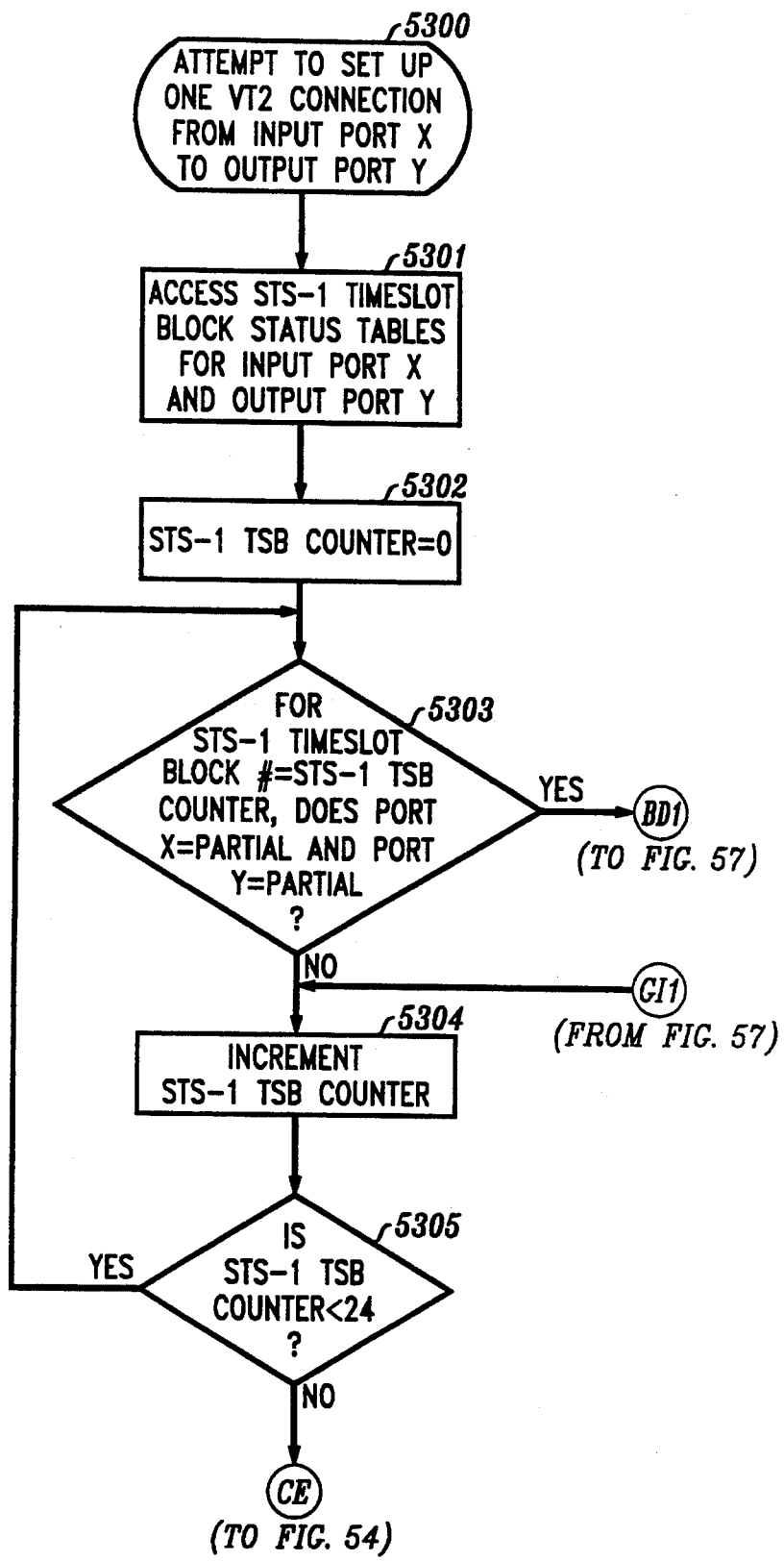
FIGS. 53–59 are a flow diagram of one VT2 path-hunt procedure of the multiple VT2 path-hunt procedure of FIG. 52.
Figure 54:
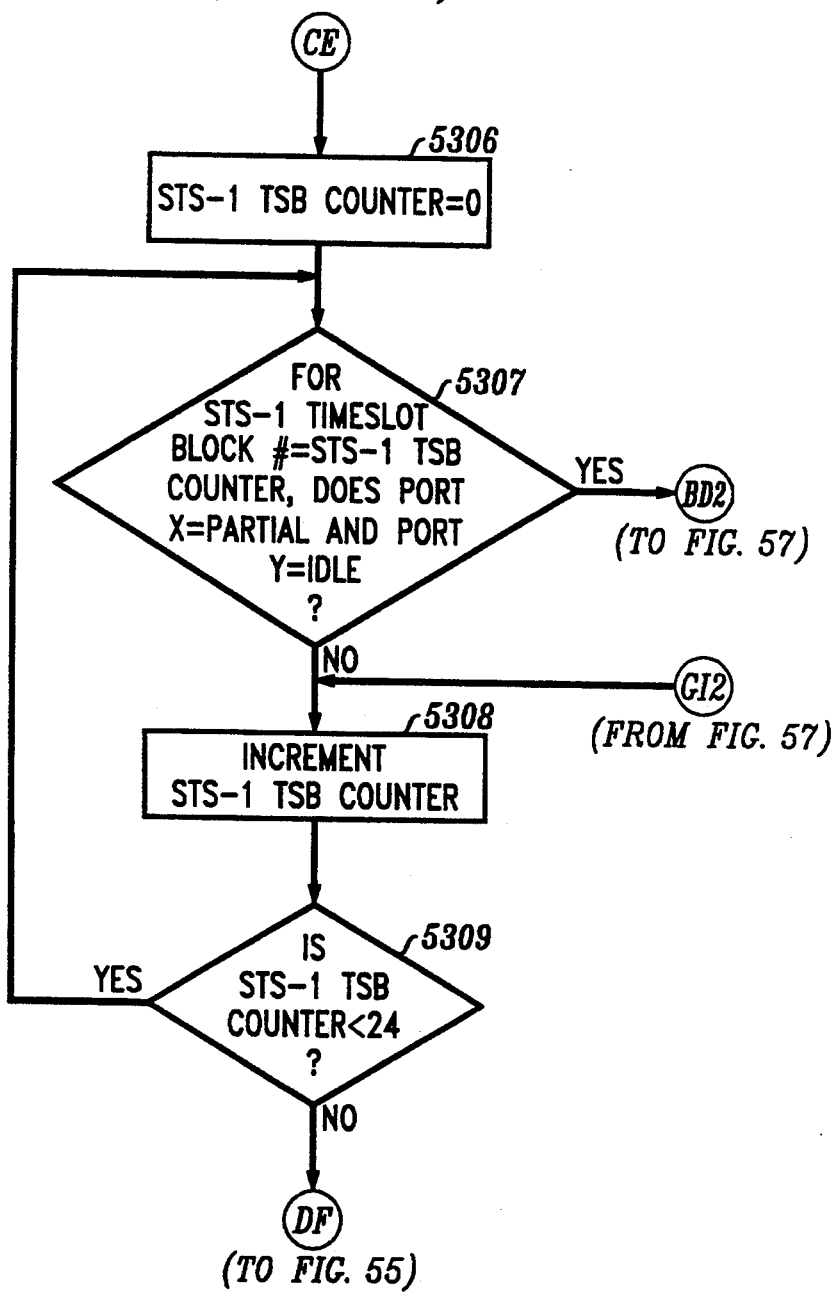
Figure 55:
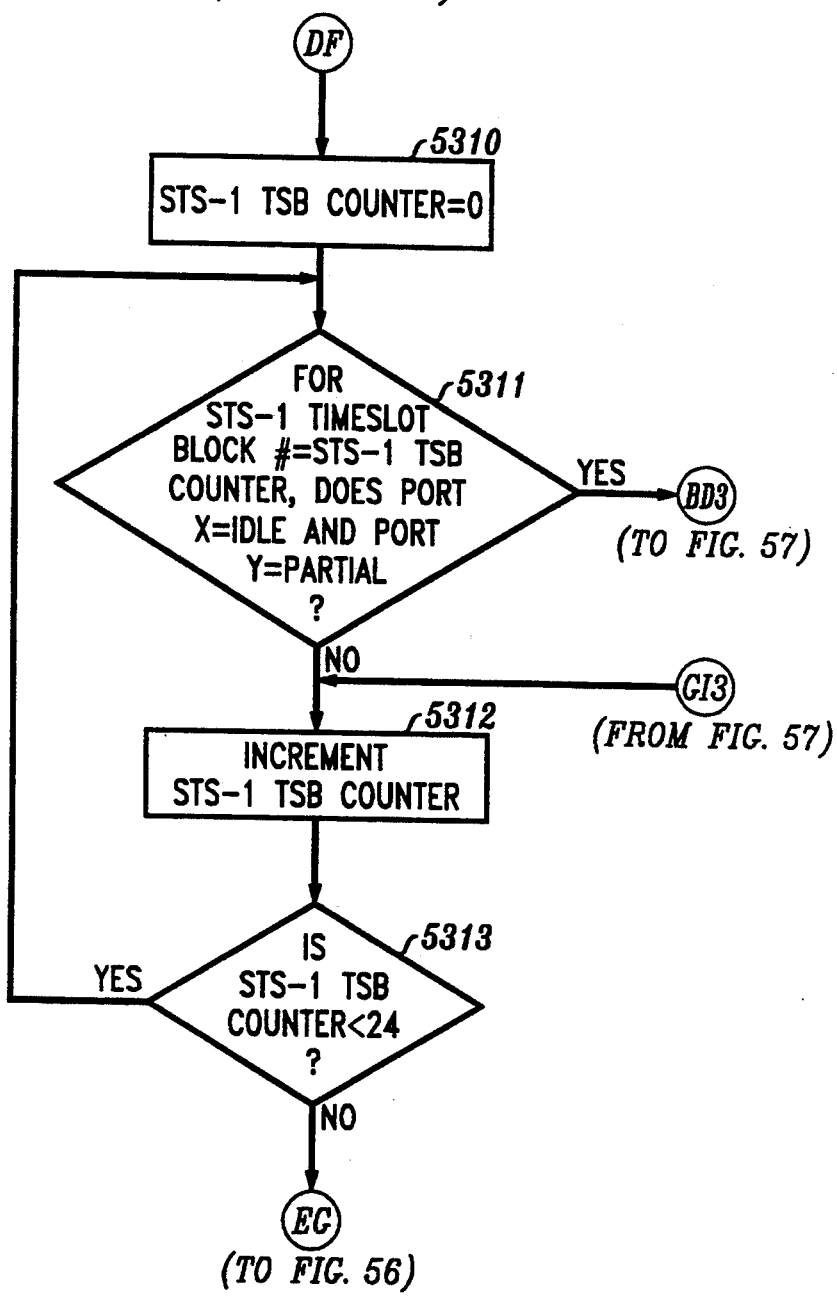
Figure 56:
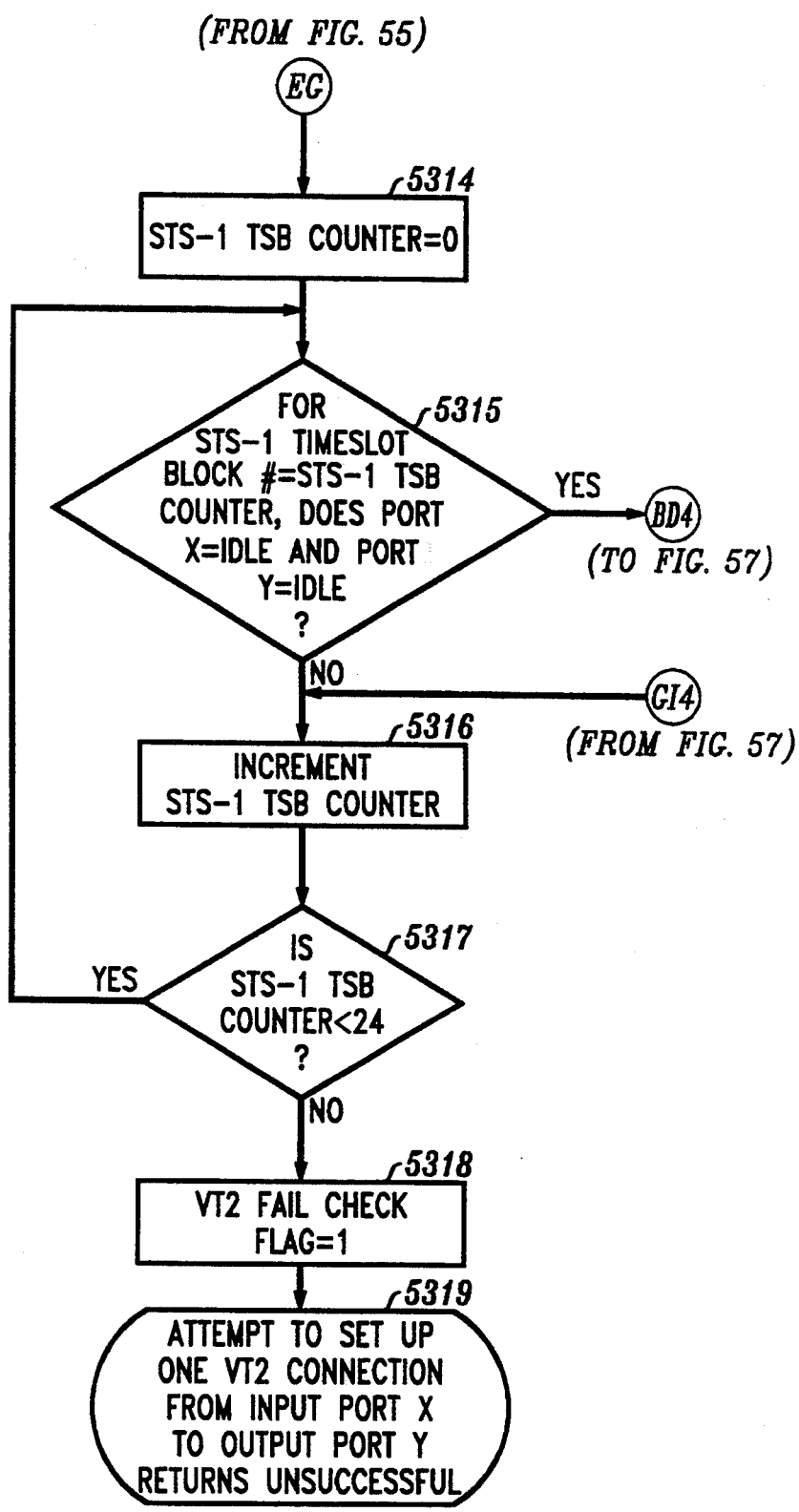

FIG. 52 shows the procedure for setting up E VT2 connections. The procedure is the same as for a VT3 connection. This procedure also parallels exactly the procedure of FIG. 34, but substitutes VT2 for any reference to STS-1, the number E for any reference to the number B, and the number L for any reference to the number H.

FIGS. 53-59 show the procedure for setting up one VT2 connection. This procedure is the same as for a VT3 connection. This procedure is performed in response to a request received from step 5203 of FIG. 52, at step 5300. Analogously to the procedure for a VT3 connection, FIGS. 53-56 duplicate FIGS. 37-40, except that the transfer of program execution from steps 5303, 5307, 5311, and 5315 is to FIG. 57; at step 5318 of FIG. 56, it is a VT2 fail-check flag that is set to one; and at step 5319, the procedure returns to step 5203 of FIG. 52.

Figure 57:
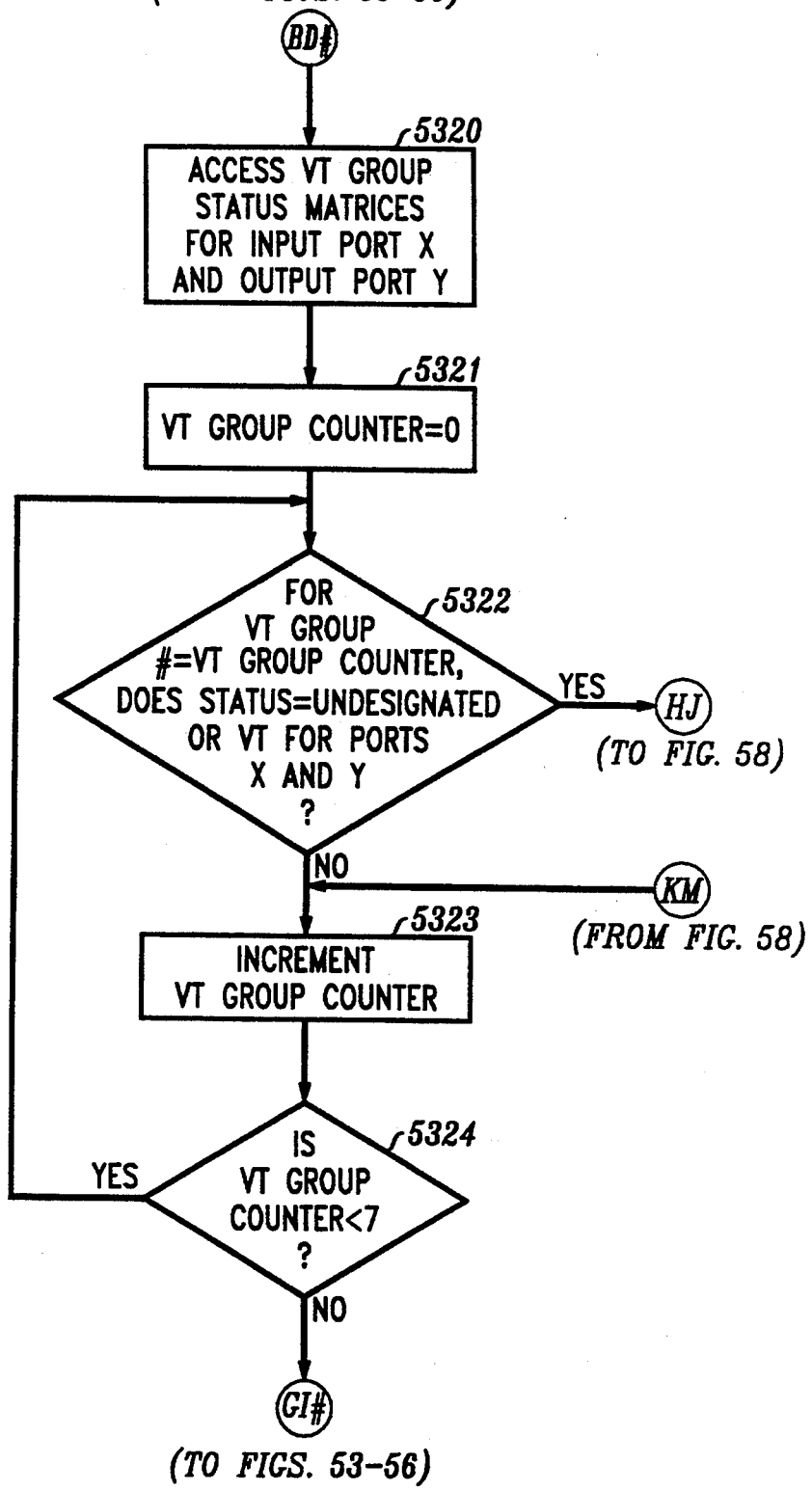

Also, the routine of FIG. 57 duplicates the routine of FIG. 41, with some exceptions. Because only a VT2 bandwidth is being sought and not a full VT6 bandwidth, at step 5322 the two entries 3001 of VT group matrices 3000 are examined to determine if their contents indicate that the corresponding VT groups either do not carry any VT type, i.e., are undesignated, or carry a VT2 type. If the determination is affirmative, program execution proceeds to step 5325 of FIG. 58. Because a VT group found at step 5322 may be found in FIG. 58 to have all corresponding VT timeslot blocks busy, in such a case program execution will return from FIG. 58 to step 5323 to continue the search for a suitably-idle VT group.

Figure 51:
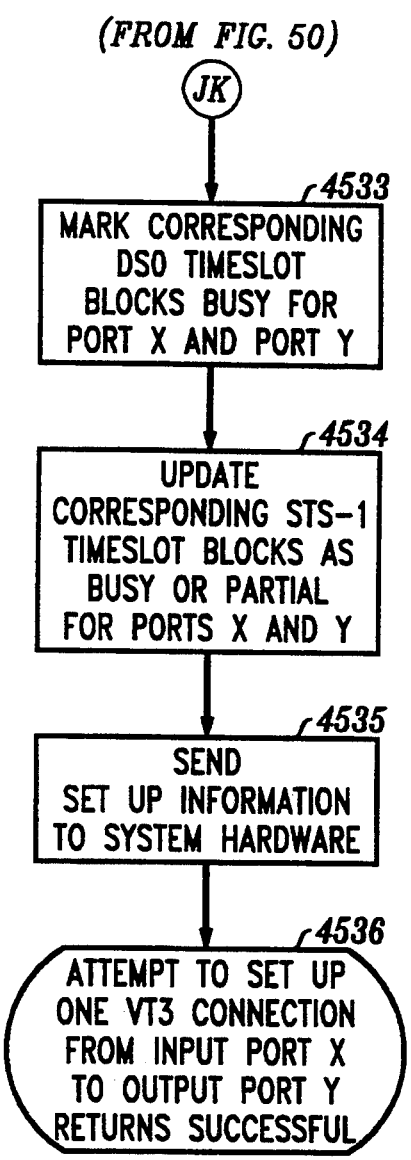
Figure 58:
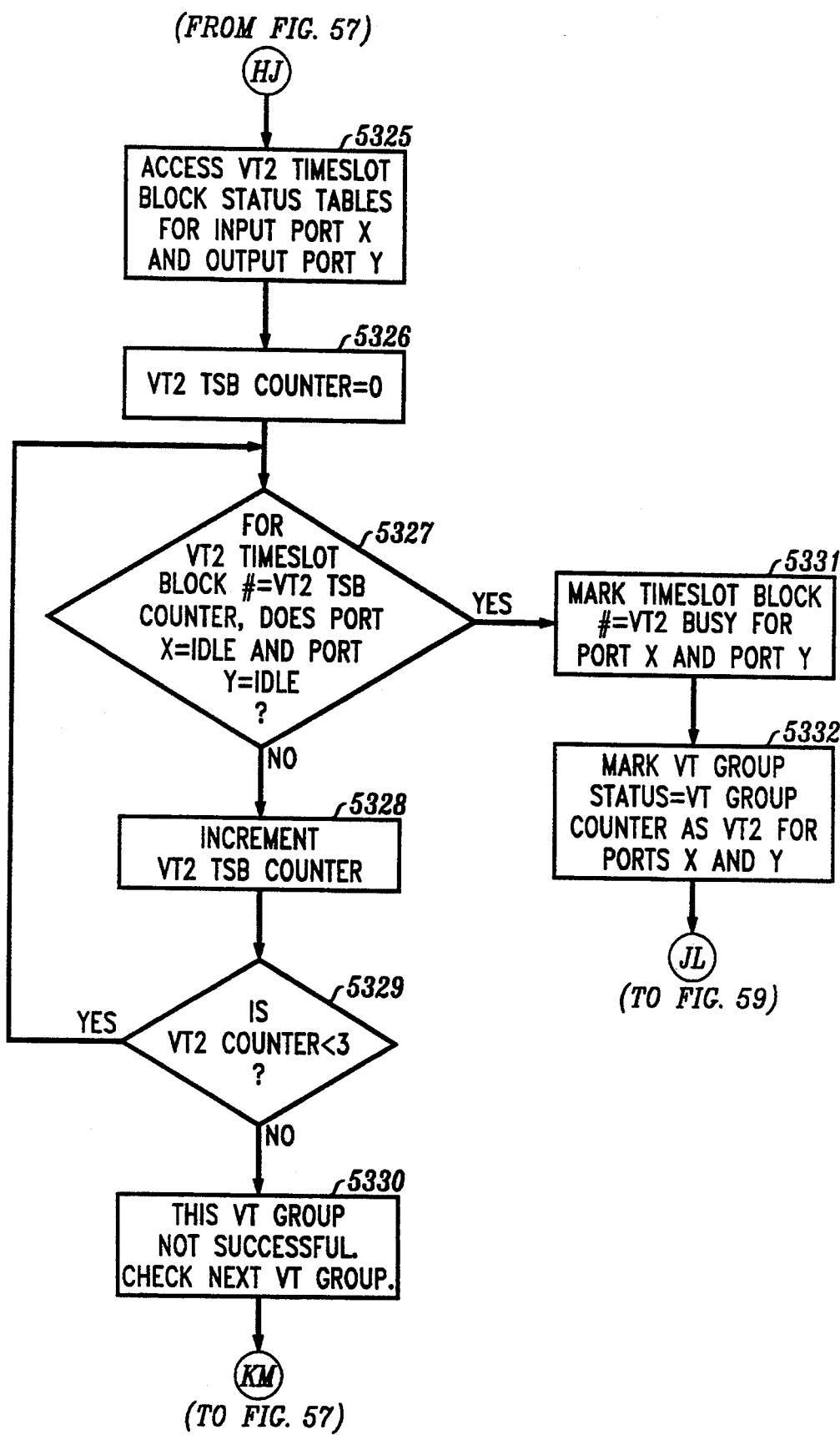
Figure 59:
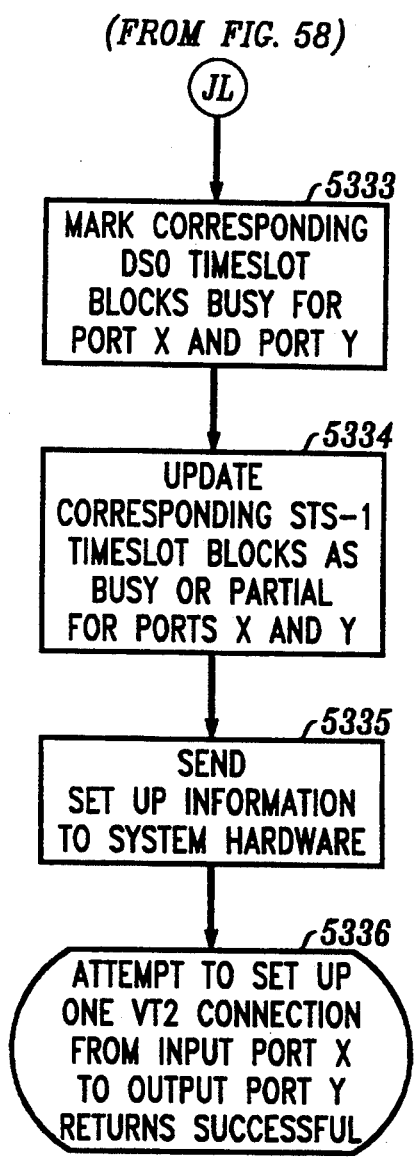

FIGS. 58 and 59 parallel almost exactly FIGS. 50 and 51 discussed above in conjunction with VT3 connections, but substitute VT2 for any reference to VT3. The only difference is that, in step 5329 of FIG. 58, the value of the VT2 counter is checked against three, on account of there being three VT2s in a VT group (whereas there are only two VT3s in a VT group).

Figure 60:
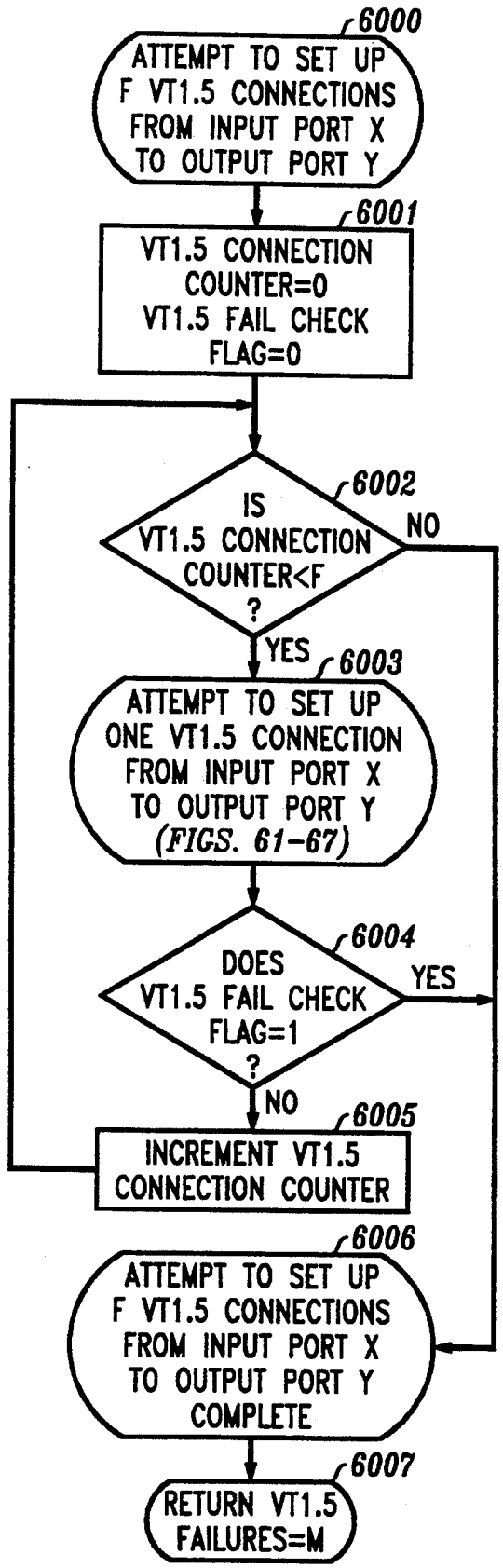
FIG. 60 is a flow diagram of multiple VT1.5 path-hunt procedure of the broadband path-hunt procedure of FIGS. 32–33.
Figure 61:
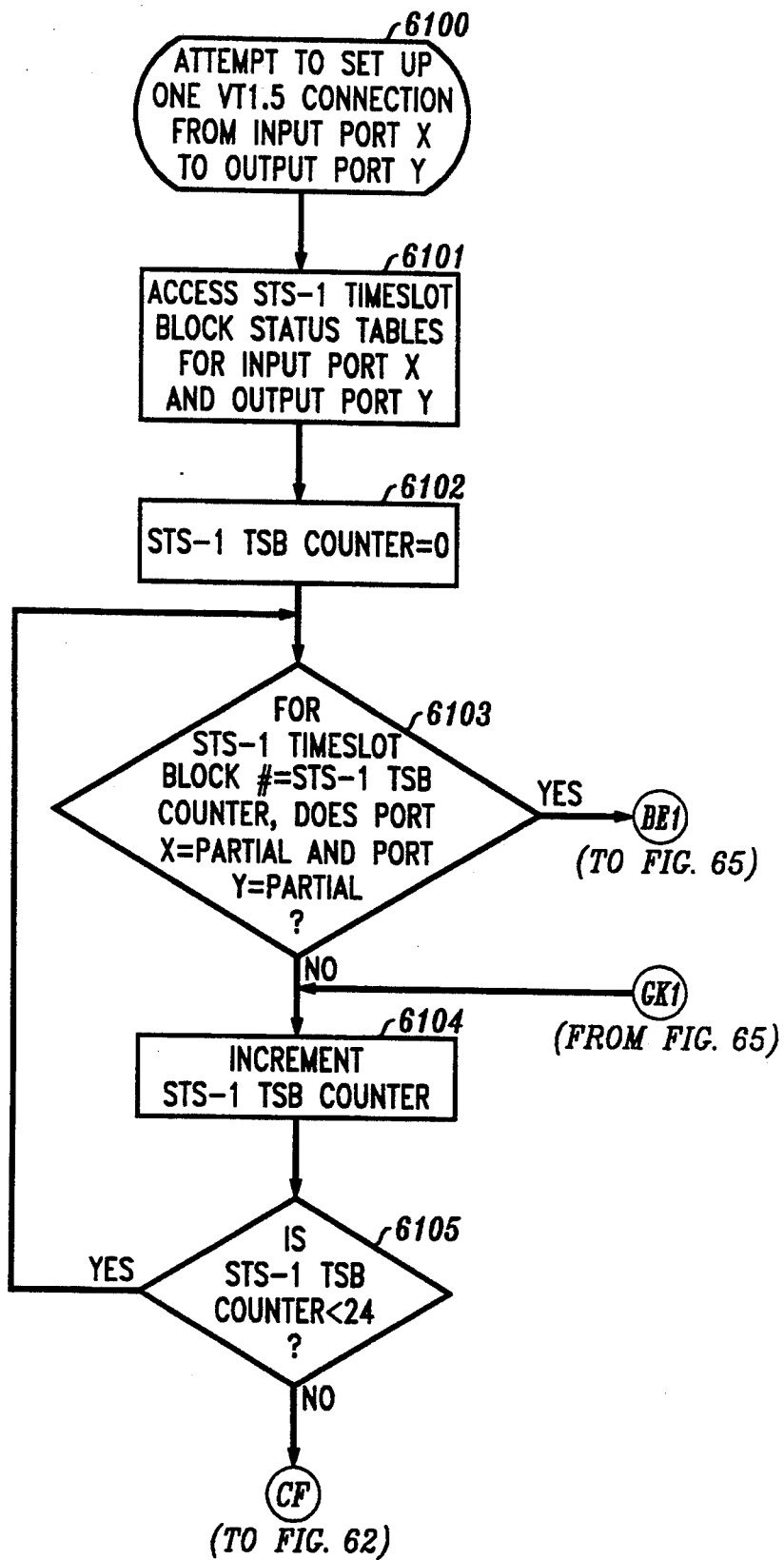
FIGS. 61–67 are a flow diagram of one VT1.5 path-hunt procedure of the multiple VT1.5 path-hunt procedure of FIG. 60.
Figure 62:
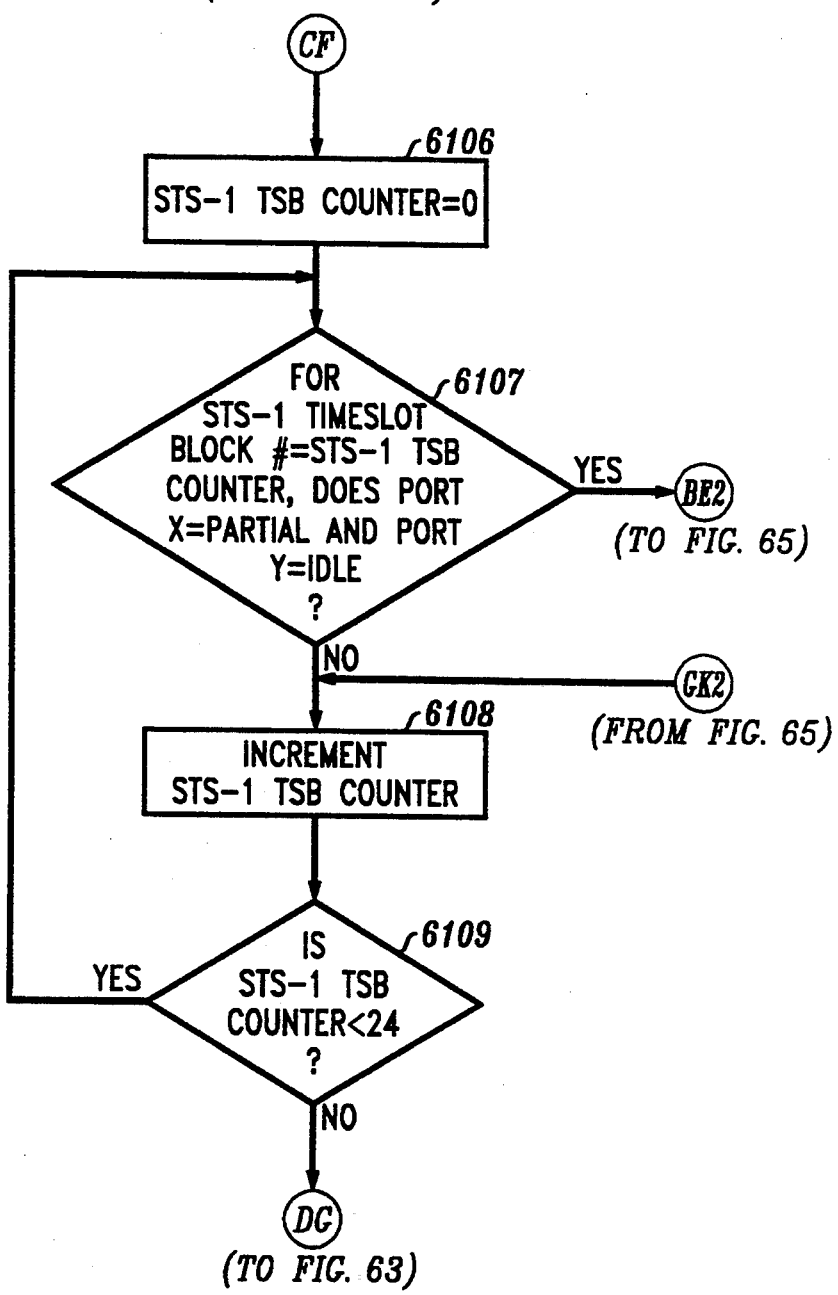
Figure 63:
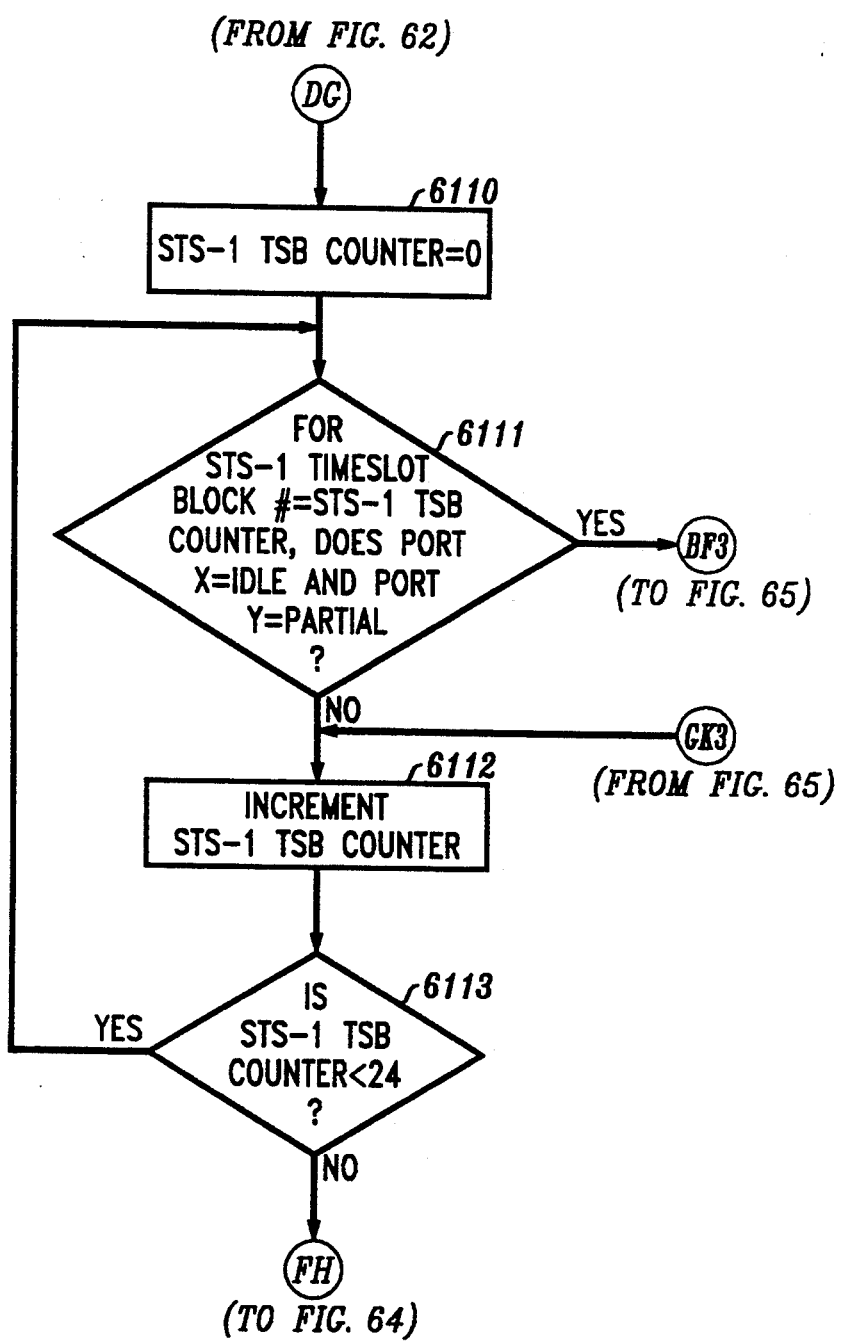
Figure 64:
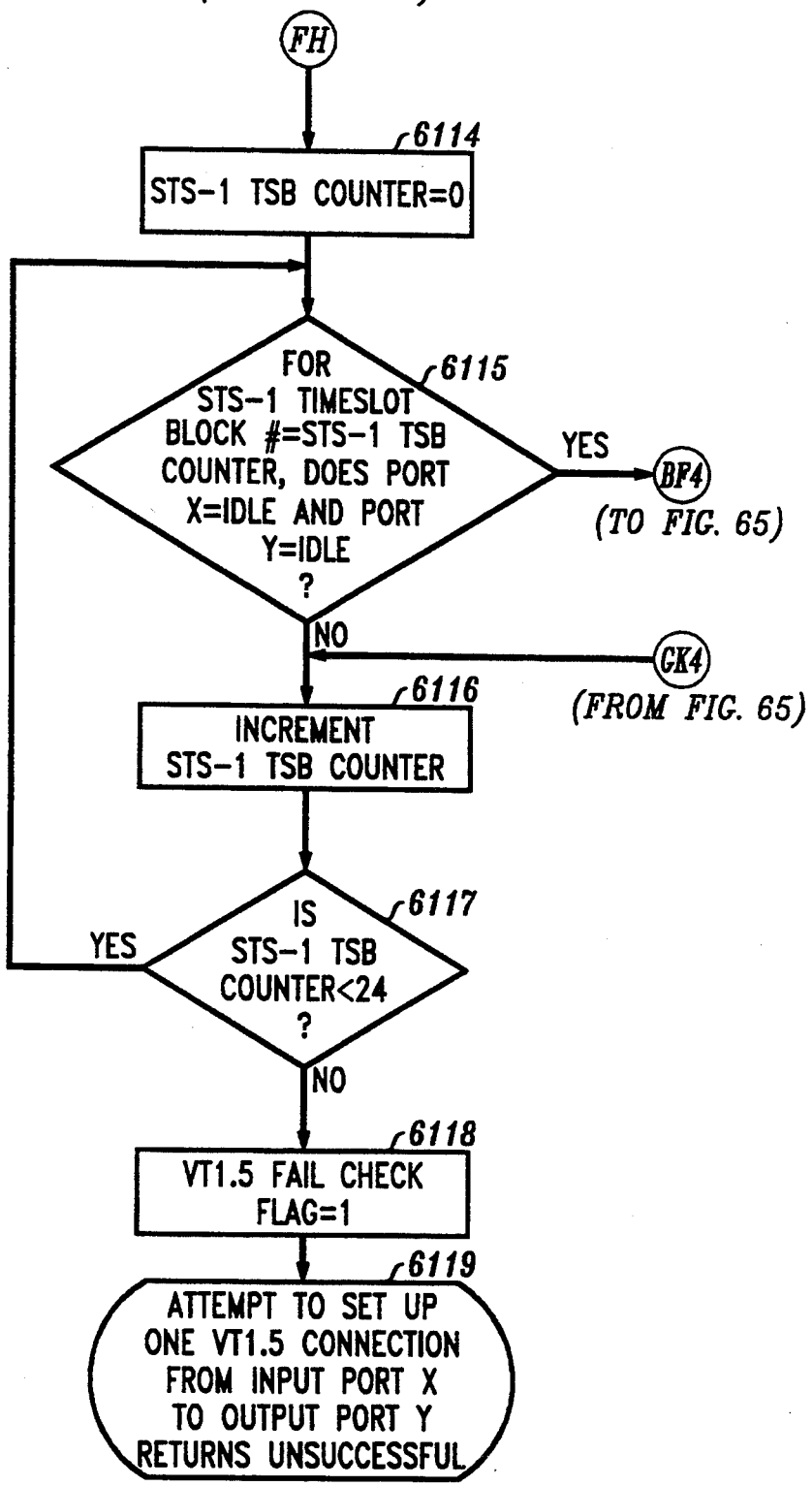

FIG. 60 shows the procedure for setting up F VT1.5 connections. The procedure is the same as for a VT2 connection. This procedure also parallels exactly the procedure of FIG. 34, but substitutes VT1.5 for any reference to STS-1, the number F for any reference to the number B, and the number M for any reference to the number H.

FIGS. 61-67 show the procedure for setting up one VT1.5 connection. This procedure is the same as for a VT2 connection. This procedure is performed in response to a request received from step 6003 of FIG. 60, at step 6100. Analogously to the procedure for a VT2 connection, FIGS. 61-64 duplicate FIGS. 37-40, except that the transfer of program execution from steps 6103, 6107, 6111, and 6115 is to FIG. 66; at step 6118 of FIG. 64, it is a VT1.5 fail-check flag that is set to one; and at step 6119, the procedure returns to step 6003 of FIG. 60.

Figure 65:
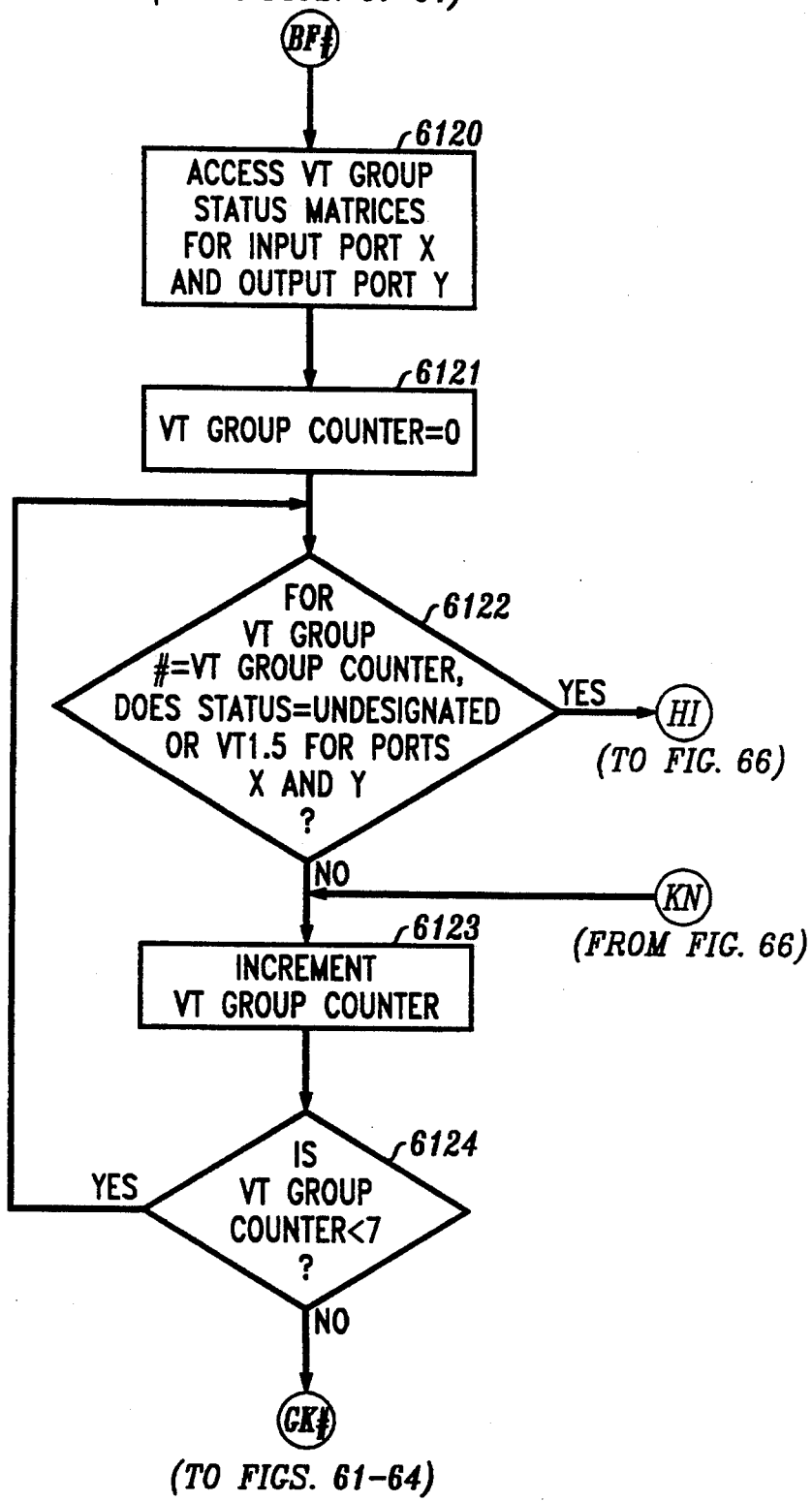

Also, the routine of FIG. 65 duplicates the routine of FIG. 41, with some exceptions. Because only a VT1.5 bandwidth is being sought and not a full VT6 bandwidth, at step 6122 the two entries 3001 of VT group matrices 3000 are examined to determine if their contents indicate that the corresponding VT groups either do not carry any VT type, i.e., are undesignated, or carry a VT1.5 type. If the determination is affirmative, program execution proceeds to step 6125 of FIG. 66. Because a VT group found at step 6122 may be found in FIG. 66 to be busy, in such a case program execution will return from FIG. 66 to step 6123 to continue to search for a suitably-idle VT group.

Figure 66:
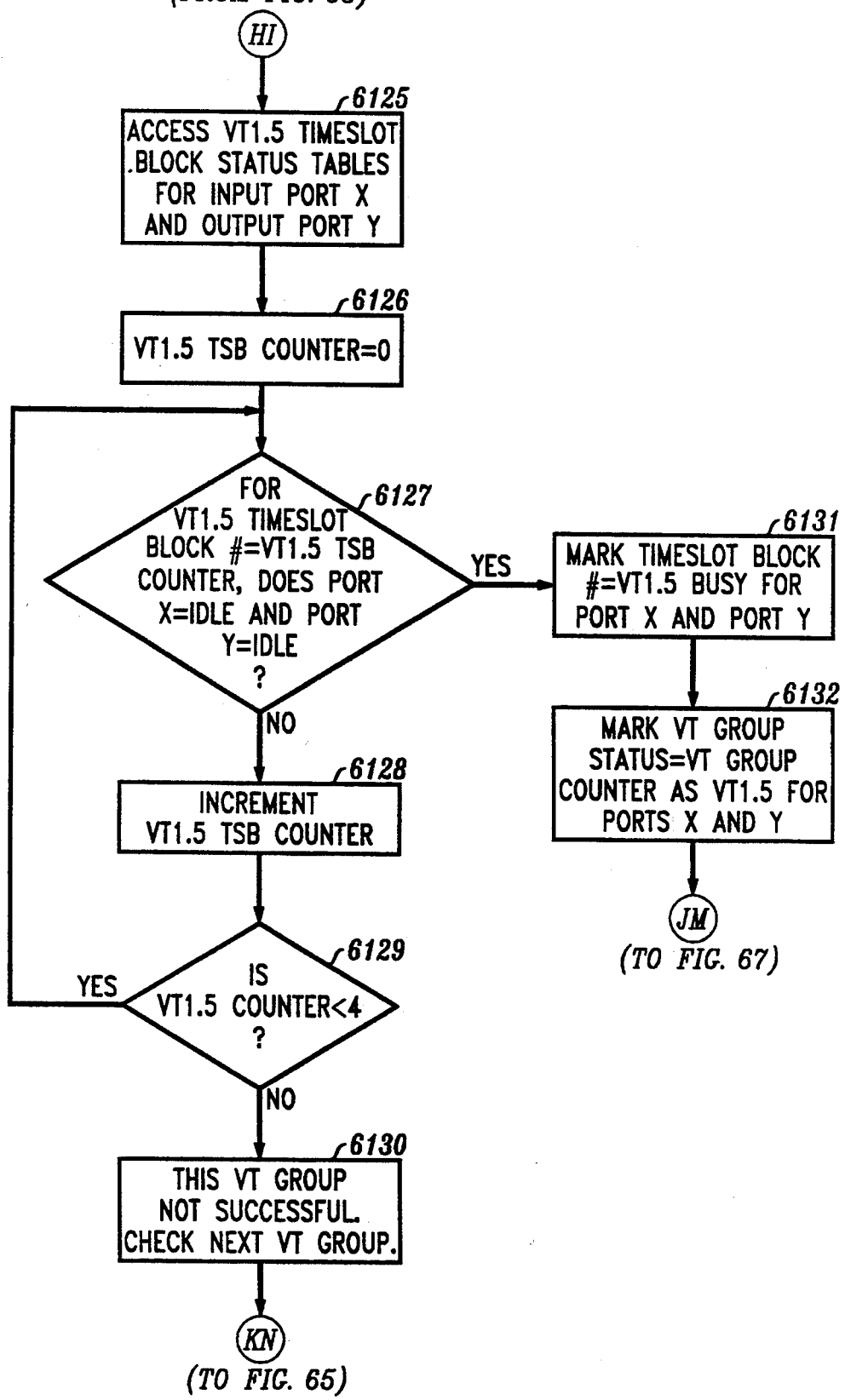
Figure 67:
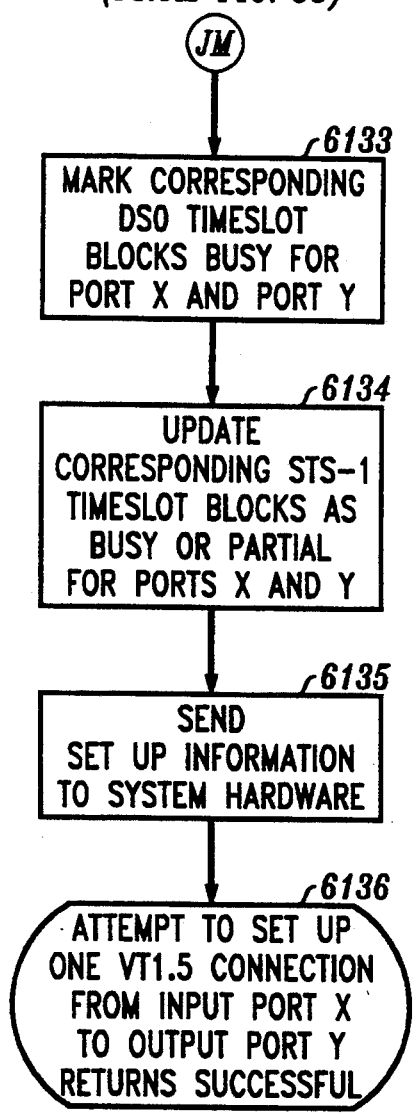

FIGS. 66 and 67 parallel almost exactly FIGS. 50 and 51 discussed above in conjunction with VT3 connections, but substitute VT1.5 for any reference to VT3. The only difference is that, in step 6129 of FIG. 66, the value of the VT1.5 counter is checked against four, on account of there being four VT1.5s in a VT group (whereas there are only two VT3s in a VT group).

Figure 68:
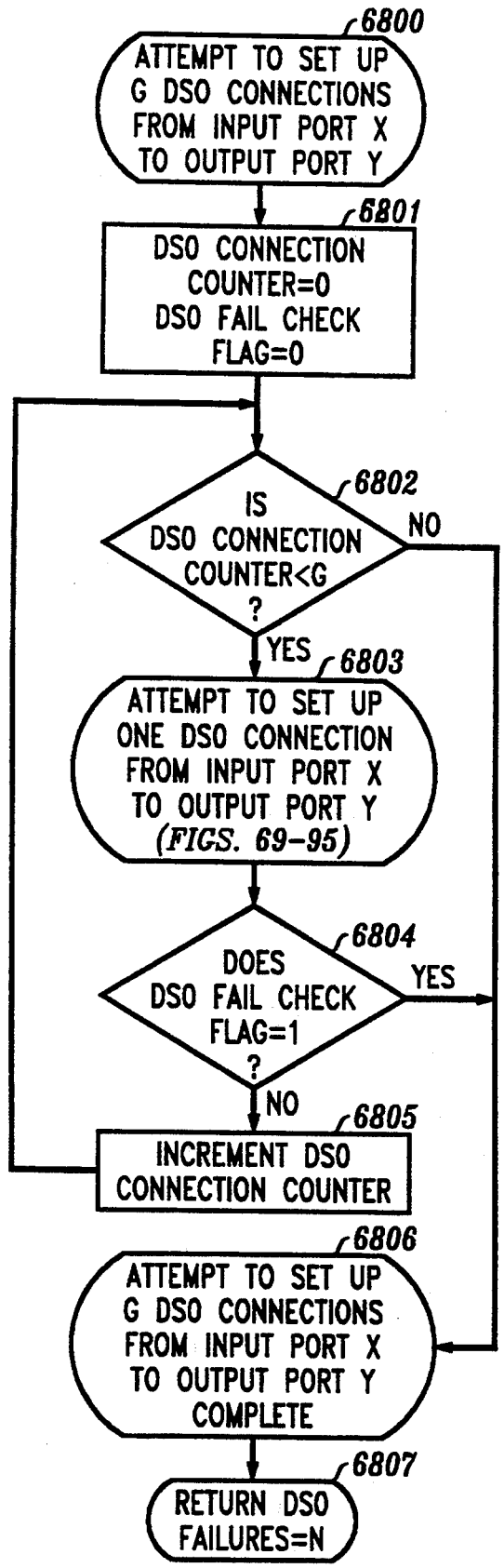
FIG. 68 is a flow diagram of multiple DS-0 path-hunt procedure of the broadband path-hunt procedure of FIGS. 32–33.

FIG. 68 shows the procedure for setting up G DS-0 connections. This procedure also parallels exactly the procedure of FIG. 34, but substitutes DS-0 for any reference to STS-1, the number G for any reference to the number B, and the number N for any reference to the number H.

FIGS. 69-95 show the procedure for setting up one DS-0 connection. A check is made to determine whether there are matching STS-1 blocks for ports X and Y both marked partially-idle. If so, execution proceeds to the VT group level, and if a positive result is indicated, a check is made to determine whether there are matching VT1.5 or VT2 blocks for ports X and Y both marked partially-idle. If there are, execution proceeds to the DS-0 level. If matching idle time slots are found, the DS-0 entries are marked busy, the VT group is marked either as VT2 or as VT1.5 as necessary, and the corresponding STS-1 and VT blocks are marked busy or partially-idle for ports X and Y. Information to set up the DS-0 connection is then sent to the system hardware—the TSIs and TMS.

If a DS-0 connection is not found following the above steps, a check is made to determine whether there are matching STS-1 blocks for ports X and Y both marked partially-idle. If so, execution proceeds to the VT group level, and if a positive result is indicated, a check is made to determine whether there is either a VT2 or VT1.5 block for port X marked partially-idle that has its matching VT block for port Y marked fully-idle. If such blocks are found, execution proceeds to the DS-0 level. These are the first two levels of the 9-level hierarchy listed above; the other levels are performed in a corresponding manner, as need demands.

Figure 69:
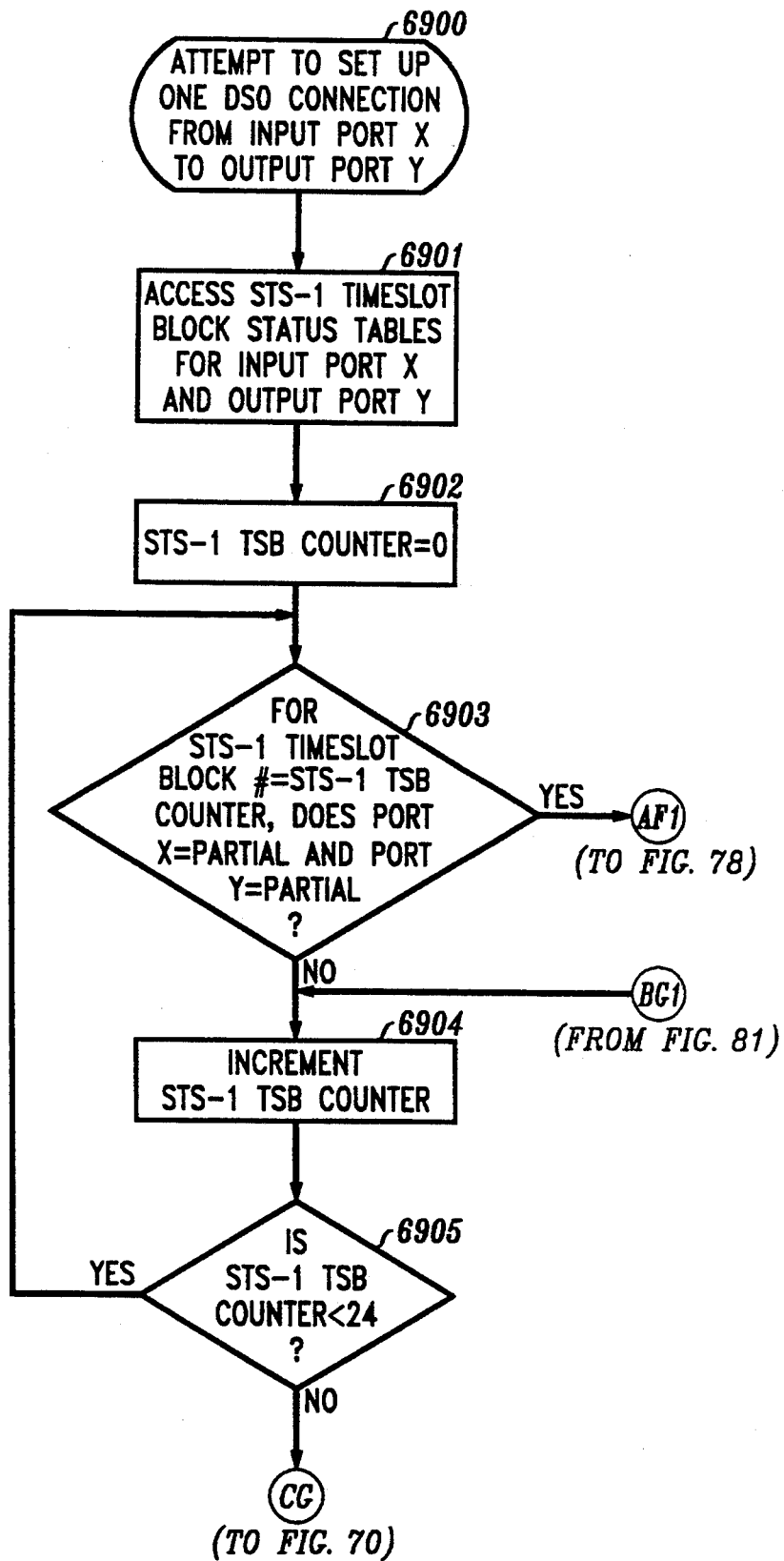
FIGS. 69–95 are a flow diagram of one DS-0 path-hunt procedure of the multiple DS-0 path-hunt procedure of FIG. 68.
Figure 70:
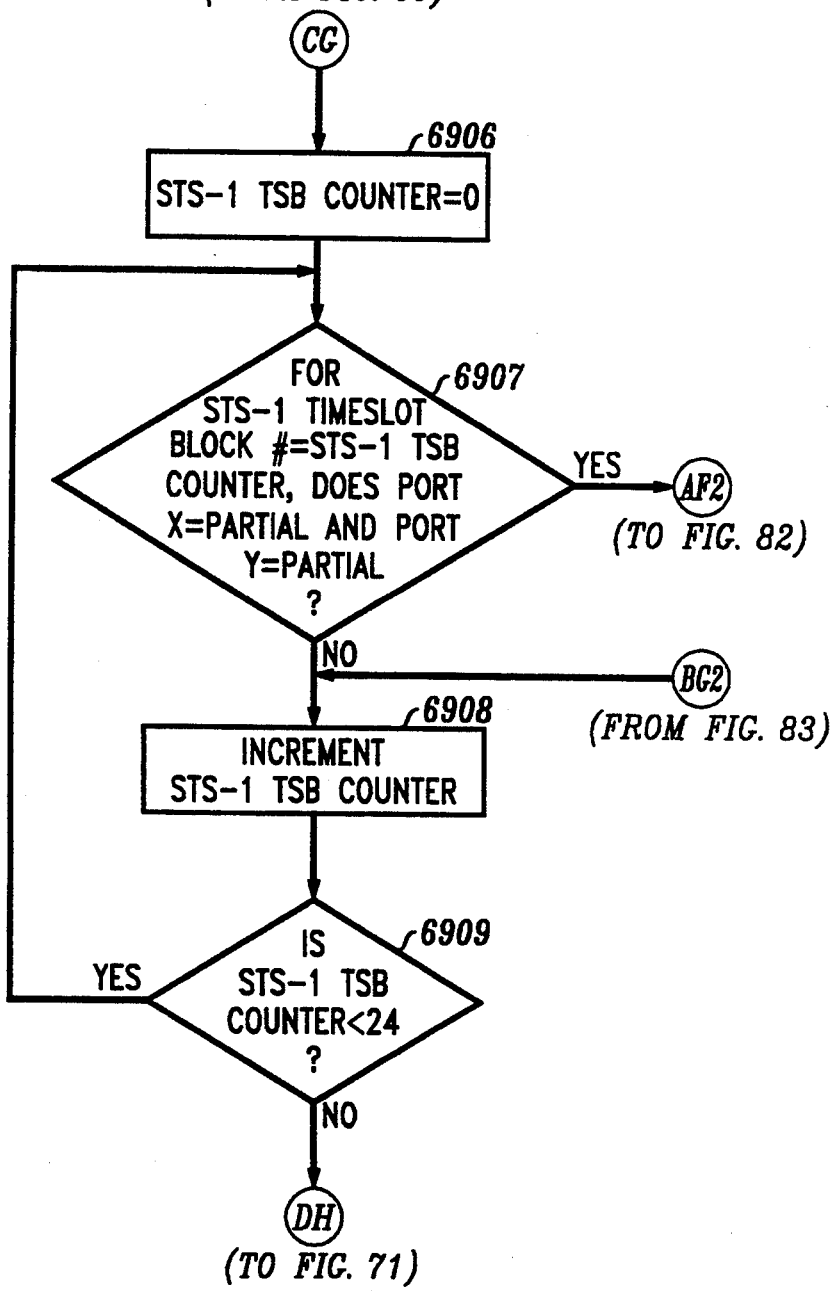

The procedure is performed in response to a request received from step 6803 of FIG. 68, at step 6900. FIGS. 69-72 each duplicate FIG. 37, except that the transfer of program execution from step 6903 of FIG. 69 is to FIG. 78, from step 6907 of FIG. 70 is to FIG. 80, and from step 6915 of FIG. 72 is to FIG. 81. This is because the search for a DS-0 follows a search hierarchy for a partial-partial, partial-idle, idle-partial, and idle-idle through the VTs, in FIGS. 78-81, respectively, just as it does through STS-1s in FIGS. 37-40.

Figure 38:
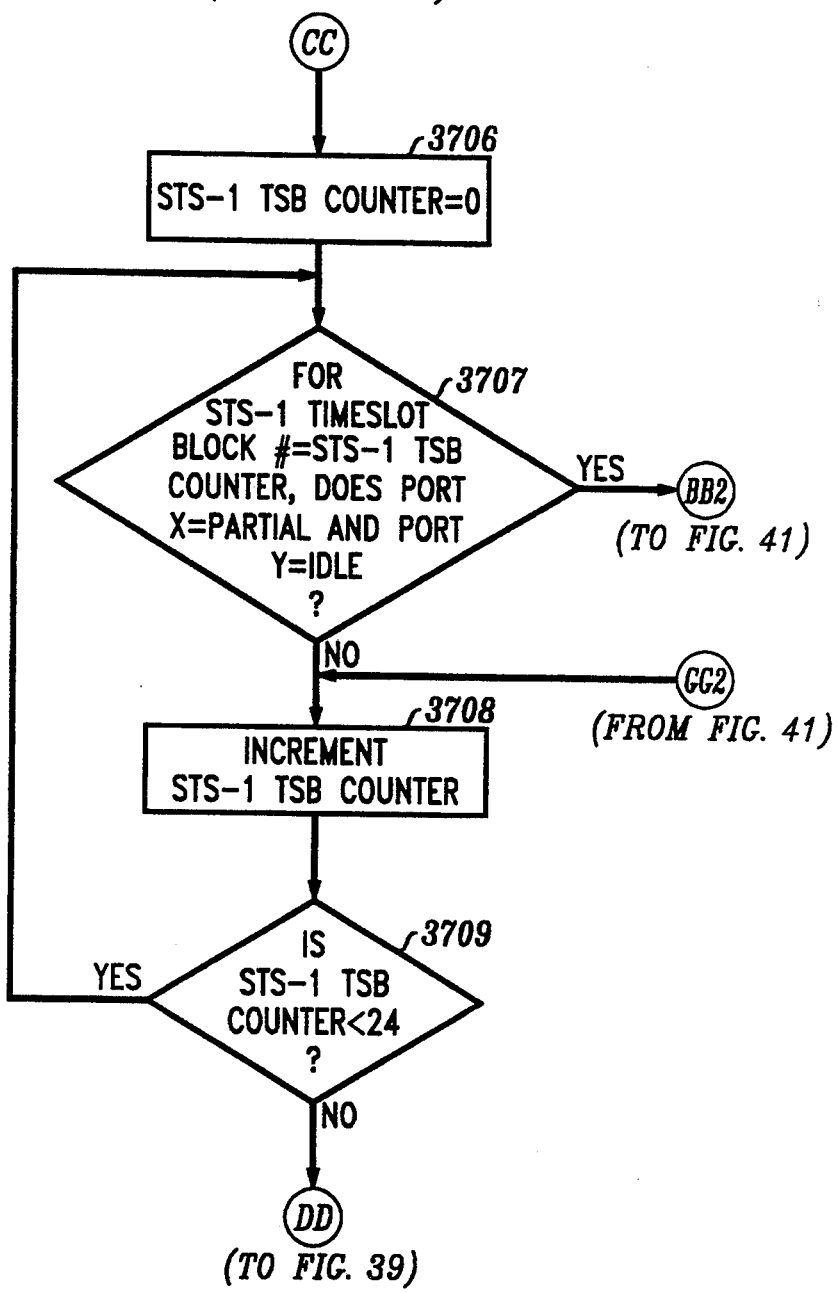
Figure 39:
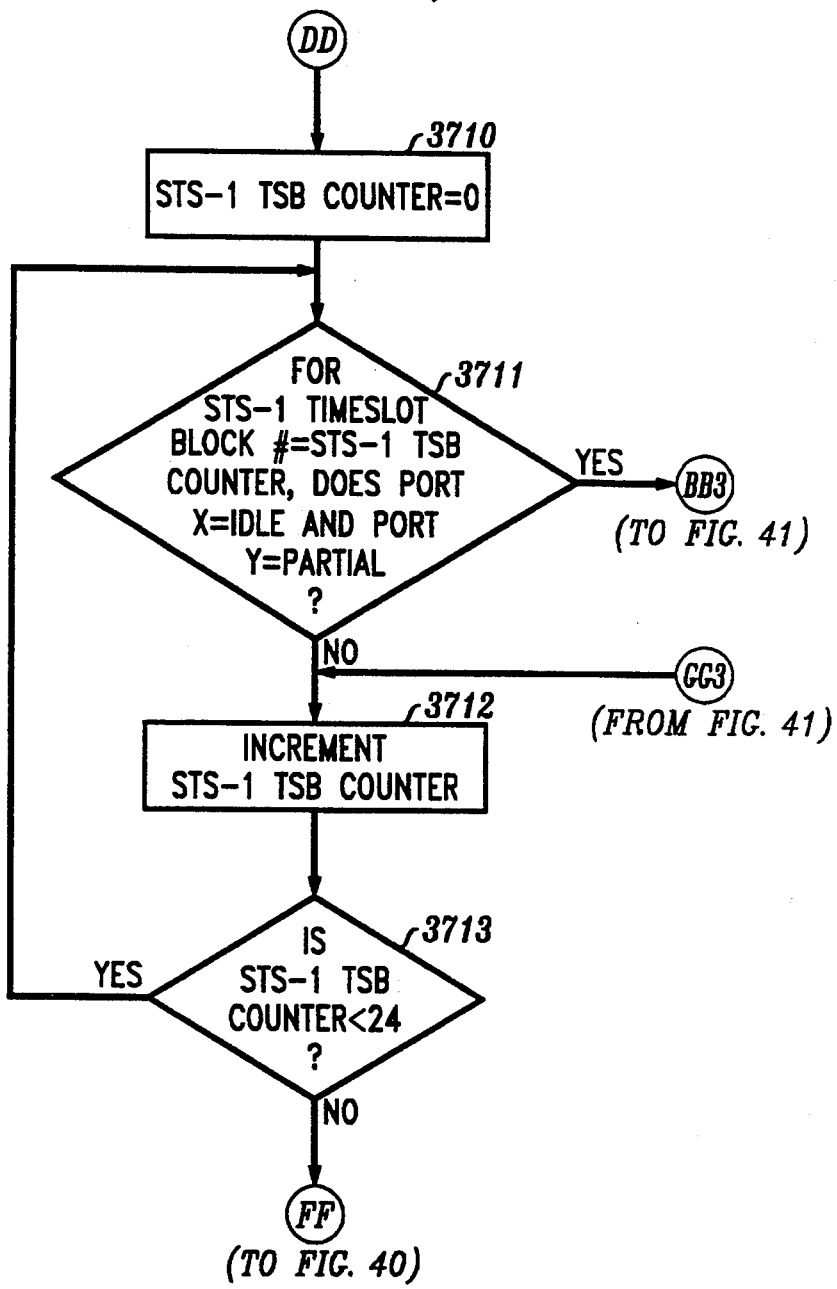
Figure 73:
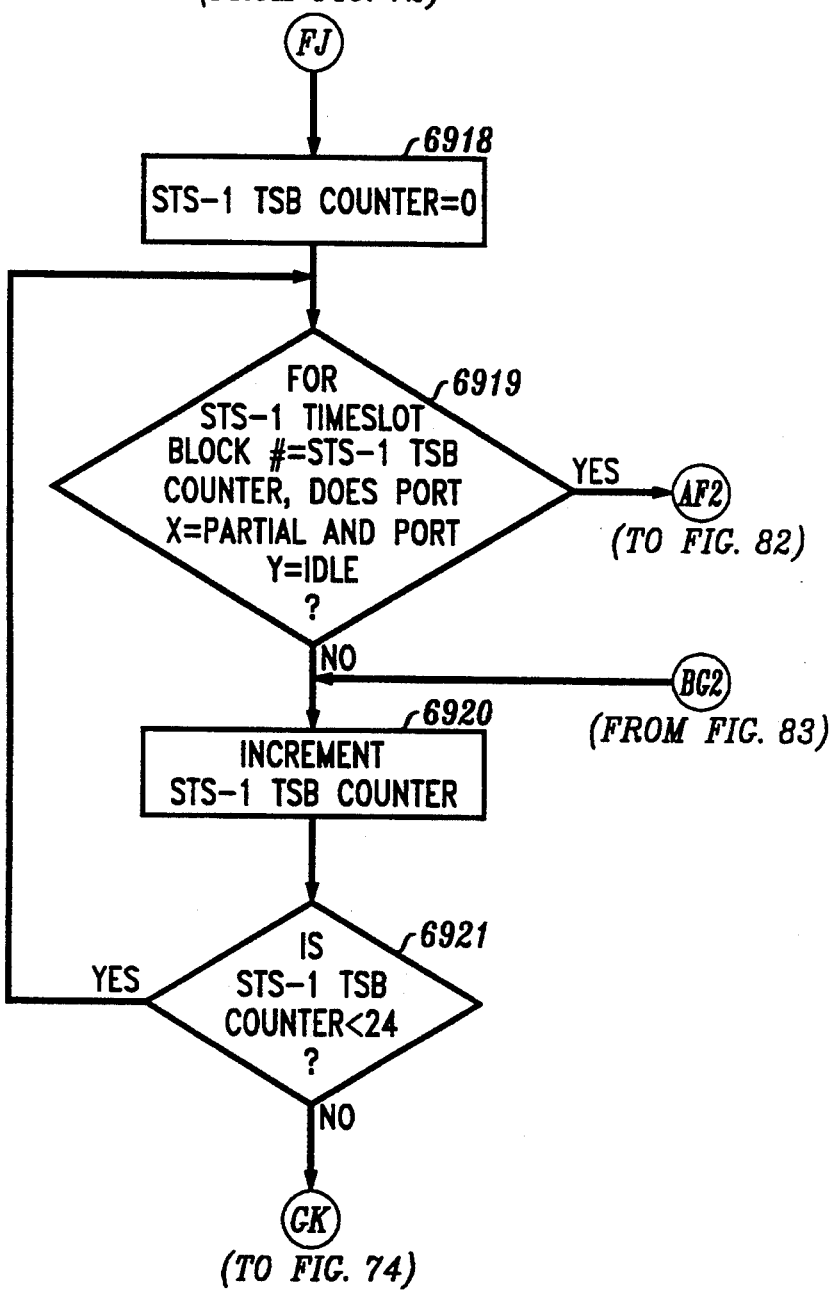
Figure 74:
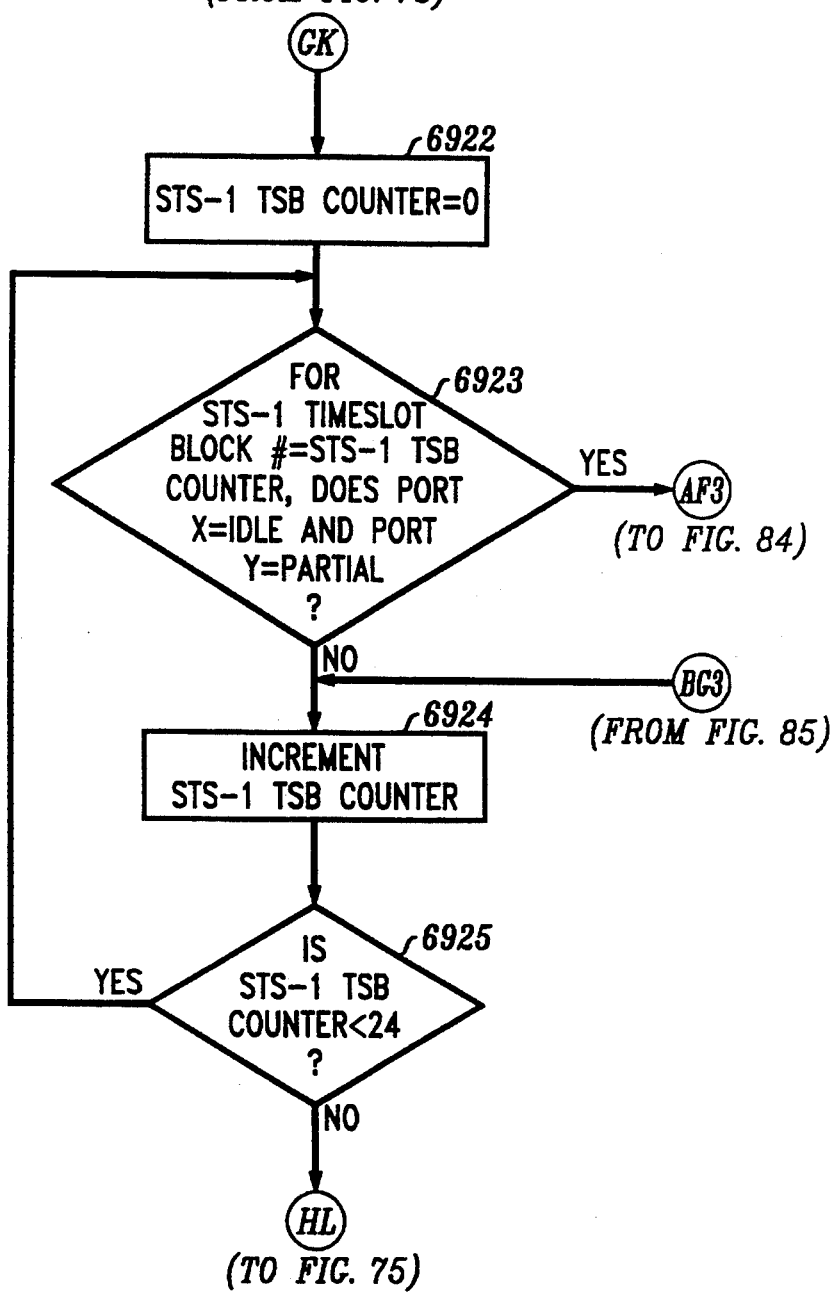
Figure 75:
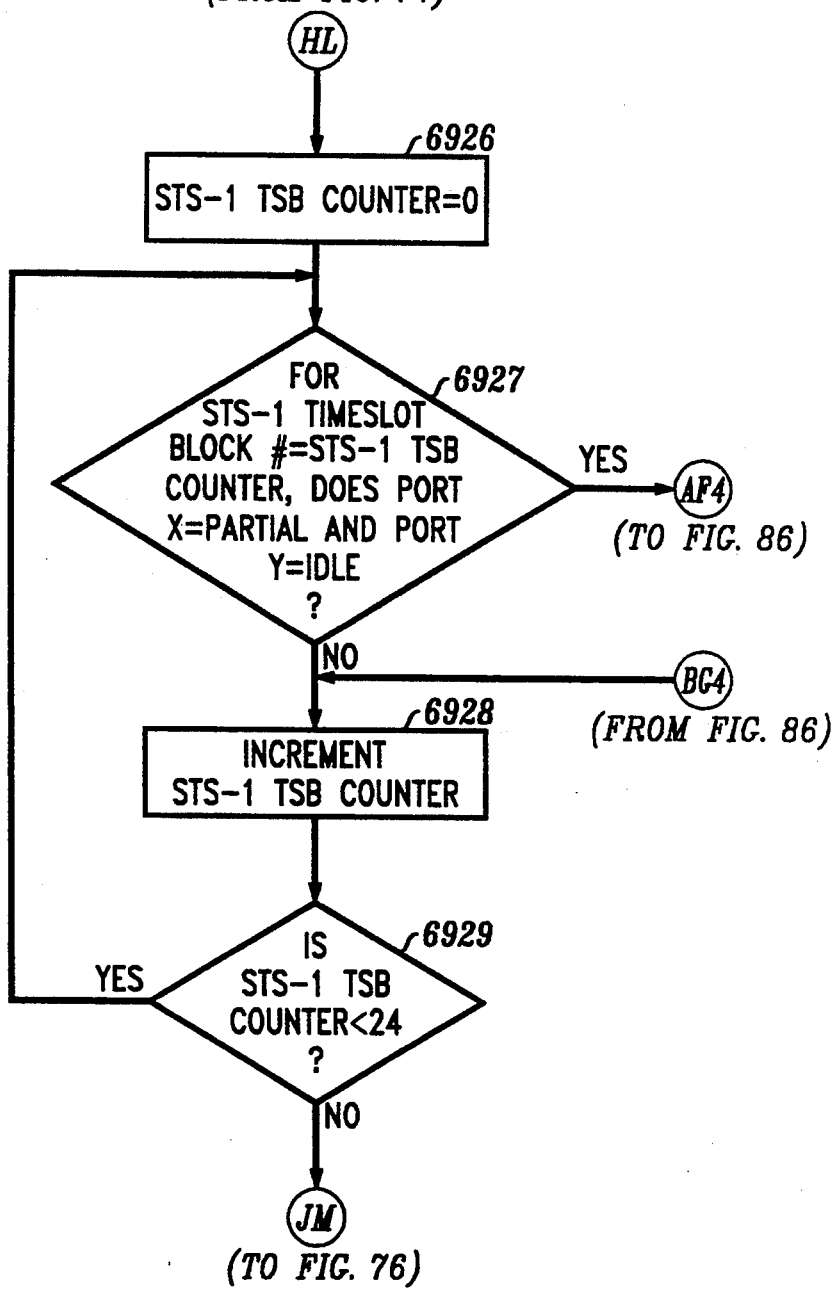
Figure 76:
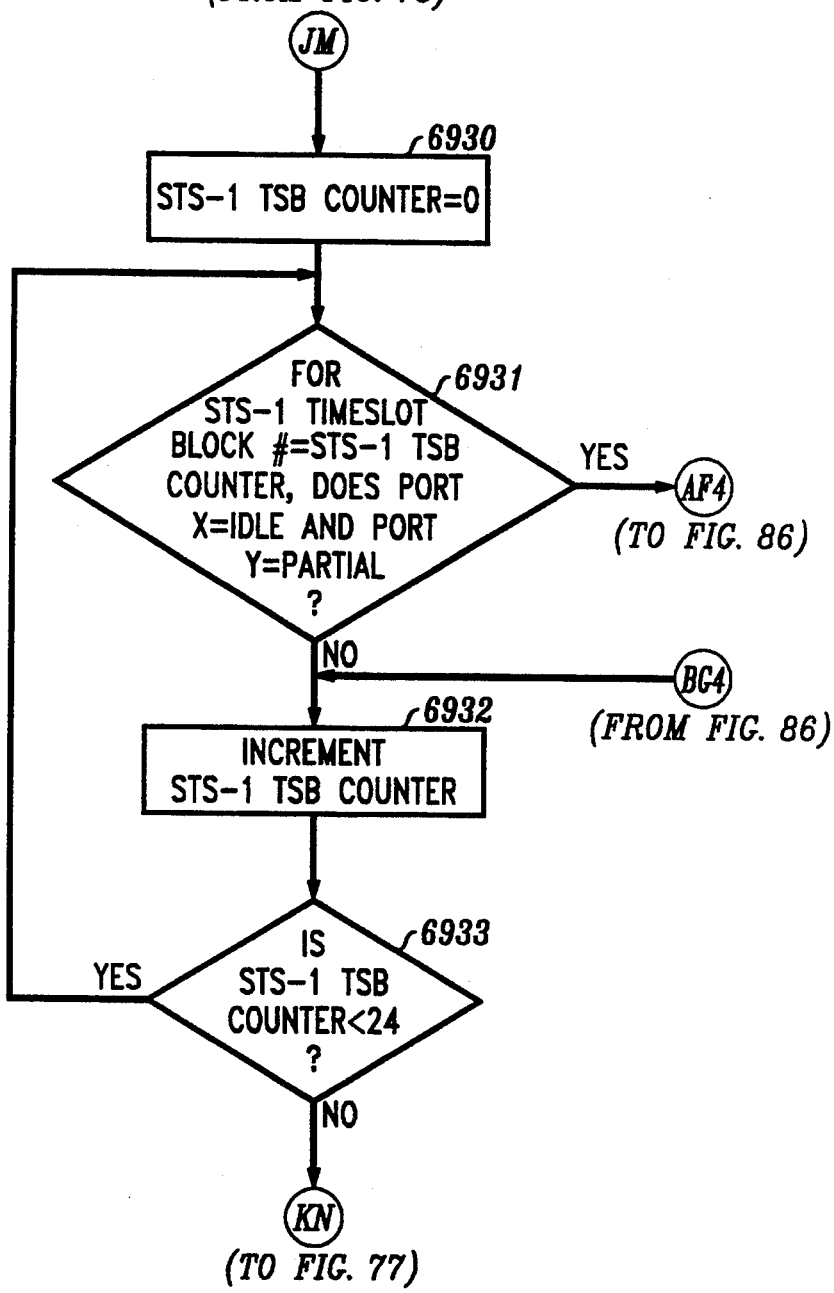
Figure 82:
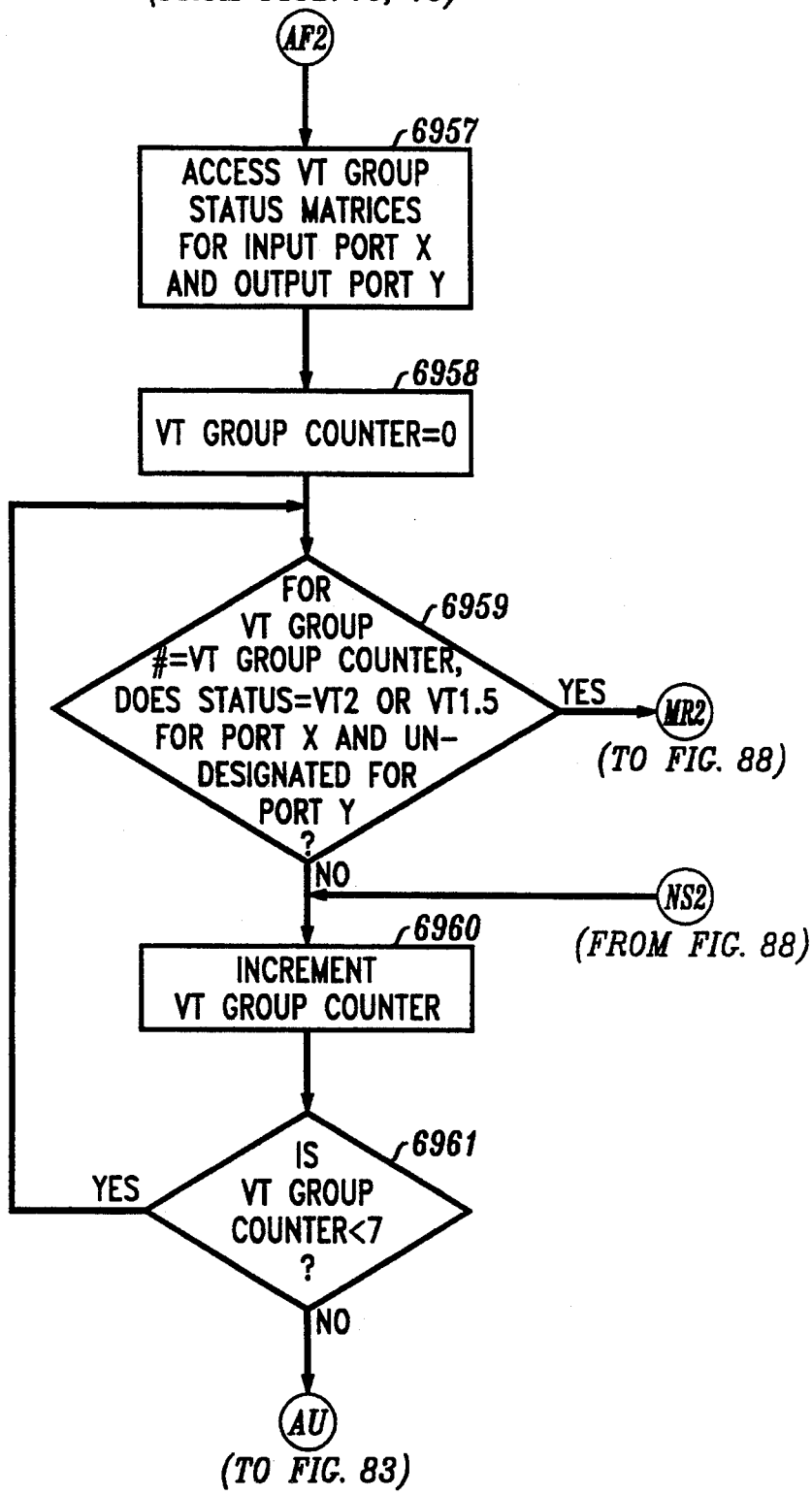
Figure 86:
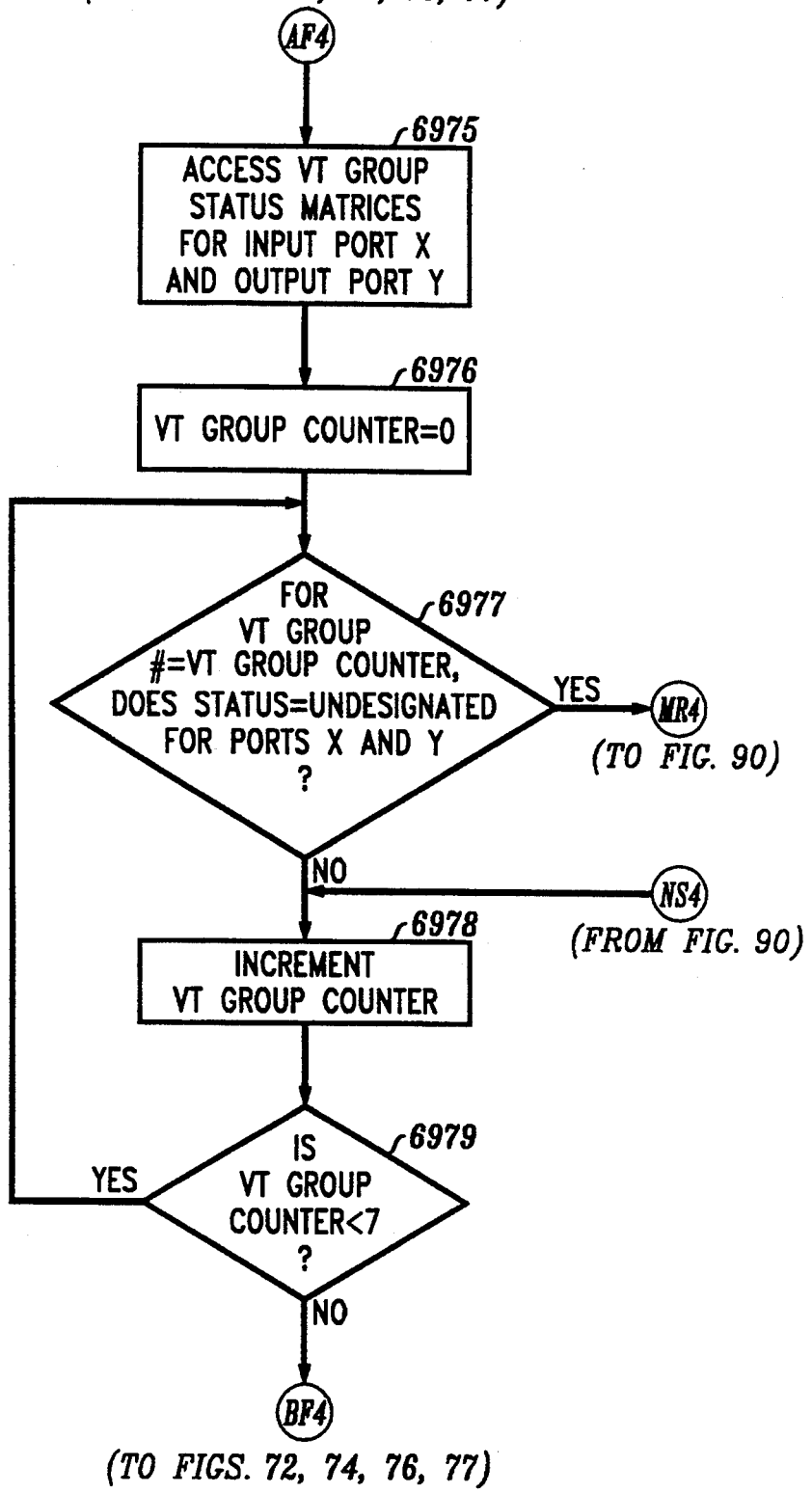

FIGS. 73 and 75 each duplicate FIG. 38, except that the transfer of program execution from step 6919 of FIG. 73 is to FIG. 82, and from step 6927 of FIG. 75 is to FIG. 86. Similarly FIGS. 74 and 76 each duplicate FIG. 39, except that the transfer of program execution from step 6923 of FIG. 74 is to FIG. 84, and from step 6931 of FIG. 76 is to FIG. 86.

Figure 77:
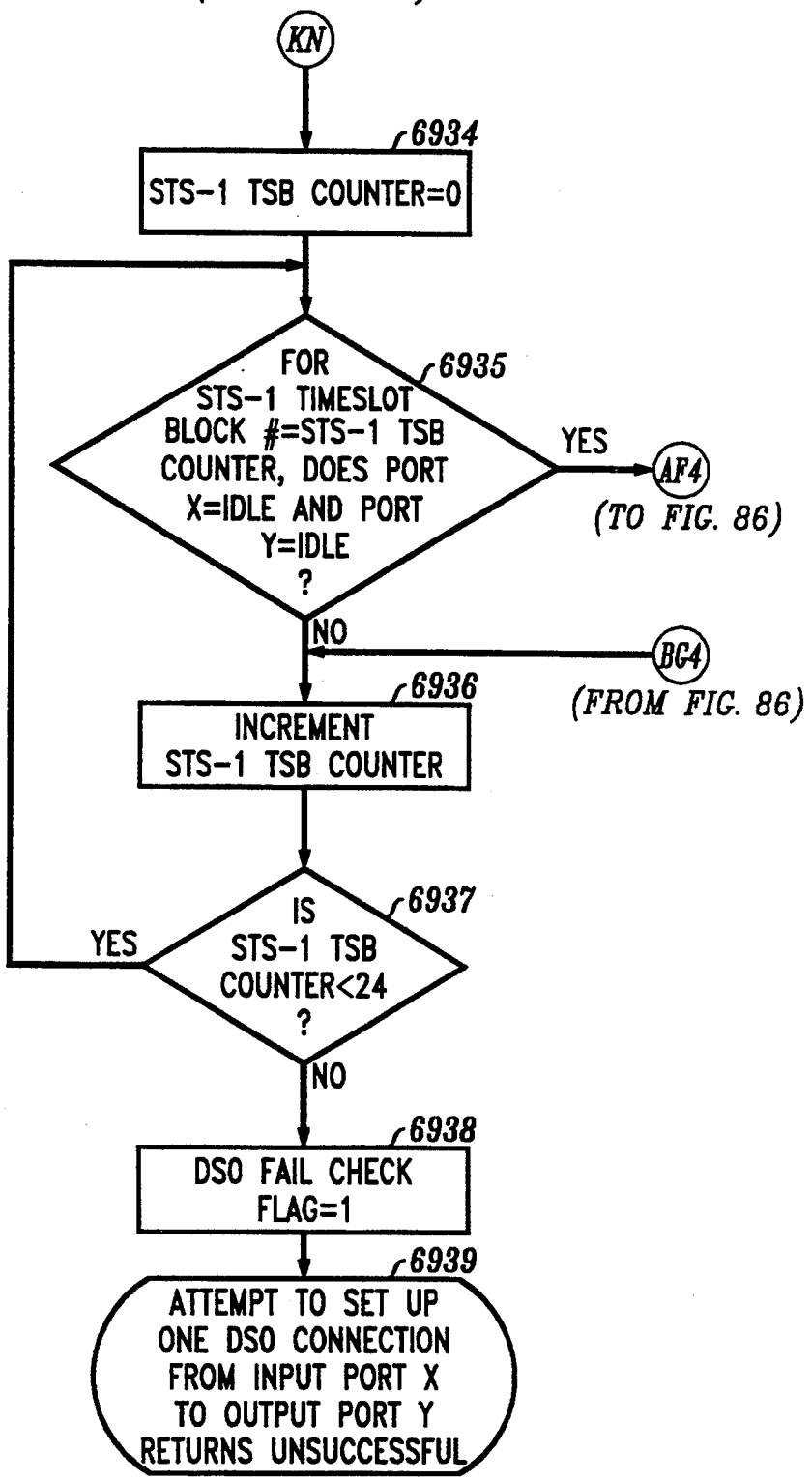

FIG. 77 duplicates FIG. 40, except that, at step 6935, transfer of execution is to FIG. 86; at step 6938, it is a DS-0 fail-check flag that is set to one; and at step 6939, the procedure returns to step 6803 of FIG. 68.

FIGS. 78-86 reflect the VT group-level search conducted for a DS-0 connection. Since a DS-0 occupies only a small portion of a VT group, both undesignated (fully-idle) and designated (partially-idle) matching VT groups are suitable for carrying a DS-0. However, in the SONET and SDH standards, DS-0 connections are mapped only into the lowest two VT rates—VT1.5 and VT2. Furthermore, it is desirable, for blocking-avoidance purposes, to ensure that a DS-0 connection is mapped into the same one VT rate end-to-end. Therefore, only matching VT groups that are either both undesignated, or both designated as VT1.5, or both designated as VT2, are acceptable to carry a DS-0 connection. The search for a DS-0 follows a search hierarchy for designated/designated, designated/undesignated, undesignated/designated, and undesignated/undesignated matching VT groups. Hence, four sets of routines for searching through VT group status matrices are required. Then, within each suitable matching pair of VT groups, the search for a DS-0 follows a search hierarchy for a partial-partial, partial-idle, idle-partial, and idle-idle through the VTs of that group. However, not all these searches need to be performed for each VT group—a search for a partially-idle VT in an undesignated VT group is meaningless, since undesignated VT groups are fully idle, by definition.

Accordingly, to reflect these various constraints, there are eight routines —FIGS. 78-86—each one of which parallels the routine of FIG. 41. Whereas the routine of FIG. 41 only searched for undesignated matching VT groups, FIGS. 78-81 search for matching VT groups either both designated as VT2 or both designated as VT1.5, FIGS. 82-83 search for matching VT groups wherein the input VT group is designated as VT2 or as VT1.5 and the output VT group is undesignated, FIGS. 84-85 search for matching VT groups wherein the input VT group is undesignated and the output VT group is designated as VT2 or as VT1.5, and FIG. 86 searches for undesignated matching VT groups.

Figure 78:
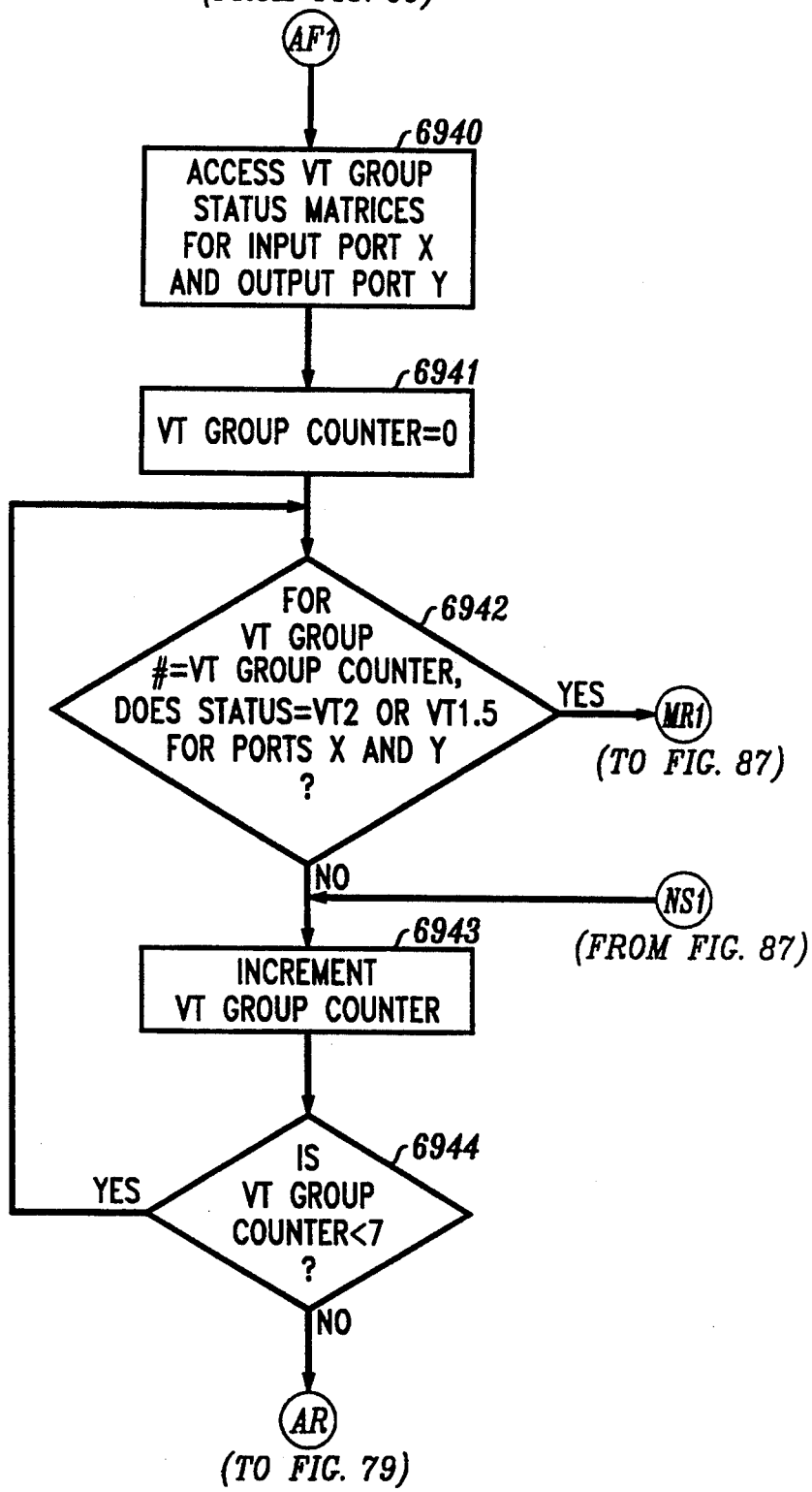

Execution of FIG. 78 is entered from FIG. 69. If matching VT groups both designated either as VT2 or as VT1.5 are found at step 6942 of FIG. 78, program execution proceeds to FIG. 87 to search for partial-partial matching VTs within those VT groups; if the search of FIG. 87 should fail, program execution will return to step 6943 to continue the search for suitably-designated matching VT groups. If such VT groups cannot be found in FIG. 78, program execution proceeds to FIG. 79.

Figure 79:
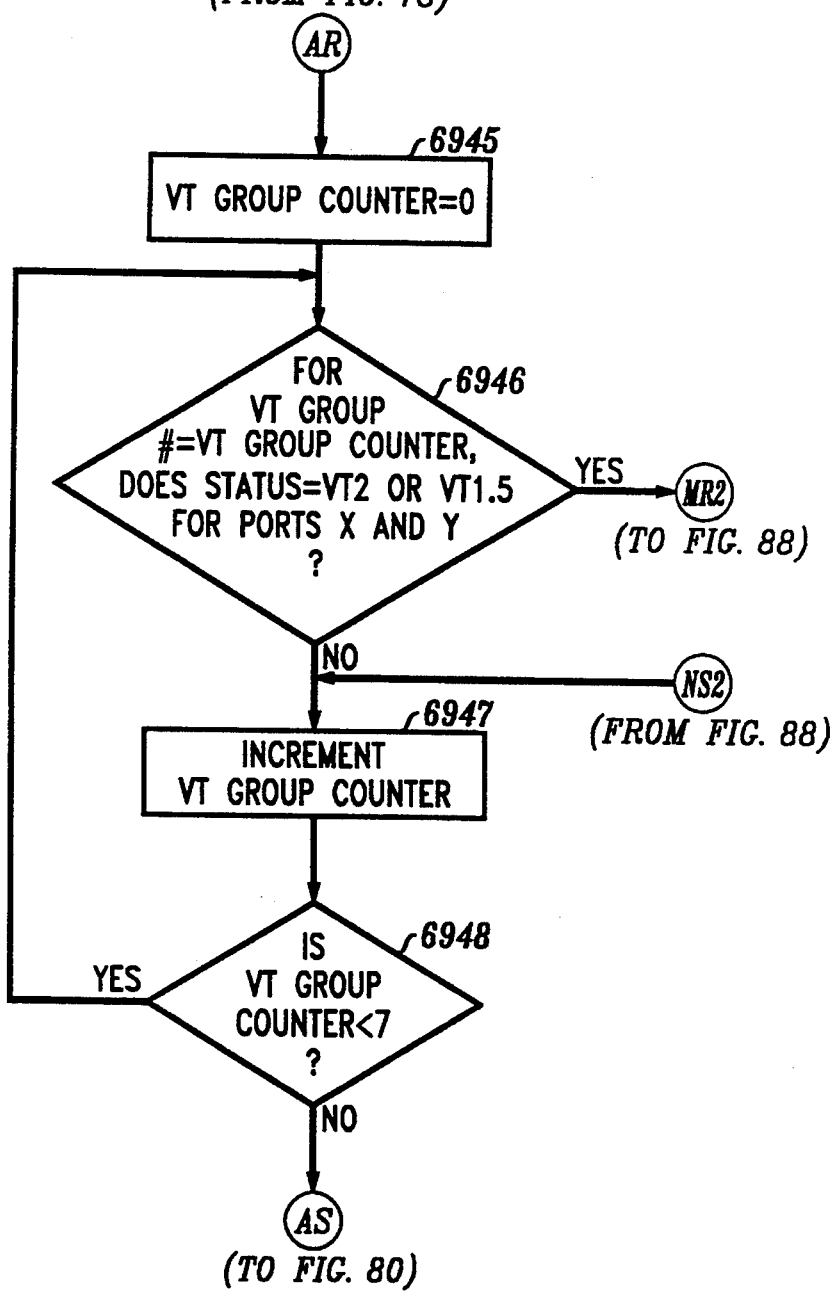
Figure 88:
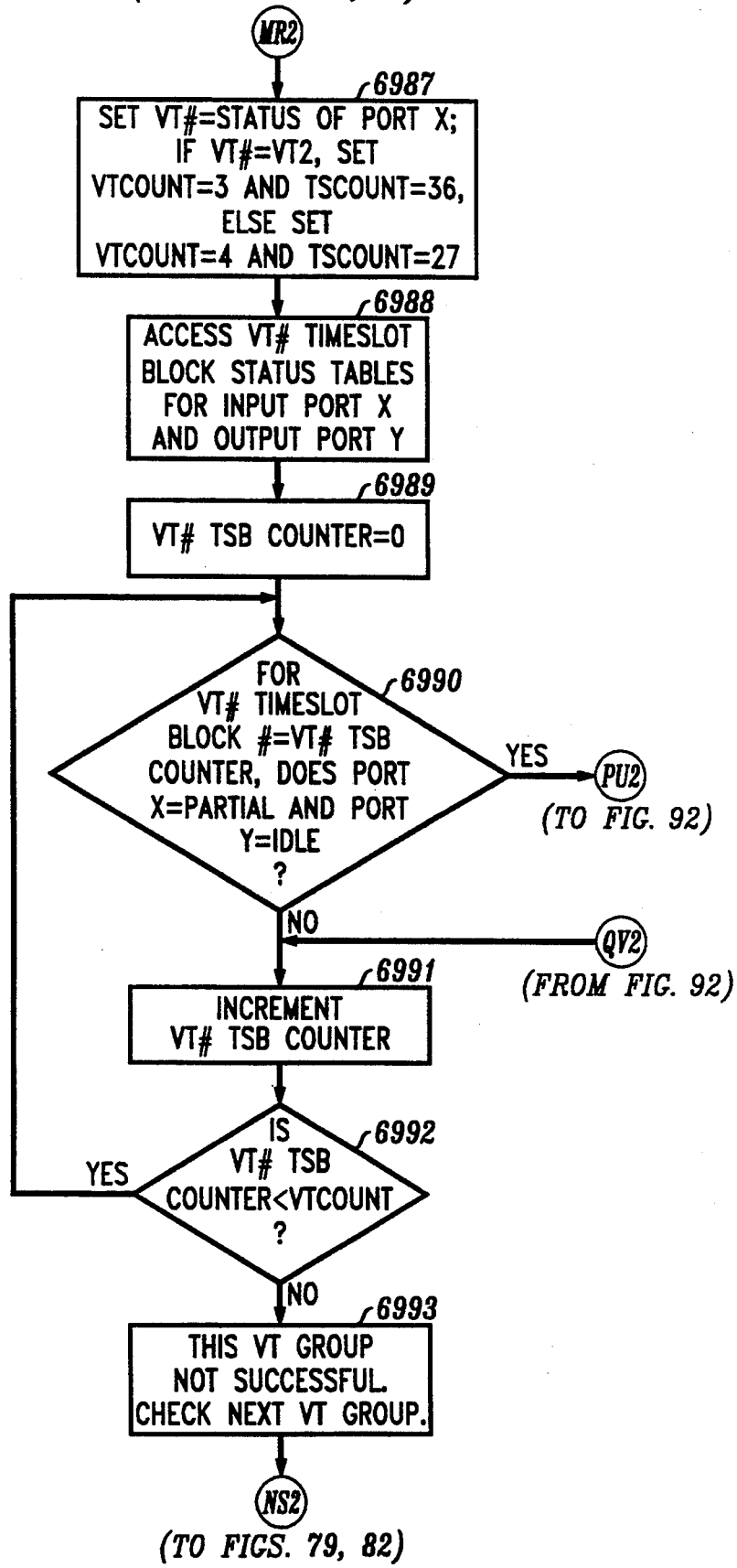

If suitably-designated matching VT groups are found at step 6946 of FIG. 79, program execution proceeds to FIG. 88 to search for partial-idle matching VTs within those VT groups; if the search of FIG. 88 should fail, program execution will return to step 6947 to continue the search for suitably-designated matching VT groups. If such VT groups cannot be found in FIG. 79, program execution proceeds to FIG. 80.

Figure 80:
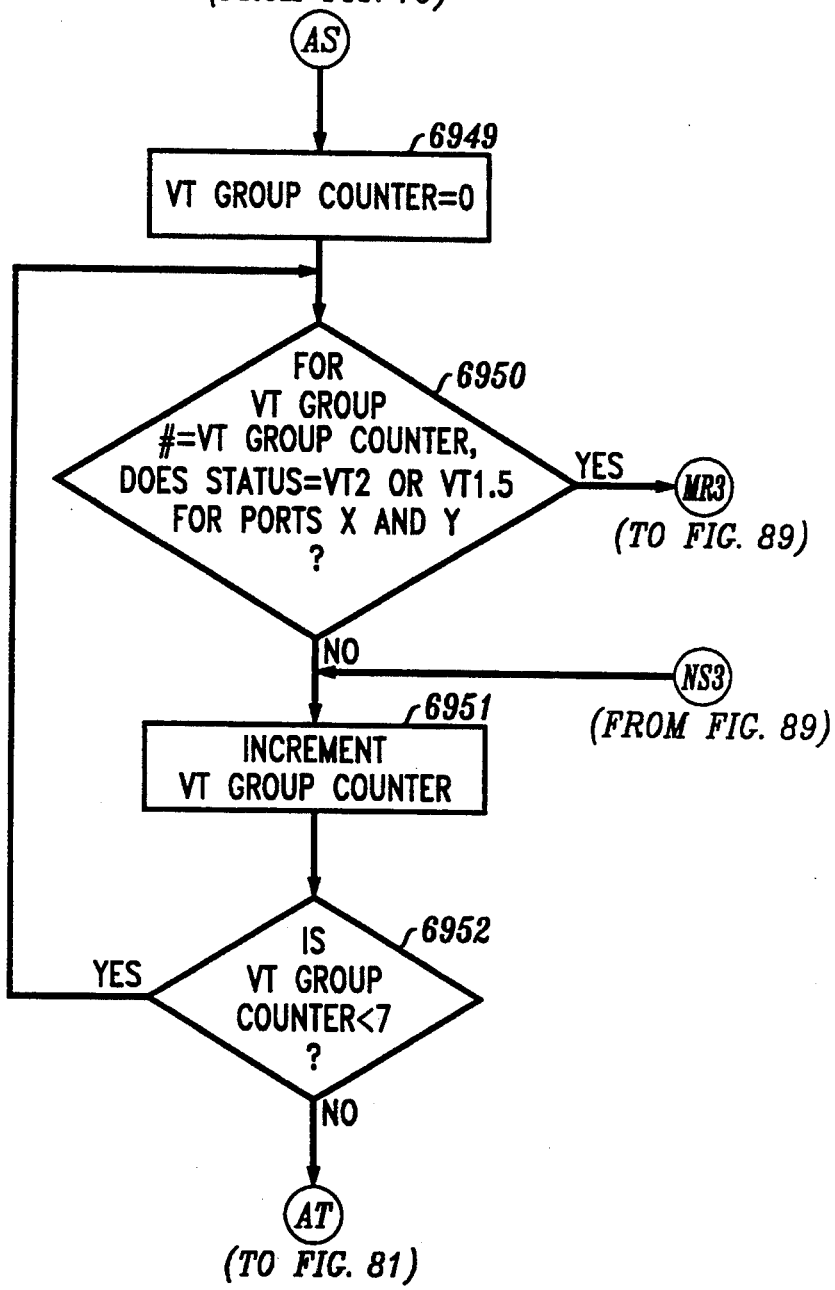
Figure 89:
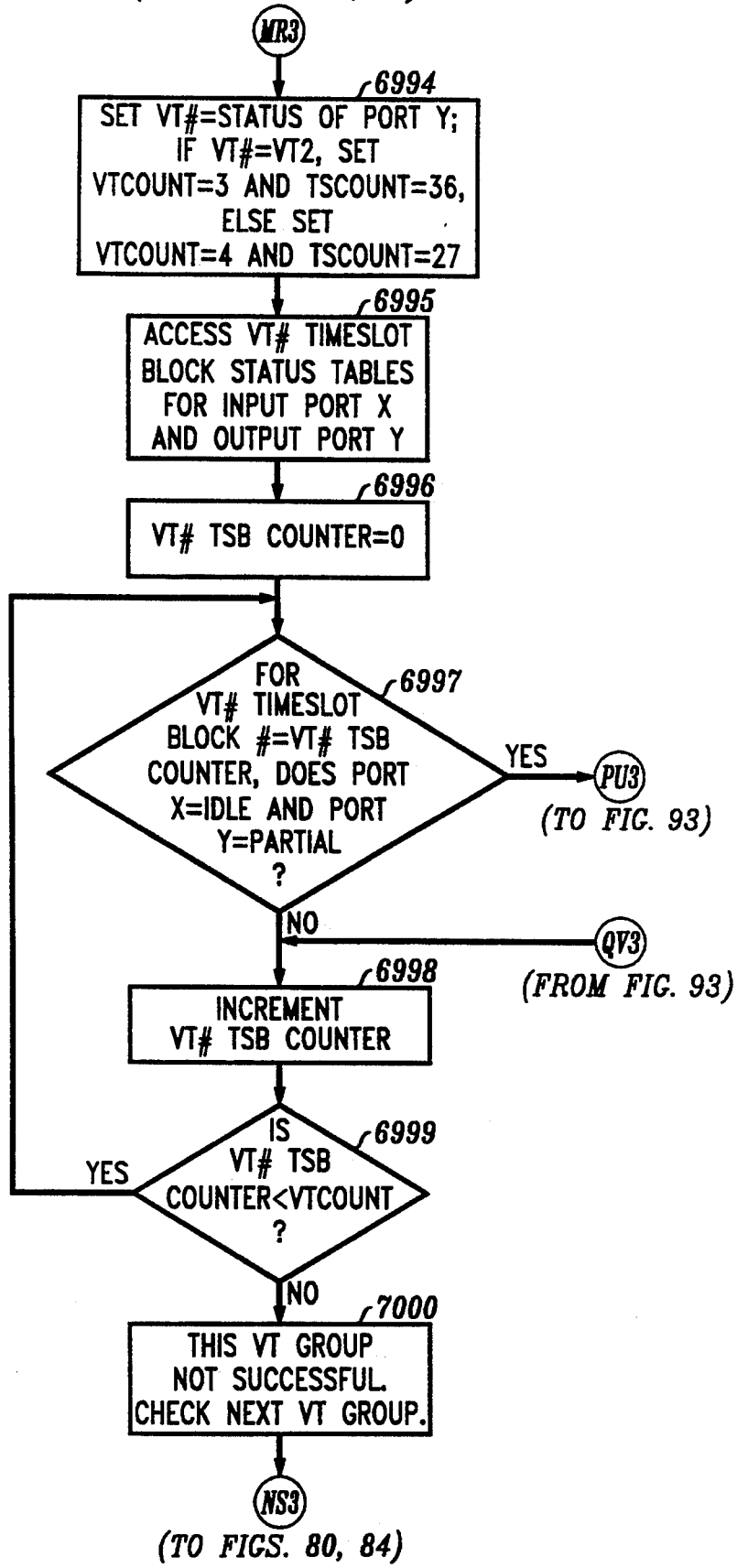

If suitably-designated matching VT groups are found at step 6950 of FIG. 80, program execution proceeds to FIG. 89 to search for idle-partial matching VTs within those groups; if the search of FIG. 89 should fail, program execution will return to step 6951 to continue the search for suitably-designated matching VT groups. If such VT groups cannot be found in FIG. 80, program execution proceeds to FIG. 81.

Figure 81:
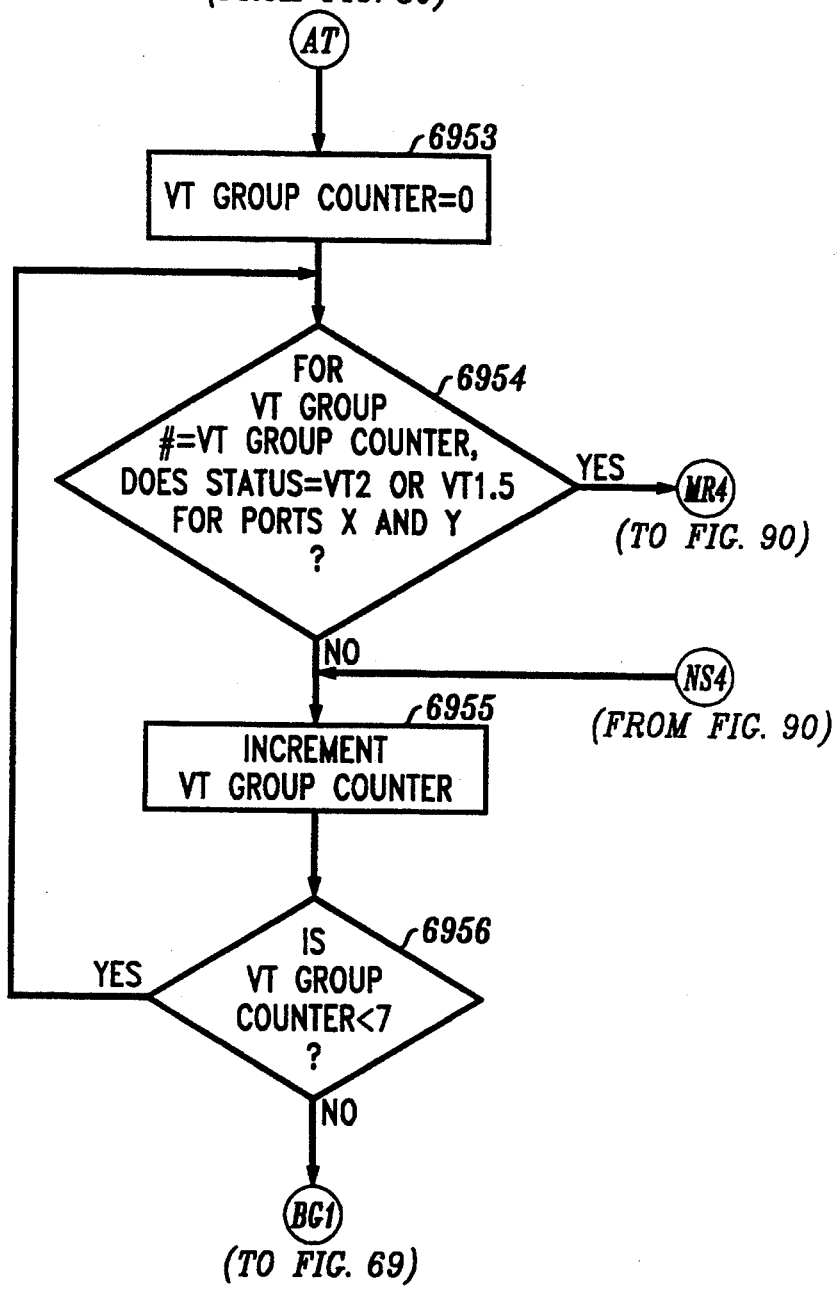
Figure 90:
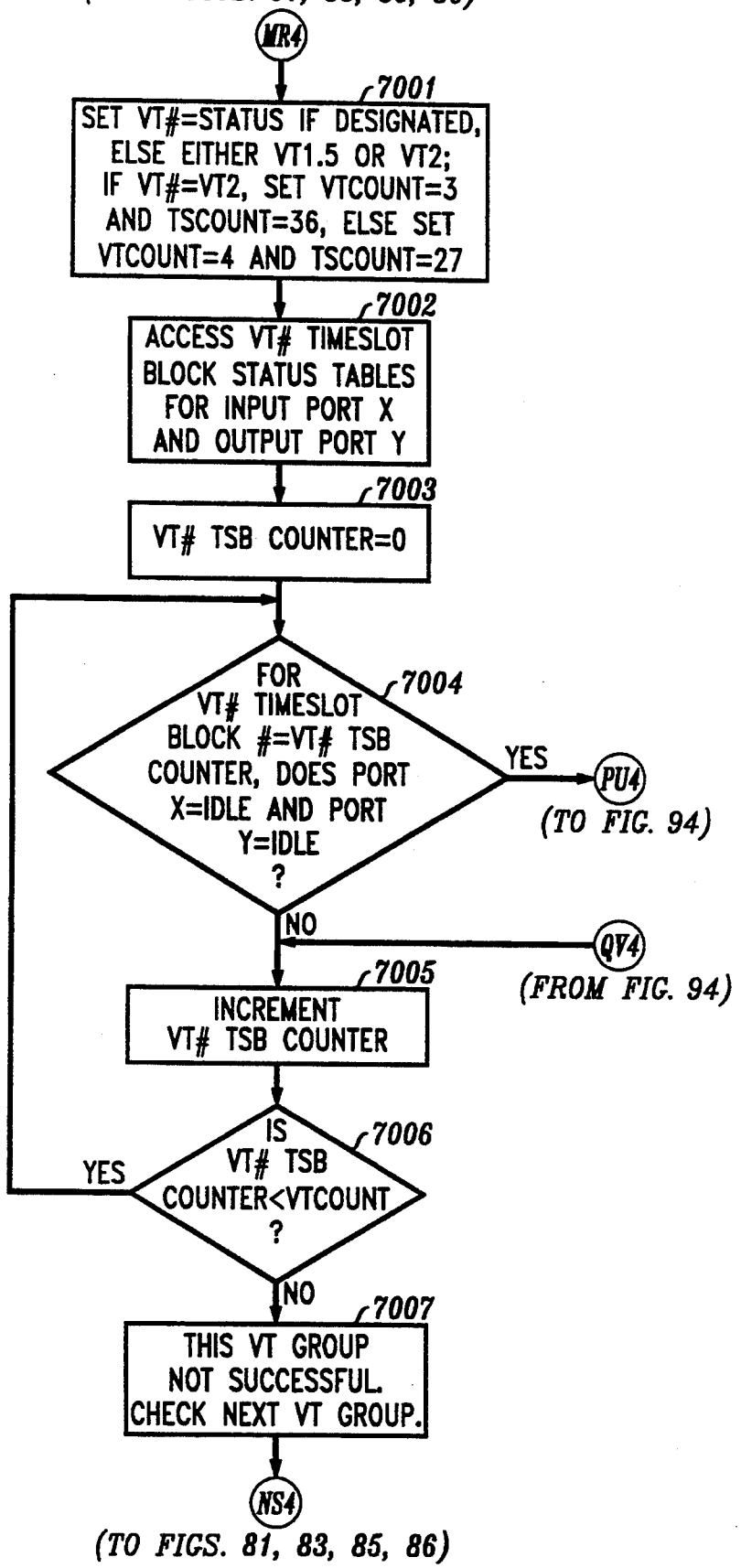

If suitably-designated matching VT groups are found at step 6954 of FIG. 81, program execution proceeds to FIG. 90 to search for idle-idle matching VTs within those groups; if the search of FIG. 90 should fail, program execution will return to step 6955 to continue the search for suitably-designated matching VT groups. If such VT groups cannot be found in FIG. 81, program execution returns to FIG. 69.

Execution of FIG. 82 is entered from FIG. 70 or FIG. 73. If an input VT group designated as VT2 or as VT1.5 and a matching undesignated output VT group are found at step 6959 of FIG. 82, program execution proceeds to FIG. 88 to search for partial-idle matching VTs within those VT groups; if the search of FIG. 88 should fail, program execution will return to step 6960 to continue the search for a suitably designated-undesignated matching VT group combination. If such a VT group combination cannot be found in FIG. 82, program execution proceeds to FIG. 83.

Figure 83:
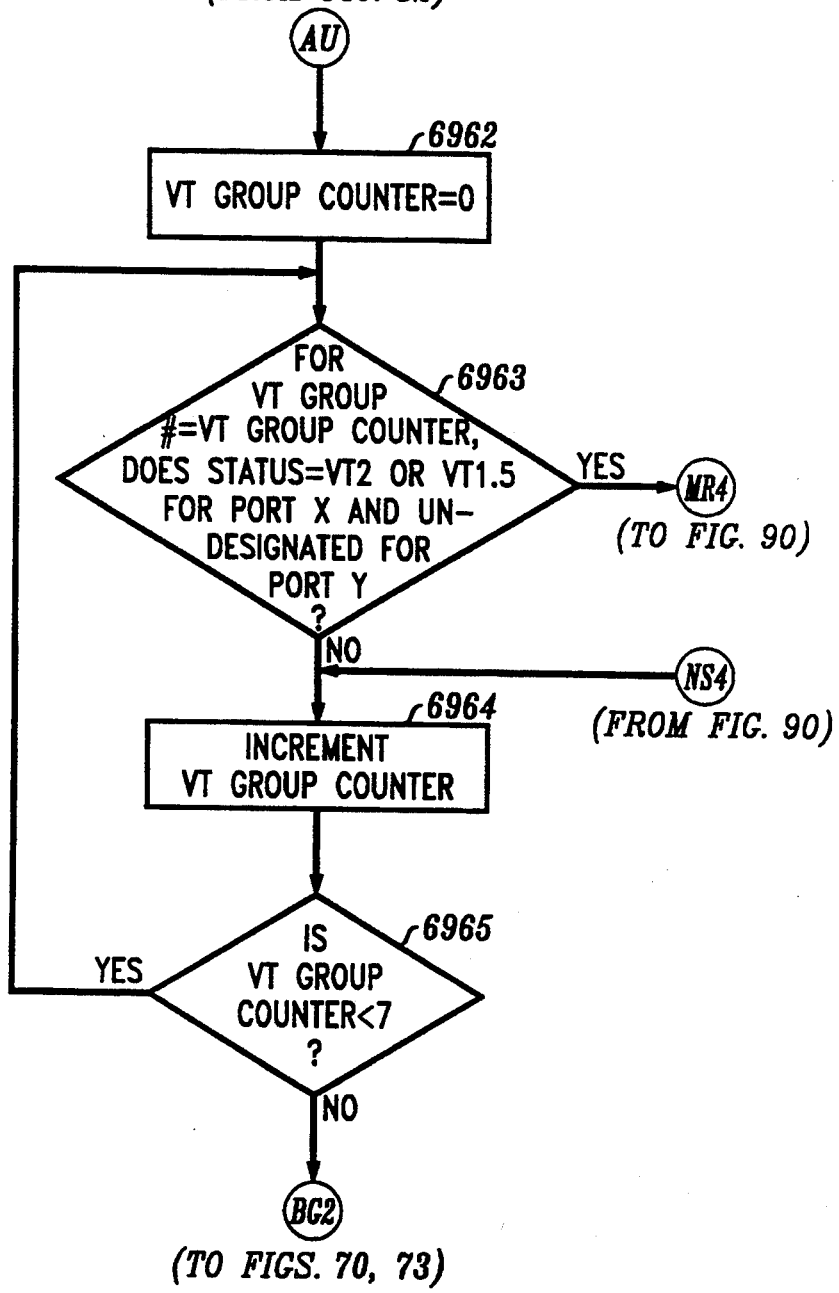

If a suitably designated-undesignated matching VT group combination is found at step 6963 of FIG. 83, program execution proceeds to FIG. 90 to search for idle-idle matching VTs within those VT groups; if the search of FIG. 90 should fail, program execution will return to step 6964 to continue the search for a suitably designated-undesignated matching VT group combination. If such a VT group combination cannot be found in FIG. 83, program execution returns to FIG. 70 or FIG. 73 from whence it came.

Figure 71:
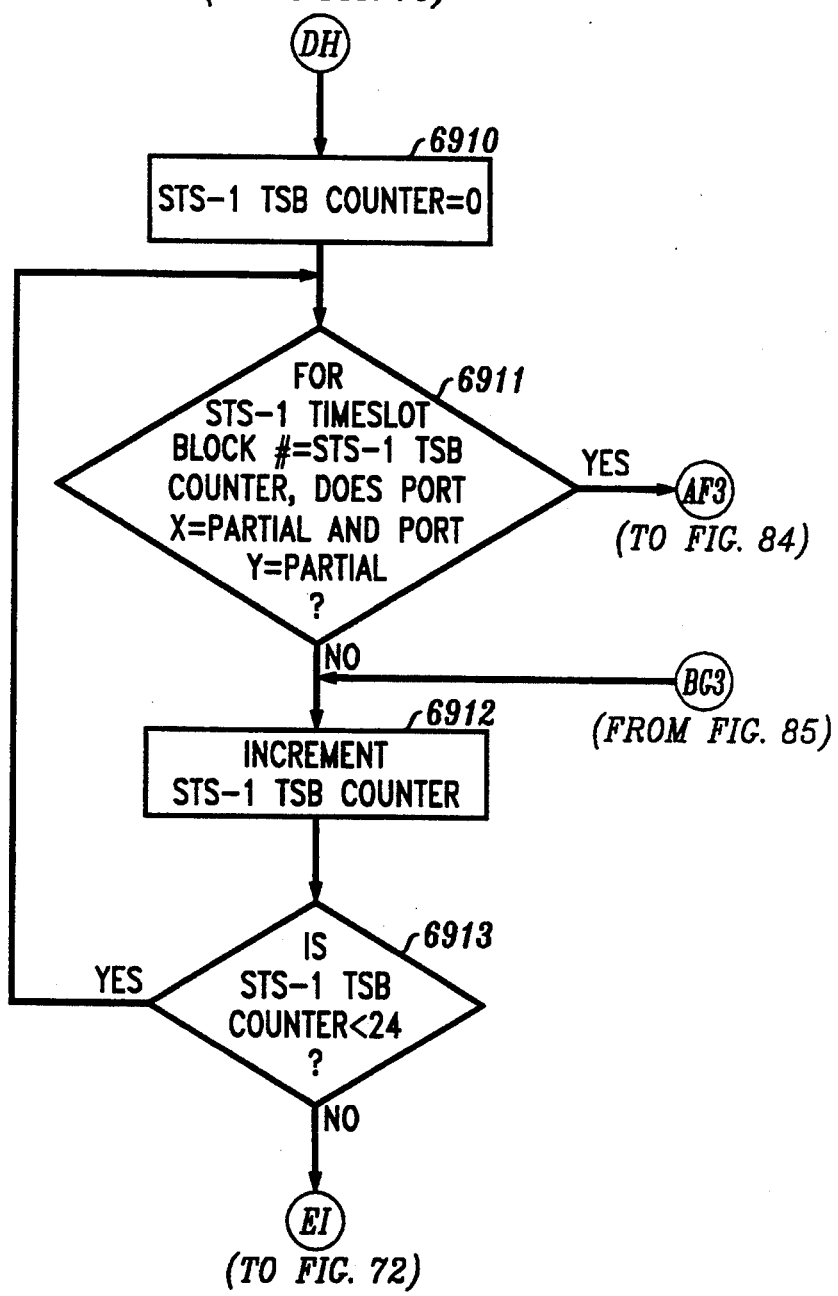
Figure 72:
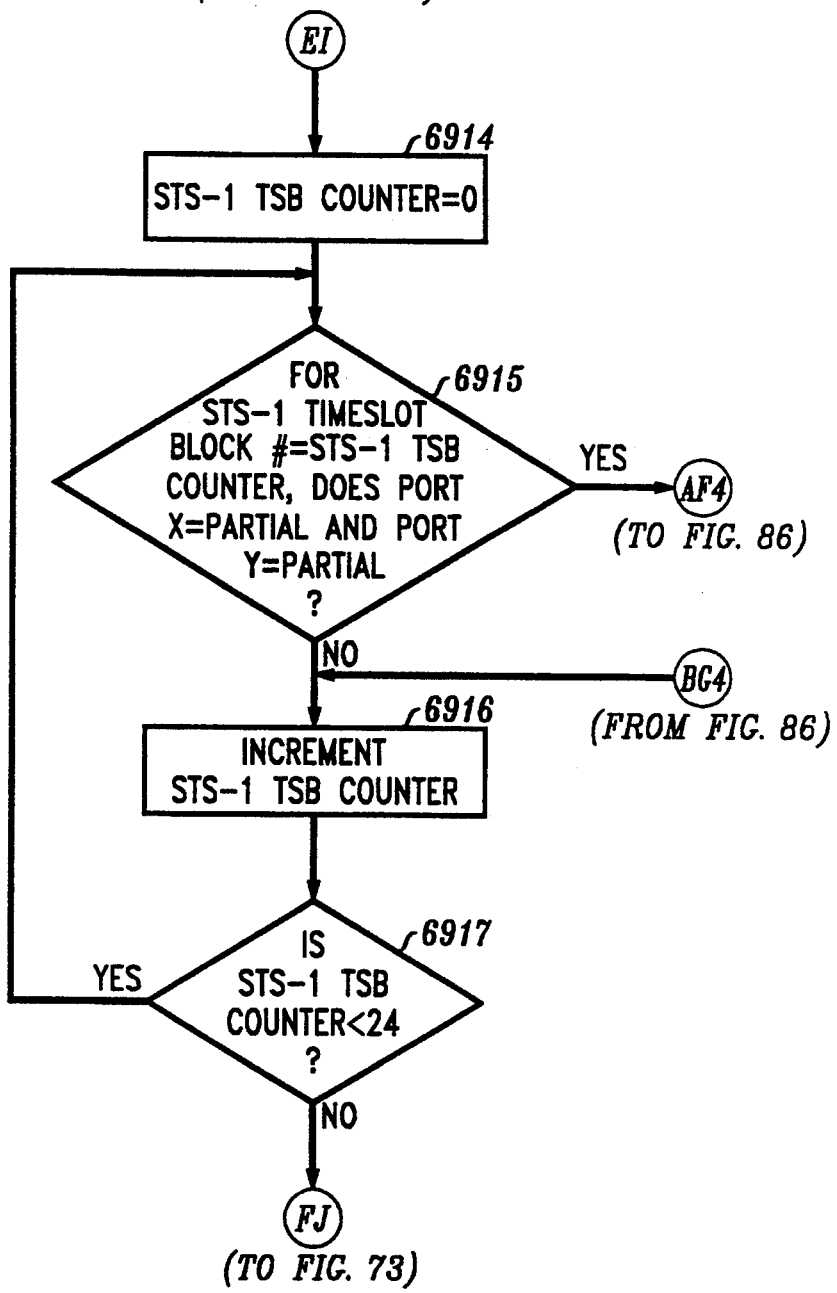
Figure 84:
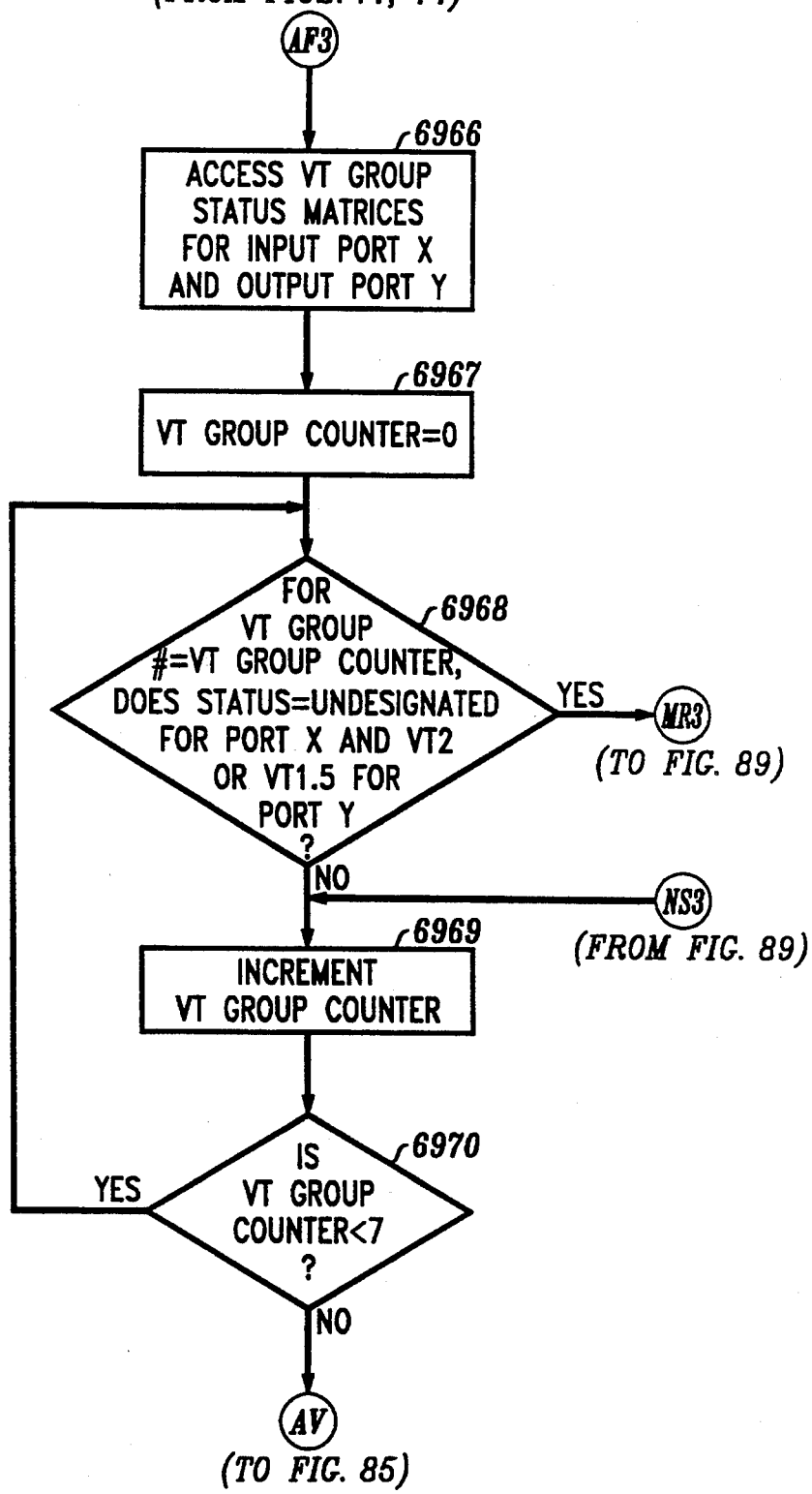

Execution of FIG. 84 is entered from FIG. 71 or FIG. 74. If an undesignated input VT group and a matching output VT group designated as VT2 or as VT1.5 are found at step 6968 of FIG. 84, program execution proceeds to FIG. 89 to search for idle-partial matching VTs within those VT groups; if the search of FIG. 89 should fail, program execution will return to step 6969 to continue the search for an undesignated-suitably designated matching VT group combination. If such a VT group combination cannot be found in FIG. 84, program execution proceeds to FIG. 85.

Figure 85:
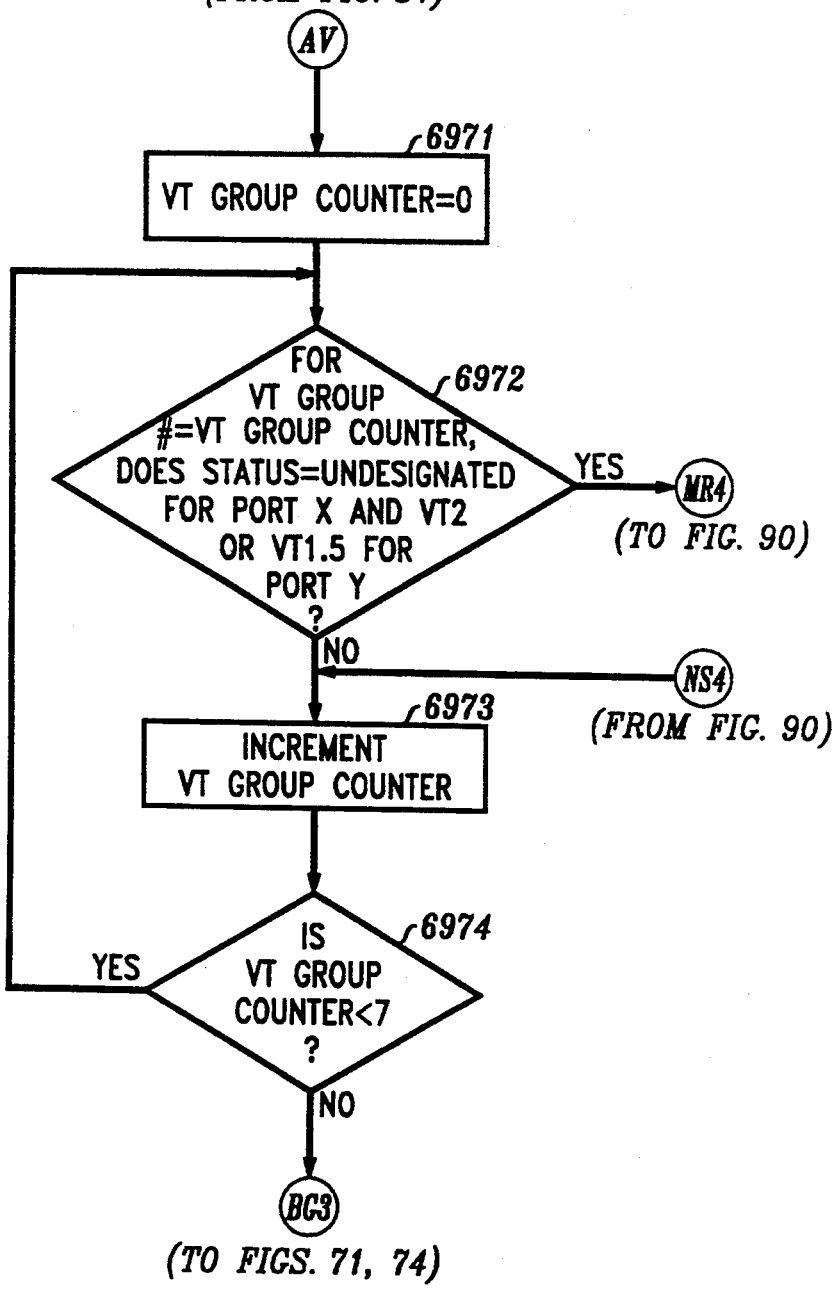

If an undesignated-suitably designated matching VT group combination is found at step 6972 of FIG. 85, program execution proceeds to FIG. 90 to search for idle-idle matching VTs within those VT groups; if the search of FIG. 90 should fail, program execution will return to step 6973 to continue the search for an undesignated-suitably designated matching VT group combination. If such a VT group combination cannot be found in FIG. 85, program execution returns to FIG. 71 or FIG. 74 from whence it came.

Execution of FIG. 86 is entered from FIG. 72, 75, 76, or 77. If undesignated matching VT groups are found at step 6977 of FIG. 86, program execution proceeds to FIG. 90 to search for idle-idle matching VTs within those VT groups; if the search of FIG. 90 should fail, program execution will return to step 6977 to continue the search for undesignated matching VT groups. If such VT groups cannot be found in FIG. 86, program execution returns to FIG. 72, 75, 76, or 77 from whence it came.

Figure 87:
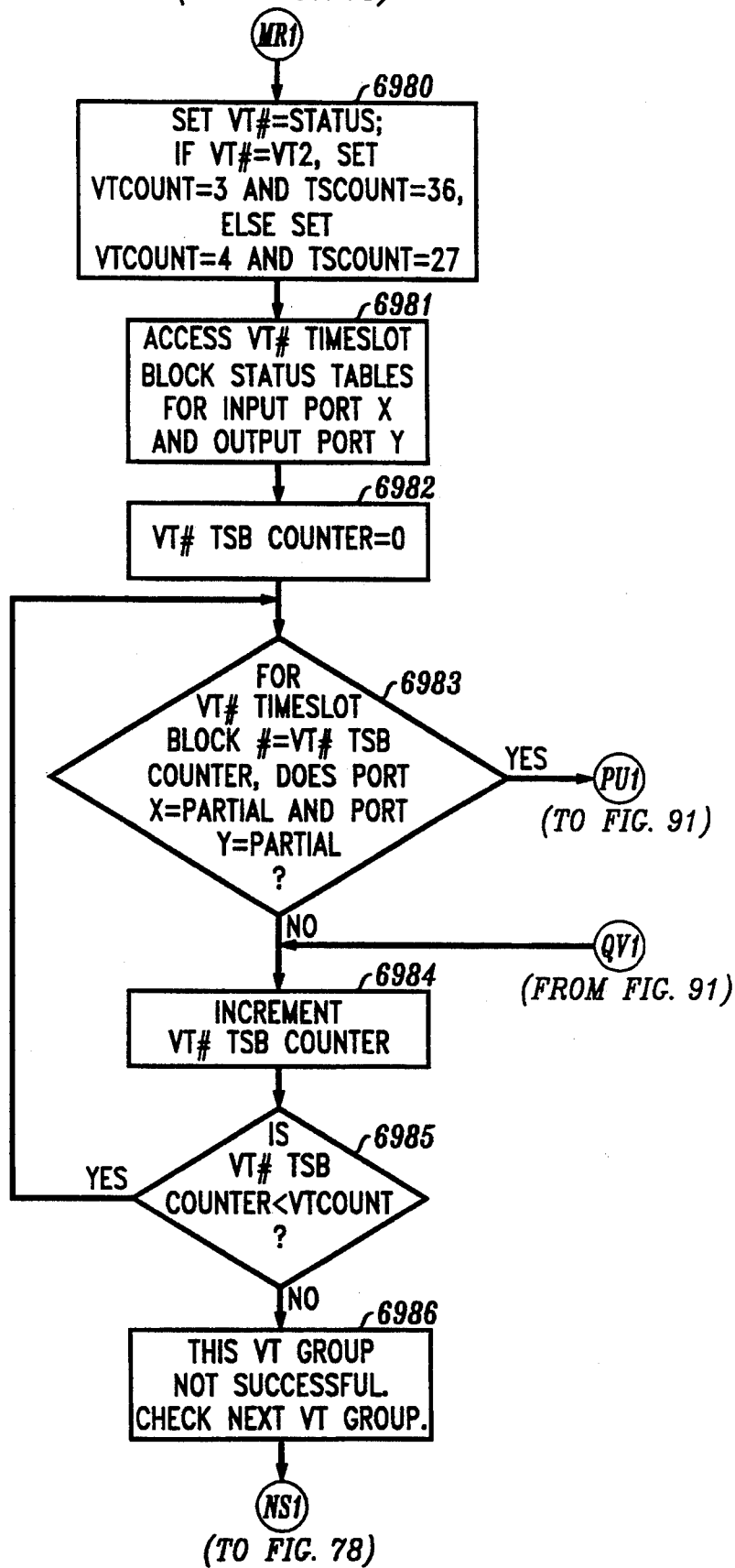

The function of one of FIGS. 87–90 is reached when suitable matching VT groups have been found in FIGS. 78–86, as described above. Turning first to FIG. 87, at step 6980, a VT# variable is set to the VT2 or VT1.5 designated status of the suitable matching VT groups that had been found in the one of the FIGS. 78–86; if the VT group's status is undesignated, then the VT# variable is set to either VT1.5 or VT2. The value of the VT# variable determines whether the DS-0 connection is mapped to a VT1.5 or a VT2 rate. Also, if the VT# variable is set to VT2, then a VT count variable is set to 3 (the number of VT2s in a VT group) and a TS count variable is set to 36 (the number of time slots, or DS-0s, in a VT2). If the VT# variable is not set to VT2, then the VT count variable is set to 4 (the number of VT1.5s in a VT group) and the TS count variable is set to 27 (the number of time slots, or DS-0s, in a VT1.5).

The remaining steps of FIG. 87 closely parallel those of FIG. 50, which had been discussed above in conjunction with VT3 connections. At step 6981, the present count of the VT group counter is used to identify and access VT timeslot block status tables 2702 that correspond to the subject matching VT groups of the input and output TSIs. Also, either a VT2 or a VT1.5 counter—depending upon the value of VT#—is initialized to zero, at step 6982. The count of this counter is then used to access and examine a corresponding entry 2712 of each one of the tables 2702 that were accessed at step 6960 to determine if their contents indicate partially-idle bandwidth for the corresponding VT2 or VT1.5 in both the input and output TSIs, at step 6983. If so, program execution proceeds to FIG. 91 to look for an idle DS-0 in that VT in both the input and output TSIs; if not, the VT2 or VT1.5 counter that was initialized at step 6982 is incremented by one, at step 6984, and the counter's value is checked against the value of the VT count variable to determine if the counter's value is smaller. If so, program execution returns to step 6983 to check the status of the next VT2 or VT1.5 in the subject matching VT groups. But if the counter's value is not less than the value of VT count, there are no more VT2s or VT1.5s in these VT groups to be checked. In other words, the search for a partially-idle VT2 or VT1.5 in this input and output VT group has been unsuccessful, as indicated at step 6986, and program execution returns to step 6943 of FIG. 78 to select and check another input and output VT group.

The functions of FIGS. 88–90 essentially duplicate the function of FIG. 87. But whereas step 6983 of FIG. 87 checks for a partial-partial VT2 or VT1.5 combination, step 6990 of FIG. 88 checks for a partial-idle combination, step 6997 of FIG. 89 checks for an idle-partial combination, and step 7004 of FIG. 90 checks for an idle-idle combination.

Figure 91:
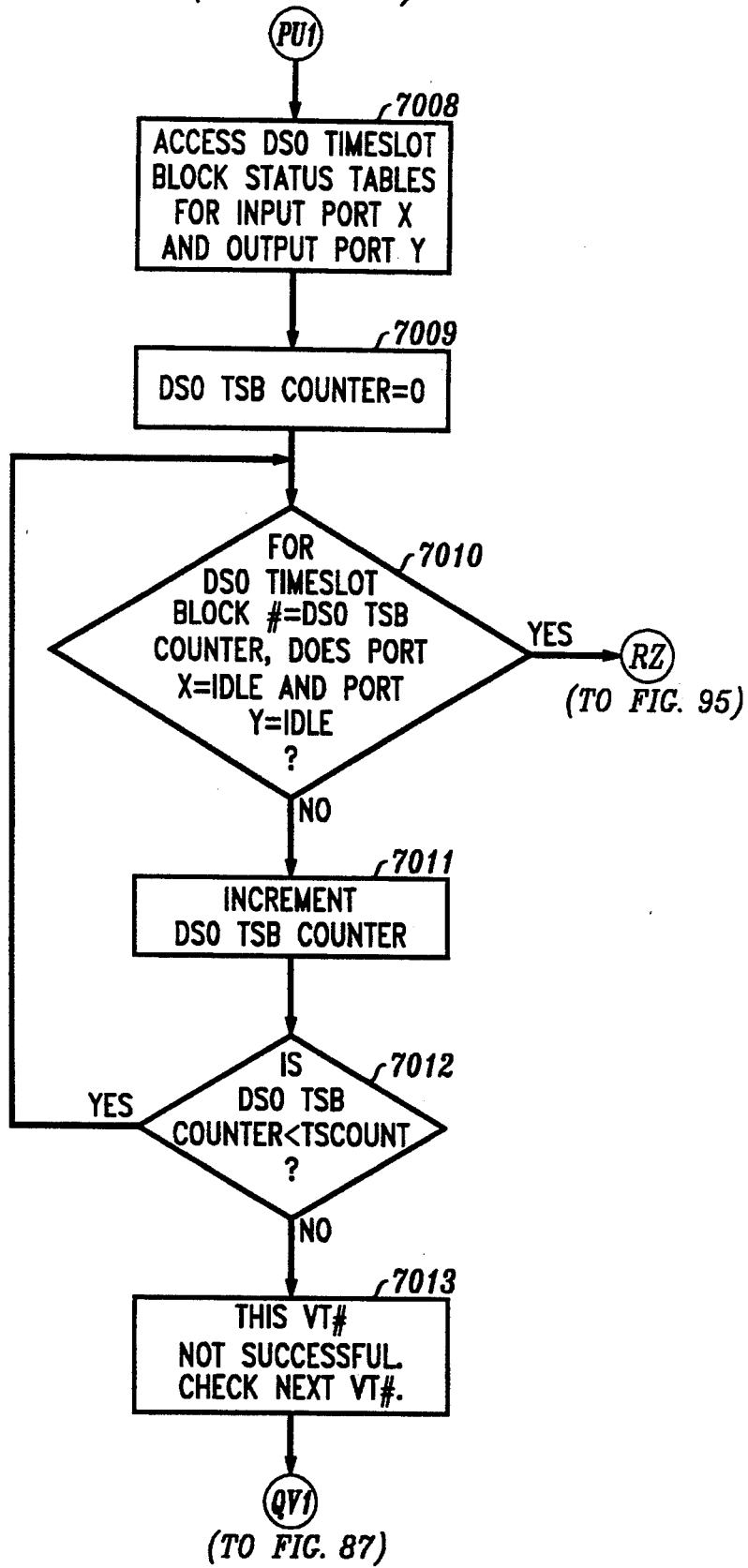

The function of FIG. 91 is reached when a fully or a partially-idle VT2 or VT1.5 has been found in FIG. 87. At step 7008, the present count of the VT2 or VT1.5 TSB counter—depending upon the value of VT#—is used to identify and access DS0 timeslot block status tables 2703 (see FIG. 27) in DS-0 timeslot block status matrices 3100 (see FIG. 31) that correspond to the suitably-idle VT2 or VT1.5 in the input and output TSIs. Also, a DS0 TSB counter (not shown) is initialized to zero, at step 7009. The count of this counter is then used to access and examine a corresponding entry 2713 of each one of the two tables 2703 that were accessed at step 7008 to determine if their contents indicate that the corresponding DS0s are idle in both input and output TSIs, at step 7010. If so, the DS-0 is available, and program execution proceeds to FIG. 95; if not, the DS-0 is not available, and the next DS-0 must be checked. The DS0 TSB counter is therefore incremented by one, at step 7011, and the counter's value is checked against the value of the TS count variable, at step 7012. If the counter's value is less than the TS count's value, there are more DS0s to be checked in this VT2 or VT1.5, and so program execution returns to step 7010 to check the status of the next DS-0. But if the counter's value is not less than the TS count's value, there are no more DS-0s in this VT2 or VT1.5 to be checked. In other words, the search for an idle DS-0 in this input and output VT2 or VT1.5 has been unsuccessful, as indicated in step 7013, and program execution returns to FIG. 87 from whence it came, to select another VT2 or VT1.5.

Figure 92:
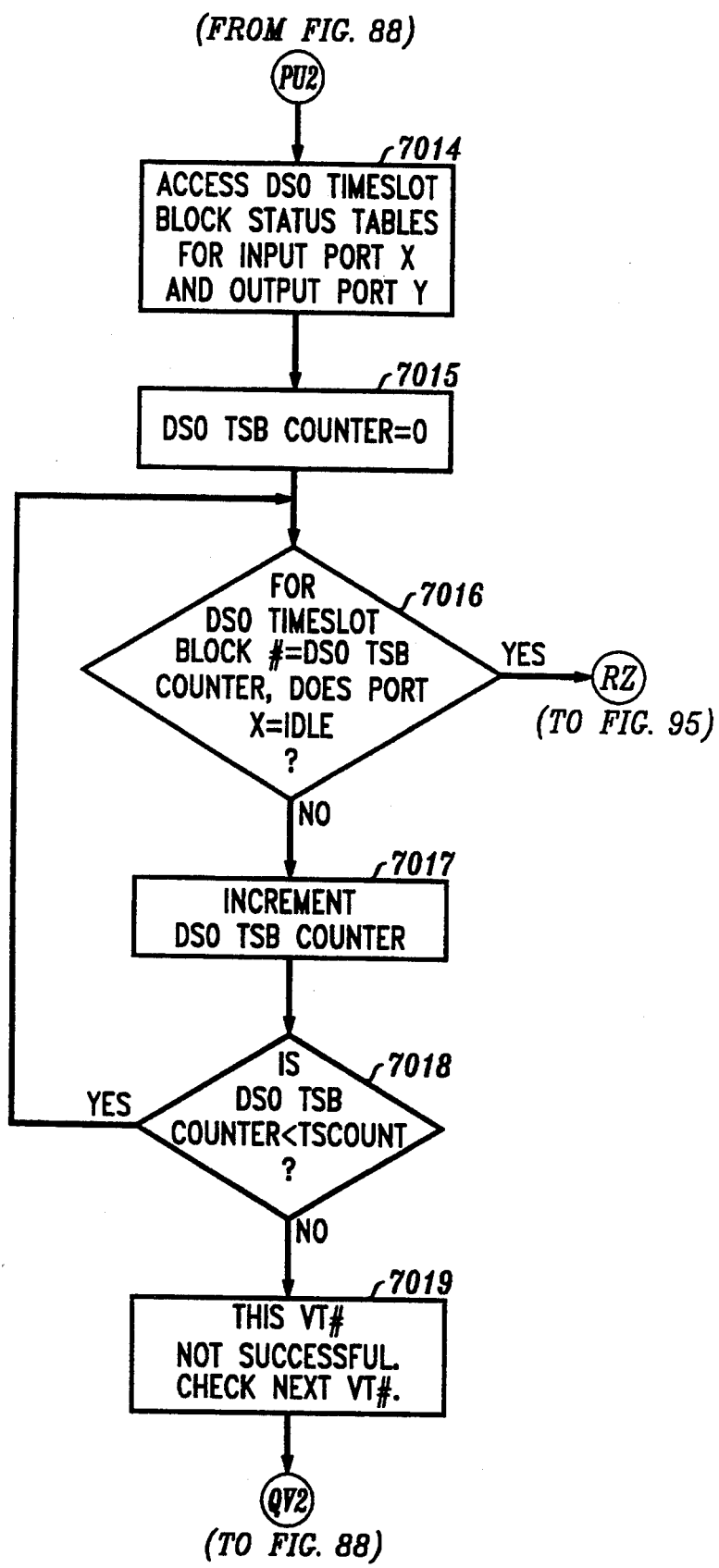
Figure 93:
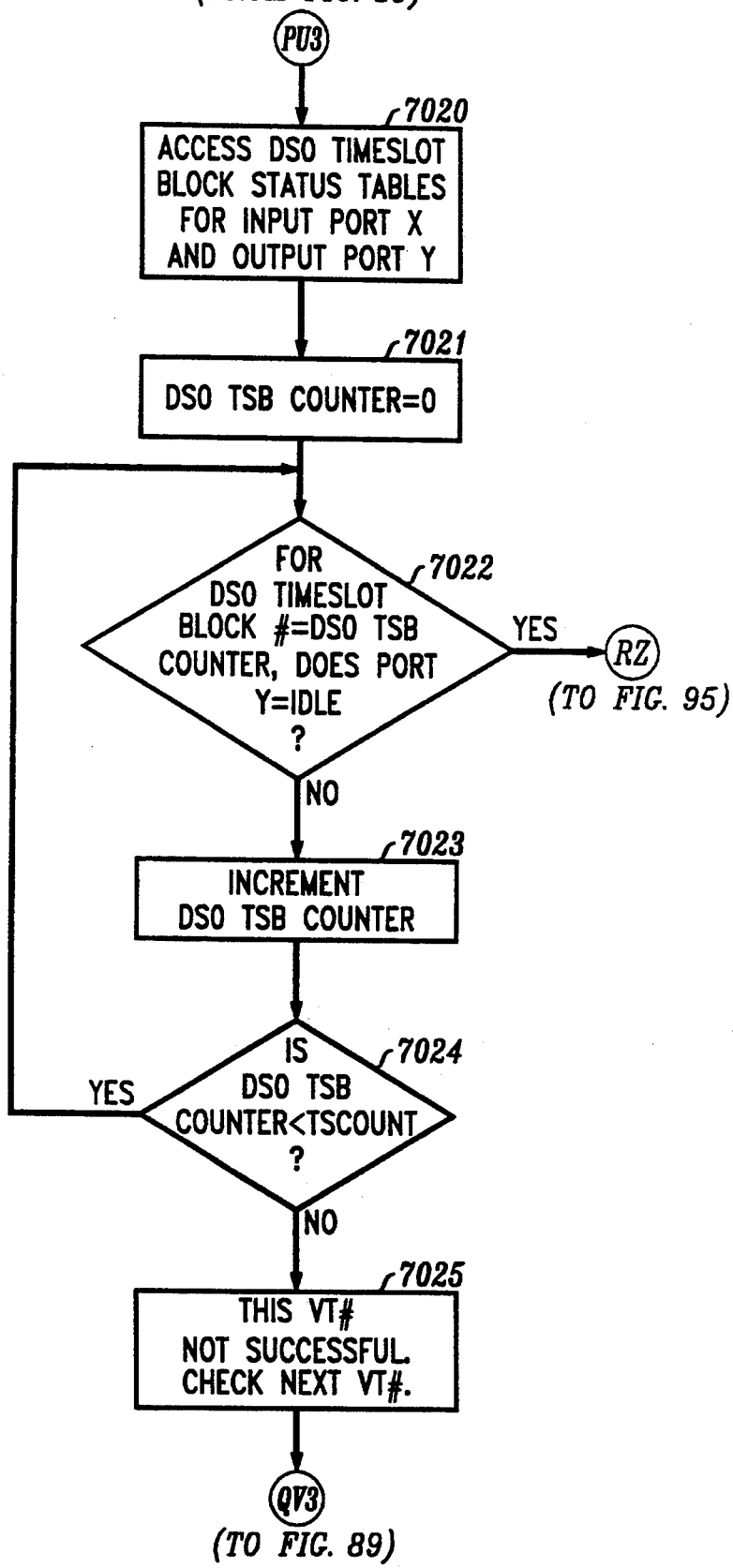
Figure 94:
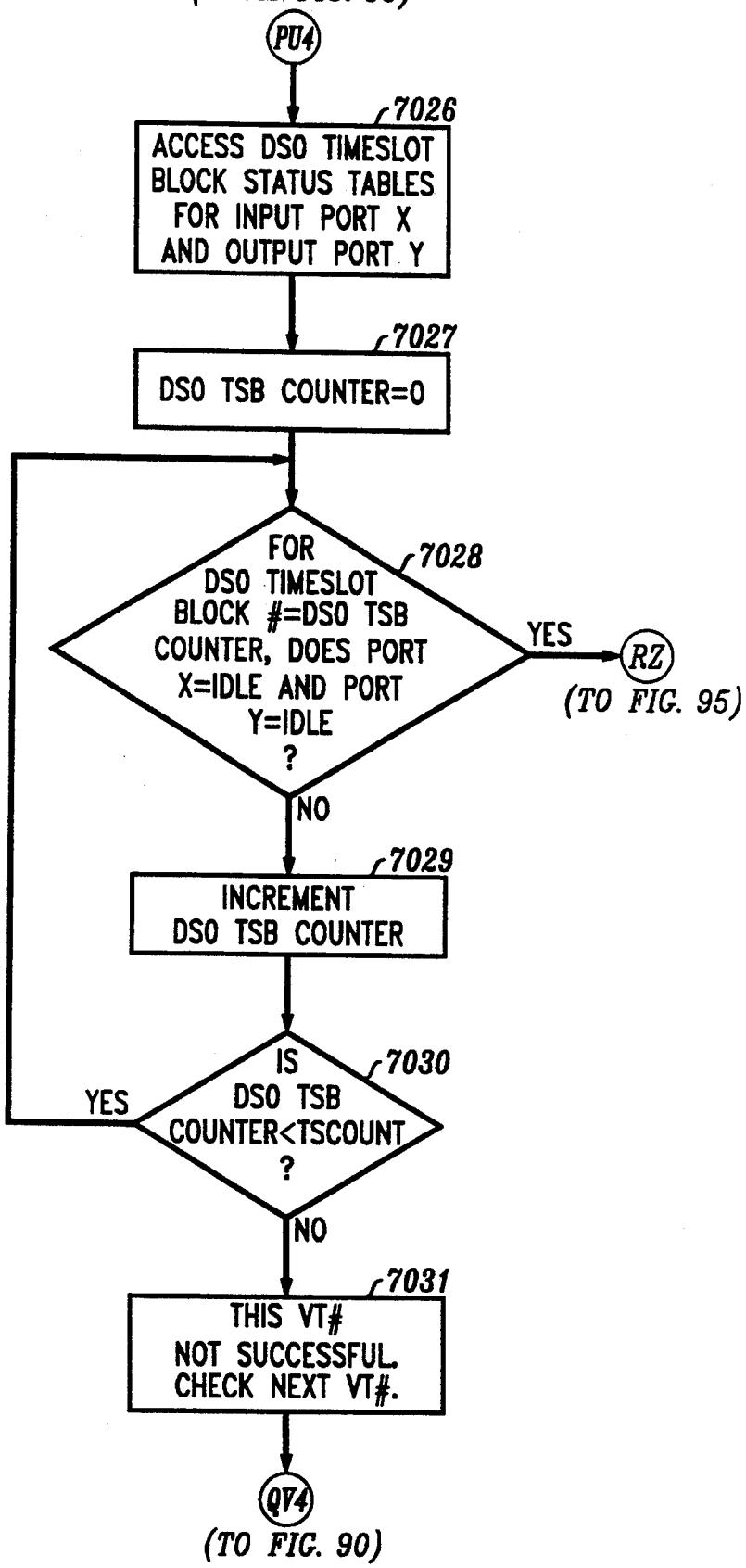

FIGS. 92-94 substantially duplicate FIG. 91. The function of FIG. 92 is entered from FIG. 88, at step 7016 checks only the entry 2713 of table 2703 of the input TSI 131 because the DS-0 of the output TSI is known to be idle from FIG. 88, and if the check is unsuccessful, it returns to FIG. 88. Similarly, the function of FIG. 93 is entered from FIG. 89, at step 7022 checks only the entry 2713 of table 2703 of the output TSI 141 because the DS-0 of the input TSI is known to be idle from FIG. 89, and if the check is unsuccessful, it returns to FIG. 89. In like vein, the function of FIG. 94 is entered from FIG. 90, at step 7028 performs a pro-forma check of the entries 2713 of table 2703 of the input and output TSIs which should never fail because the DS-0s are known to be idle from FIG. 90, and then proceeds to FIG. 95 as do FIGS. 91-94.

Turning to FIG. 95, both of the entries 2713 that were just successfully examined in FIG. 91, 92, 93, or 94 for matching idle DS-0s are marked as busy, at step 7032. Also, if the entries 3001 of VT group status matrices 3000 for the input and output VT2 or VT1.5 which contain the subject DS0 do not indicate any VT type, then they are marked to indicate VT2 or VT1.5—depending upon the present value of the VT# variable—at step 7033. Furthermore, the entries 2712 of tables 2702 which correspond to the VT2 or VT1.5 that contains the subject DS0 (indicated by the present count of either the VT2 or the VT1.5 TSB counter—depending upon the present value of the VT# variable), and the entries 2711 of tables 2701 which correspond to the STS-1 which in turn contains that VT2 or VT1.5 (indicated by the present count of the STS-1 TSB counter), are updated to indicate partially-idle or busy status, at step 7034, in the manner described previously for step 3732 of FIG. 43. The DS-0 connection is now ready to be programmed into control memories of input TSI 131, output TSI 141, and TMS 120, and so the results of the path-hunt are loaded into the TSI and TMS programming registers, at step 7035. The setup having been successfully completed, the procedure returns to step 6803 of FIG. 68, at step 7036.

Of course, it should be understood that various changes and modifications to the illustrative embodiment described above will be apparent to those skilled in the art. For example, the invention can be applied to any three-stage switching network comprised of time and/or space switching stages. Specific examples include a space-space-space switching network or a space-time-space switching network. These variations may be chosen depending upon the format of the information being transported on the network. In addition, the invention can be applied to any network, in that any single stage in any network can be replaced by a three-stage network in accordance with this invention. Also, multistage fabrics may be subdivided into three-stage subsets, or the algorithm can be extended for parallel searches across all stages. For example, for a four-stage fabric, the search hierarchy would be extended to partial-partial-partial, partial-partial-idle, etc. Such changes and modifications can be made without departing from the spirit and the scope of the invention and without diminishing its attendant advantages. It is therefore intended that all such changes and modifications be covered by the following claims.

We claim:

1. A method of providing a switched connection of a given bandwidth as a collection of a plurality of connections of smaller bandwidth through a switching network providing connections having a hierarchy of data rates comprising at least a high rate and a lower rate, said method comprising the steps of:
    dividing said given bandwidth into at least one first connection having said high rate;
    dividing any remainder of said given bandwidth into at least one second connection having said lower rate;
    attempting to provide said at least one first connection having said high rate to satisfy some of said given bandwidth;
    selectively failing to provide at least one said attempted first connection;
    in response to failing to provide at least one said attempted first connection, dividing the bandwidth of any said failed attempted first connection into a plurality of third connections having said lower rate; and
    providing said third connections and any said second connections having said lower rate to satisfy other of said given bandwidth.

2. A method of providing a switched connection of a given bandwidth as a collection of a plurality of connections of smaller bandwidth through a switching network providing connections having a hierarchy of data rates comprising at least a high rate and a lower rate, wherein said switching network is a three-stage network having switching elements and that includes a hierarchy of status tables for each individual input and each individual output switching element of said three-stage network, said hierarchy of status tables corresponding to said hierarchy of data rates, each status table having entries each defining availability of time slots having bandwidth of the corresponding rate and connecting the corresponding individual input or output switching element with an intermediate switching stage of said three-stage network and defining availability as fully-available, partially-available, or non-available, said method comprising the steps of:
    providing at least one connection having said high rate to satisfy some of said given bandwidth, including
    finding first entries defining fully-available bandwidth in high rate status tables for matching first time slots of an input switching element and an output switching element to be used for said connection of said given bandwidth to satisfy as much of said given bandwidth as possible, and marking said first entries as non-available; and
    providing at least one connection having said lower rate to satisfy other of said given bandwidth.

3. The method of claim 2 wherein:
    the step of providing at least one connection having said high rate comprises the further step of
    marking second entries in said status tables for said lower rate which correspond to said first entries as non-available.

4. The method of claim 2 wherein:
    the step of providing at least one connection having said high rate comprises the further step of
    programming a connection between said first matching time slots into control memories of said input and output switching elements and said intermediate switching stage.

5. The method of claim 2 wherein the step of providing at least one connection having said lower rate comprises the steps of:

finding second entries defining at least partially-available bandwidth in said high rate status tables for matching second time slots of said input and output switching elements;

for said second entries, finding third entries defining at least partially-available bandwidth, for matching third time slots in lower rate status tables which correspond to said second entries; and selectively marking the third entries as partially-available or non-available.

6. The method of claim 5 wherein:

the step of providing at least one connection having said lower rate comprises the further step of selectively marking the second entries as either partially-available or non-available.

7. A method of claim 5 wherein:

the step of providing at least one connection having said lower rate comprises the further step of programming a connection between said third matching time slots into control memories of said input and output switching elements and said intermediate switching stage.

8. The method of claim 5 wherein:

the step of finding second entries comprises the step of seeking to find initial second entries defining partially-available bandwidth in said high rate status tables for matching second time slots of said input and output switching elements, in response to either not finding said initial second entries or finding said initial second entries but not finding said third entries in the lower rate status tables which correspond to said initial second entries, seeking to find intermediate second entries one of which defines partially-available bandwidth and the other of which defines fully-available bandwidth in said high rate status tables for matching second time slots of said input and output switching elements, and in response to either not finding said intermediate second entries or finding said intermediate second entries but not finding said third entries in the lower rate status tables which correspond to said intermediate second entries, seeking to find final second entries defining fully-available bandwidth in said high rate status tables for matching second time slots of said input and output switching elements.

9. The method of claim 8 wherein:

the step of finding third entries comprises the step of for each pair of found said second entries, seeking to find third entries defining fully-idle bandwidth for matching third time slots in lower rate status tables which correspond to said pair of found second entries; and the step of marking said third entries comprises the step of in response to finding said third entries, marking said found third entries as non-available.

10. The method of claim 8 wherein:

the step of finding third entries comprises the steps of for each pair of found second entries, seeking to find initial third entries defining partially-idle bandwidth for matching third time slots in lower rate status tables which correspond to said pair of found second entries, in response to not finding said initial third entries, seeking to find intermediate third entries one of which defines partially-idle bandwidth and the other of which defines fully-idle bandwidth for matching third time slots in lower rate status tables which correspond to said pair of found second entries, and in response to not finding said intermediate third entries, seeking to find final third entries defining fully-idle bandwidth for matching third time slots in lower rate status tables which correspond to said pair of found second entries; and the step of marking said third entries comprises the step of in response to finding any said third entries, selectively marking said found third entries as partially-available or non-available.

11. A method of providing a switching connection of a given bandwidth as a collection of a plurality of connections of smaller bandwidth through a switching network providing connections having a hierarchy of data rates comprising at least a high rate and a lower rate, where said switching network is a three-stage network having switching elements, said method comprising the steps of:

storing a hierarchy of status tables for each input and output switching element of said three-stage network, and status tables having entries defining availability of time slots connecting the input and the output switching elements with an intermediate switching stage of said three-stage network, said hierarchy of status tables corresponding to said hierarchy of data rates and defining availability of full, partial, or idle, for connections having said high and said lower rate;

finding matching idle entries in the high rate status tables for the input and the output switching elements to be used for said connection of said given bandwidth to meet the requirements of as much of said given bandwidth as possible;

marking said found idle entries as full and updating corresponding status tables for said lower rate; and providing at least one connection having said lower rate to satisfy as much of any unsatisfied bandwidth of said given bandwidth as possible.

12. A method in accordance with claim 11 wherein said providing at least one connection having said lower rate comprises the steps of:

finding matching partial entries in said high rate status tables for said input and output switching elements;

for said found matching partial entries, finding matching idle entries in the corresponding lower rate status tables; and marking said found idle entries in said corresponding lower rate status tables as full and updating the corresponding entries in the high rate status tables.

13. A method in accordance with claim 12 wherein said providing at least one connection having said lower rate further comprises the steps of:

finding corresponding partial/idle and idle/partial entries in said high rate status tables for said input and output switching elements;

for said found corresponding partial/idle and idle/partial entries, finding matching idle entries in the corresponding lower rate status tables; and marking said found idle entries in said corresponding lower rate status tables as full and updating the corresponding entries in the high rate status tables.

14. A method in accordance with claim 13 wherein said providing at least one connection having said lower rate further comprises the steps of:
finding matching idle entries in said high rate status tables for said input and output switching elements;
for said found matching idle entries, finding matching idle entries in the corresponding lower rate status tables; and
marking said found idle entries in said corresponding lower rate status tables as full and updating the corresponding entries in the high rate status tables.

15. In a switching system comprising a three-stage network having switching elements for switching connections having a hierarchy of data rates comprising a lowest rate corresponding to one time slot of a time division frame of time slots, said hierarchy comprising at least one higher rate corresponding to a predefined plurality of time slots within said time division frame, a method comprising the steps of:
storing a hierarchy of status tables for each input and output switching element of input and output switching states, respectively, of said three-stage network, said status tables having entries defining availability of time slots connecting the corresponding input or output switching element with an intermediate switching stage of said three-stage network, said hierarchy of status tables corresponding to said hierarchy of data rates, said status tables for said higher rate defining the corresponding plurality of time slots, as full, partial or idle, said status tables for said lowest rate defining each time slot of said frame as busy or idle; and
in response to a request for a connection through said three-stage network having said higher rate, finding matching idle entries in the status tables for said higher rate for the input and the output switching elements to be used for said requested connection if said matching idle entries exist.

16. A method in accordance with claim 15 further comprising the steps of:
in response to a request for a connection through said three-stage network having said lowest rate, finding matching partial entries in the status tables for said higher rate for the input and the output switching elements to be used for said requested connection if such matching partial entries exist; and
upon finding said matching partial entries, finding matching idle entries in the status tables for said lowest rate for the input and the output switching elements to be used for said requested connection, said matching idle entries being selected from the pluralities of time slots corresponding to said found matching partial entries in the status tables for said higher rate.

17. In a three-stage switching network having switching elements and providing connections of STS-N, VT, and DS-0 rates where N is an integer, a path-hunt method comprising the steps of:
storing a hierarchy of status tables for each input and output switching element of said three-stage network, said status tables having entries defining availability of time slots connecting the corresponding input or output switching element with an intermediate switching stage of said three-stage network, said hierarchy of status tables corresponding to said STS-N, VT, and DS-0 rates and defining availability as full, partial, or idle for connections having said STS-N and VT rates, and defining availability as busy or idle for connections having said DS-0 rate.

A) in response to a request for an STS-N connection, finding matching idle entries in the STS-N status tables for the input and the output switching elements to be used for said STS-N connection and assigning time slots represented by said matched idle STS-N entries to said STS-N connection;

B) in response to a request for a VT connection, finding matching idle entries in the VT status tables for the input and the output switching elements to be used for said VT connection, and assigning time slots represented by said matching idle VT entries to said VT connection but only when the result of such assignment of said VT time slots does not result in a previously-idle STS-N entry no longer being available for STS-N connections unless such assignment is necessary to prevent blocking of said VT connection; and C) in response to a request for a DS-0 connection, finding matching idle entries in the DS-0 status tables for the input and the output switching elements to be used for said DS-0 connection, and assigning time slots represented by said matching idle DS-0 entries to said DS-0 connection but only when the result of such assignment of said DS-0 time slots does not result in a previously-idle VT entry no longer being available to VT connections unless such assignment is necessary to prevent blocking of said DS-0 connection.

18. A method in accordance with claim 17 further comprising the step of:
when no time slots are assigned to said STS-N connection in step A), attempting to complete the STS-N connection as a plurality of VT connections.

19. A method in accordance with claim 17 further comprising the step of:
when no time slots are assigned to said VT connection in step B), attempting to complete said VT connection as a plurality of DS-0 connections.

20. A method in accordance with claim 17 wherein said VT rate comprises at least one of VT1.5, VT2, VT3, and VT6 rates.

21. In a three-stage switching network providing connections having a hierarchy of data rates comprising a highest rate, at least one intermediate rate, and a lowest rate, a path-hunt method comprising the steps of:
in response to a request for a switched connection of a given bandwidth through the three-stage switching network, dividing said given bandwidth into a plurality of bandwidths corresponding to individual rates of said hierarchy of data rates;
path-hunting for connections having said highest rate to try to satisfy at least some of any bandwidths of said plurality which correspond to said highest rate;
dividing any unsatisfied bandwidths of said plurality which correspond to said highest rate into additional bandwidths corresponding to at least one of the lower rates;
path-hunting for connections having said at least one intermediate rate to try to satisfy at least some of any bandwidths which correspond to said at least one intermediate rate;

dividing any unsatisfied bandwidths which correspond to said at least one intermediate rate into additional bandwidths corresponding to said lowest rate; and path-hunting for connections having said lowest rate to try to satisfy any bandwidths which correspond to said lowest rate.

22. The method of claim 21 in a three-stage switching network having switching elements and that includes a hierarchy of status tables for each individual input and each individual output switching element of said three-stage switching network, different ones of the status tables of said hierarchy of status tables corresponding to said rates of said hierarchy of data rates, each status table having entries each defining availability of time slots having bandwidth of the corresponding rate and connecting the corresponding individual input or output switching element with an intermediate switching stage of said three-stage switching network and defining availability as fully-available, partially-available, or non-available, wherein:

the step of dividing said given bandwidth comprises the steps of:

first dividing said given bandwidth into zero or more connections having said highest rate, secondly dividing any of said given bandwidth remaining after said step of firstly dividing, into zero or more connections having said at least one intermediate rate, and thirdly dividing any of said given bandwidth remaining after said step of secondly dividing, into zero or more connections having said lowest rate.

23. The method of claim 22 wherein the step of path-hunting for connections having said highest rate comprises the steps of for every connection having said highest rate, seeking to find a pair of first entries defining fully-available bandwidth in highest rate status tables for matching first time slots of an input switching element and an output switching element to be used for said connection having said highest rate, and in response to finding any of said sought pairs of first entries, marking the found pairs of first entries as non-available; and the step of dividing any unsatisfied bandwidths which correspond to said highest rate comprises the step of in response to failing to find some of said sought pairs of first entries, dividing the bandwidth of some said connections having said highest rate into a plurality of additional connections having said at least one intermediate rate.

24. The method of claim 23 wherein the step of path-hunting for connections having said at least one intermediate rate comprises, for each said intermediate rate, the steps of for every connection having an individual intermediate rate, seeking to find a pair of second entries defining at least partially-available bandwidth in said highest rate status tables for matching second time slots of said input and output switching elements to be used for said connection having said individual intermediate rate, in response to finding a pair of said sought second entries, seeking to find a pair of third entries defining fully-available bandwidth at said individual intermediate rate in intermediate rate status tables for matching third time slots of said input and output switching elements to be used for said connection having said individual intermediate rate, in response to finding any of said pairs of third entries, marking the found pairs of third entries as non-available, and in response to marking any said found pairs of third entries as non-available, selectively marking the corresponding second entries as partially-available or non-available; and the step of dividing any unsatisfied bandwidths which correspond to said at least one intermediate rate comprises the step of in response to failing to find some of said sought pairs of third entries, dividing the bandwidth of some said connections having said individual intermediate rate into a plurality of additional connections having a lower rate than said individual rate.

25. The method of claim 24 wherein the step of path-hunting for connections having said lowest rate comprises the steps of for every connection having said lowest rate, seeking to find a pair of fourth entries defining at least partially-available bandwidth in said highest-rate status tables for matching fourth time slots of said input and output switching elements to be used for said connection having said lowest rate, in response to finding a pair of said sought fourth entries, seeking to find a pair of fifth entries defining at least partially-available bandwidth in said intermediate rate status tables for matching fifth time slots of said input and output switching elements to be used for said connection having said lowest rate, in response to finding a pair of said sought fifth entries, seeking to find a pair of sixth entries defining fully-available bandwidth in lowest rate status tables for matching sixth time slots of said input and output switching elements to be used for said connection having said lowest rate, in response to finding any of said sought pairs of sixth entries, marking the found pairs of sixth entries as non-available, and in response to marking any found pairs of sixth entries non-available, selectively marking the corresponding fourth and fifth entries as partially-available or non-available.

26. The method of claim 25 wherein said hierarchy of data rates is a SONET or an SDH hierarchy of rates.

27. The method of claim 25 wherein said highest rate is an STS-N rate where N is an integer, said at least one intermediate rate is at least one VT rate, and said lowest rate is a DS-0 rate.

28. A switching arrangement comprising:

a switching network that switches connections having a hierarchy of data rates comprising at least a high rate and a lower rate;

first means responsive to a request for a switched connection of a given bandwidth, for dividing the given bandwidth into at least one first connection having the high rate;

means coupled to the first means for dividing, for attempting to find the at least one first connection having the high rate to satisfy some of the given bandwidth;

second means for dividing any remainder of the given bandwidth into at least one second connection having the lower rate;

third means responsive to failure to find at least one attempted first connection, for dividing the bandwidth of any said failed attempted first connection into a plurality of third connections having the lower rate; and means coupled to the second and third means for dividing, for finding the third connections and any said connections having the lower rate to satisfy other of the given bandwidth;

the switching network providing the requested connection as a collection of the found connections.

29. A switching arrangement comprising:

a three-stage switching network that switches connections having a hierarchy of data rates comprising at least a high rate and a lower rate, the three-stage switching network having switching elements and including a hierarchy of status tables for each individual input and each individual output switching element of said three-stage network, said hierarchy of status tables corresponding to said hierarchy of data rates, each status table having entries each defining availability of time slots having bandwidth of the corresponding rate and connecting the corresponding individual input or output switching element with an intermediate switching stage of said three-stage network and defining availability as fully-available, partially-available, or non-available; and means responsive to a request for a switched connection of a given bandwidth, for finding at least one connection through the switching network having the high rate to satisfy some of the given bandwidth, including means for finding first entries defining fully-available bandwidth in high rate status tables for matching first time slots of an input switching element and an output switching element to be used for said connection of said given bandwidth to satisfy as much of said given bandwidth as possible, and means coupled to the means for finding first entries, for marking said first entries as non-available; and means responsive to the request, for finding at least one connection through the switching network having the lower rate to satisfy other of the given bandwidth;

the switching network providing the requested connection as a collection of the found connections.

30. The switching arrangement of claim 29 wherein:
the means for finding at least one connection having said high rate further comprises
means for marking second entries in said status tables for said lower rate which correspond to said first entries as non-available.

31. The switching arrangement of claim 29 further comprising:
means for programming a connection between said first matching time slots into control memories of said input and output switching elements and said intermediate switching stage.

32. The switching arrangement of claim 29 wherein the means for finding at least one connection having said lower rate comprises:
means for finding second entries defining at least partially-available bandwidth in said high rate status tables for matching second time slots of said input and output switching elements;
means coupled to the means for finding second entries, for finding, for said second entries, third entries defining at least partially-available bandwidth, for matching third time slots in lower rate status tables which correspond to said second entries; and
means coupled to the means for finding third entries, for selectively marking the third entries as partially-available or non-available.

33. The switching arrangement of claim 32 wherein:
the means for finding at least one connection having said lower rate further comprises
means for selectively marking the second entries as either partially-available or non-available.

34. The switching arrangement of claim 32 further comprising:
means for programming a connection between said third matching time slots into control memories of said input and output switching elements and said intermediate switching stage.

35. The switching arrangement of claim 32 wherein the means for finding second entries comprises
first means for seeking to find initial second entries defining partially-available bandwidth in said high rate status tables for matching second time slots of said input and output switching elements,
second means coupled to said first means for seeking, responsive to either not finding said initial second entries or finding said initial second entries but not finding said third entries in the lower rate status tables which correspond to said initial second entries, for seeking to find intermediate second entries one of which defines partially-available bandwidth and the other of which defines fully-available bandwidth in said high rate status tables for matching second time slots of said input and output switching elements, and
third means coupled to said second means for seeking, responsive to either not finding said intermediate second entries or finding said intermediate second entries but not finding said third entries in the lower rate status tables which correspond to said intermediate second entries, for seeking to find final second entries defining fully-available bandwidth in said high rate status tables for matching second time slots of said input and output switching elements.

36. The switching arrangement of claim 35 wherein:
the means for finding third entries comprises
means for seeking to find, for each pair of said found second entries, third entries defining fully-idle bandwidth for matching third time slots in lower rate status tables which correspond to said pair of found second entries; and
the means for marking said third entries is responsive to finding said third entries, for marking said found third entries as non-available.

37. The switching arrangement of claim 35 wherein:
the means for finding third entries comprises
fourth means for seeking to find, for each pair of found second entries, initial third entries defining partially-idle bandwidth for matching third time slots in lower rate status tables which correspond to said pair of found second entries.
fifth means coupled to said fourth means for seeking, responsive to not finding said initial third entries, for seeking to find intermediate third entries one of which defines partially-idle bandwidth and the other of which defines fully-idle bandwidth for matching third time slots in lower rate status tables which correspond to said pair of found second entries, and sixth means coupled to said fifth means for seeking, responsive to not finding said intermediate third entries, for seeking to find final third entries defining fully-idle bandwidth for matching third time slots in lower rate status tables which correspond to said pair of found second entries; and the means for marking said third entries is responsive to finding any said third entries, for selectively marking said found third entries as partially-available or non-available.

38. A switching arrangement comprising:

a three-stage switching network that switches connections having a hierarchy of data rates comprising at least a high rate and a lower rate and having switching elements and a hierarchy of status tables for each input and each output switching element of said three-stage network, said status tables having entries defining availability of time slots connecting the corresponding input or output switching element with an intermediate switching stage of said three-stage network, said hierarchy of status tables corresponding to said hierarchy of data rates and defining availability of full, partial, or idle, for connections having said high and said lower rate;

first means responsive to a request for a switched connection of a given bandwidth, for finding matching idle entries in the high rate status tables for the input and the output switching elements to be used for said connection of said given bandwidth to meet the requirement of as much of said given bandwidth as possible;

means coupled to said first means for finding entries, for marking said found idle entries as full and updating corresponding status tables for said lower rate; and means responsive to the request, for finding at least one connection through the three-stage network having the lower rate to satisfy as much of any unsatisfied bandwidth of said given bandwidth as possible.

39. A switching arrangement in accordance with claim 38 wherein said means for finding at least one connection having the lower rate comprises:

second means for finding matching partial entries in said high rate status tables for the input and the output switching elements;

third means coupled to said second means for finding entries, for finding, for said found matching partial entries, matching idle entries in the corresponding lower rate status tables; and means coupled to said third means for finding entries, for marking said found idle entries in said corresponding lower rate status tables as full and updating the corresponding entries in the high rate status tables.

40. A switching arrangement in accordance with claim 39 wherein said means for finding at least one connection having said lower rate further comprises:

fourth means for finding corresponding partial/idle and idle/partial entries in said high rate status for the input and the output switching elements;

fifth means coupled to said fourth means for finding entries, for finding, for said found corresponding partial/idle and idle/partial entries, matching idle entries in the corresponding lower rate status tables; and means coupled to said fifth means for finding entries, for marking said found idle entries in said corresponding lower rate status tables as full and updating the corresponding entries in the high rate status tables.

41. A switching arrangement in accordance with claim 40 wherein said means for finding at least one connection having said lower rate further comprises:

sixth means for finding matching idle entries in said high rate status tables for the input and the output switching elements;

seventh means coupled to said sixth means for finding entries, for finding, for said found matching idle entries, matching idle entries in the corresponding lower rate status tables; and means coupled to said seventh means for finding entries, for marking said found idle entries in said corresponding lower rate status tables as full and updating the corresponding entries in the high rate status tables.

42. A switching system comprising:

a three-stage network having switching stages comprising switching elements for switching connections having a hierarchy of data rates comprising a lowest rate corresponding to one time slot of a time division frame of time slots, said hierarchy comprising at least one higher rate corresponding to a predefined plurality of time slots within said frame;

a hierarchy of status tables for each input and each output switching element of input and output stages, respectively, of said three-stage network, said status tables having entries defining availability of time slots connecting the corresponding input or output switching element with an intermediate switching state of said three-stage network, said hierarchy of status tables corresponding to said hierarchy of data rates, said status tables for said higher rate defining the corresponding plurality of time slots, as full, partial or idle, said status tables for said lowest rate defining each time slot of said frame as busy or idle; and means, responsive to a request for a connection through said three-stage network having said higher rate, for finding matching idle entries in the status tables for said higher rate for the input and the output switching elements to be used for said requested connection if such matching idle entries exist.

43. A switching system in accordance with claim 42 further comprising:

means responsive to a request for a connection through said three-stage network having said lowest rate, for finding matching partial entries in the status tables for said higher rate for the input and the output switching elements to be used for said requested connection if said matching partial entries exist; and means responsive to finding said matching partial entries, for finding matching idle entries in the status tables for said lowest rate for the input and the output switching elements to be used for said requested connection, said matching idle entries being selected from the pluralities of time slots corresponding to said found matching partial entries in the status table for said higher rate.

44. A switching system comprising:

a three-stage network having switching elements and providing connections having STS-N, VT, and DS-0 rates where N is an integer;

a hierarchy of status tables for each input and each output switching element of said three-stage network, said status tables having entries defining availability of time slots connecting the corresponding input or output switching element with an intermediate switching stage of said three-stage network, said hierarchy of status tables corresponding to said STS-N, VT, and DS-0 rates and defining availability as full, partial, or idle for connections having said STS-N and VT rates, and defining availability as busy or idle for connections having said DS-0 rate;

means responsive to a request for an STS-N connection, for finding matching idle entries in the STS-N status tables for the input and the output switching elements to be used for said STS-N connection and assigning time slots represented by said matching idle STS-N entries to said STS-N connection;

means responsive to a request for a VT connection, for finding matching idle entries in the VT status tables for the input and the output switching elements to be used for said VT connection, and assigning time slots represented by said matching idle VT entries to said VT connection but only when the result of such assignment of said VT time slots does not result in a previously-idle STS-N entry no longer being available for STS-N connections unless such assignment is necessary to prevent blocking of said VT connection; and means responsive to a request for a DS-0 connection, for finding matching idle entries in the DS-0 status tables for the input and the output switching elements to be used for said DS-0 connection, and assigning time slots represented by said matching idle DS-0 entries to said DS-0 connection but only when the result of such assignment of said DS-0 time slots does not result in a previously-idle VT entry no longer being available for VT connection unless such assignment is necessary to prevent blocking of said DS-0 connection.

45. A switching system in accordance with claim 44 further comprising:

means responsive to failure to assign time slots to said STS-N connection, for requesting a plurality of VT connections to complete said STS-N connection.

46. A switching system in accordance with claim 44 further comprising:

means responsive to failure to assign time slots to said VT connection, for requesting a plurality of DS-0 connections to complete said VT connection.

47. A switching system in accordance with claim 44 wherein said VT rate comprises at least one of VT1.5, VT1, VT3, and VT6 rates.

48. A path-hunt arrangement for a three-stage switching network providing connections having a hierarchy of data rates comprising a highest rate, at least one intermediate rate, and a lowest rate, comprising:

means responsive to a request for a switched connection of a given bandwidth through the three-stage network, for dividing said given bandwidth into a plurality of bandwidths corresponding to individual rates of said hierarchy of data rates;

means for path-hunting for connections having said highest rate to try to satisfy at least some of any bandwidths of said plurality which correspond to said highest rate;

means for dividing any unsatisfied bandwidths of said plurality which correspond to said highest rate into additional bandwidths corresponding to at least one of the lower rates;

means for path-hunting for connections having said at least one intermediate rate to try to satisfy at least some of any bandwidths which correspond to said at least one intermediate rate;

means for dividing any unsatisfied bandwidths which correspond to said at least one intermediate rate into additional bandwidths corresponding to said lowest rate; and means for path-hunting for connections having said lowest rate to try to satisfy any bandwidths which correspond to said lowest rate.

49. The path-hunt arrangement of claim 48 for a three-stage switching network having switching elements, further comprising a hierarchy of status tables for each individual input and each individual output switching element of said three-stage switching network, different ones of the status tables of said hierarchy of status tables corresponding to said rates of said hierarchy of data rates, each status table having entries each defining availability of time slots having bandwidth of the corresponding rate and connecting the corresponding individual input or output switching element with an intermediate switching stage of said three-stage switching network and defining availability as fully-available, partially-available, or non-available; wherein the means for dividing said given bandwidth comprises means for firstly dividing said given bandwidth into zero or more connections having said highest rate, means for secondly dividing any of said given bandwidth remaining after said step of firstly dividing, into zero or more connections having said at least one intermediate rate, and means for thirdly dividing any of said given bandwidth remaining after said step of secondly dividing, into zero or more connections having said lowest rate.

50. The path-hunt arrangement of claim 49 wherein the means for path-hunting for connections having said highest rate comprises first means for seeking, for every connection having said highest rate, to find a pair of first entries defining fully-available bandwidth in highest rate status tables for matching first time slots of an input switching element and an output switching element to be used for said connection having said highest rate, and means coupled to said first means for seeking, responsive to finding any of said sought pairs of first entries, for marking the found pairs of first entries as non-available; and the means for of dividing any unsatisfied bandwidths which correspond to said highest rate comprises in response to failing to find some of said sought pairs of first entries, dividing the bandwidth of some said connections having said highest rate into a plurality of additional connections having said at least one intermediate rate.

51. The path-hunt arrangement of claim 50 wherein the means for path-hunting for connections having said at least one intermediate rate comprises, for each said intermediate rate, second means for seeking, for every connection having an individual intermediate rate, to find a pair of second entries defining at least partially-available bandwidth in said highest rate status tables for matching second time slots of said input and output switching elements to be used for said connection having said individual intermediate rate, third means coupled to said second means for seeking, responsive to finding a pair of said sought second entries, for seeking to find a pair of third entries defining fully-available bandwidth of said individual intermediate rate in intermediate rate status tables for matching third time slots of said input and output switching elements to be used for said connection having said individual intermediate rate, first means coupled to said third means for seeking, responsive to finding any of said pairs of third entries, for marking the found pairs of third entries as non-available, and second means coupled to the first means for marking, responsive to marking any said found pairs of third entries as non-available, for selectively marking the corresponding second entries as partially-available or non-available; and the means for dividing any unsatisfied bandwidths which correspond to said at least one intermediate rate comprises means responsive to failure to find some of said sought pairs of third entries, for dividing the bandwidth of some said connections having said individual intermediate rate into a plurality of additional connections having a lower rate than said individual intermediate rate.

52. The path-hunt arrangement of claim 57 wherein the means for path-hunting for connections having said lowest rate comprises fourth means for seeking, for every connection having said lowest rate, to find a pair of fourth entries defining at least partially-available bandwidth in said highest-rate status tables for matching fourth time slots of said input and output switching elements to be used for said connection having said lowest rate, fifth means coupled to said fourth means for seeking, responsive to finding a pair of said sought fourth entries, for seeking to find a pair of fifth entries defining at least partially-available bandwidth in said intermediate rate status tables for matching fifth time slots of said input and output switching elements to be used for said connection having said lowest rate, sixth means coupled to said fifth means for seeking, responsive to finding a pair of said sought fifth entries, for seeking to find a pair of sixth entries defining fully-available bandwidth in lowest rate status tables for matching sixth time slots of said input and output switching elements to be used for said connection having said lowest rate, third means coupled to said sixth means for seeking, responsive to finding any of said sought pairs of sixth entries, for marking the found pairs of sixth entries as non-available, and fourth means coupled to said third means for marking, responsive to marking any found pairs of sixth entries non-available, for selectively marking the corresponding fourth and fifth entries as partially-available or non-available.

53. The path-hunt arrangement of claim 52 wherein said hierarchy of data rates is a SONET or an SDH hierarchy of rates.

54. The path-hunt arrangement of claim 52 wherein said highest rate is an STS-N rate where N is an integer, said at least one intermediate rate is at least one VT rate, and said lowest rate is a DS-0 rate.

55. A method of providing a switched connection of a given bandwidth between an input and an output port of a switching network as a collection of a plurality of connections of smaller bandwidth between said input and said output through said switching network, said method comprising the steps of:

dividing said given bandwidth into at least one first unitarily-switched connection having a high data rate between said input and said output of said switching network, said first unitarily-switched connection being one of a plurality of unitarily-switched connections provided by said switching network between inputs and outputs of said switching network and having a hierarchy of data rates comprising at least the high rate and a lower rate;

dividing any remainder of said given bandwidth into at least one second unitarily-switched connection having said lower data rate between said input and said output of said switching network, said second unitarily-switched connection being one of the plurality of unitarily-switched connections provided by said switching network;

attempting to providing said at least one first unitarily-switched connection having said high rate between said input and said output of said switching network to satisfy some of said given bandwidth;

selectively failing to provide at least one said attempted first unitarily-switched connection;

in response to failing to provide at least one said attempted first unitarily switched connection, dividing the bandwidth of any said failed attempted first unitarily-switched connection into a plurality of third unitarily-switched connections having said lower rate between said input and said output of said switching network, said third unitarily-switched connection being one of the plurality of unitarily-switched connections provided by said switching network; and providing said third unitarily-switched connections and any said second unitarily-switched connections having said lower rate between said input and said output of said switching network to satisfy other of said given bandwidth.

56. A method of providing a switched connection of a given bandwidth as a collection of a plurality of available switched connections of smaller bandwidth selected from among switched connections having a hierarchy of data rates comprising at least at high rate and a lower rate and provided by a multi-stage switching network having stages interconnected by paths that are individually time-division multiplexed between a plurality of switched connections, said method comprising the steps of:

finding at least one available switched connection having said high rate through said multi-stage switching network across at least one of said paths to satisfy some of said given bandwidth;

finding at least one available switched connection having said lower rate through said multi-stage switching network across at least one of said paths to satisfy other of said given bandwidth; and providing said found available switched connections through said multi-stage network across at least one of said paths to jointly serve as said switched connection of a given bandwidth.

57. The method of claim 56 wherein:

the step of finding at least one available switched connection having said high rate comprises the step of path-hunting for said available switched connections having said high rate to satisfy as much of said given bandwidth as possible; and the step of finding at least one available switched connection having said lower rate comprises the step of path-hunting for said available switched connections having said lower rate to satisfy as much of any unsatisfied bandwidth of said given bandwidth as possible.

58. The method of claim 57 wherein:

the step of finding available switched connections having said lower rate comprises the step of path-hunting for available switched connections having said lower rate to satisfy all of any said unsatisfied bandwidth.

59. The method of claim 56 wherein:

the step of finding at least one available switched connection having said high rate comprises the steps of dividing said given bandwidth into at least one first said switched connection having said high rate, dividing any remainder of said given bandwidth into at least one second said switched connection having said lower rate, attempting to find an available said at least one first switched connection having said high rate, and selectively failing to find an available at least one said attempted first switched connection; and the step of finding at least one available switched connection having said lower rate comprises the steps of in response to failing to find an available at least one said attempted first switched connection, dividing the bandwidth of any said failed attempted first switched connection into a plurality of third said switched connections having said lower rate, and finding available said third switched connections and any said second switched connections having said lower rate.

60. A switching arrangement comprising:

a switching network that provides unitarily-switched connections between inputs and outputs of said switching network, said unitarily-switched connections having a hierarchy of data rates comprising at least a high rate and a lower rate;

first means responsive to a request for a switched connection of a given bandwidth between an input and an output of said switching network, for dividing the given bandwidth into at least one first unitarily-switched connection having the high rate between said input and said output of said switching network;

means coupled to the first means for dividing, for attempting to find the at least one first unitarily-switched connection having the high rate between said input and said output of said switching network to satisfy some of said given bandwidth;

second means for dividing any remainder of the given bandwidth into at least on second unitarily-switched connection having the lower rate between said input and said output of said switching network;

third means responsive to failure to find at least one attempted said first unitarily-switched connection, for dividing the bandwidth of any said failed attempted fist unitarily-switched connection into a plurality of third unitarily-switched connections having the lower rate between said input and said output of said switching network; and means coupled to the second and third means for dividing, for finding the third unitarily-switched connections and any said second unitarily-switched connections having the lower rate between said input and said output of said switching network to satisfy other of said given bandwidth.

61. A switching arrangement comprising:

a multi-stage switching network having stages interconnected by paths that are individually time-division multiplied by a plurality of switched connections and that switches connections having a hierarchy of data rates comprising at least a high rate and a lower rate;

means responsive to a request for a switched connection of a given bandwidth, for finding at least one available switched connection having said high rate through said multi-stage switching network across at least one of said paths to satisfy some of said given bandwidth; and means responsive to the request, for finding at least one available switched connection having said lower rate through said multi-stage switching network across at least one of said paths to satisfy other of said given bandwidth;

the multi-stage switching network providing said found available switched connections through said multi-stage switching network across at least one of said paths to jointly serve as said requested connection.

62. The switching arrangement of claim 61 wherein:

the means for finding at least one available switched connection having said high rate comprises means for path-hunting for said available switched connections having said high rate to satisfy as much of said given bandwidth as possible; and the means for finding at least one available switched connection having said lower rate comprises means for path-hunting for said available switched connections having said lower rate to satisfy as much of any unsatisfied bandwidth of said given bandwidth as possible.

63. The switching arrangement of claim 61 wherein:

the means for finding at least one available switched connection having said high rate comprises first means for dividing the given bandwidth into at least one first said switched connection having the high rate, and means coupled to the first means for dividing, for attempting to find an available said at least one first switched connection having the high rate; and the means for finding at least one available switched connection having said lower rate comprises second means for dividing any remainder of said given bandwidth into at least one second said switch connection having said lower rate, third means responsive to failure to find an available at least one attempted first switched connection, for dividing the bandwidth of any said failed attempted first switched connection into a plurality of third said switched connections having said lower rate, and means coupled to the second and third means for dividing, for finding available said third switched connections and any said second switched connections having said lower rate.

* * * * *